US008239351B2

(12) United States Patent
Hörnqvist

(10) Patent No.: US 8,239,351 B2
(45) Date of Patent: Aug. 7, 2012

(54) METHODS AND SYSTEMS FOR MANAGING PERMISSIONS DATA

(75) Inventor: John M. Hörnqvist, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 11/811,189

(22) Filed: Jun. 7, 2007

(65) Prior Publication Data

US 2008/0306954 A1 Dec. 11, 2008

(51) Int. Cl.
*G06F 17/30* (2006.01)

(52) U.S. Cl. .................. 707/687; 707/781; 707/783

(58) Field of Classification Search .................. 707/203, 707/1, 3, 754, 770, 797, 781, 783, 784, 687, 707/782; 711/145, 123, 207
See application file for complete search history.

(56) References Cited

U.S. PATENT DOCUMENTS

| | | | | |
|---|---|---|---|---|
| 4,713,755 A | * | 12/1987 | Worley et al. | 711/123 |
| 5,214,770 A | * | 5/1993 | Ramanujan et al. | 711/123 |
| 5,699,551 A | * | 12/1997 | Taylor et al. | 711/207 |
| 6,587,931 B1 | * | 7/2003 | Bauman et al. | 711/145 |
| 7,203,709 B2 | * | 4/2007 | Long et al. | 707/203 |
| 2003/0195866 A1 | * | 10/2003 | Long et al. | 707/1 |
| 2005/0289127 A1 | * | 12/2005 | Giampaolo et al. | 707/3 |
| 2008/0155229 A1 | * | 6/2008 | Beyer et al. | 711/216 |

* cited by examiner

*Primary Examiner* — Sherief Badawi
(74) *Attorney, Agent, or Firm* — Blakely, Sokoloff, Taylor & Zafman LLP

(57) ABSTRACT

Methods, systems and computer readable media which use permissions checking when deciding whether to allow access to a file are described. In one exemplary embodiment, a method includes receiving a notification of a change of permissions of a directory in a hierarchical file system and determining, in response to the notification, whether to update partially a permissions cache which is used in screening access based on permissions, such as access to search results. The determining may include a comparison of an identifier of the directory to a data structure of cached directories which have files represented in the permissions cache.

22 Claims, 90 Drawing Sheets

| Name | Parent | Date Modified ▼ | Kind |
|---|---|---|---|
| Today | | | |
| 📄 FindBrowse | Finder | 2/11/04 | Folder |
| 📄 findBrowse sequence2 | FindBrowse | 2/4/04 | Macromedia Director Movie |
| Yesterday | | | |
| 📄 findBrowse multi 3.dir | FindBrowse | 2/4/04 | Macromedia Director Movie |
| 📄 FindBrowse.dir | Find Starting Point | 2/2/04 | Macromedia Director Movie |
| 📄 findBrowse.sequence | FindBrowse | 2/2/04 | Macromedia Director Movie |
| 📄 browse by date5 header4 copy.tif | assets | 2/2/04 | Adobe Photoshop TIFF file |
| 📄 findBrowse sequ assets | FindBrowse | 2/2/04 | Folder |
| before Yesterday | | | |
| 📄 findBrowse assets | FindBrowse | 2/2/04 | Folder |
| 📄 find Browse multi 2.dir | FindBrowse | 2/2/04 | Macromedia Director Movie |
| 📄 find Browse multi 1.dir | FindBrowse | 2/2/04 | Macromedia Director Movie |
| 📄 browse by keyword map + SB2.psd | Finder | 1/12/04 | Adobe Photoshop file |
| 📄 browse by keyword map + SB.psd | Finder | 1/9/04 | Adobe Photoshop file |
| over a Week ago | | | |
| 📄 Browse by keyword map.psd | Finder | 12/17/03 | Adobe Photoshop file |
| 📄 Browse by date5 + info2.psd | Finder | 12/15/03 | Adobe Photoshop file |
| 📄 Browse by folder + info.psd | Finder | 12/15/03 | Adobe Photoshop file |
| 📄 Browse by date5 + info.psd | Finder | 12/15/03 | Adobe Photoshop file |
| 📄 Browse by date5 + actions2.psd | Finder | 12/12/03 | Adobe Photoshop file |
| 📄 Browse by date5 + actions.psd | Finder | 12/12/03 | Adobe Photoshop file |
| 📄 Browse by date5 header5.psd | Finder | 12/11/03 | Adobe Photoshop file |
| 📄 Browse by date5 header4.psd | Finder | 12/10/03 | Adobe Photoshop file |
| 📄 Browse by date5 header3.psd | Finder | 12/10/03 | Adobe Photoshop file |
| 📄 Browse by date5 header2.psd | Finder | 12/10/03 | Adobe Photoshop file |
| 📄 Browse by date5 header.psd | Finder | 12/10/03 | Adobe Photoshop file |
| 📄 Browse by date5.psd | Finder | 12/10/03 | Adobe Photoshop file |
| 📄 Browse by day4.psd | Finder | 12/10/03 | Adobe Photoshop file |
| 📄 Browse by day3.psd | Finder | 12/10/03 | Adobe Photoshop file |
| 📄 Browse by day2.psd | Finder | 12/9/03 | Adobe Photoshop file |
| 📄 Browse by day.psd | Finder | 12/9/03 | Adobe Photoshop file |

FIG. 8A

| Name | Parent | Date Modified | Kind |
|---|---|---|---|
| Adobe Photoshop file | | | |
| browse by date5 + actions.psd | Finder | 12/12/03 | Adobe Photoshop file |
| browse by date5 + actions2.psd | Finder | 12/12/03 | Adobe Photoshop file |
| browse by date5 + info.psd | Finder | 12/15/03 | Adobe Photoshop file |
| browse by date5 + info2.psd | Finder | 12/15/03 | Adobe Photoshop file |
| browse by date5 + header.psd | Finder | 12/10/03 | Adobe Photoshop file |
| browse by date5 + header2.psd | Finder | 12/10/03 | Adobe Photoshop file |
| browse by date5 + header3.psd | Finder | 12/10/03 | Adobe Photoshop file |
| browse by date5 + header4.psd | Finder | 12/11/03 | Adobe Photoshop file |
| browse by date5 + header5.psd | Finder | 12/10/03 | Adobe Photoshop file |
| browse by date5.psd | Finder | 12/9/03 | Adobe Photoshop file |
| browse by day2.psd | Finder | 12/9/03 | Adobe Photoshop file |
| browse by day3.psd | Finder | 12/10/03 | Adobe Photoshop file |
| browse by day4.psd | Finder | 12/15/03 | Adobe Photoshop file |
| browse by folder + info.psd | Finder | 12/9/04 | Adobe Photoshop file |
| browse by keyword map + SB.psd | Finder | 12/12/04 | Adobe Photoshop file |
| browse by keyword map + SB2.psd | Finder | 12/17/03 | Adobe Photoshop file |
| browse by keyword map.psd | Finder | | Adobe Photoshop file |
| Adobe Photoshop TIFF file | | | |
| browse by date5 header5 copy.tif | assets | 2/2/04 | Adobe Photoshop TIFF file |
| Folder | | | |
| FindBrowse | Finder | 2/11/04 | Folder |
| findBrowse assets | FindBrowse | 2/2/04 | Folder |
| findBrowse sequ assets | FindBrowse | 2/2/04 | Folder |
| Macromedia Director Movie | | | |
| find browse multi 1.dir | FindBrowse | 2/2/04 | Macromedia Director Movie |
| find browse multi 2.dir | FindBrowse | 2/2/04 | Macromedia Director Movie |
| find browse multi 3.dir | FindBrowse | 2/4/04 | Macromedia Director Movie |
| findBrowse sequence | FindBrowse | 2/2/04 | Macromedia Director Movie |
| findBrowse sequence2 | FindBrowse | 2/4/04 | Macromedia Director Movie |
| FindBrowse.dir | Find Starting Point | 2/2/04 | Macromedia Director Movie |

Spotlight: forstall

524 Results

▼ Contacts
- Freya Forstall — Today 3:30 pm
- Molly Forstall — Today 2:57 pm
- Nils Forstall — Yesterday 4:30 pm
- Scott Forstall — Tuesday 2:23 pm
- Olaf Forstall — June 15 1:47 pm 102 more...

▼ Documents
- The Forstall Report — Today 8:07 am
- Scott Forstall Speech Transcript — Today 8:05 am
- Budget 2004 — Today 8:03 am
- Meeting Notes — Yesterday 3:55 pm
- Product Rollout 2004 — Yesterday 2:34 pm ▼ iCal Events
- Rock Climbing Competition — Today 8:00 am
- Freya Forstall's Birthday — Monday 3:30 pm
- User Experience meeting — June 1 2:58 pm
- SF Film Festival (Finding Forstall) — April 24 7:00 pm
- Nils Forstall Graduation — April 23 4:00 pm 344 more...

▼ Mail Messages
- Scott Forstall — Ready for the conference? — Today 9:30 am
- Olaf Forstall — Madonna tickets on sale! — Today 8:25 am
- Molly Forstall — Next week's Dinner Party — Yesterday 2:13 pm
- Scott Forstall — You've got to see this... — Yesterday 5:56 pm
- Jimmie Page — Playing Forstall's house tonight — June 24 11:07 pm 56 more...

Group By:
Category
Kind
Date
People
Flat List

Sort Within Group by:
Name
Date
Kind
People
Popularity

When:
Any Date
Today
Since Yesterday
This Week
This Month
This Year

Where:
Everywhere
Home
My Hard Drive
Firewire Hard Drive
iPod

METHODS AND SYSTEMS FOR MANAGING PERMISSIONS DATA

BACKGROUND OF THE INVENTION

Modern data processing systems, such as general purpose computer systems, allow the users of such systems to create a variety of different types of data files. For example, a typical user of a data processing system may create text files with a word processing program such as Microsoft Word or may create an image file with an image processing program such as Adobe's PhotoShop. Numerous other types of files are capable of being created or modified, edited, and otherwise used by one or more users for a typical data processing system. The large number of the different types of files that can be created or modified can present a challenge to a typical user who is seeking to find a particular file which has been created, especially with regard to the search itself and corresponding time and resource cost of the search.

Modern data processing systems often include a file management system which allows a user to place files in various directories or subdirectories (e.g. folders) and allows a user to give the file a name. Further, these file management systems often allow a user to find a file by searching for the file's name, or the date of creation, or the date of modification, or the type of file. An example of such a file management system is the Finder program which operates on Macintosh computers from Apple Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file. However, this search capability searches through information which is the same for each file, regardless of the type of file. Thus, for example, the searchable data for a Microsoft Word file is the same as the searchable data for an Adobe PhotoShop file, and this data typically includes the file name, the type of file, the date of creation, the date of last modification, the size of the file and certain other parameters which may be maintained for the file by the file management system.

Certain presently existing application programs allow a user to maintain data about a particular file. This data about a particular file may be considered metadata because it is data about other data. This metadata for a particular file may include information about the author of a file, a summary of the document, and various other types of information. A program such as Microsoft Word may automatically create some of this data when a user creates a file and the user may add additional data or edit the data by selecting the "property sheet" from a menu selection in Microsoft Word. The property sheets in Microsoft Word allow a user to create metadata for a particular file or document. However, in existing systems, a user is not able to search for metadata across a variety of different applications using one search request from the user. Furthermore, existing systems can perform one search for data files, but this search does not also include searching through metadata for those files. Additionally, existing systems often do not provide searching access to all the files to which a user potentially has permission to access, do not exploit assumptions regarding permissions that can be made, especially on file location and exclusivity of access.

SUMMARY OF THE DESCRIPTION

Methods for managing data in a data processing system and systems for managing data are described herein.

These methods and systems provide ways to protect the privacy of files and/or metadata for the files based on user (and/or system) defined access permissions.

In one exemplary embodiment, a method includes receiving a notification of a change of permissions of a directory in a hierarchical file system (HFS) and determining, in response to the notification, whether to update partially a permissions cache which is used in screening access based on permissions, such as screening access to search results. The determining may include a comparison of an identifier of the directory to a data structure of cached directories which have files represented in the permissions cache. The method may further include updating, for at least a period of time, at least a portion of the permissions cache; this updating may include either setting invalidity data for the portion or removing the portion from the permissions cache, and this updating may be performed in response to determining to update partially the permissions cache. This method avoid a problem created when a directory's permission changes, such as when a temporary folder (e.g. a temporary subdirectory in the HFS) created by a program (e.g. during a download process) causes a change for a directory's permissions; in the past, this change may cause an entire permissions cache to be invalidated even though no files in the permission cache are children of the temporary folder. In other words, the change in a directory's permissions caused a still-valid permissions cache to be invalidated because there was no way to determine whether files in the permissions cache were children of the directory which changed. This method uses the notification of a change of permissions of a directory and the data structure of cached directories to determine if the files in the permissions cache are within the directory which changed. The method may further include determining to not update the permissions cache if the directory is not one of the cached directories in the data structure. The updating, if performed, may be terminated automatically after the period of time, and if the updating is incomplete when terminated, the entire permission cache is either invalidated or flushed. The data structure may be implemented as a full, lossless list of all directories which are parents of the files listed or identified in the permissions cache, or the data structure may be implemented as a fixed size Bloom filter in which directory identifiers are hashed and then stored in the Bloom filter.

In another exemplary embodiment, a method includes receiving a notification of a change of permissions of a directory in an HFS and determining, in response to the notification, whether to update a permissions cache. The determining of whether to update is based on a comparison of the directory, in the notification, to a data structure for cached directories having files represented in the permissions cache. The permissions cache may be used in determining whether to allow access to files, such as screening search results based on permissions. The permissions cache is not updated if the directory, which h may be specified in the notification, is not one of the cached directories in the data structure which stores representations of identifiers for the cached directories. In an implementation of this embodiment, the entire permissions cache is either invalidated or flushed (rather than partially updated) if the determining of whether to update determines that the directory is one of the cached directories. In another implementation of this embodiment, a portion of the permissions cache is updated for at least a period of time if the directory specified through the notification is one of the directories in the cached directories.

Other aspects of the present invention include various data processing systems which perform these methods and machine readable media excluding signals and carrier waves which perform various methods described herein.

BRIEF DESCRIPTION OF THE DRAWINGS

The present invention is illustrated by way of example and not limitation in the figures of the accompanying drawings in which like references indicate similar elements.

FIGS. 8A and 8B show two examples of formats for displaying search results according to one exemplary embodiment of the invention.

FIGS. 19A, 19B, 19C, 19D, and 19E show further illustrative embodiments of user interfaces according to the present invention.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc. 2004.

Figure 1:
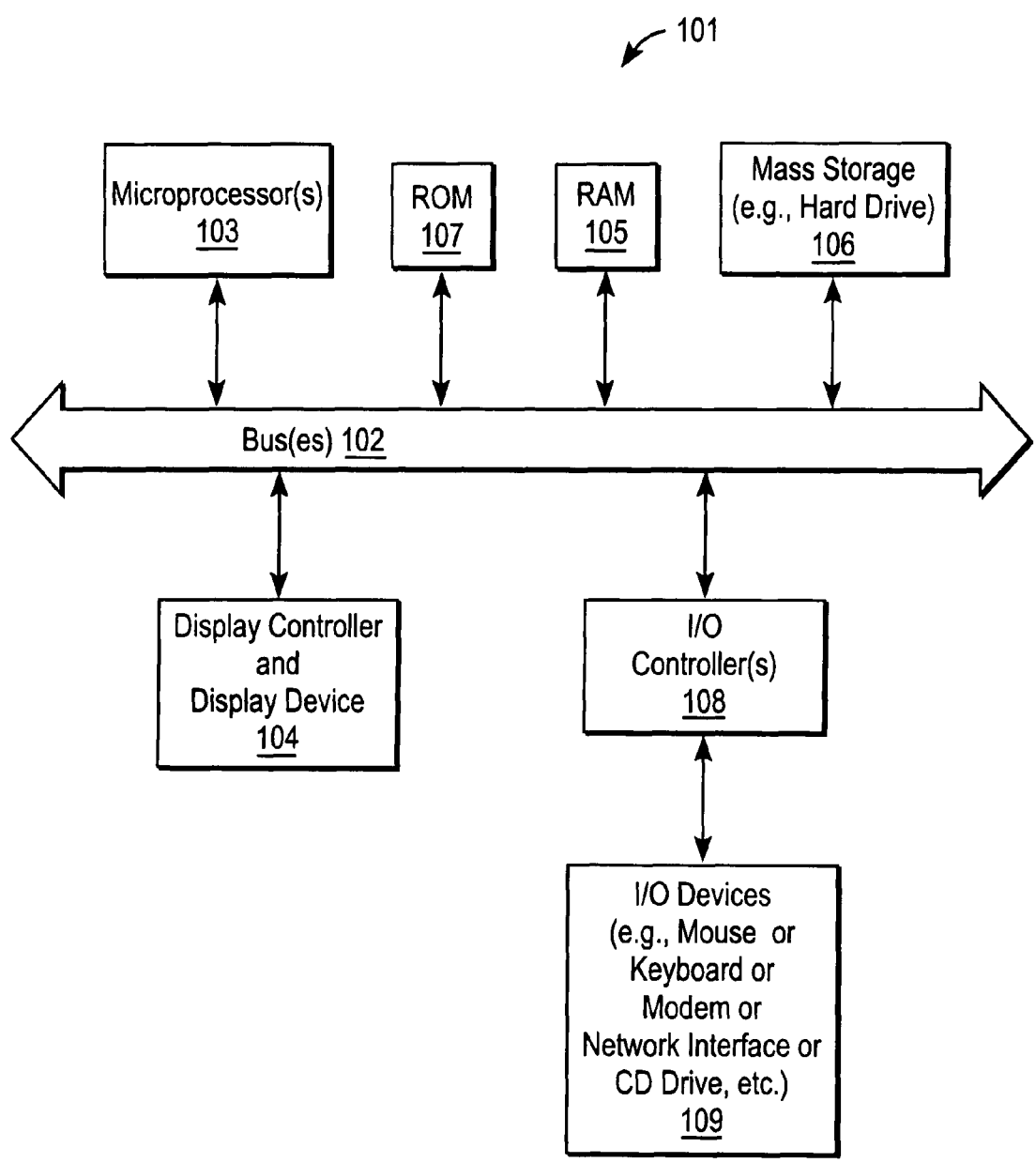
FIG. 1 shows an exemplary embodiment of a data processing system, which may be a general purpose computer system and which may operate in any of the various methods described herein.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be a Macintosh computer from Apple Inc.

As shown in FIG. 1, the computer system 101, which is a form of a data processing system, includes a bus 102 which is coupled to a microprocessor(s) 103 and a ROM (Read Only Memory) 107 and volatile RAM 105 and a non-volatile memory 106. The microprocessor 103 may be a G3 or G4 microprocessor from Motorola, Inc. or one or more G5 microprocessors from IBM. The bus 102 interconnects these various components together and also interconnects these components 103, 107, 105, and 106 to a display controller and display device 104 and to peripheral devices such as input/output (I/O) devices which may be mice, keyboards, modems, network interfaces, printers and other devices which are well known in the art. Typically, the input/output devices 109 are coupled to the system through input/output controllers 108. The volatile RAM (Random Access Memory) 105 is typically implemented as dynamic RAM (DRAM) which requires power continually in order to refresh or maintain the data in the memory. The mass storage 106 is typically a magnetic hard drive or a magnetic optical drive or an optical drive or a DVD RAM or other types of memory systems which maintain data (e.g. large amounts of data) even after power is removed from the system. Typically, the mass storage 106 will also be a random access memory although this is not required. While FIG. 1 shows that the mass storage 106 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 108 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, RAM 105, mass storage 106 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Capturing and Use of Metadata Across a Variety of Application Programs

Figure 2:
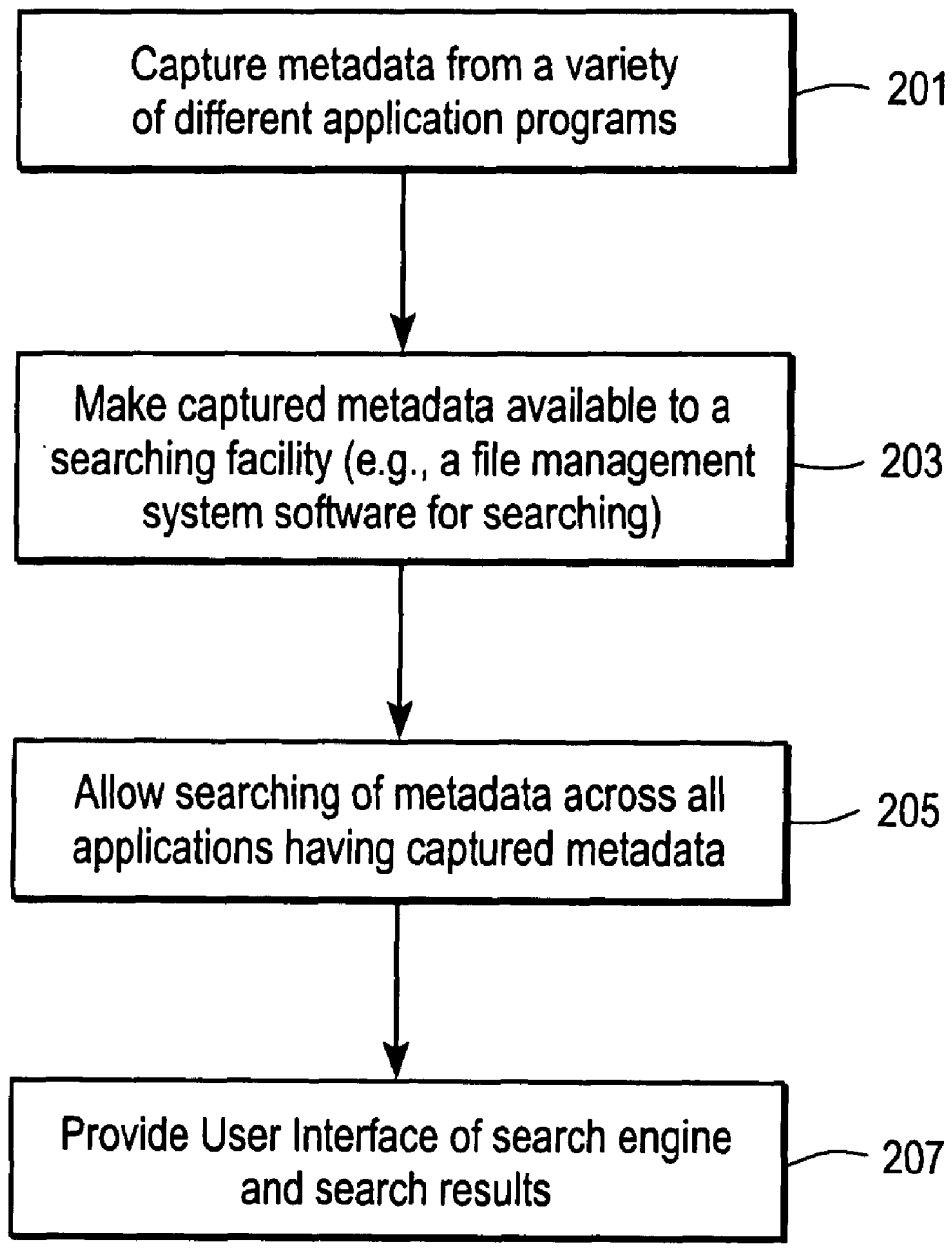
FIG. 2 shows a general example of one exemplary method of one aspect of the invention.

FIG. 2 shows a generalized example of one embodiment of the present invention. In this example, captured metadata is made available to a searching facility, such as a component of the operating system which allows concurrent searching of all metadata for all applications having captured metadata (and optionally for all non-metadata of the data files). The method of FIG. 2 may begin in operation 201 in which metadata is captured from a variety of different application programs.

Figure 5:
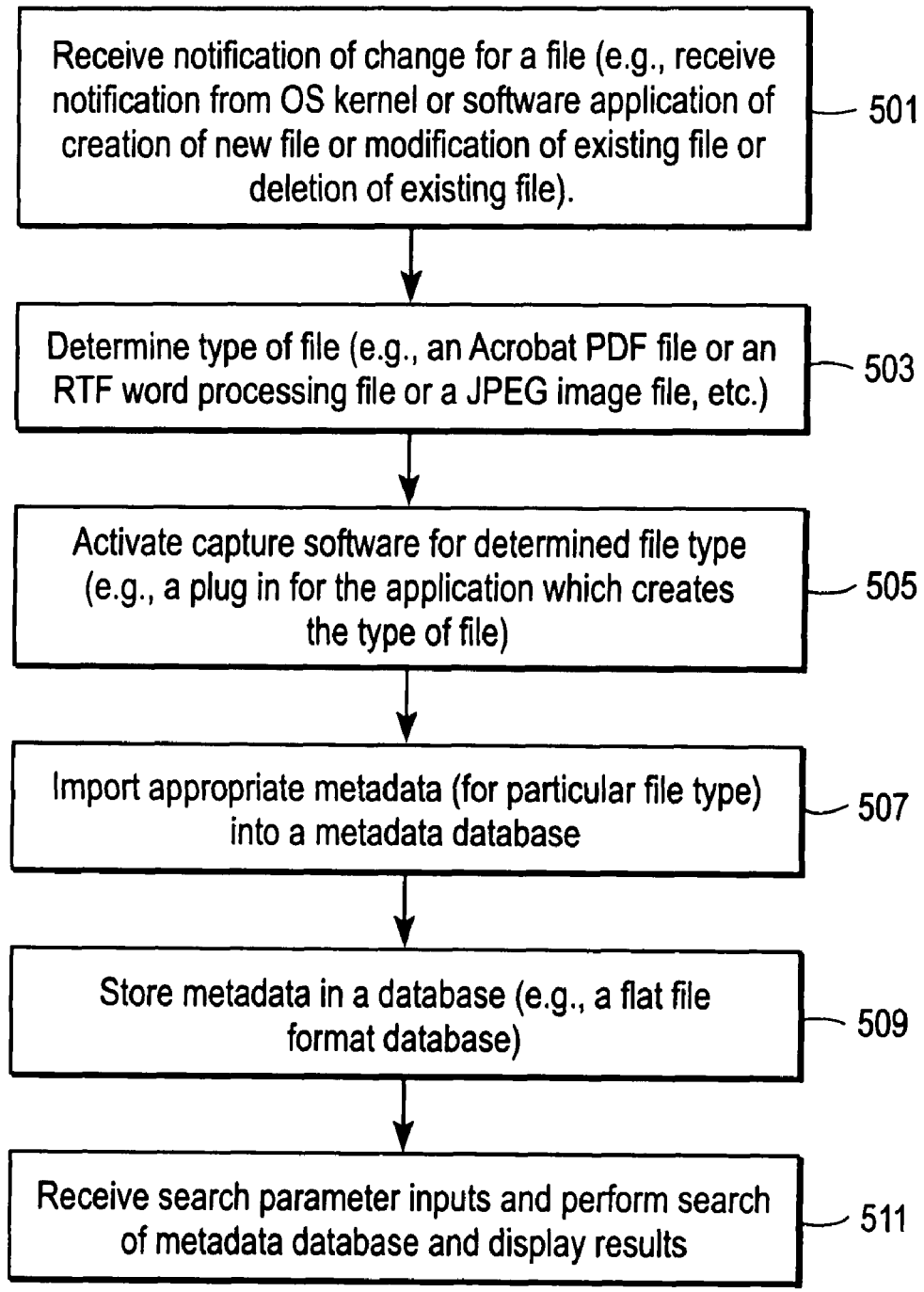
FIG. 5 is a flowchart showing another exemplary method of the present invention.

This captured metadata is then made available in operation 203 to a searching facility, such as a file management system software for searching. This searching facility allows, in operation 205, the searching of metadata across all applications having captured metadata. The method also provides, in operation 207, a user interface of a search engine and the search results which are obtained by the search engine. There are numerous possible implementations of the method of FIG. 2. For example, FIG. 5 shows a specific implementation of one exemplary embodiment of the method of FIG. 2. Alternative implementations may also be used. For example, in an alternative implementation, the metadata may be provided by each application program to a central source which stores the metadata for use by searching facilities and which is managed by an operating system component, which may be, for example, the metadata processing software. The user interface provided in operation 207 may take a variety of different formats, including some of the examples described below as well as user interfaces which are conventional, prior art user interfaces. The metadata may be stored in a database which may be any of a variety of formats including a B tree format or, as described below, in a flat file format according to one embodiment of the invention.

The method of FIG. 2 may be implemented for programs which do not store or provide metadata. In this circumstance, a portion of the operating system provides for the capture of the metadata from the variety of different programs even though the programs have not been designed to provide or capture metadata. For those programs which do allow a user to create metadata for a particular document, certain embodiments of the present invention may allow the exporting back of captured metadata back into data files for applications which maintain metadata about their data files.

Figure 4:
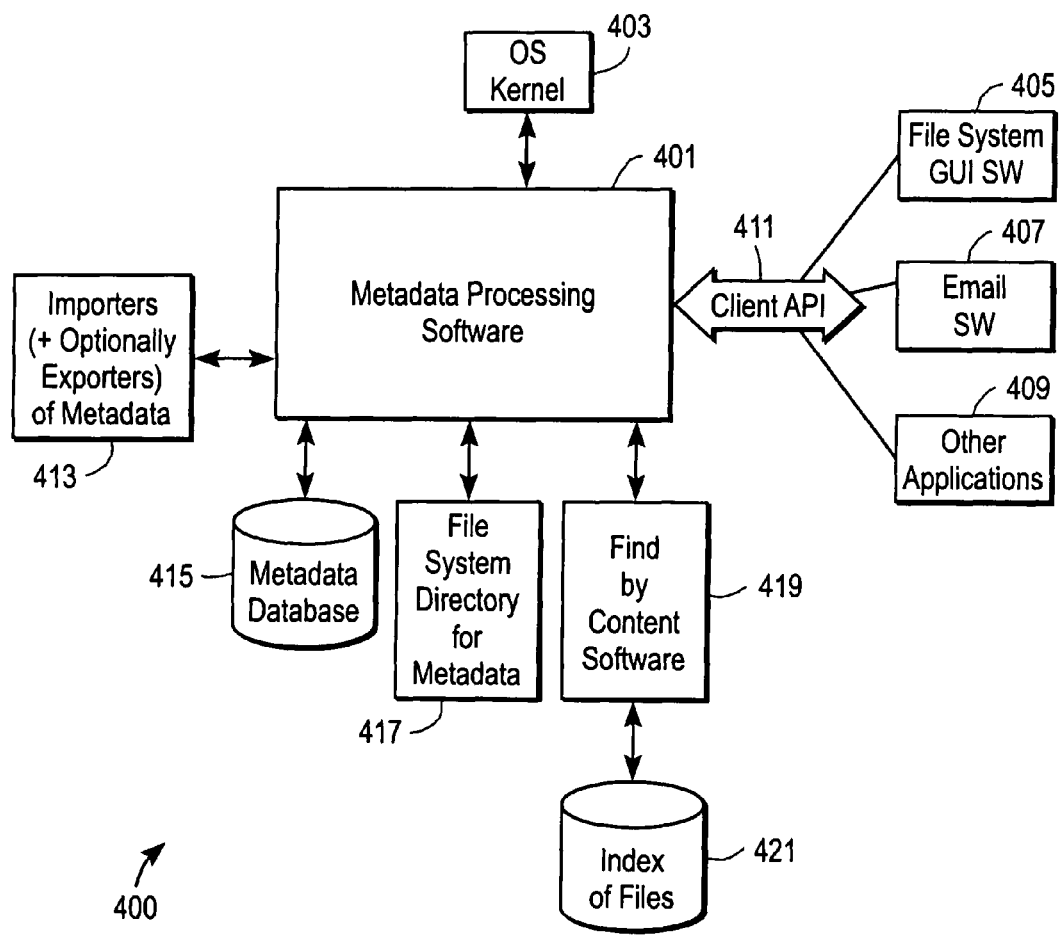
FIG. 4 shows an example of an architecture for managing metadata according to one exemplary embodiment of the invention.

The method of FIG. 2 allows information about a variety of different files created by a variety of different application programs to be accessible by a system wide searching facility, which is similar to the way in which prior art versions of the Finder or Windows Explorer can search for file names, dates of creation, etc. across a variety of different application programs. Thus, the metadata for a variety of different files created by a variety of different application programs can be accessed through an extension of an operating system, and an example of such an extension is shown in FIG. 4 as a metadata processing software which interacts with other components of the system and will be described further below.

Figure 3A:
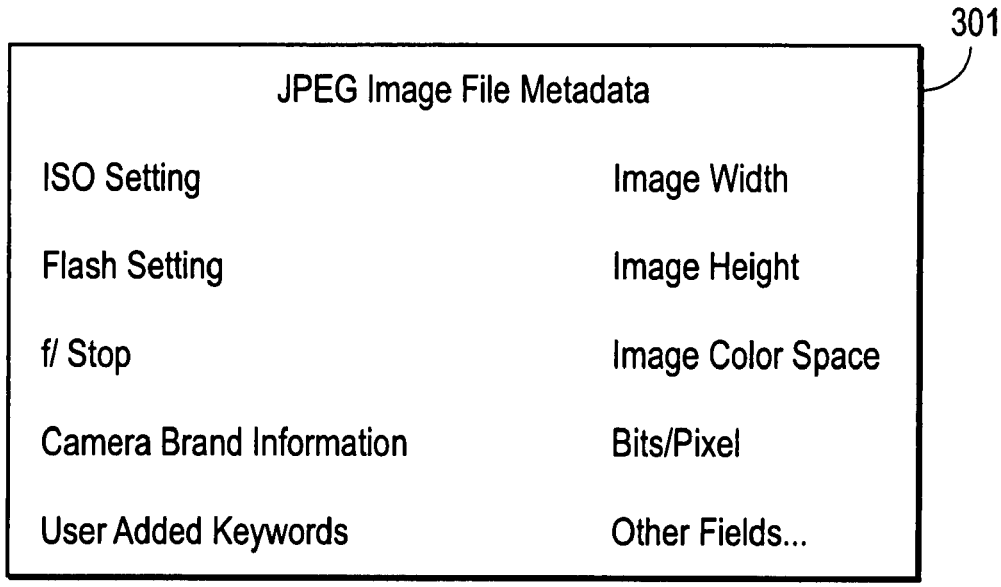
FIG. 3A shows an example of the content of the particular type of metadata for a particular type of file.
Figure 3B:
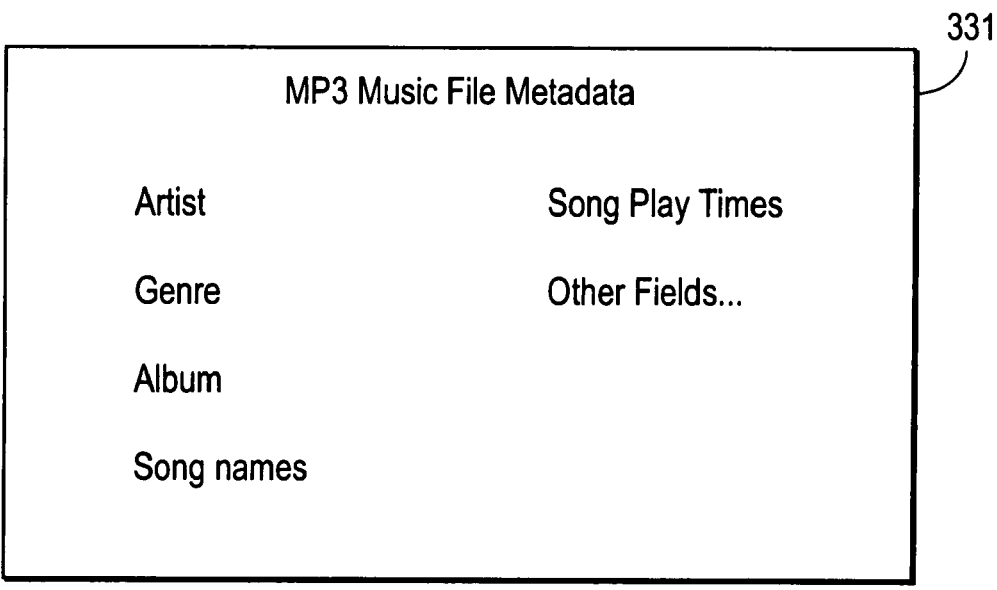
FIG. 3B shows another example of a particular type of metadata for another particular type of file.

FIGS. 3A and 3B show two different metadata formats for two different types of data files. Note that there may be no overlap in any of the fields; in other words, no field in one type of metadata is the same as any field in the other type of metadata. Metadata format 301 may be used for an image file such as a JPEG image file. This metadata may include information such as the image's width, the image's height, the image's color space, the number of bits per pixel, the ISO setting, the flash setting, the F/stop of the camera, the brand name of the camera which took the image, user-added keywords and other fields, such as a field which uniquely identifies the particular file, which identification is persistent through modifications of the file. Metadata format 331 shown in FIG. 3B may be used for a music file such as an MP3 music file. The data in this metadata format may include an identification of the artist, the genre of the music, the name of the album, song names in the album or the song name of the particular file, song play times or the song play time of a particular song and other fields, such as a persistent file ID number which identifies the particular MP3 file from which the metadata was captured. Other types of fields may also be used. The following chart shows examples of the various fields which may be used in metadata for various types of files.

| Item name | Parent in hierarchy | Attribute name | Description/Notes | CFType | Multi-value | Localized | User set-table | Get-table | Copied with copy | App viewable |
|---|---|---|---|---|---|---|---|---|---|---|
| Item | n/a | Authors | Who created or contributed to the contents of this item | CFString | Yes | No | Yes | Yes | Yes | Address Book |
| | | Comment | A free form text comment | CFString | No | No | Yes | Yes | Yes | |
| | | ContentType | This is the type that is determined by UTI | CFString | No | ? | No | Yes | Yes | |
| | | ContentTypes | This is the inheritance of the UTI system | CFString | Yes | ? | No | Yes | Yes | |
| | | CreatedDate | When was this item created | CFDate | No | No | No | Yes | Yes | |
| | | DisplayName | The name of the item as the user would like to read it. Very well may be the file name, but it may also be the subject of an e-mail message or the full name of a person, for example. | CFString | No | Yes | Yes | Yes | Yes | Finder (or Launch Services) |
| | | Keywords | This is a list words set by the user to identify arbitrary sets of organization. The scope is determined by the user and can be flexibly used for any kind of organization. For example, Family, Hawaii, Project X, etc. | CFString | Yes | System-provided keywords (if any) | Yes | Yes | Ask | |

| Item name | Parent in hierarchy | Attribute name | Description/Notes | CFType | Multi-value | Localized | User set-table | Get-table | Copied with copy | App viewable |
|---|---|---|---|---|---|---|---|---|---|---|
| | | Contact Keywords | A list of contacts that are associated with this document, beyond what is captured as Author. This may be a person who's in the picture or a document about a person or contact (performance review, contract) | CFString | Yes | No | Yes | Yes | Ask | Address Book |
| | | ModifiedDate | When this item was last modified | CFDate | No | No | No | Yes | | |
| | | Rating | A relative rating (0 to 5 value) on how important a particular item is to you, whether it's a person, file or message | CFNumber | No | n/a | Yes | Yes | | |
| | | RelatedTos | A list of other items that are arbitrarily grouped together. | CFString | Yes | No | Yes | Yes | | |
| | | TextContent | An indexed version of any content text | CFString | No | No | No | Yes | | |
| | | UsedDates | Which days was the document opened/viewed/played | CFDate | Yes | No | No | Yes | | |
| Content/Data | Item | Copyright | Specifies the owner of this content, i.e. Copyright Apple Computer, Inc. | CFString | No | No | Yes | Yes | | |
| | | CreatorApp | Keeps track of the application that was used to create this document (if it's known). | CFString | No | ? | No | Yes | | |
| | | Languages | The languages that this document is composed in (for either text or audio-based media) | CFString | Yes | Yes | Yes | Yes | | |
| | | ParentalControl | A field that is used to determine whether this is kid-friendly content or not | CFString | No | ? | Yes | Yes | | |
| | | Publishers | The name or a person or organization that published this content. | CFString | Yes | No | Yes | Yes | | Address Book |
| | | PublishedDate | The original date that this content was published (if it was), independent of created date. | CFDate | No | No | Yes | Yes | | |
| | | Reviewers | A list of contacts who have reviewed the contents of this file. This would have to be set explicitly by an application. | CFString | Yes | No | Yes | Yes | | Address Book |
| Image | Data | ReviewStatus | Free form text that used to specify where the document is in any arbitrary review process | CFString | No | ? | Yes | Yes | | |
| | | TimeEdited | Total time spent editing document | CFDate | No | No | No | Yes | | |
| | | WhereTos | Where did this go to, eg. CD, printed, backedup | CFString | Yes | System-provided words only (if any) | ? | Yes | | |
| | | WhereFroms | Where did this come from, e.g. camera, email, web download, CD | CFString | Yes | System-provided words only (if any) | ? | Yes | | |
| | | BitsPerSample | What is the bit depth of the image (8-bit, 16-bit, etc.) | CFNumber | No | | | Yes | | |
| | | ColorSpace | What color space model is this document following | CFString | No | | | Yes | | ColorSync Utility? |
| | | ImageHeight | The height of the image in pixels | CFNumber | No | | | Yes | | |

-continued

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| | | ImageWidth | The width of the image in pixels | CFNumber | No | | | Yes | | |
| | | ProfileName | The name of the color profile used with for image | CFString | No | | | Yes | | ColorSync Utility? |
| | | ResolutionWidth | Resolution width of this image (i.e. dpi from a scanner) | CFNumber | No | | | Yes | | |
| | | ResolutionHeight | Resolution height of this image (i.e. dpi from a scanner) | CFNumber | No | | | Yes | | |
| | | LayerNames | For image formats that contain "named" layers (e.g. Photoshop files) | CFString | Yes | | | Yes | | |
| | | Aperture | The f-stop rating of the camera when the image was taken | CFNumber | No | | | Yes | | |
| | | CameraMake | The make of the camera that was used to acquire this image (e.g. Nikon) | CFString | No | Yes | | Yes | | |
| | | CameraModel | The model of the camera used to acquire this image (Coolpix 5700) | CFString | No | Yes | | Yes | | |
| | | DateTimeOriginal | Date/time the picture was taken | CFDate | No | | | Yes | | |
| | | ExposureMode | Mode that was used for the exposure | CFString | No | | | Yes | | |
| | | ExposureTime | Time that the lens was exposed while taking the picture | CFDate | No | | | Yes | | |
| | | Flash | This attribute is overloaded with information about red-eye reduction. This is not a binary value | CFNumber | No | | | Yes | | |
| | | GPS | Raw value received from GPS device associated with photo acquisition. It hasn't necessarily been translated to a user-understandable location. | CFString | No | | | Yes | | |
| | | ISOSpeed | The ISO speed the camera was set to when the image was acquired | CFNumber | No | | | Yes | | |
| | | Orientation | The orientation of the camera when the image was acquired | CFString | No | | | Yes | | |
| | | WhiteBalance | The white balance setting of the camera when the picture was taken | CFNumber | No | | | Yes | | |
| | | EXIFversion | The version of EXIF that was used to generate the metadata for the image | CFString | No | | | Yes | | |
| Time-based | Data | AcquisitionSources | The name or type of device that used to acquire the media | CFString | Yes | | | Yes | | |
| | | Codecs | The codecs used to encode/decode the media | CFString | Yes | | | Yes | | |
| | | DeliveryType | FastStart or RTSP | CFString | No | | | Yes | | |
| | | Duration | The length of time that the media lasts | CFNumber | No | | | Yes | | |
| | | Streamable | Whether the content is prepared for purposes of streaming | CFBoolean | No | | | Yes | | |
| | | TotalBitRate | The total bit rate (audio & video combined) of the media. | CFNumber | No | | | Yes | | |
| | | AudioBitRate | The audio bit rate of the media | CFNumber | No | | | Yes | | |
| | | AspectRatio | The aspect ratio of the video of the media | CFString | No | | | Yes | | |

-continued

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| | | ColorSpace | The color space model used for the video aspect of the media | CFString | No | | | Yes | | |
| | | FrameHeight | The frame height in pixels of the video in the media | CFNumber | No | | | Yes | | |
| | | FrameWidth | The frame width in pixels of the video in the media | CFNumber | No | | | Yes | | |
| | | ProfileName | The name of the color profile used on the video portion of the media | CFString | No | | | Yes | | |
| | | VideoBitRate | The bit rate of the video aspect of the media | CFNumber | No | | | Yes | | |
| Text | Data | Subject | The subject of the text. This could be metadata that's supplied with the text or something automatically generated with technologies like VTWIN | CFString | No | | | Yes | | |
| | | PageCount | The number of printable pages of the document | CFNumber | No | | | Yes | | |
| | | LineCount | The number of lines in the document | CFNumber | No | | | Yes | | |
| | | WordCount | The number of words in the document | CFNumber | No | | | Yes | | |
| | | URL | The URL that will get you to this document (or at least did at one time). Relevant for saved HTML documents, bookmarks, RSS feeds, etc. | CFString | No | | | Yes | | |
| | | PageTitle | The title of a web page. Relevant to HTML or bookmark documents | CFString | No | | | Yes | | |
| | | Google Hierarchy | Structure of where this page can be found in the Google hierarchy. Relevant to HTML or bookmark documents | CFString | No | | | Yes | | |
| Compound document | Data | <Abstract> | There are no specific attributes assigned to this item. This is to catch all app-specific file formats that fall within Data, but don't fit into any of the other types. Typically these documents have multiple types of media embedded within them. (e.g. P | n/a | n/a | n/a | n/a | n/a | n/a | n/a |
| PDF | Compound document | NumberOfPages | The number of printable pages in the document | CFNumber | No | | | Yes | | |
| | | PageSize | The size of the page stored as points | CFNumber | No | | No | Yes | | |
| | | PDFTitle | PDF-specific title metadata for the document | CFString | No | | ? | Yes | | |
| | | PDFAuthor | PDF-specific author metadata for the document | CFString | No | | ? | Yes | | Address Book |
| | | PDFSubject | PDF-specific subject metadata for the document | CFString | No | | ? | Yes | | |
| | | PDFKeywords | PDF-specific keywords metadata for the document | CFString | Yes | | ? | Yes | | |
| | | PDFCreated | PDF-specific created metadata for the document | CFDate | No | | ? | Yes | | |

-continued

| Item name | Parent in hierarchy | Attribute name | Description/Notes | CFType | Multi-value | Localized | User set-table | Get-table | Copied with copy | App viewable |
|---|---|---|---|---|---|---|---|---|---|---|
| | | PDFModified | PDF-specific modified metadata for the document | CFDate | No | | ? | Yes | | |
| | | PDFVersion | PDF-specific version metadata for the document | CFString | No | | ? | Yes | | |
| | | SecurityMethod | Method by which this document is kept secure | CFString | No | | | Yes | | |
| Presentation (Keynote) | Compound document | SlideTitles | A collection of the titles on slides | CFString | Yes | | | Yes | | |
| | | SlideCount | The number of slides | CFString | No | | | Yes | | |
| | | SpeakerNotesContent | The content of all the speaker notes from all of the slides together | CFString | ? | | | Yes | | |
| Application | Item | Categories | The kind of application this is: productivity, games, utility, graphics, etc. A set list that | CFString | Yes | | | Yes | | |
| Message | Item | Recipients | Maps to To and Cc: addresses in a mail message. | CFString | Yes | | | Yes | | Address Book |
| | | Priority | The priority of the message as set by the sender | CFString | No | | | Yes | | |
| | | AttachmentNames | The list of filenames that represent attachments in a particular message (should be actionable within the Finder) | CFString | Yes | | | Yes | | |
| | | Authors | maps to From address in mail message | CFString | Yes | No | Yes | Yes | Yes | Address Book |
| | | Comment | Not applicable to Mail right now (should we consider?) | CFString | No | No | Yes | Yes | Yes | |
| | | ContentType | | CFString | No | | No | Yes | Yes | |
| | | ContentTypes | | CFString | Yes | | No | Yes | Yes | |
| | | CreatedDate | When was this message was sent or received | CFDate | No | No | No | Yes | Yes | |
| | | DisplayName | Subject of the message | CFString | No | Yes | Yes | Yes | Yes | |
| | | Keywords | There will be a way to set keywords within Mail | CFString | Yes | System-provided keywords (if any) | Yes | Yes | Ask | |
| | | Contact Keywords | Could be where recipients are held | CFString | Yes | No | Yes | Yes | Ask | Address Book |
| | | ModifiedDate | Not applicable | CFDate | No | No | No | Yes | | |
| | | Rating | A relative rating (0 to 5 stars) on how important a particular message is to you (separate from a message's Priority) | CFNumber | No | n/a | Yes | Yes | | |
| | | RelatedTos | Potentially threaded messages could be put into this category | CFString | Yes | No | Yes | Yes | | |
| | | TextContent | An indexed version of the mail message | CFString | No | No | No | Yes | | |
| | | UsedDates | The day/time in which the mail message was viewed/read | CFDate | Yes | No | No | Yes | | |
| Contact | Item | Company | The company that this contact is an employee of | CFString | No | | | Yes | | Address Book |
| | | E-mails | A list of e-mail addresses that this contact has | CFString | Yes | | | Yes | | Mail |
| | | IMs | A list of instant message handles this contact has | CFString | Yes | | | Yes | | iChat |
| | | Phones | A list of phone numbers that relate to this contact | CFString | Yes | | | | | |
| | | Addresses | A list of physical addresses that relate to this person | CFString | Yes | | | | | |
| | | Authors | the name of the owner of the Address Book (current user name) | CFString | Yes | No | Yes | Yes | Yes | Address Book |

-continued

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| | | Comment | | CFString | No | No | Yes | Yes | Yes | |
| | | ContentType | | CFString | No | | No | Yes | Yes | |
| | | ContentTypes | | CFString | Yes | | No | Yes | Yes | |
| | | CreatedDate | date the user entered this into his AddressBook (either through import or direct entry) | CFDate | No | No | No | Yes | Yes | |
| | | DisplayName | Composite name of contact (First Name, Last Name) | CFString | No | Yes | Yes | Yes | Yes | |
| | | Keywords | There will be a way to set keywords within Address Book | CFString | Yes | System-provided keywords (if any) | Yes | Yes | Ask | |
| | | Contact Keywords | | CFString | Yes | No | Yes | Yes | Ask | Address Book |
| | | ModifiedDate | Last time this contact entry was modified | CFDate | No | No | No | Yes | | |
| | | Rating | A relative rating (0 to 5 stars) on how important a particular contact is to you (separate from a message's Priority) | CFNumber | No | n/a | Yes | Yes | | |
| | | RelatedTos | (potentially could be used to associate people from the same company or family) | CFString | Yes | No | Yes | Yes | | |
| | | TextContent | An indexed version of the Notes section | CFString | No | No | No | Yes | | |
| | | UsedDates | The day/time in which the contact entry was viewed in Address Book | CFDate | Yes | No | No | Yes | | |
| Meeting (TBD) | Item | Body | text, rich text or document that represents the full content of the event | CFString | No | | | Yes | | |
| | | Description | text describing the event | CFString | No | | | Yes | | |
| | | EventTimes | time/date the event starts | CFDate | Yes | | | Yes | | |
| | | Duration | The length of time that the meeting lasts | CFNumber | No | | | Yes | | |
| | | Invitees | The list of people who are invited to the meeting | CFString | Yes | | | Yes | | Address Book |
| | | Location | The name of the location where the meeting is taking place | CFString | No | | | Yes | | |

One particular field which may be useful in the various metadata formats would be a field which includes an identifier of a plug in or other software element which may be used to capture metadata from a data file and/or export metadata back to the creator application.

Various different software architectures may be used to implement the functions and operations described herein. The following discussion provides one example of such an architecture, but it will be understood that alternative architectures may also be employed to achieve the same or similar results. The software architecture shown in FIG. 4 is an example which is based upon the Macintosh operating system. The architecture 400 includes a metadata processing software 401 and an operating system (OS) kernel 403 which is operatively coupled to the metadata processing software 401 for a notification mechanism which is described below. The metadata processing software 401 is also coupled to other software programs such as a file system graphical user interface software 405 (which may be the Finder), an email software 407, and other applications 409. These applications are coupled to the metadata processing software 401 through client application program interface 411 which provide a method for transferring data and commands between the metadata processing software 401 and the software 405, 407, and 409. These commands and data may include search parameters specified by a user as well as commands to perform searches from the user, which parameters and commands are passed to the metadata processing software 401 through the interface 411. The metadata processing software 401 is also coupled to a collection of importers 413 which extract data from various applications. In particular, in one exemplary embodiment, a text importer is used to extract text and other information from word processing or text processing files created by word processing programs such as Microsoft Word, etc. This extracted information is the metadata for a particular file. Other types of importers extract metadata from other types of files, such as image files or music files. In this particular embodiment, a particular importer is selected based upon the type of file which has been created and modified by an application program. For example, if the data file was created by PhotoShop, then an image importer for PhotoShop may be used to input the metadata from a PhotoShop data file into the metadata database 415 through the metadata processing software 401. On the other hand, if the data file is a word processing document, then an importer designed to extract metadata from a word processing document is called upon to extract the metadata from the word processing data file and place it into the metadata database 415 through the metadata processing software 401. Typically, a plurality of different importers may be required in order to handle the plurality of different application programs which are used in a typical computer system. The importers 413 may optionally include a plurality of exporters which are capable of exporting the extracted metadata for particular types of data files back to property sheets or other data components maintained by certain application programs. For example, certain application programs may maintain some metadata for each data file created by the program, but this metadata is only a subset of the metadata extracted by an importer from this type of data file. In this instance, the exporter may export back additional metadata or may simply insert metadata into blank fields of metadata maintained by the application program.

The software architecture 400 also includes a file system directory 417 for the metadata. This file system directory keeps track of the relationship between the data files and their metadata and keeps track of the location of the metadata object (e.g. a metadata file which corresponds to the data file from which it was extracted) created by each importer. In one exemplary embodiment, the metadata database is maintained as a flat file format as described below, and the file system directory 417 maintains this flat file format. One advantage of a flat file format is that the data is laid out on a storage device as a string of data without references between fields from one metadata file (corresponding to a particular data file) to another metadata file (corresponding to another data file). This arrangement of data will often result in faster retrieval of information from the metadata database 415.

The software architecture 400 of FIG. 4 also includes find by content software 419 which is operatively coupled to a database 421 which includes an index of files. The index of files represents at least a subset of the data files in a storage device and may include all of the data files in a particular storage device (or several storage devices), such as the main hard drive of a computer system. The index of files may be a conventional indexed representation of the content of each document. The find by content software 419 searches for words in that content by searching through the database 421 to see if a particular word exists in any of the data files which have been indexed. The find by content software functionality is available through the metadata processing software 401 which provides the advantage to the user that the user can search concurrently both the index of files in the database 421 (for the content within a file) as well as the metadata for the various data files being searched. The software architecture shown in FIG. 4 may be used to perform the method shown in FIG. 5 or alternative architectures may be used to perform the method of FIG. 5.

The method of FIG. 5 may begin in operation 501 in which a notification of a change for a file is received. This notification may come from the OS kernel 403 which notifies the metadata processing software 401 that a file has been changed. This notification may come from sniffer software elements which detect new or modified files and deletion of files. This change may be the creation of a new file or the modification of an existing file or the deletion of an existing file. The deletion of an existing file causes a special case of the processing method of FIG. 5 and is not shown in FIG. 5. In the case of a deletion, the metadata processing software 401, through the use of the file system directory 417, deletes the metadata file in the metadata database 415 which corresponds to the deleted file. The other types of operations, such as the creation of a new file or the modification of an existing file, causes the processing to proceed from operation 501 to operation 503 in which the type of file which is the subject of the notification is determined. The file may be an Acrobat PDF file or an RTF word processing file or a JPEG image file, etc. In any case, the type of the file is determined in operation 503. This may be performed by receiving from the OS kernel 403 the type of file along with the notification or the metadata processing software 401 may request an identification of the type of file from the file system graphical user interface software 405 or similar software which maintains information about the data file, such as the creator application or parent application of the data file. It will be understood that in one exemplary embodiment, the file system graphical user interface software 405 is the Finder program which operates on the Macintosh operating system. In alternative embodiments, the file system graphical user interface system may be Windows Explorer which operates on Microsoft's Windows operating system. After the type of file has been determined in operation 503, the appropriate capture software (e.g. one of the importers 413) is activated for the determined file type. The importers may be a plug-in for the particular application which created the type of file about which notification is received in operation 501. Once activated, the importer or capture software imports the appropriate metadata (for the particular file type) into the metadata database, such as metadata database 415 as shown in operation 507. Then in operation 509, the metadata is stored in the database. In one exemplary embodiment, it may be stored in a flat file format. Then in operation 511, the metadata processing software 401 receives search parameter inputs and performs a search of the metadata database (and optionally also causes a search of non-metadata sources such as the index of files 421) and causes the results of the search to be displayed in a user interface. This may be performed by exchanging information between one of the applications, such as the software 405 or the software 407 or the other applications 409 and the metadata processing software 401 through the interface 411. For example, the file system software 405 may present a graphical user interface, allowing a user to input search parameters and allowing the user to cause a search to be performed. This information is conveyed through the interface 411 to the metadata processing software 401 which causes a search through the metadata database 415 and also may cause a search through the database 421 of the indexed files in order to search for content within each data file which has been indexed. The results from these searches are provided by the metadata processing software 401 to the requesting application which, in the example given here, was the software 405, but it will be appreciated that other components of software, such as the email software 407, may be used to receive the search inputs and to provide a display of the search results. Various examples of the user interface for inputting search requests and for displaying search results are described herein and shown in the accompanying drawings.

It will be appreciated that the notification, if done through the OS kernel, is a global, system wide notification process such that changes to any file will cause a notification to be sent to the metadata processing software. It will also be appreciated that in alternative embodiments, each application program may itself generate the necessary metadata and provide the metadata directly to a metadata database without the requirement of a notification from an operating system kernel or from the intervention of importers, such as the importers 413. Alternatively, rather than using OS kernel notifications, an embodiment may use software calls from each application to a metadata processing software which receives these calls and then imports the metadata from each file in response to the call.

Figure 6:
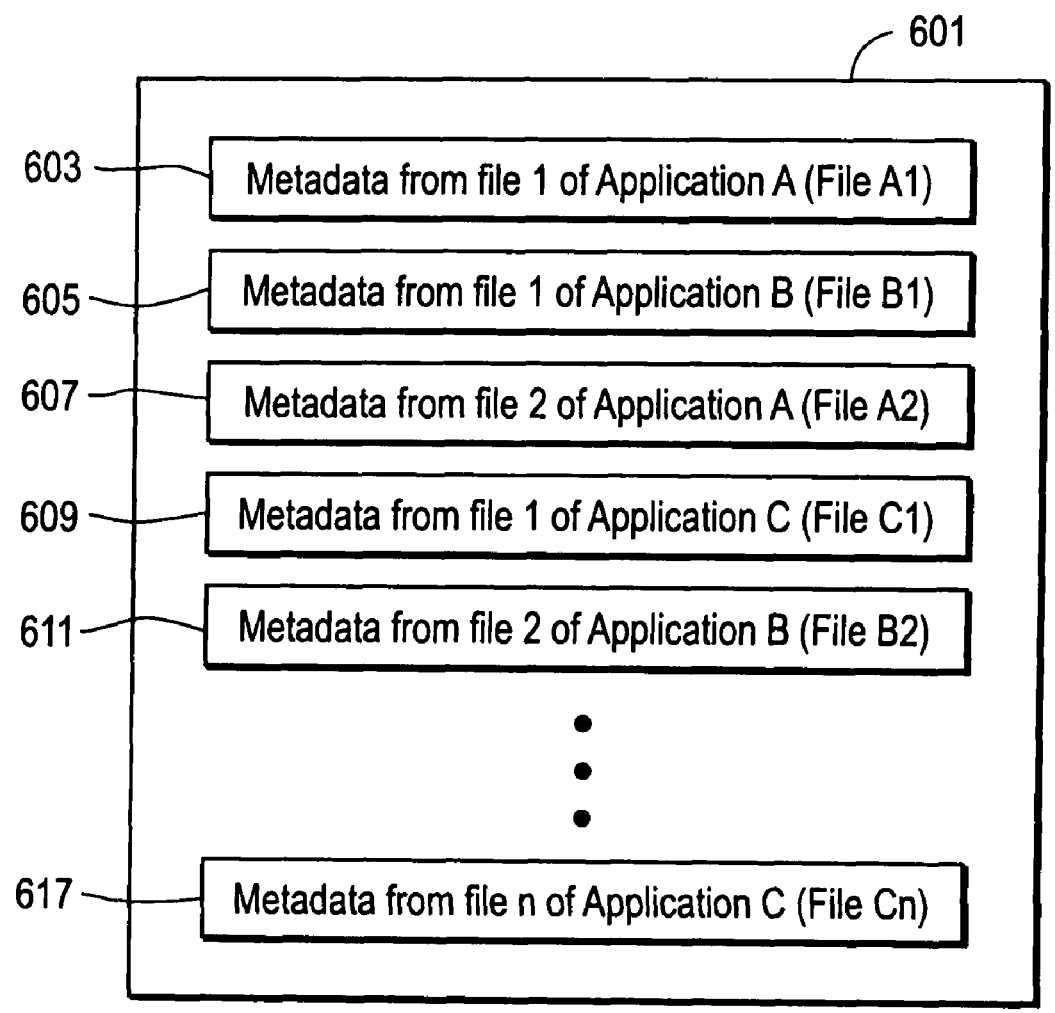
FIG. 6 shows an example of a storage format which utilizes a flat file format for metadata according to one exemplary embodiment of the invention.

As noted above, the metadata database 415 may be stored in a flat file format in order to improve the speed of retrieval of information in most circumstances. The flat file format may be considered to be a non-B tree, non-hash tree format in which data is not attempted to be organized but is rather stored as a stream of data. Each metadata object or metadata file will itself contain fields, such as the fields shown in the examples of FIGS. 3A and 3B. However, there will typically be no relationship or reference or pointer from one field in one metadata file to the corresponding field (or another field) in the next metadata file or in another metadata file of the same file type. FIG. 6 shows an example of the layout in a flat file format of metadata. The format 601 includes a plurality of metadata files for a corresponding plurality of data files. As shown in FIG. 6, metadata file 603 is metadata from file 1 of application A and may be referred to as metadata file A1. Similarly, metadata file 605 is metadata from file 1 of application B and may be referred to as metadata file B1. Each of these metadata files typically would include fields which are not linked to other fields and which do not contain references or pointers to other fields in other metadata files. It can be seen from FIG. 6 that the metadata database of FIG. 6 includes metadata files from a plurality of different applications (applications A, B, and C) and different files created by each of those applications. Metadata files 607, 609, 611, and 617 are additional metadata files created by applications A, B, and C as shown in FIG. 6.

A flexible query language may be used to search the metadata database in the same way that such query languages are used to search other databases. The data within each metadata file may be packed or even compressed if desirable. As noted above, each metadata file, in certain embodiments, will include a persistent identifier which uniquely identifies its corresponding data file. This identifier remains the same even if the name of the file is changed or the file is modified. This allows for the persistent association between the particular data file and its metadata.

User Interface Aspects

Various different examples of user interfaces for inputting search parameters and for displaying search results are provided herein. It will be understood that some features from certain embodiments may be mixed with other embodiments such that hybrid embodiments may result from these combinations. It will be appreciated that certain features may be removed from each of these embodiments and still provide adequate functionality in many instances.

Figure 7A:
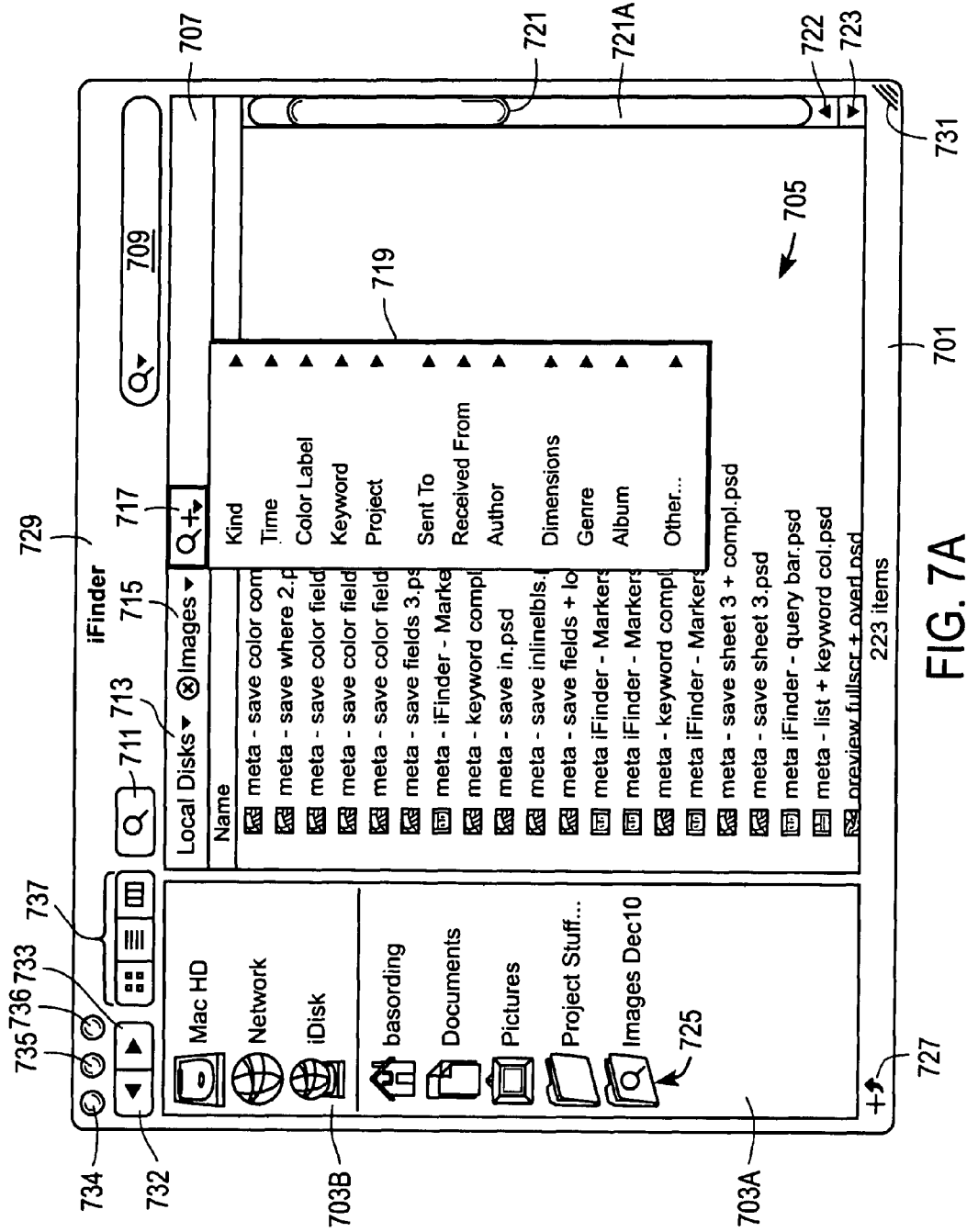
FIGS. 7A-7E show a sequence of graphical user interfaces provided by one exemplary embodiment in order to allow searching of metadata and/or other data in a data processing system.

FIG. 7A shows a graphical user interface which is a window which may be displayed on a display device which is coupled to a data processing system such as a computer system. The window 701 includes a side bar having two regions 703A, which is a user-configurable region, and 703B, which is a region which is specified by the data processing system. Further details in connection with these side bar regions may be found in co-pending U.S. patent application Ser. No. 10/873,661 filed Jun. 21, 2004, and entitled "Methods and Apparatuses for Operating a Data Processing System," by inventors Donald Lindsay and Bas Ording. The window 701 also includes a display region 705 which in this case displays the results of searches requested by the user. The window 701 also includes a search parameter menu bar 707 which includes configurable pull down menus 713, 715, and 717. The window 701 also includes a text entry region 709 which allows a user to enter text as part of the search query or search parameters. The button 711 may be a start search button which a user activates in order to start a search based upon the selected search parameters. Alternatively, the system may perform a search as soon as it receives any search parameter inputs or search queries from the user rather than waiting for a command to begin the search. The window 701 also includes a title bar 729 which may be used in conjunction with a cursor control device to move, in a conventional manner, the window around a desktop which is displayed on a display device. The window 701 also includes a close button 734, a minimize button 735, and a resize button 736 which may be used to close or minimize or resize, respectively, the window. The window 701 also includes a resizing control 731 which allows a user to modify the size of the window on a display device. The window 701 further includes a back button 732 and a forward button 733 which function in a manner which is similar to the back and forward buttons on a web browser, such as Internet Explorer or Safari. The window 701 also includes view controls which include three buttons for selecting three different types of views of the content within the display region 705. When the contents found in a search exceed the available display area of a display region 705, scroll controls, such as scroll controls 721, 722, and 723, appear within the window 701. These may be used in a conventional manner, for example, by dragging the scroll bar 721 within the scroll region 721A using conventional graphical user interface techniques.

The combination of text entry region 709 and the search parameter menu bar allow a user to specify a search query or search parameters. Each of the configurable pull down menus presents a user with a list of options to select from when the user activates the pull down menu. As shown in FIG. 7A, the user has already made a selection from the configurable pull down menu 713 to specify the location of the search, which in this case specifies that the search will occur on the local disks of the computer systems. Configurable pull down menu 715 has also been used by the user to specify the kind of document which is to be searched for, which in this case is an image document as indicated by the configurable pull down menu 715 which indicates "images" as the selected configuration of this menu and hence the search parameter which it specifies. The configurable pull down menu 717, as shown in FIG. 7A, represents an add search parameter pull down menu. This add search parameter pull down menu allows the user to add additional criteria to the search query to further limit the search results. In the embodiment shown in FIG. 7A, each of the search parameters is logically ANDed in a Boolean manner. Thus the current search parameter specified by the user in the state shown in FIG. 7A searches all local disks for all images, and the user is in the middle of the process of selecting another search criteria by having selected the add search criteria pull down menu 717, resulting in the display of the pull down menu 719, which has a plurality of options which may be selected by the user.

Figure 7B:
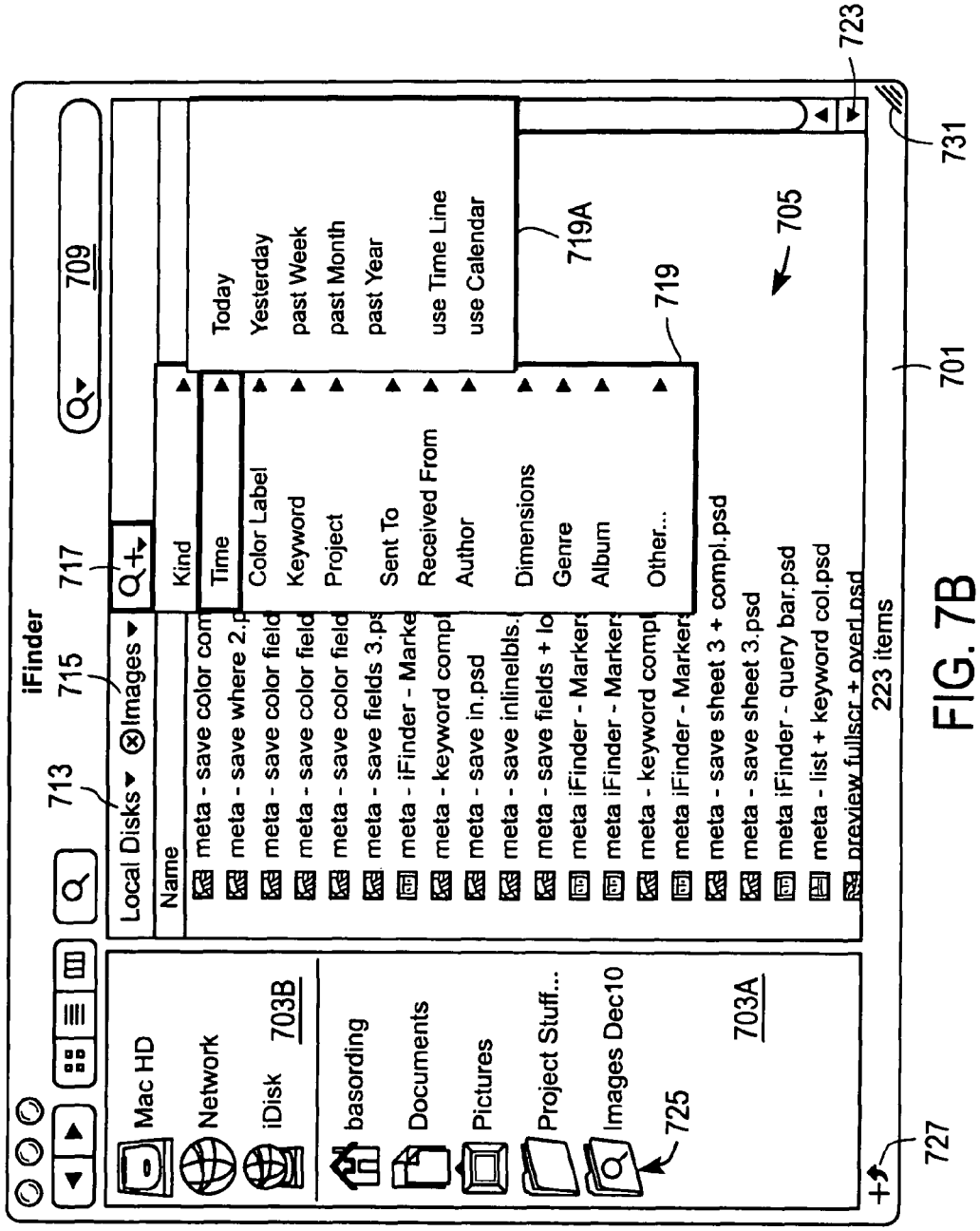

FIG. 7B shows the window 701 after the user has caused the selection of the time option within pull down menu 719, thereby causing the display of a submenu 719A which includes a list of possible times which the user may select from. Thus it appears that the user wants to limit the search to all images on all local disks within a certain period of time which is to be specified by making a selection within the submenu 719A.

Figure 7C:
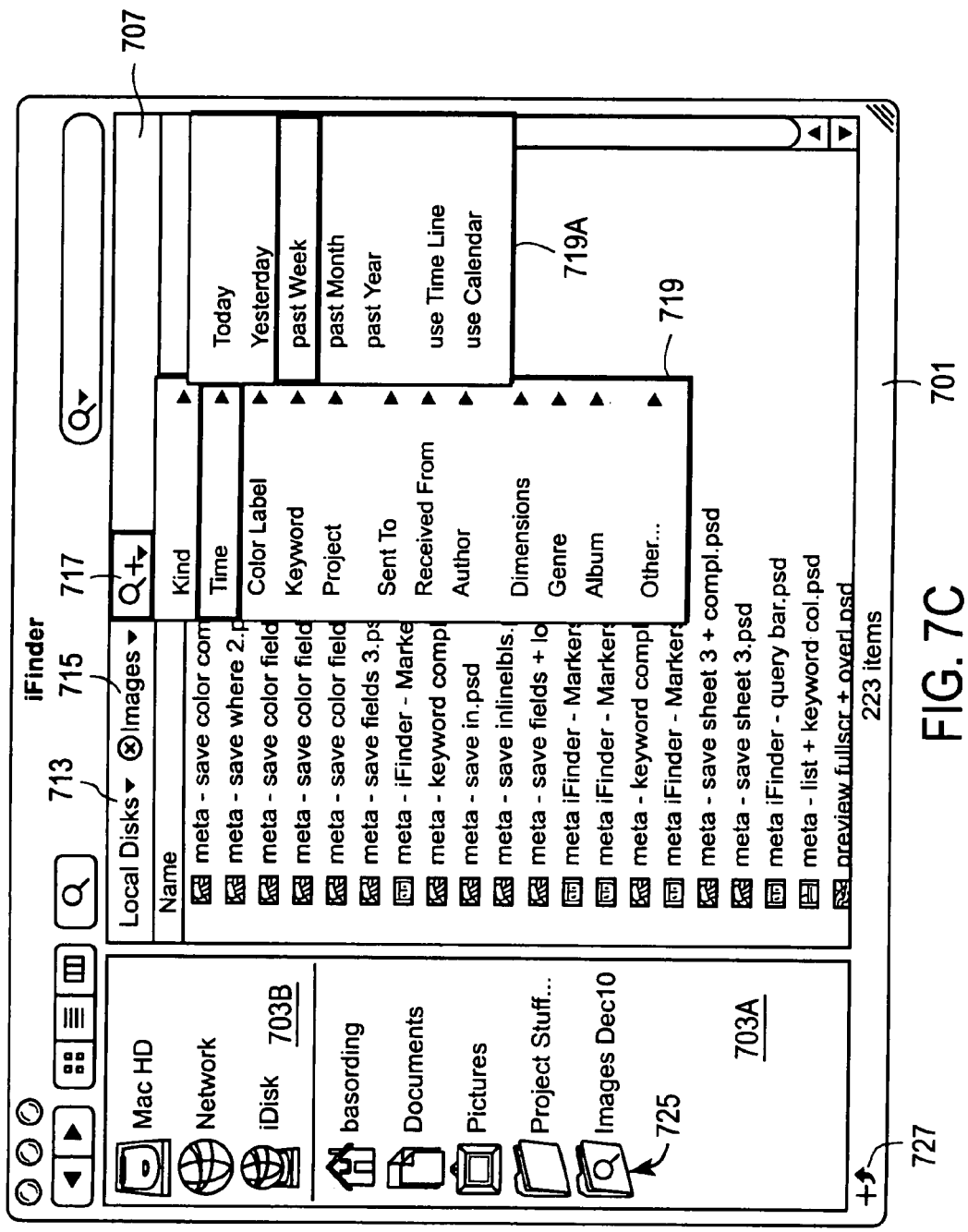
Figure 7D:
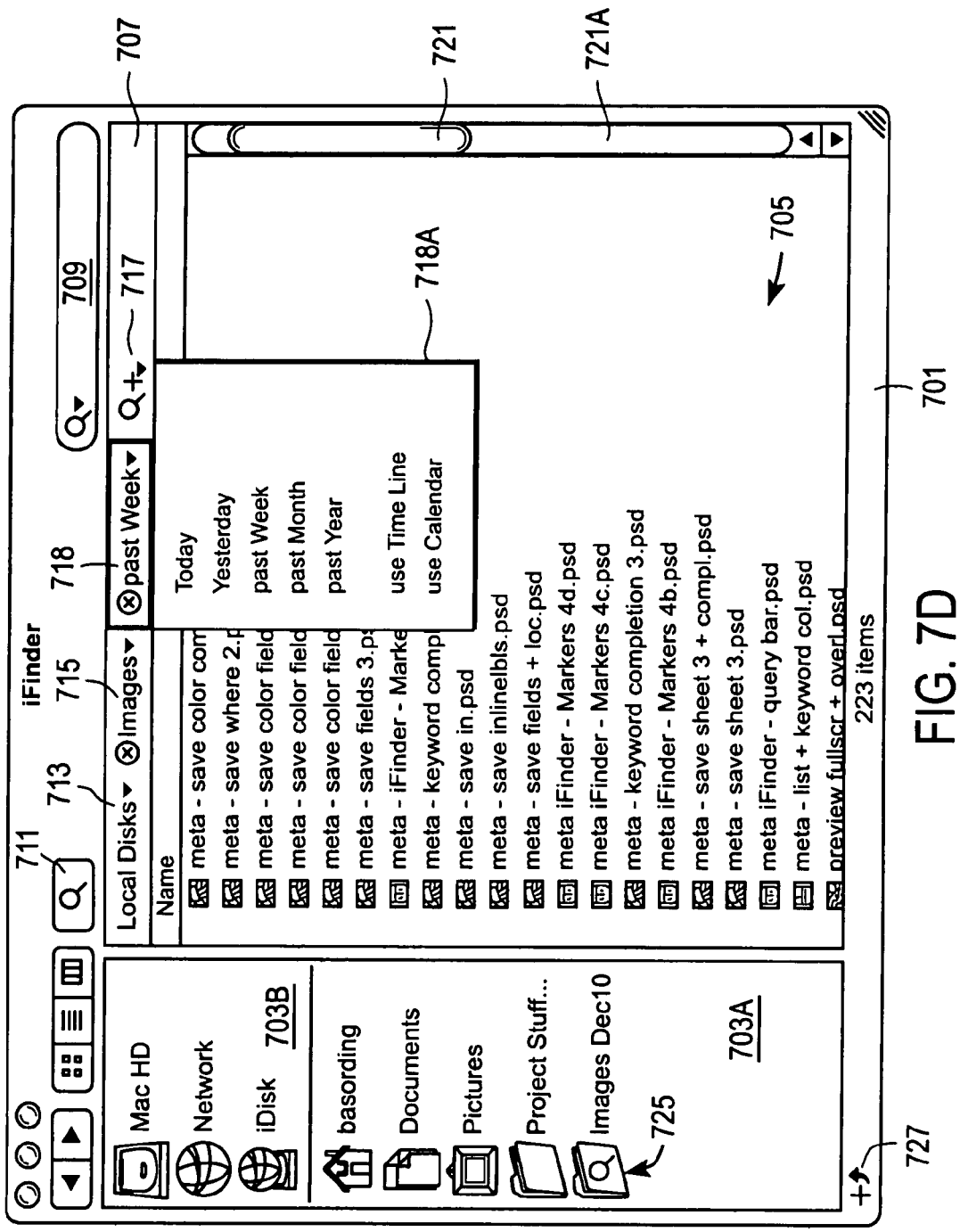
Figure 7E:
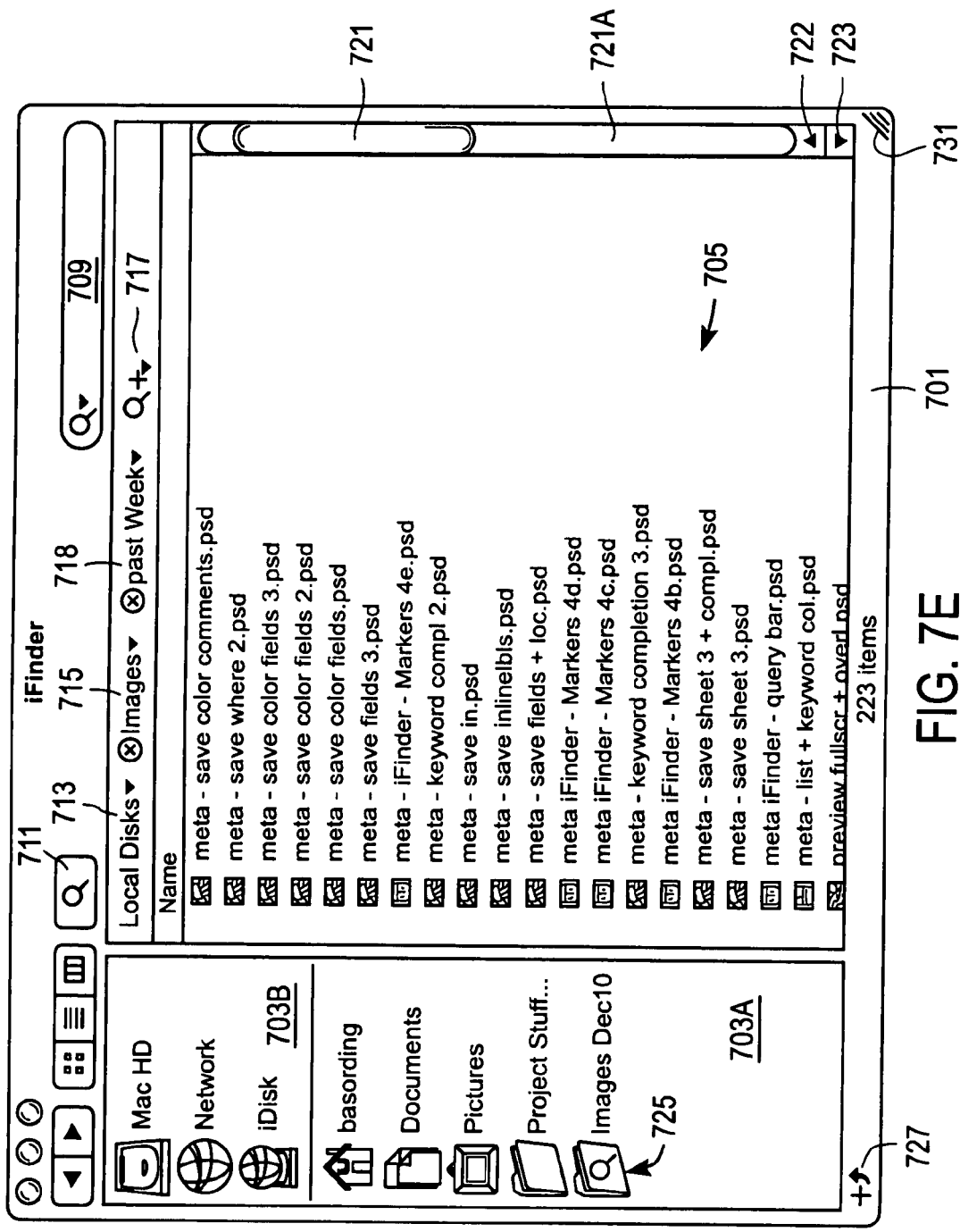

FIG. 7C shows the window 701 on the display of a data processing system after the user has selected a particular option (in this case "past week") from the submenu 719A. If the user accepts this selection, then the display shown in FIG. 7D results in which the configurable pull down menu 718 is displayed showing that the user has selected as part of the search criteria files that have been created or modified in the past week. It can be seen from FIG. 7D that the user can change the particular time selected from this pull down menu 718 by selecting another time period within the pull down menu 718A shown in FIG. 7D. Note that the configurable pull down menu 717, which represents an add search parameter menu, has now moved to the right of the configurable pull down menu 718. The user may add further search parameters by pressing or otherwise activating the configurable pull down menu 717 from the search parameter menu bar 707. If the user decides that the past week is the proper search criteria in the time category, then the user may release the pull down menu 718A from being displayed in a variety of different ways (e.g. the user may release the mouse button which was being depressed to keep the pull down menu 718A on the display). Upon releasing or otherwise dismissing the pull down menu 718A, the resulting window 701 shown in FIG. 7E then appears. There are several aspects of this user interface shown in FIG. 7A-7E which are worthy of being noted. The search parameters or search query is specified within the same window as the display of the search results. This allows the user to look at a single location or window to understand the search parameters and how they affected the displayed search results, and may make it easier for a user to alter or improve the search parameters in order to find one or more files. The configurable pull down menus, such as the add search parameter pull down menu, includes hierarchical pull down menus. An example of this is shown in FIG. 7B in which the selection of the time criteria from the pull down menu 717 results in the display of another menu, in this case a submenu 719A which may be selected from by the user. This allows for a compact presentation of the various search parameters while keeping the initial complexity (e.g. without submenus being displayed) at a lower level. Another useful aspect of the user interface shown in FIG. 7A-7E is the ability to reconfigure pull down menus which have previously been configured. Thus, for example, the configurable pull down menu 713 currently specifies the location of the search (in this case, all local disks), however, this may be modified by selecting the pull down region associated with the configurable pull down menu 713, causing the display of a menu of options indicating alternative locations which may be selected by the user. This can also be seen in FIG. 7D in which the past week option has been selected by the user (as indicated by "past week" being in the search parameter menu bar 707), but a menu of options shown in the pull down menu 718A allows the user to change the selected time from the "past week" to some other time criteria. Another useful aspect of this user interface is the ability to continue adding various search criteria by using the add search criteria pull down menu 717 and selecting a new criteria.

It will also be appreciated that the various options in the pull down menus may depend upon the fields within a particular type of metadata file. For example, the selection of "images" to be searched may cause the various fields present in the metadata for an image type file to appear in one or more pull down menus, allowing the user to search within one or more of those fields for that particular type of file. Other fields which do not apply to "images" types of files may not appear in these menus in order reduce the complexity of the menus and to prevent user confusion.

Another feature of the present invention is shown in FIGS. 7A-7E. In particular, the side bar region 703A, which is the user-configurable portion of the side bar, includes a representation of a folder 725 which represents the search results obtained from a particular search, which search results may be static or they may be dynamic in that, in certain instances, the search can be performed again to obtain results based on the current files in the system. The folder 725 in the example shown in FIGS. 7A-7E represents a search on a local disk for all images done on December 10. By selecting this folder in the side bar region 703A, the user may cause the display in the display region 705 of the results of that search. In this way, a user may retrieve a search result automatically by saving the search result into the side bar region 703A. One mechanism for causing a search result or a search query to be saved into the side bar region 703A is to select the add folder button 727 which appears in the bottom portion of the window 701. By selecting this button, the current search result or search query is saved as a list of files and other objects retrieved in the current search result. In the case where the search query is saved for later use rather than the saving of a search result, then the current search query is saved for re-use at a later time in order to find files which match the search query at that later time. The user may select between these two functionalities (saving a search result or saving a search query) by the selection of a command which is not shown.

FIGS. 8A and 8B show another aspect of a user interface feature which may be used with certain embodiments of the present invention. The window 801 of FIG. 8A represents a display of the search results which may be obtained as a result of using one of the various different embodiments of the present invention. The search results are separated into categories which are separated by headers 805, 807, 809, and 811 which in this case represent periods of time. This particular segmentation with headers was selected by the user's selecting the heading "date modified" using the date modified button 803 at the top of the window 801. An alternative selection of the kind category by selecting the button 802 at the top of the window 801A shown in FIG. 8B results in a different formatting of the search results which are now categorized by headers which indicate the types of files which were retrieved in the search and are separated by the headings 815, 817, 819, and 821 as shown in FIG. 8B. The use of these headings in the search results display allows the user to quickly scan through the search results in order to find the file.

Figure 9:
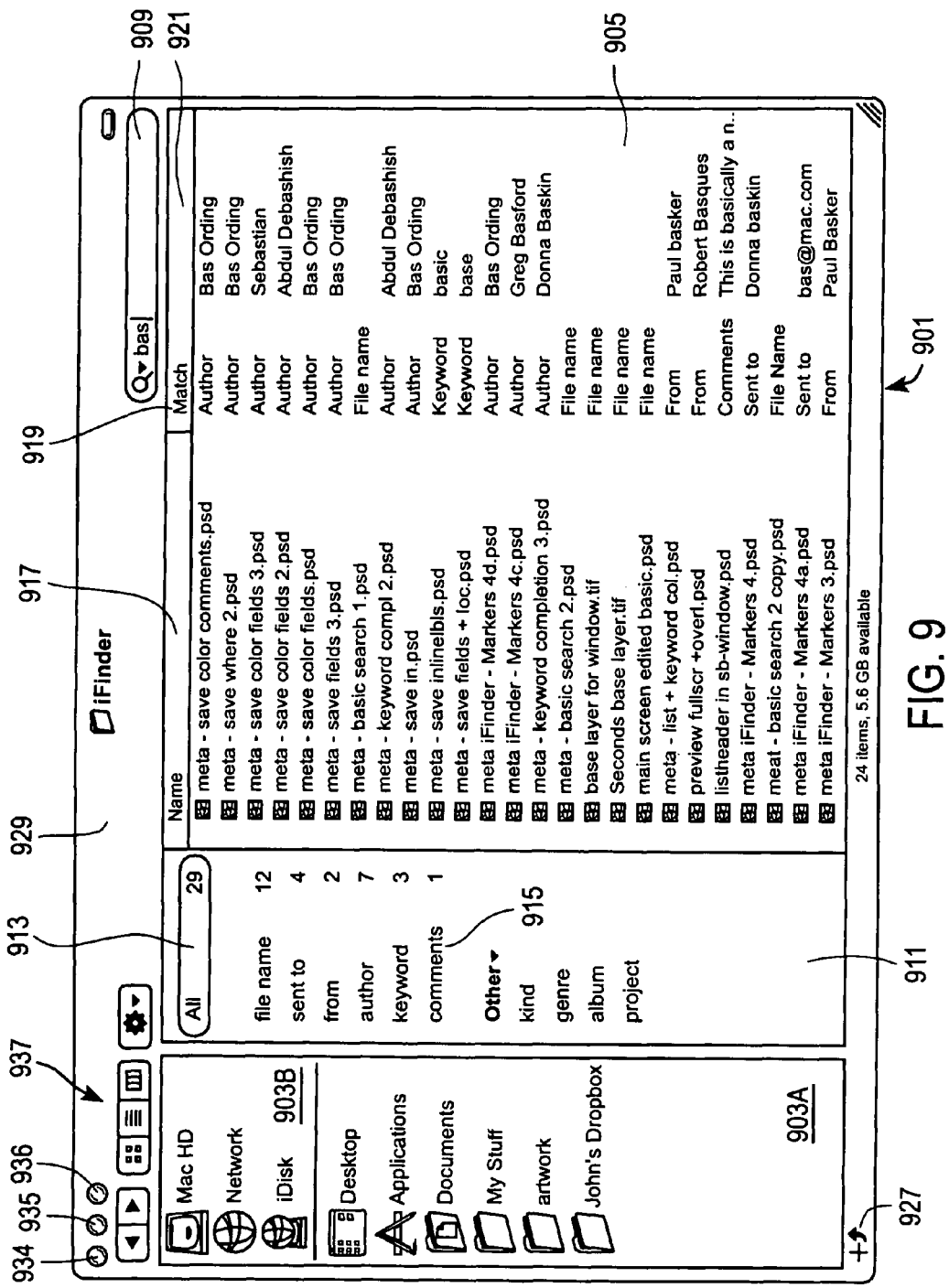
FIG. 9 shows another exemplary user interface of the present invention.

FIG. 9 shows another aspect of the present invention that is illustrated as part of the window 901 shown in FIG. 9. This window includes a display region 905 which shows the results of the search and the window also includes two side bar regions 903A and 903B, where the side bar region 903A is the user-configurable portion and the side bar region 903B is the system controlled portion. A folder add button 927 may be selected by the user to cause the addition of a search result or a search query to be added to the user-configurable portion of the side bar. The window 901 also includes conventional window controls such as a title bar or region 929 which may be used to move the window around a display and view select buttons 937 and maximize, minimize and resize buttons 934, 935, and 936 respectively. The window 901 shows a particular manner in which the results of a text-based search may be displayed. A text entry region 909 is used to enter text for searching. This text may be used to search through the metadata files or the indexed files or a combination of both. The display region 905 shows the results of a search for text and includes at least two columns, 917 and 919, which provide the name of the file that was found and the basis for the match. As shown in column 919, the basis for the match may be the author field or a file name or a key word or comments or other data fields contained in metadata that was searched. The column 921 shows the text that was found which matches the search parameter typed into the text entry field 909. Another column 911 provides additional information with respect to the search results. In particular, this column includes the number of matches for each particular type of category or field as well as the total number of matches indicated in the entry 913. Thus, for example, the total number of matches found for the comments field is only 1, while other fields have a higher number of matches.

Figure 10:
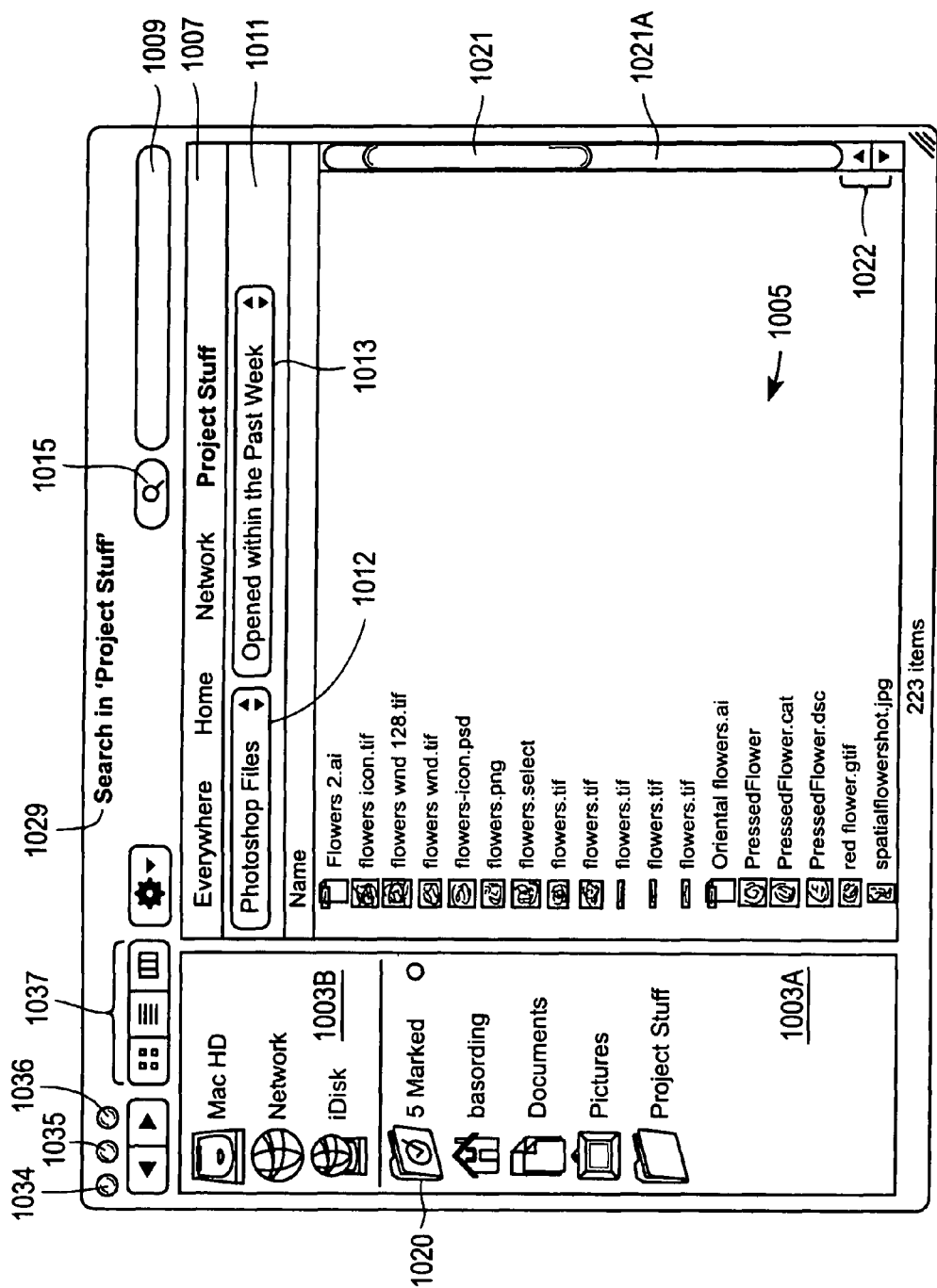
FIG. 10 shows another exemplary user interface of the present invention.

FIG. 10 shows certain other aspects of some embodiments of the present invention. Window 1001 is another search result window which includes various fields and menus for a user to select various search parameters or form a search query. The window 1001 includes a display region 1005 which may be used to display the results of a search and a user-configurable side bar portion 1003A and a system specified side bar portion 1003B. In addition, the window 1001 includes conventional scrolling controls such as controls 1021 and 1022 and 1021A. The window further includes conventional controls such as a title bar 1029 which may be used to move the window and view control buttons 1037 and maximize, minimize, and resize buttons 1034, 1035, and 1036. A start search button 1015 is near a text entry region 1009. A first search parameter menu bar 1007 is displayed adjacent to a second search parameter bar 1011. The first search parameter search bar 1007 allows a user to specify the location for a particular search while two menu pull down controls in the second search parameter menu bar 1011 allow the user to specify the type of file using the pull down menu 1012 and the time the file was created or last modified using the menu 1013.

The window 1001 includes an additional feature which may be very useful while analyzing a search result. A user may select individual files from within the display region 1005 and associate them together as one collection. Each file may be individually marked using a specific command (e.g. pressing the right button on a mouse and selecting a command from a menu which appears on the screen, which command may be "add selection to current group") or similar such commands. By individually selecting such files or by selecting a group of files at once, the user may associate this group of files into a selected group or a "marked" group and this association may be used to perform a common action on all of the files in the group (e.g. print each file or view each file in a viewer window or move each file to a new or existing folder, etc.). A representation of this marked group appears as a folder in the user-configurable portion 1003A. An example of such a folder is the folder 1020 shown in the user-configurable portion 1003A. By selecting this folder (e.g. by positioning a cursor over the folder 1020 and pressing and releasing a mouse button or by pressing another button) the user, as a result of this selection, will cause the display within the display region 1005 of the files which have been grouped together or marked. Alternatively, a separate window may appear showing only the items which have been marked or grouped. This association or grouping may be merely temporary or it may be made permanent by retaining a list of all the files which have been grouped and by keeping a folder 1020 or other representations of the grouping within the user-configurable side bar, such as the side bar 1003A. Certain embodiments may allow multiple, different groupings to exist at the same time, and each of these groupings or associations may be merely temporary (e.g. they exist only while the search results window is displayed), or they may be made permanent by retaining a list of all the files which have been grouped within each separate group. It will be appreciated that the files within each group may have been created from different applications. As noted above, one of the groupings may be selected and then a user may select a command which performs a common action (e.g. print or view or move or delete) on all of the files within the selected group.

Figure 11A:
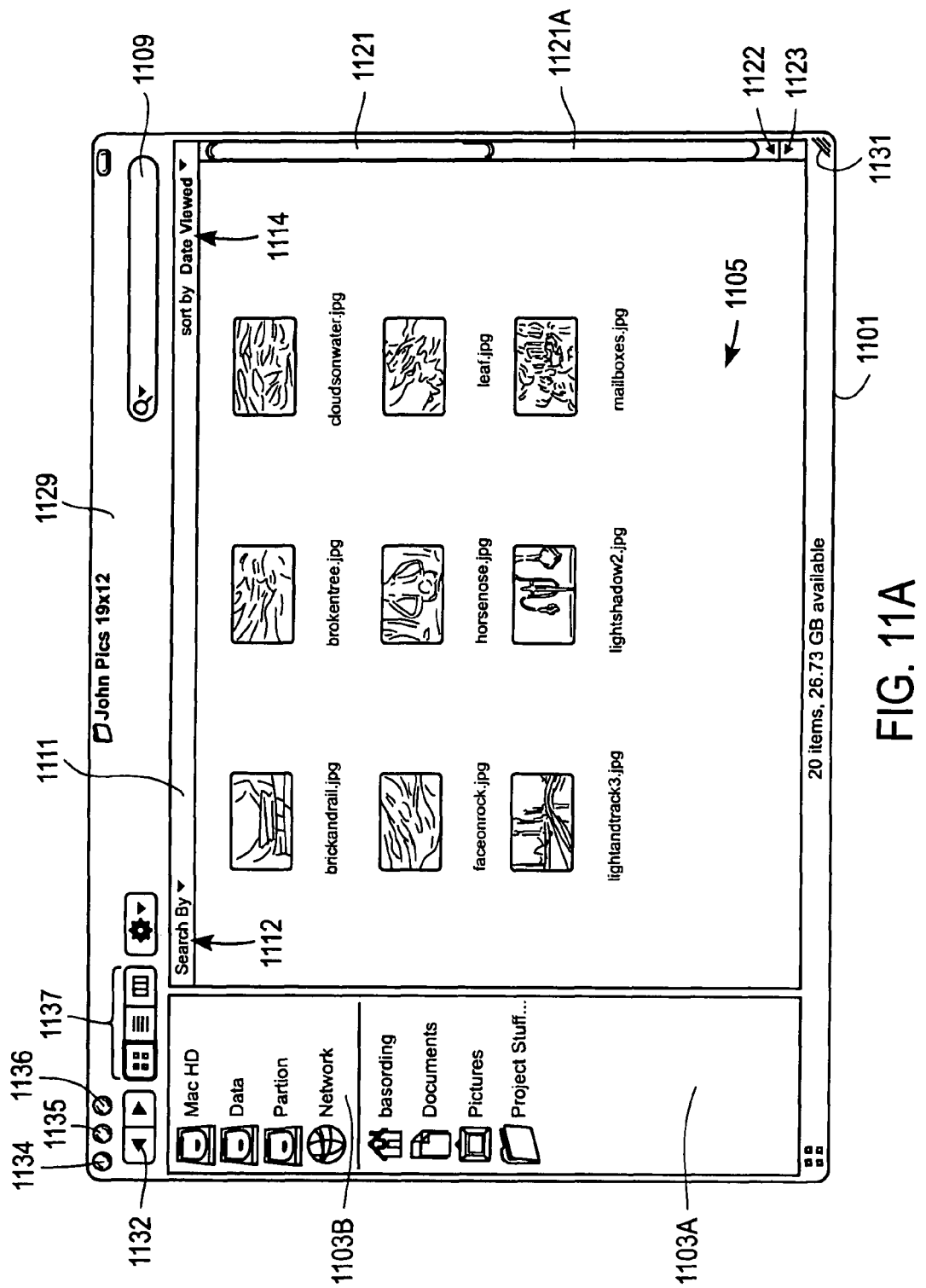
FIGS. 11A-11D show, in sequence, another exemplary user interface according to the present invention.
Figure 11B:
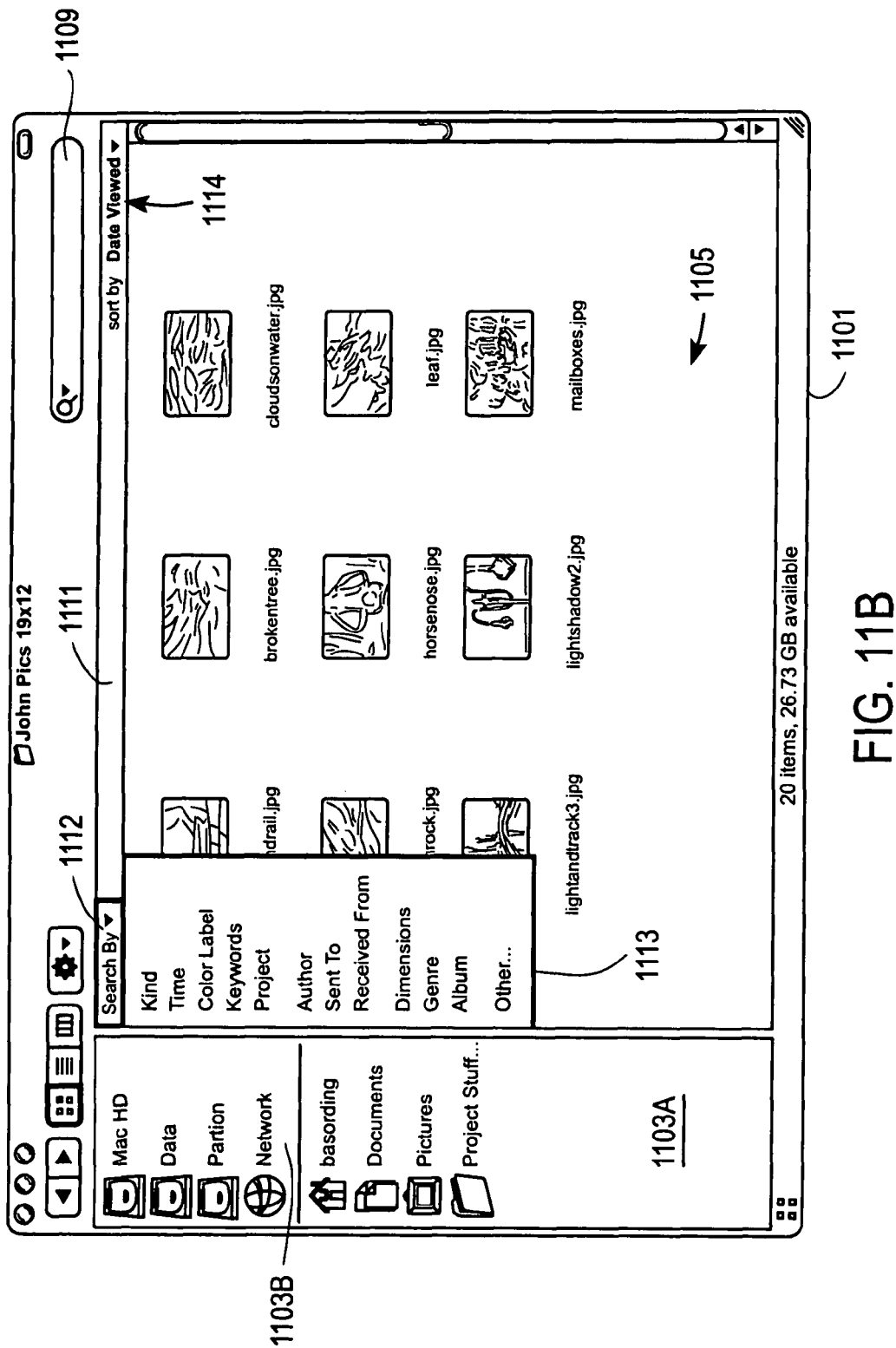

FIGS. 11A, 11B, 11C, and 11D show an alternative user interface for allowing a user to input search queries or search parameters. The user interface shown in these figures appears within the window 1101 which includes a user-configurable side bar region 1103A and a system specified side bar region 1103B. The window 1101 also includes traditional window controls such as a window resizing control 1131 which may be dragged in a conventional graphical user interface manner to resize the window, and the window further includes scrolling controls such as controls 1121, 1122, and 1123. The scrolling control 1121 may, for example, be dragged within the scrolling region 1121A or a scroll wheel on a mouse or other input device may be used to cause scrolling within a display region 1105. Further, traditional window controls include the title bar 1129 which may be used to move the window around a desktop which is displayed on a display device of a computer system and the window also includes view buttons 1137 as well as close, minimize, and resize buttons 1134, 1135 and 1136. A back and forward button, such as the back button 1132, are also provided to allow the user to move back and forth in a manner which is similar to the back and forth commands in a web browser. The window 1101 includes a search parameter menu bar 1111 which includes a "search by" pull down menu 1112 and a "sort by" pull down menu 1114. The "search by" pull down menu 1112 allows a user to specify the particular search parameter by selecting from the options which appear in the pull down menu once it is activated as shown in FIG. 11B. In particular, the pull down menu 1113 shows one example of a pull down menu when the "search by" pull down menu 1112 has been activated. The "sort by" pull down menu 1114 allows a user to specify how the search results are displayed within a display region 1105. In the example shown in FIGS. 11A-11D a user has used the "sort by" pull down menu 1114 to select the "date viewed" criteria to sort the search results by. It should also be noted that the user may change the type of view of the search results by selecting one of the three view buttons 1137. For example, a user may select an icon view which is the currently selected button among the view buttons 1137, or the user may select a list view or a column view.

Figure 11C:
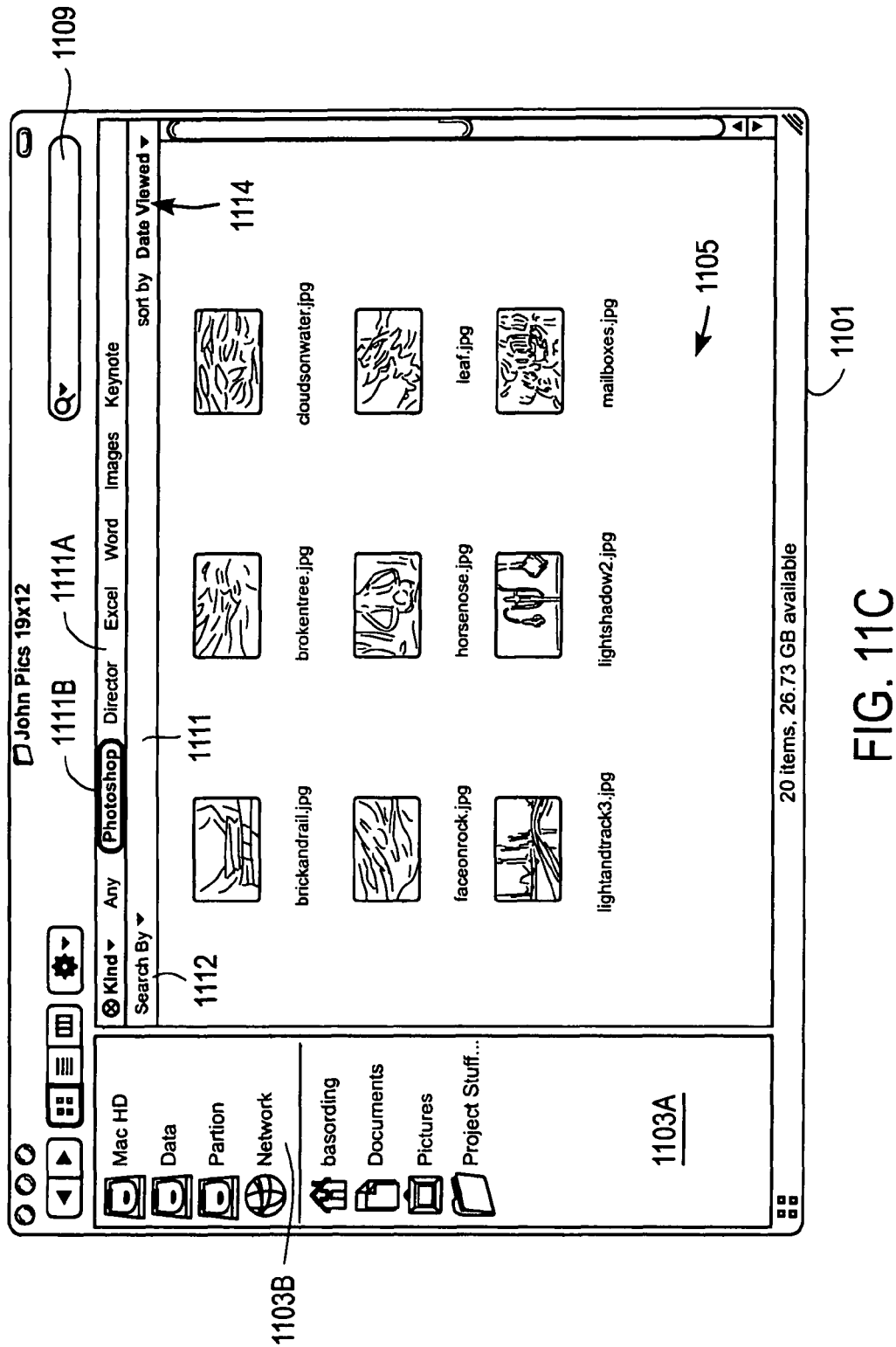
Figure 11D:
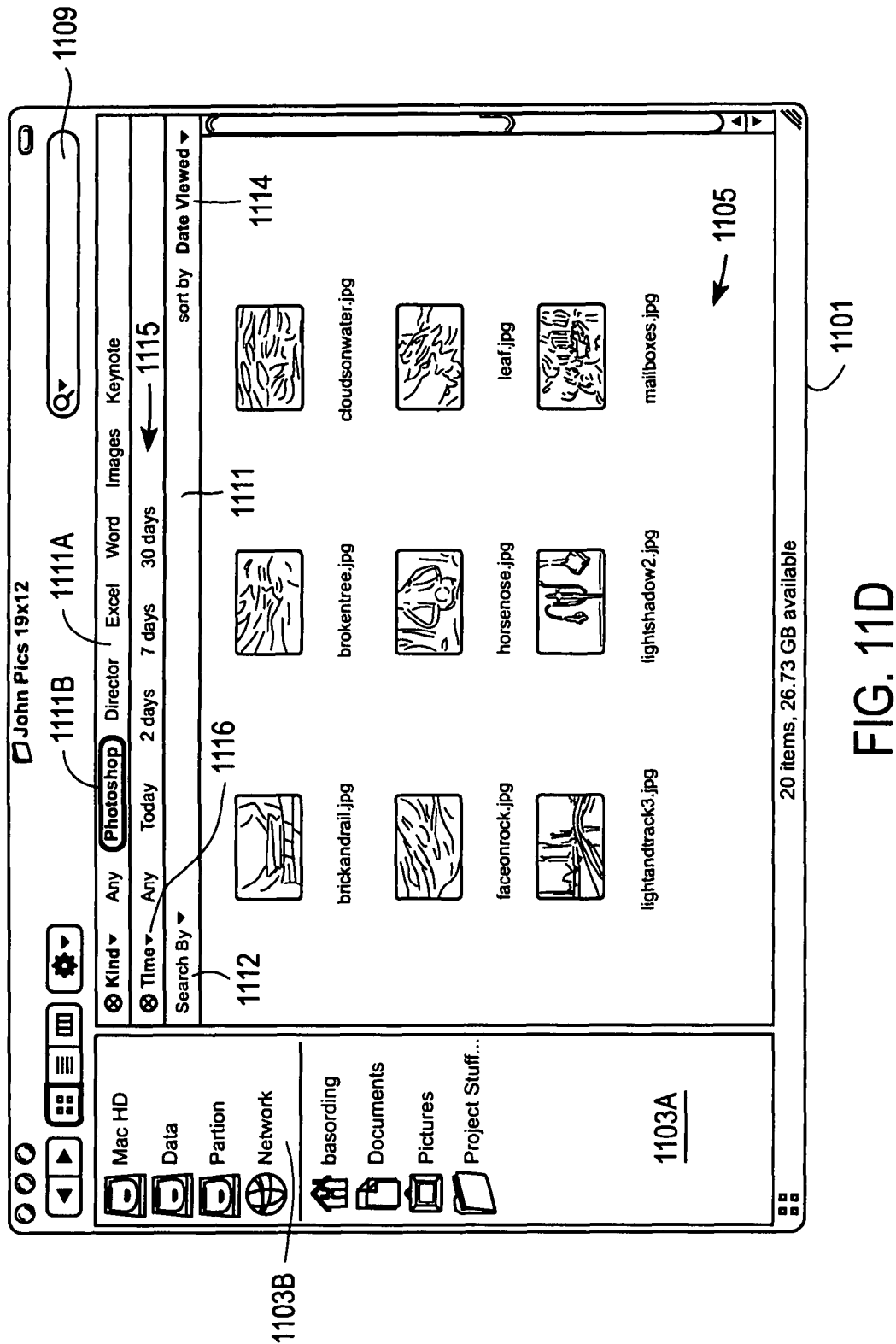

FIG. 11B shows the result of the user's activation of a "search by" pull down menu 1112 which causes the display of the menu 1113 which includes a plurality of options from which the user may choose to perform a search by. It will be appreciated that there are a number of different ways for a user to activate the "search by" pull down menu 1112. One way includes the use of a cursor, such as a pointer on a display which is controlled by a cursor control device, such as a mouse. The cursor is positioned over the region associated with the "search by" menu title (which is the portion within the search parameter menu bar 1111 which contains the words "search by") and then the user indicates the selection of the menu title by pressing a button, such as a mouse's button, to cause the pull down menu to appear, which in this case is the menu 1113 shown in FIG. 11B. At this point, the user may continue to move the cursor to point to a particular option within the menu, such as the "time" option. This may result in the display of a submenu to the left or to the right of the menu 1113. This submenu may be similar to the submenu 719A or to the menu 1214 shown in FIG. 12A. If the "kind" option is selected in the menu 1113, the submenu may include a generic list of the different kinds of documents, such as images, photos, movies, text, music, PDF documents, email documents, etc. or the list may include references to specific program names such as PhotoShop, Director, Excel, Word, etc. or it may include a combination of generic names and specific names. FIG. 11C shows the result of the user having selected PhotoShop type of documents from a submenu of the "kind" option shown in menu 1113. This results in the display of the search parameter menu bar 1111A shown in FIG. 11C which includes a highlighted selection 1111B which indicates that the PhotoShop type of documents will be searched for. The search parameter menu bar 1111 appears below the search parameter menu bar 1111A as shown in FIG. 11C. The user may then specify additional search parameters by again using the "search by" pull down menu 1112 or by typing text into the text entry field 1109. For example, from the state of the window 1101 shown in FIG. 11C, the user may select the "search by" pull down menu 1112 causing the display of a menu containing a plurality of options, such as the options shown within the menu 1113 or alternative options such as those which relate to PhotoShop documents (e.g. the various fields in the metadata for PhotoShop type of documents). A combination of such fields contained within metadata for PhotoShop type documents and other generic fields (e.g. time, file size, and other parameters) may appear in a menu, such as the menu 1113 which is activated by selecting the "search by" pull down menu. The user may then select another criteria such as the time criteria. In this case, the window 1101 displays a new search parameter menu bar 1115 which allows a user to specify a particular time. The user may select one of the times on the menu bar 1115 or may activate a pull down menu by selecting the menu title "time," which is shown as the menu title 1116. The state of the window 1101 shown in FIG. 11D would then search for all PhotoShop documents created in the last 30 days or 7 days or 2 days or today or at any time, depending on the particular time period selected by the user.

FIGS. 12A, 12B, 12C and 12D show another example of a user interface for allowing the creation of search queries for searching metadata and other data and for displaying the results of the search performed using a search query. The different implementation shown in FIGS. 12A-12D shows a user interface presentation in a column mode; this can be seen by noting the selection of the column button, which is the rightmost button in the view buttons 1237 shown in FIG. 12A. The window 1201 has two columns 1211 and the display region 1205, while the window 1251 of FIG. 12C has three columns which are columns 1257, 1259, and the display region 1255, and the window 1271 has three columns which are columns 1277, 1279, and the display region 1275.

Figure 12A:
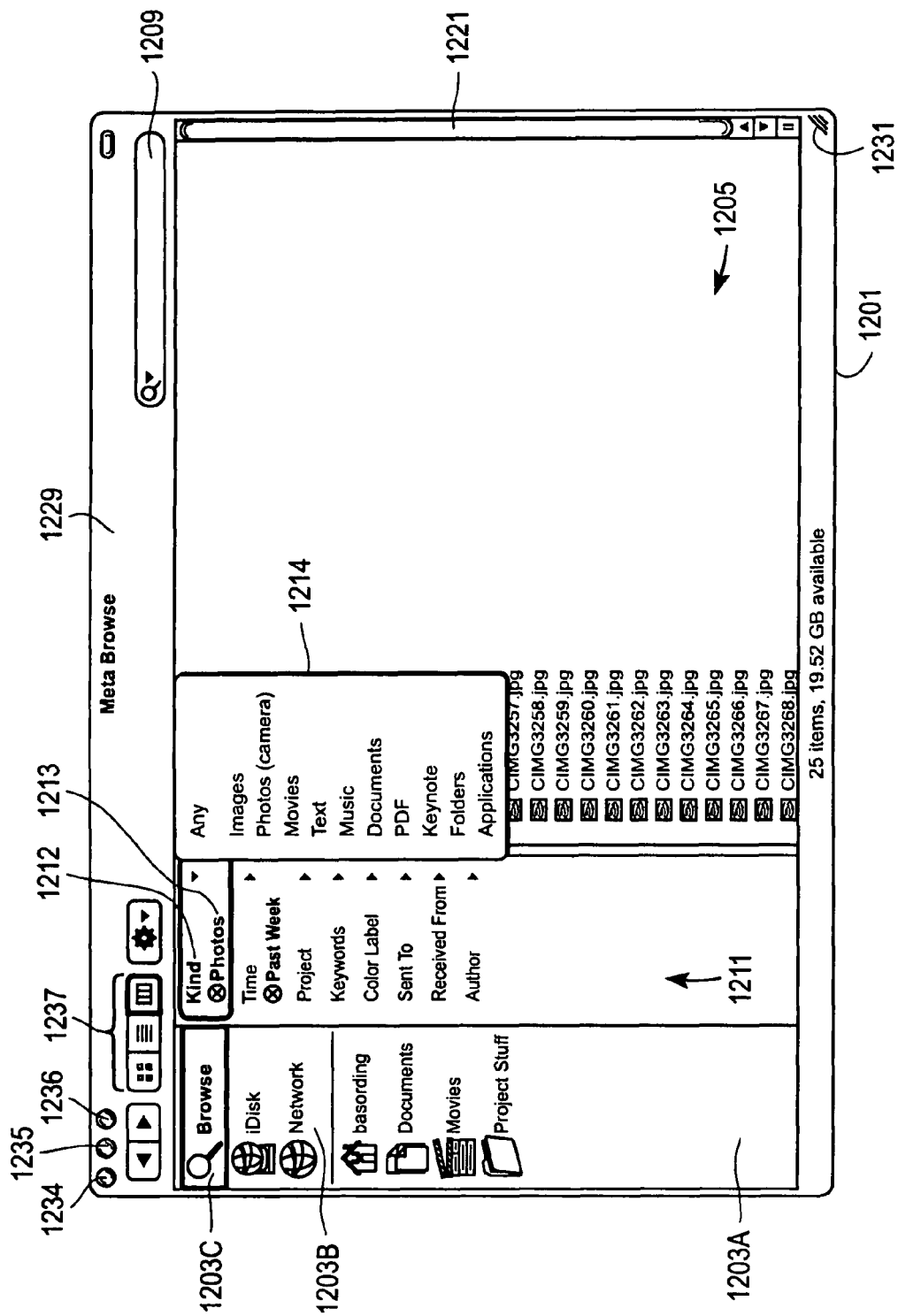
FIGS. 12A-12D show alternative embodiments of user interfaces according to the present invention.
Figure 12B:
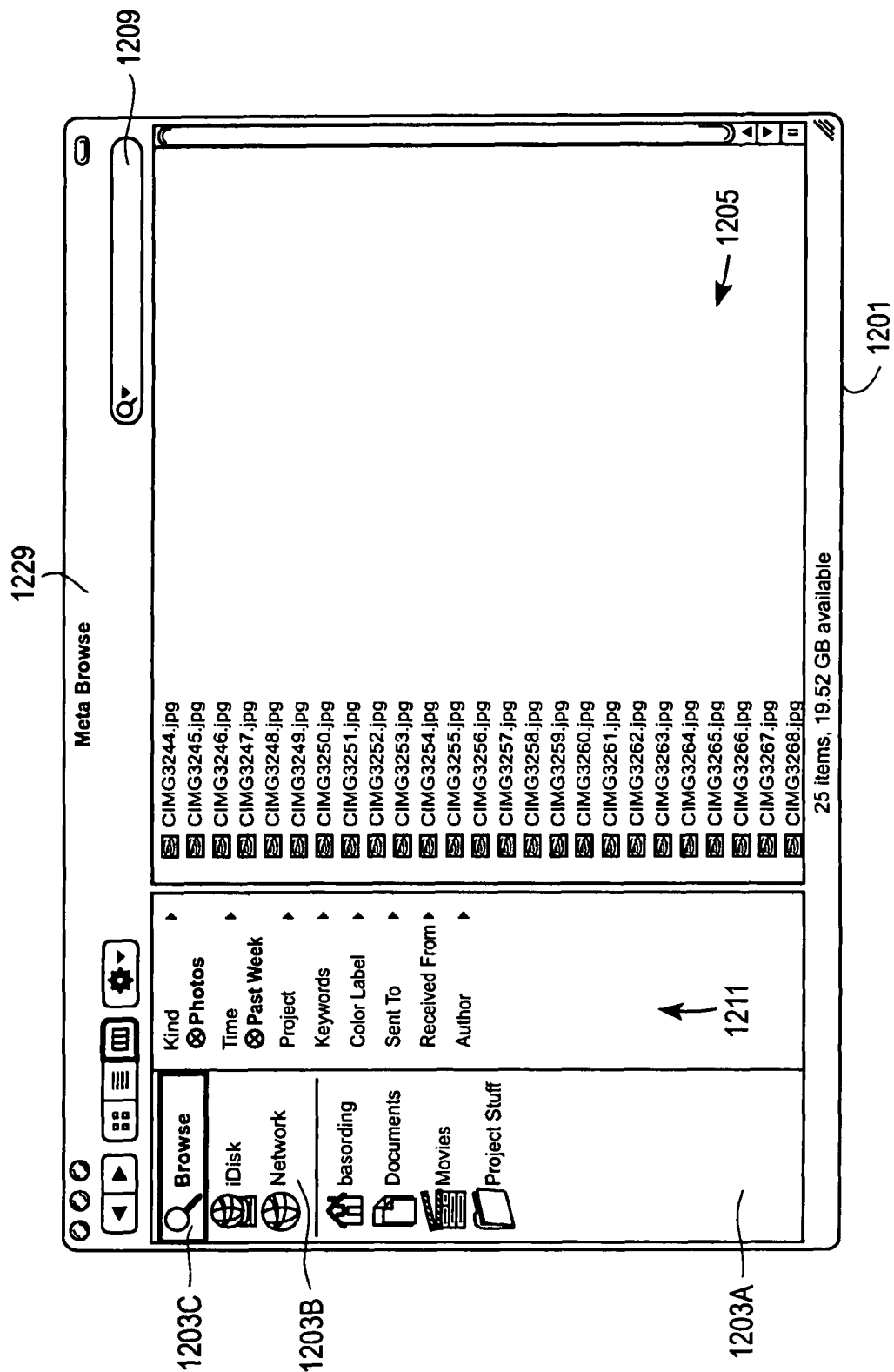

The window 1201 shown in FIGS. 12A and 12B includes a display region 1205 which shows the results of a search; these results may be shown dynamically as the user enters search parameters or the results may be shown only after the user has instructed the system to perform the search (e.g. by selecting a "perform search" command). The window 1201 includes conventional window controls, such as a resizing control 1231, a scrolling control 1221, a title bar 1229 which may be used to move the window, a window close button, a window minimize button, and a window resize button 1234, 1235, and 1236, respectively. The window 1201 also includes a user-configurable side bar region 1203A and a system specified side bar region 1203B. It can be seen from FIG. 12A that a browse mode has been selected as indicated by the highlighted "browse" icon 1203C in the system specified side bar region 1203B. The window 1201 also includes a text entry region 1209, which a user may use to enter text for a search, and the window 1201 also includes view selector buttons 1237.

A column 1211 of window 1201 allows a user to select various search parameters by selecting one of the options which in turn causes the display of a submenu that corresponds to the selected option. In the case of FIG. 12A, the user has selected the "kind" option 1212 and then has used the submenu 1214 to select the "photos" option from the submenu, resulting in an indicator 1213 (photos) to appear in the column 1211 under the "kind" option as shown in FIG. 12A. It can also be seen that the user has previously selected the "time" option in the column 1211 and has selected from a submenu brought up when the "time" option was selected the "past week" search parameter. When the user has finished making selections of the various options and suboptions from both the column 1112 and any of the corresponding submenus which appear, then the display showed in FIG. 12B appears. Note that the submenus are no longer present and that the user has completed the selection of the various options and suboptions which specify the search parameters. Column 1211 in FIG. 12B provides feedback to the user indicating the exact nature of the search query (in this case a search for all photos dated in the past week), and the results which match the search query are shown in the display region 1205.

Figure 12C:
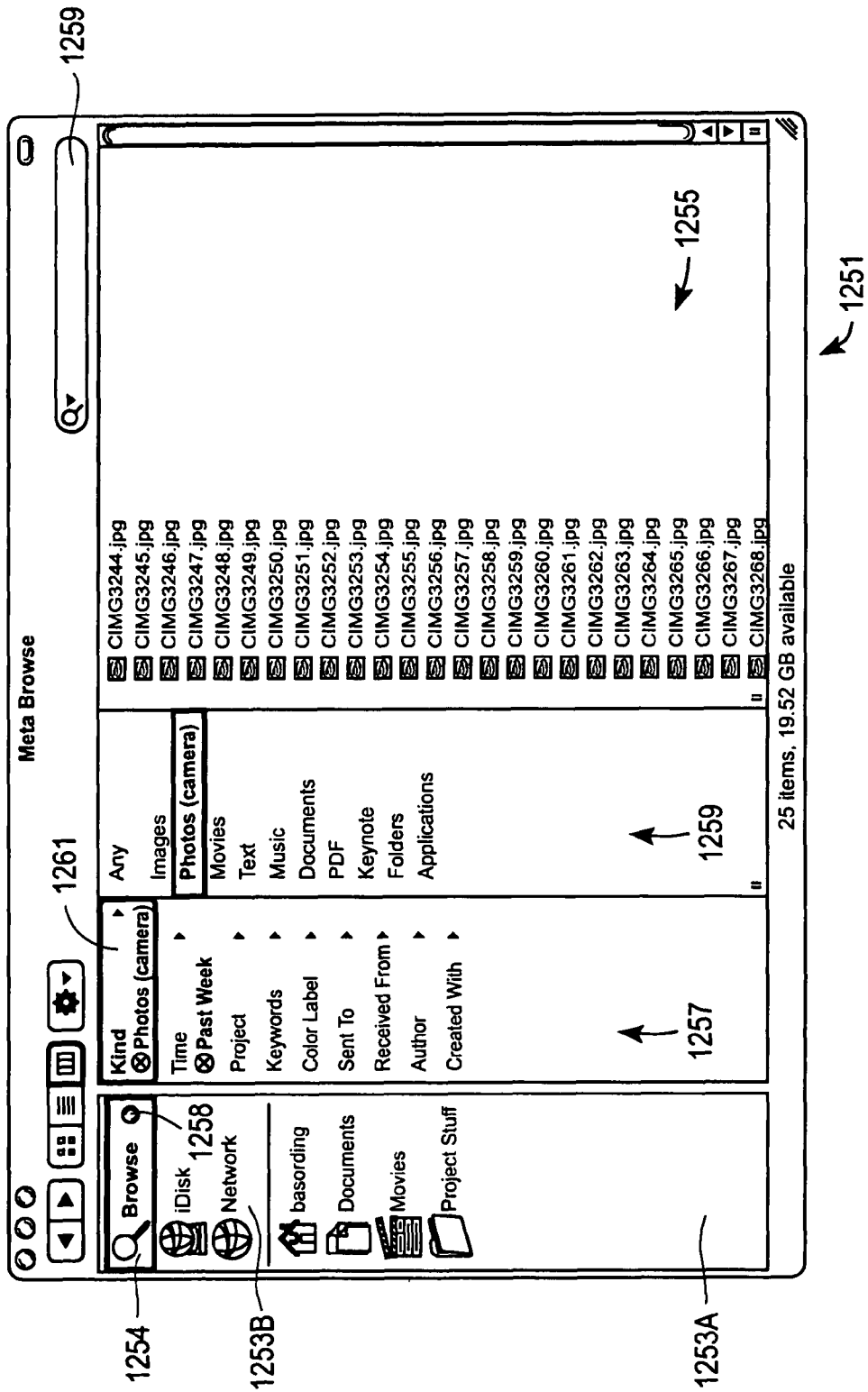
Figure 12D:
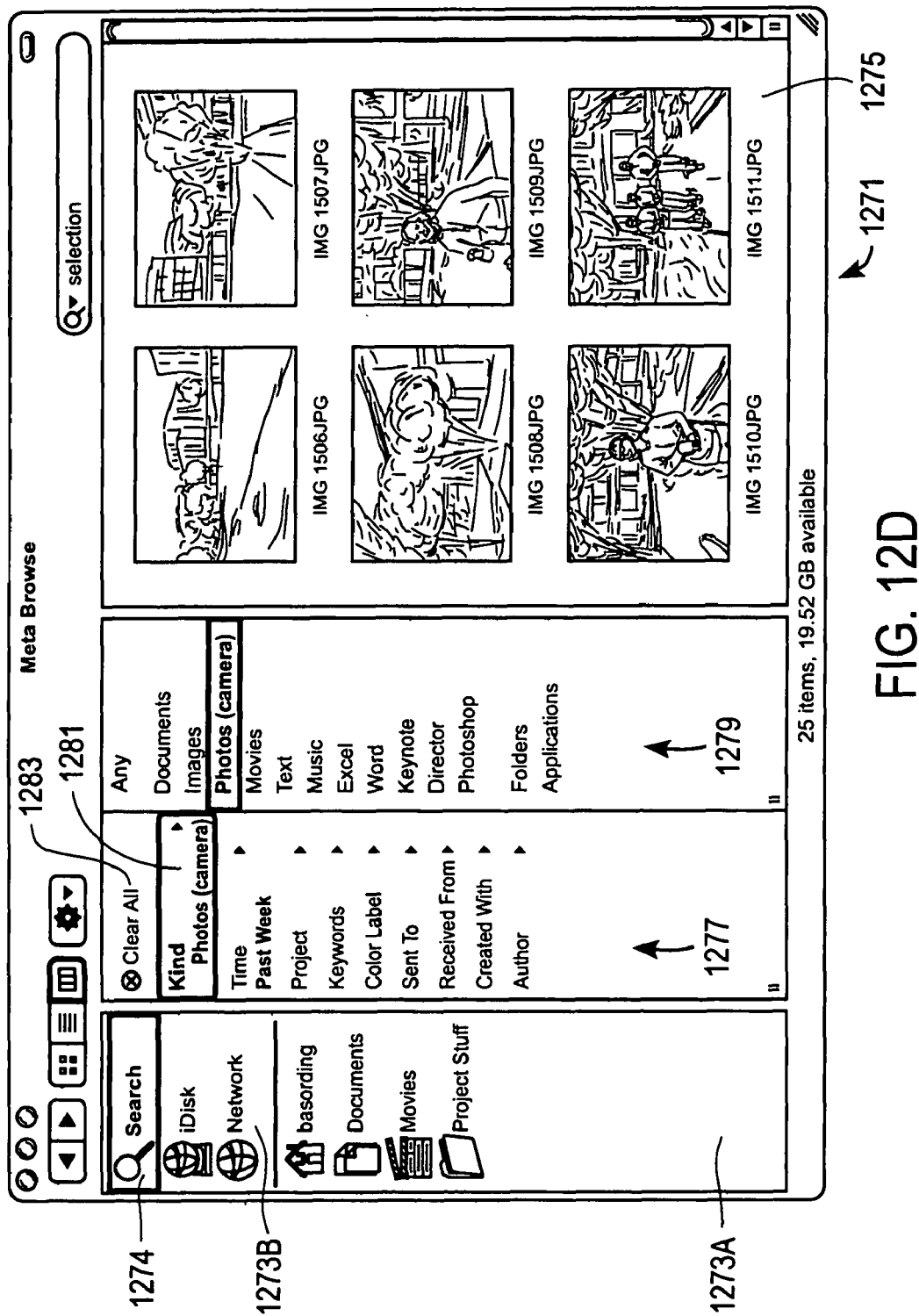

FIGS. 12C and 12D show an alternative embodiment in which the submenus which appear on a temporary basis in the embodiment of FIGS. 12A and 12B are replaced by an additional column which does not disappear after a selection is made. In particular, the column 1259 of the window 1251 functions in the same manner as the submenu 1214 except that it remains within the window 1251 after a selection is made (wherein the submenu 1214 is removed from the window after the user makes the selection from the submenu). The column 1279 of window 1271 of FIG. 12D is similar to the column 1259. The window 1251 includes a side bar which has a user-configurable side bar region 1253A and a system defined side bar region 1253B. The system specified side bar region 1253B includes a "browse" selection region 1254 which has a clear button 1258 which the user may select to clear the current search query. The window 1271 of FIG. 12D provides an alternative interface for clearing the search query. The window 1271 also includes a user configurable side bar region 1273A and a system specified side bar region 1273B, but the clear button, rather than being with the "search" region 1274 is at the top of the column 1277. The user may clear the current search parameter by selecting the button 1283 as shown in FIG. 12D.

Figure 13A:
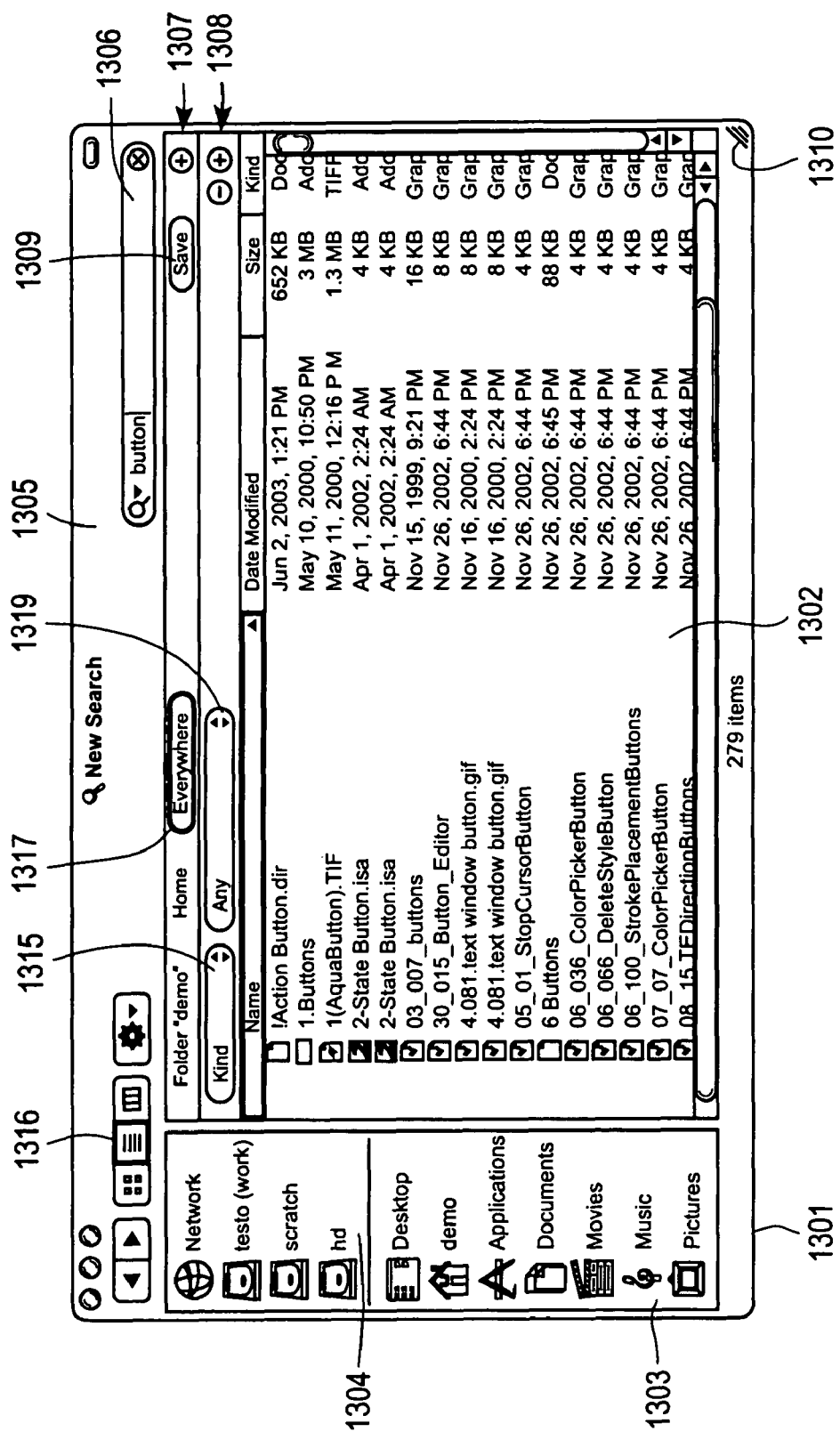
FIGS. 13A and 13B show further alternative embodiments of user interfaces according to the present invention.
Figure 13B:
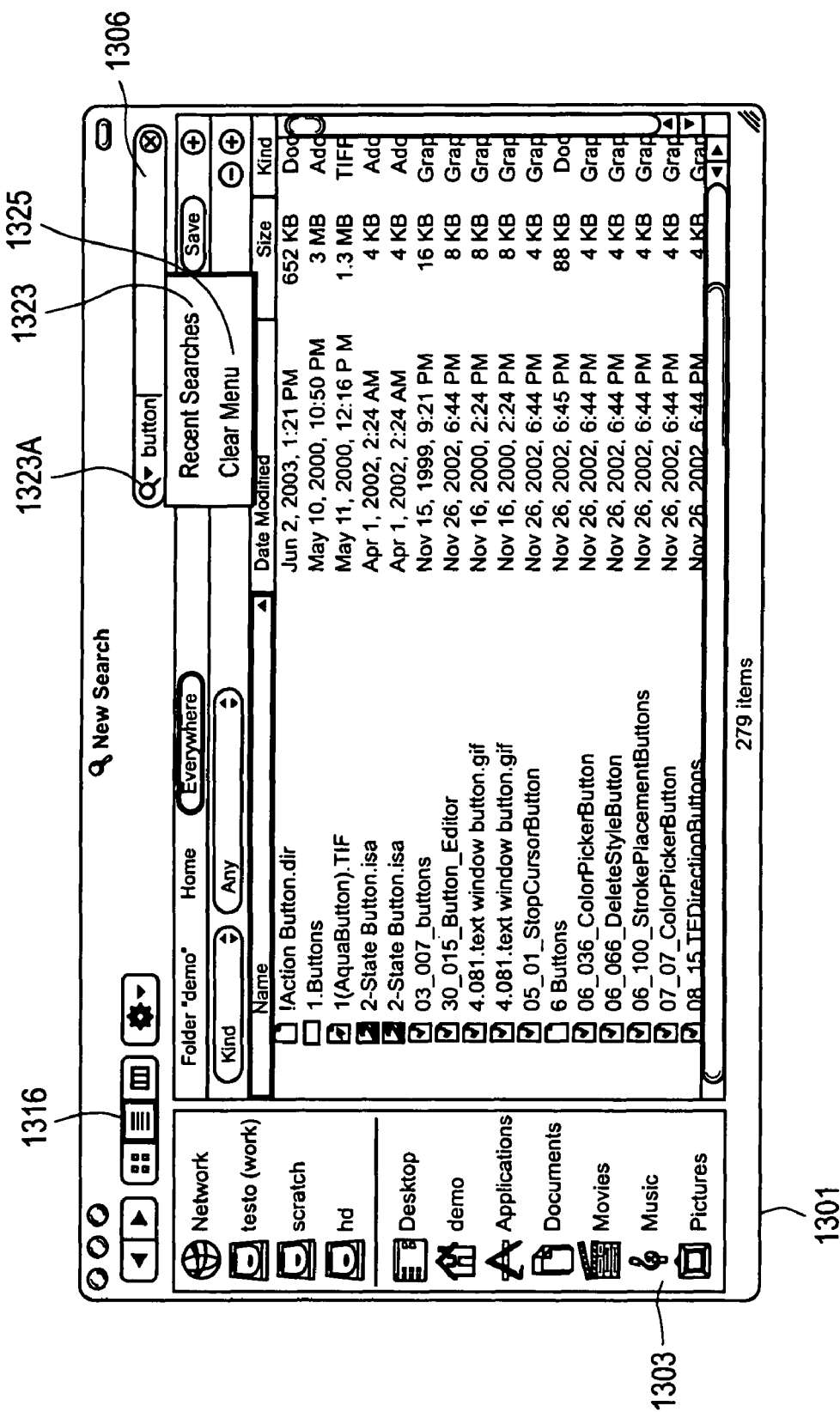

FIG. 13A shows another embodiment of a window 1301 which displays search results within a display region 1302. The window 1301 may be a closeable, minimizeable, resizable, and moveable window having a resizing control 1310, a title bar 1305 which may be used to move the window, a text entry region 1306 and a user configurable portion 1303, and a system specified portion 1304. The window 1301 further includes buttons for selecting various views, including an icon view, a list view, and a column view. Currently, the list view button 1316 has been selected, causing the display of the search results in a list view manner within the display region 1302. It can be seen that the text ("button") has been entered into the text entry region 1306 and this has caused the system to respond with the search results shown in the display region 1302. The user has specified a search in every location by selecting "everywhere" button 1317. Further, the user has searched for any kind of document by selecting the "kind" option from the pull down menu 1315 and by selecting the "any" option in the pull down menu 1319. The where or location slice 1307 includes a "+" button which may be used to add further search parameters, and similarly, the slice 1308 includes a "+" and a "−" button for adding or deleting search parameters, respectively. The slice 1307 further includes a "save" button 1309 which causes the current search query to be saved in the form of a folder which is added to the user configurable portion 1303 for use later. This is described further below and may be referred to as a "smart folder." The search input user interface shown in FIGS. 13A and 13B is available within, in certain embodiments, each and every window controlled by a graphical user interface file management system, such as a Finder program which runs on the Macintosh or Windows Explorer which runs on Microsoft Windows. This interface includes the text entry region 1306 as well as the slices 1307 and 1308.

The window 1301 shown in FIG. 13B shows the activation of a menu by selecting the search button 1323A, causing a display of a menu having two entries 1323 and 1325. Entry 1323 displays recently performed searches so that a user may merely recall a prior search by selecting the prior search and cause the prior search to be run again. The menu selection 1325 allows the user to clear the list of recent searches in the menu.

Figure 14A:
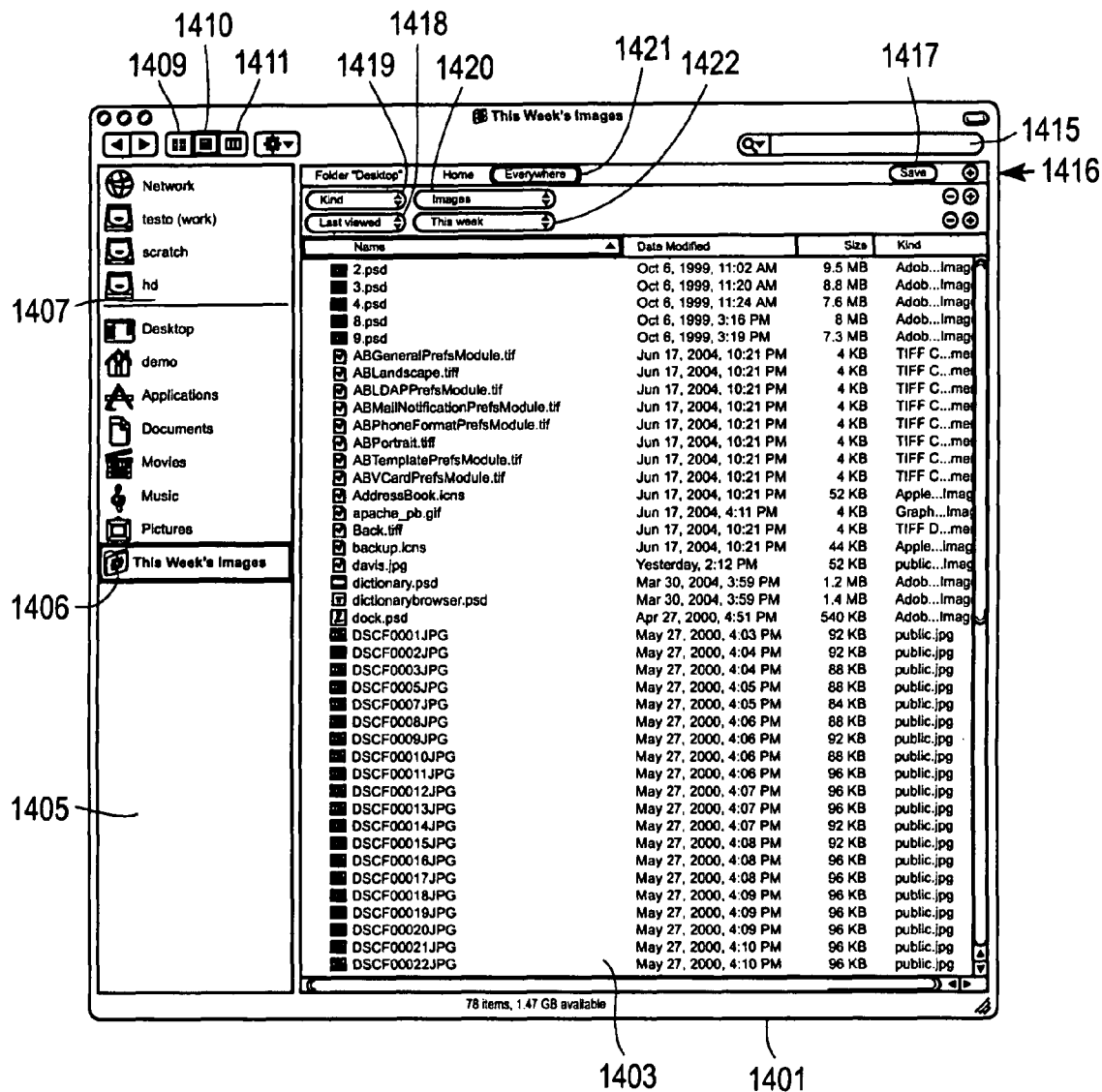
FIGS. 14A, 14B, 14C, and 14D show further alternative embodiments of user interfaces according to the present invention.
Figure 14B:
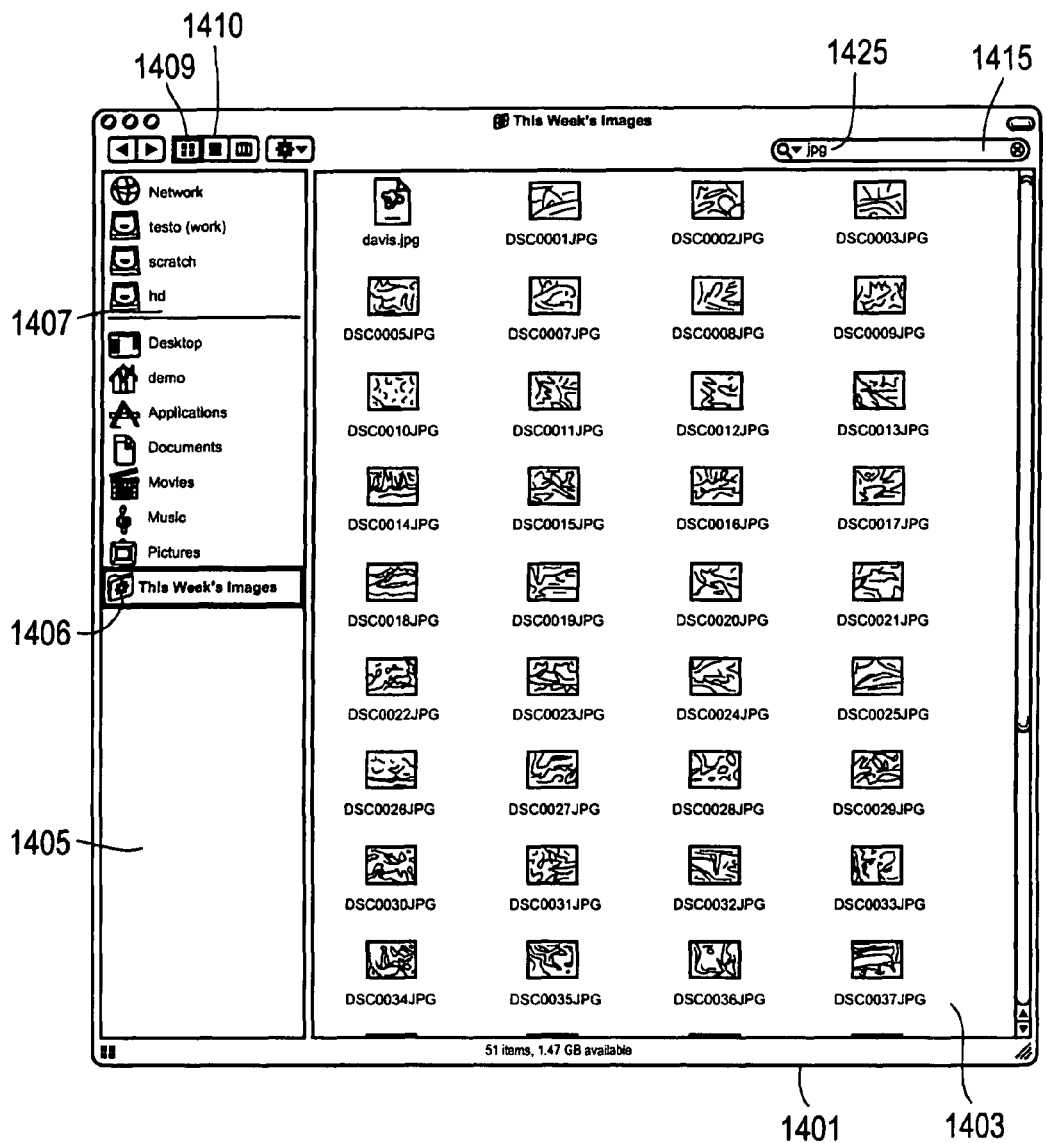
Figure 14C:
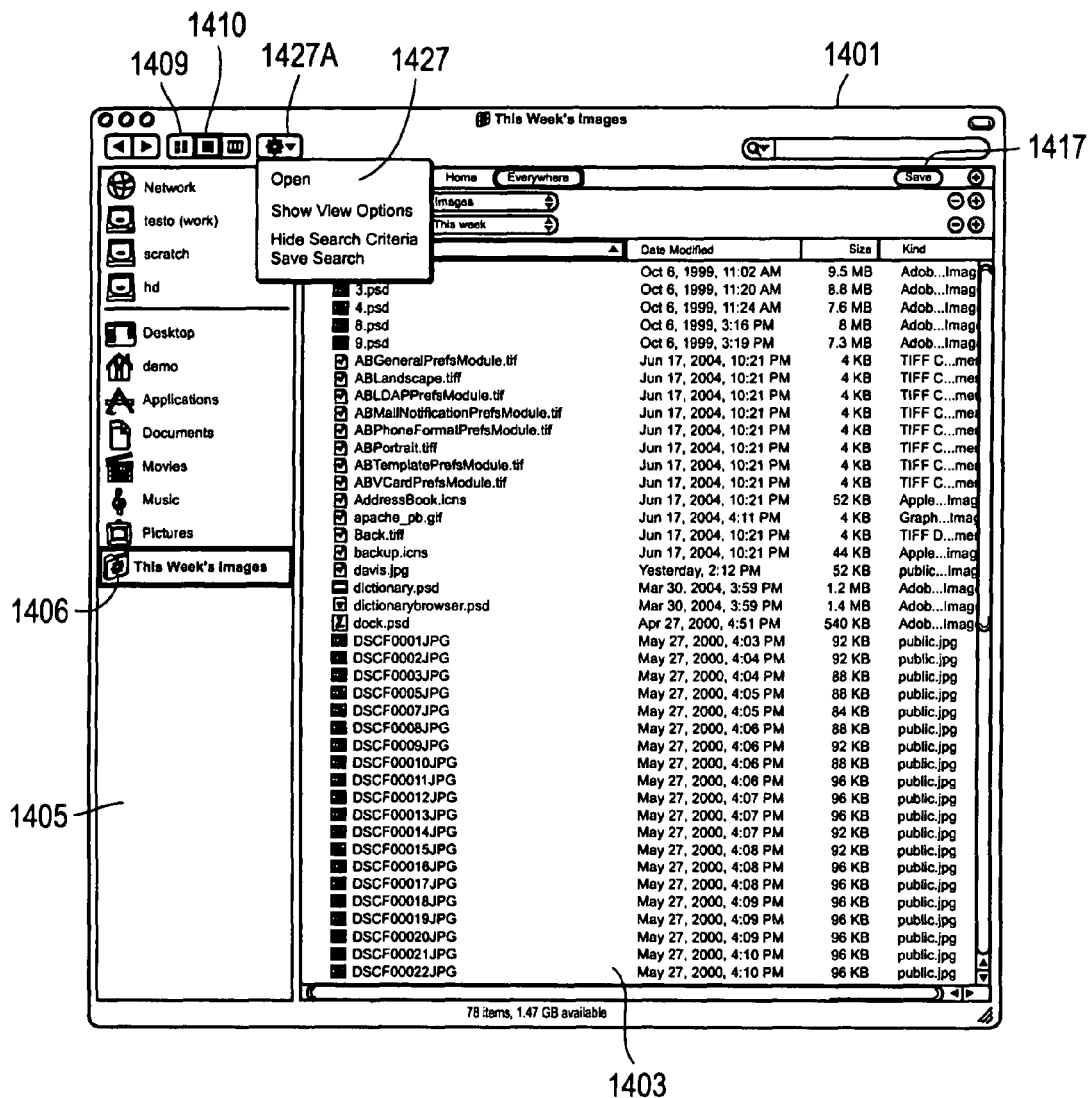

FIGS. 14A, 14B, and 14C show examples of another window in a graphical user interface file system, such as the Finder which runs on the Macintosh operating system. These windows show the results of a particular search and also the ability to save and use a smart folder which saves a prior search. The window 1401 shown in FIG. 14A includes a display region 1403, a user configurable region 1405, a smart folder 1406, a system specified region 1407, an icon view button 1409, a list view button 1410, and a column view button 1411. The window 1401 also includes a text entry region 1415 and a location slice 1416 which may be used to specify the location for the search, which slice also includes a save button 1417. Additional slices below the slice 1416 allow the user to specify further details with respect to the search, in this case specifying types of documents which are images which were last viewed this week. The user has set the search parameters in this manner by selecting the "kind" option from the pull down menu 1419 and by selecting the "images" type from the pull down menu 1420 and by selecting the "last viewed" option from pull down menu 1418 and by selecting "this week" from the pull down menu 1422. The user has also selected "everywhere" by selecting the button 1421 so that the search will be performed on all disks and storage devices connected to this system. The results are shown within the display region 1403. The user can then save the search query by selecting the "save" button 1417 and may name the saved search query as "this week's images" to produce the smart folder 1406 as shown in the user configurable portion 1405. This allows the user to repeat this search at a later time by merely selecting the smart folder 1406 which causes the system to perform a new search again, and all data which matches the search criteria will be displayed within the display region 1403. Thus, after several weeks, a repeating of this search by selecting the smart folder 1406 will produce an entirely different list if none of the files displayed in the display region 1403 of FIG. 14A are viewed in the last week from the time in which the next search is performed by selecting the smart folder 1406.

FIG. 14B shows a way in which a user may sort or further search within the search results specified by a saved search, such as a smart folder. In the case of FIG. 14B, the user has selected the smart folder 1406 and has then entered text "jpg" 1425 in the text entry region 1415. This has caused the system to filter or further limit the search results obtained from the search query saved as the smart folder 1406. Thus, PhotoShop files and other files such as TIF files and GIF files are excluded from the search results displayed within the display region 1403 of FIG. 14B because the user has excluded those files by adding an additional search criteria specified by the text 1425 in the text entry region 1415. It can be seen that the "jpg" text entry is ANDed logically with the other search parameters to achieve the search results displayed in the display region 1403. It can also be seen that the user has selected the icon view by selecting the icon view button 1409. Thus, it is possible for a user to save a search query and use it later and to further limit the results of the search query by performing a search on the results of the search query to further limit the search results.

FIG. 14C shows the window 1401 and shows the search results displayed within the display region 1403, where the results are based upon the saved search specified by the smart folder 1406. The user has caused a pull down menu 1427 to appear by selecting the pull down region 1427A. The pull down region 1427 includes several options which a user may select. These options include hiding the search criteria or saving the search (which is similar to selecting the button 1417) or showing view options or opening the selected file. This allows the user, for example, to hide the search criteria, thereby causing the slice 1416 and the other search parameters to be removed from the window 1401 which is a moveable, resizable, minimizeable, and closeable window.

Figure 14D:
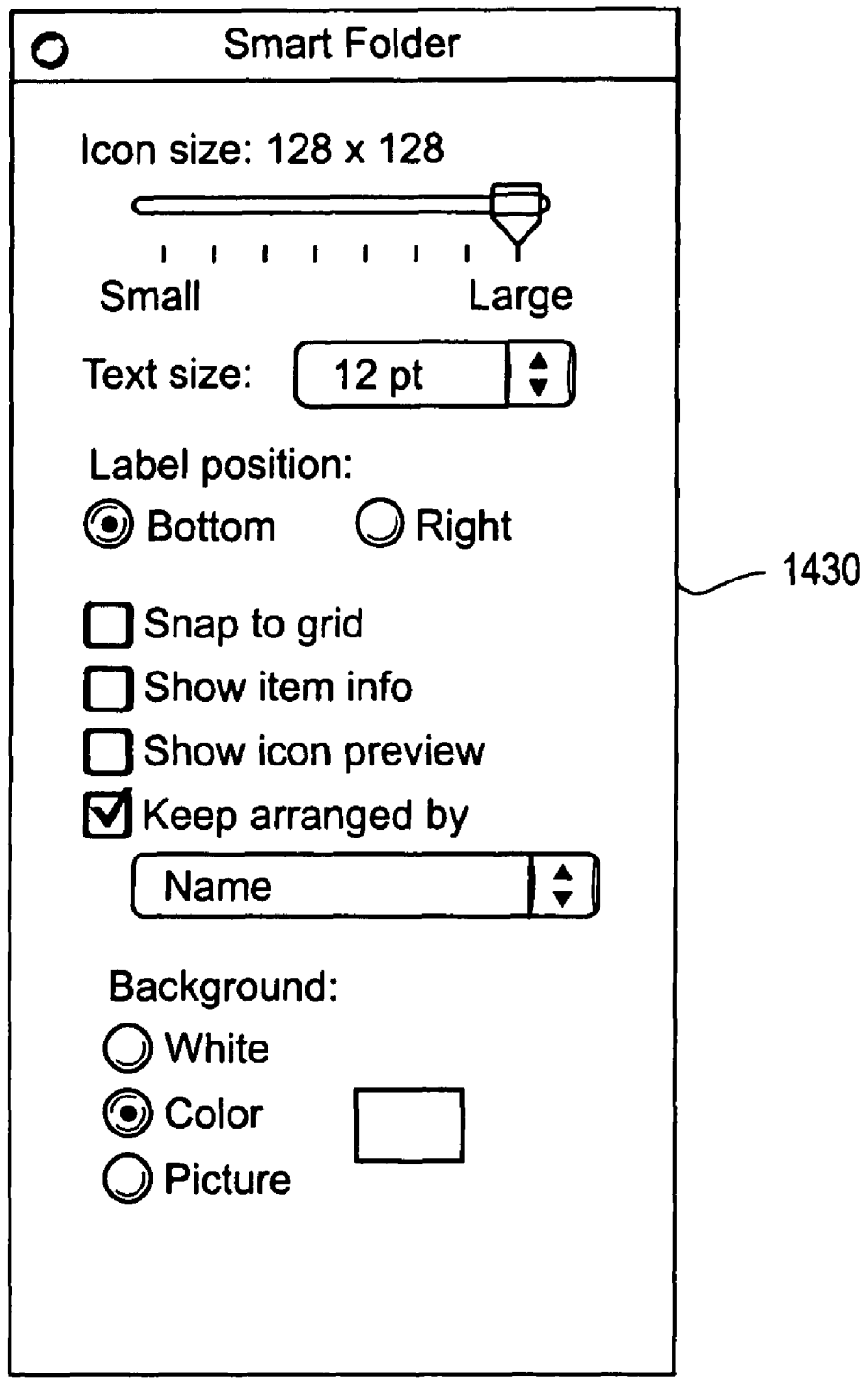

FIG. 14D shows an example of a user interface which allows the user to specify the appearance of a smart folder, such as the smart folder 1406.

Figure 15A:
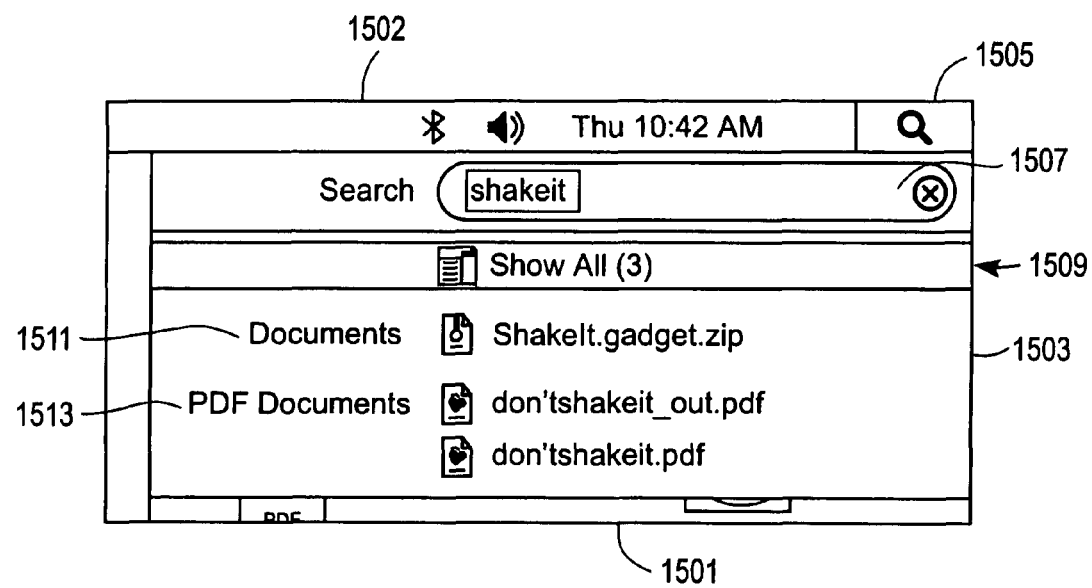
FIGS. 15A, 15B, 15C and 15D show another alternative embodiment of user interfaces according to the present invention.
Figure 15B:
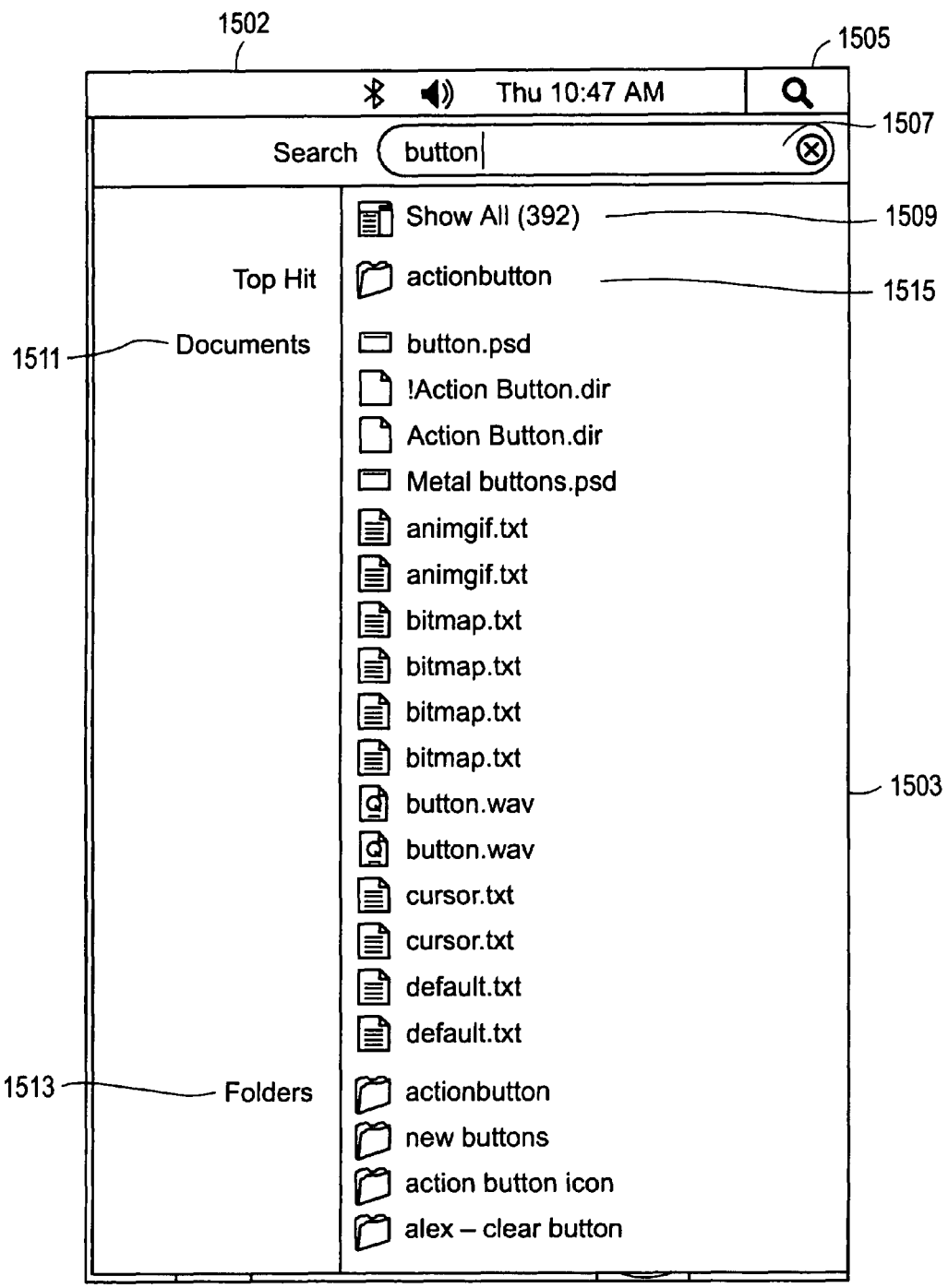
Figure 15C:
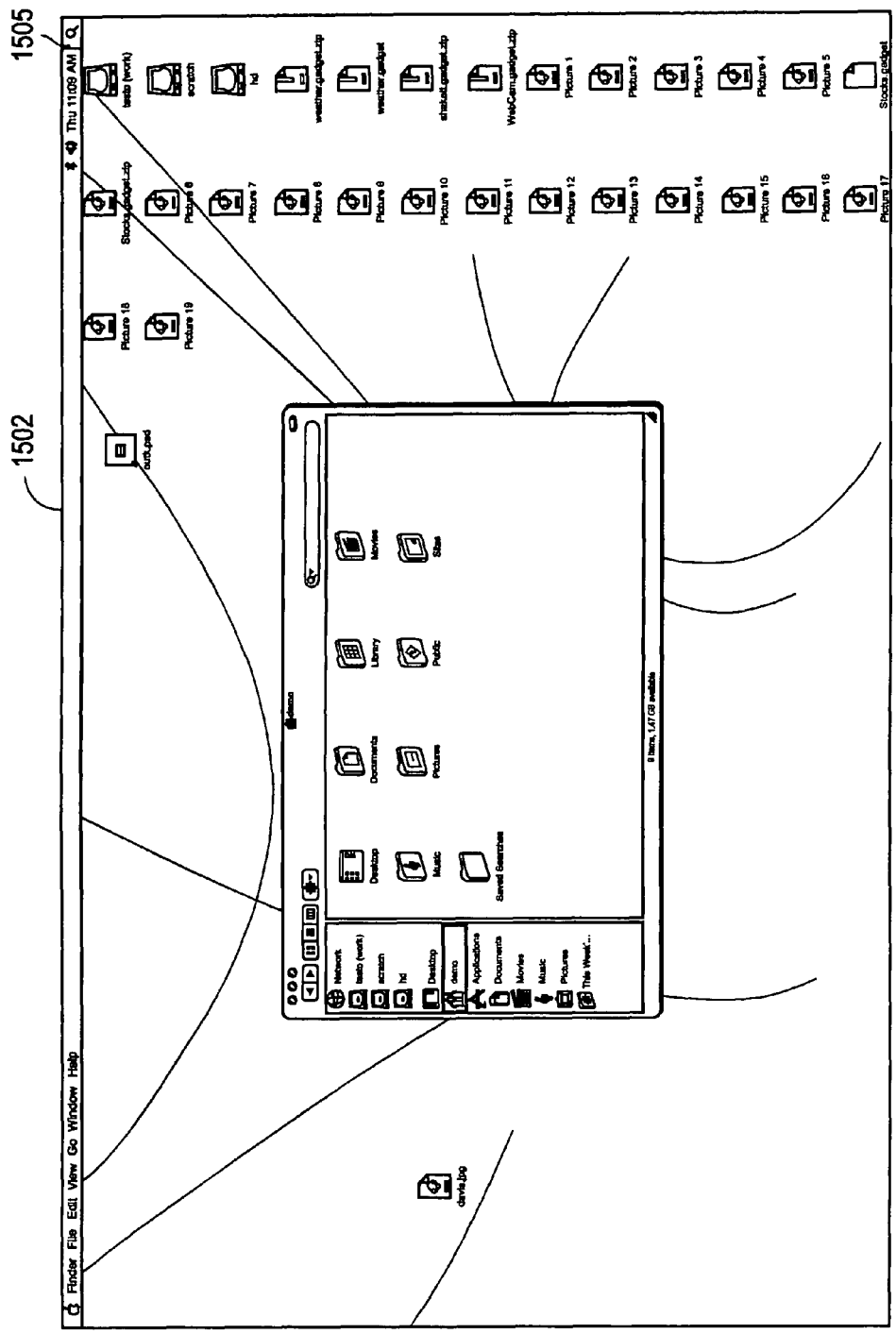
Figure 15D:
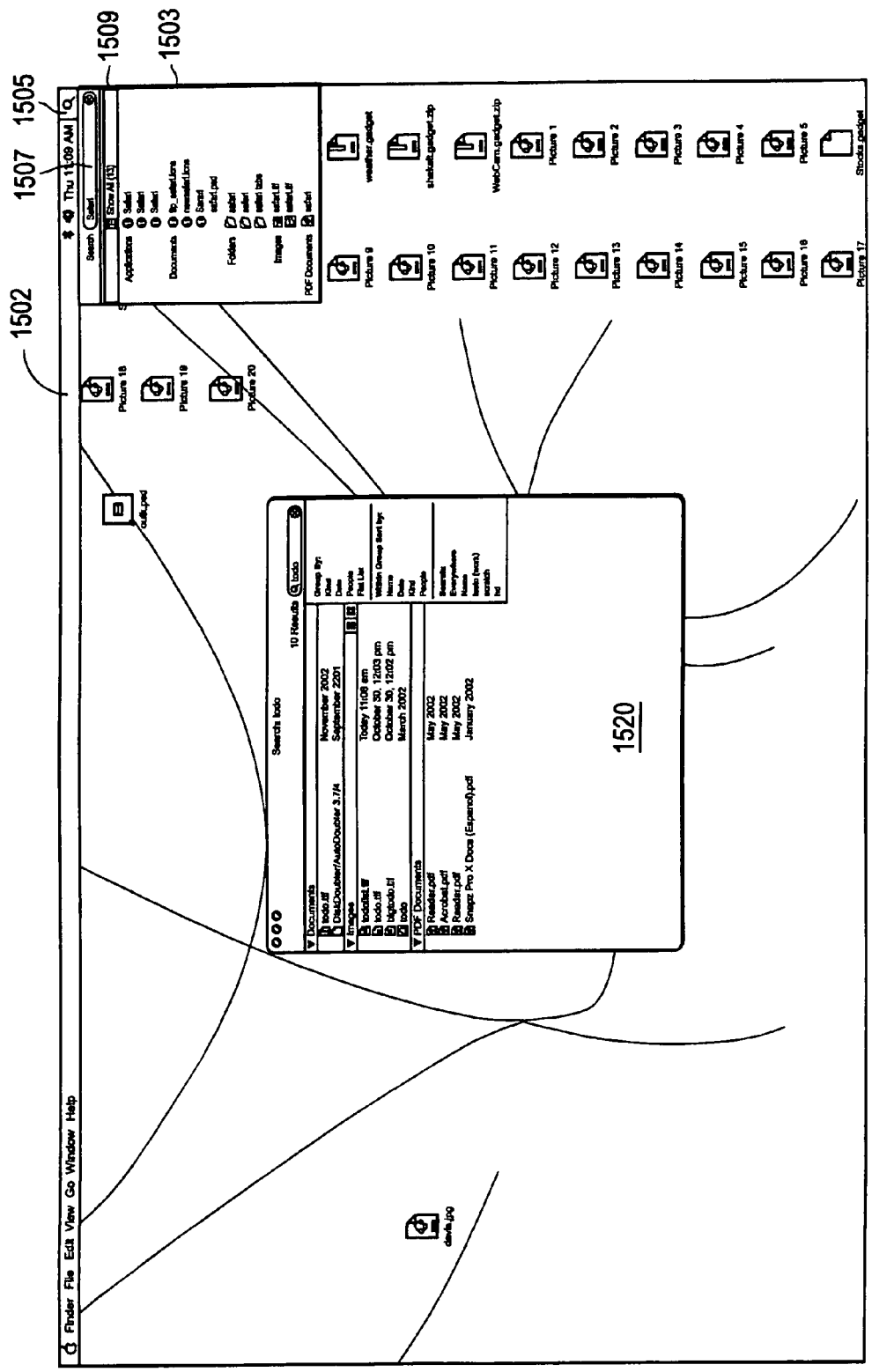

FIGS. 15A, 15B, 15C, and 15D show an example of a system wide search input user interface and search result user interface. In one particular exemplary embodiment, these user interfaces are available on the entire system for all applications which run on the system and all files and metadata, and even address book entries within an address book program, such as a personal information manager, and calendar entries within a calendar program, and emails within an email program, etc. In one exemplary embodiment, the system begins performing the search and begins displaying the results of the search as the user types text into a text entry field, such as the text entry field 1507. The search results are organized by categories and are displayed as a short list which is intentionally abbreviated in order to present only a selected number of the most relevant (scored) matches or hits to the search query. The user can ask for the display of all the hits by selecting a command, such as the "show all" command 1509. FIG. 15A shows a portion of a display controlled by a data processing system. This portion includes a menu bar 1502 which has at its far end a search menu command 1505. The user can select the search menu command by positioning a cursor, using a mouse, for example, over the search menu command 1505 and by pressing a button or by otherwise activating or selecting a command. This causes a display of a text entry region 1507 into which a user can enter text. In the example shown in FIG. 15A, which is a portion of the display, the user has entered the text "shakeit" causing the display of a search result region immediately below a "show all" command region 1509 which is itself immediately below the text entry region 1507. It can be seen that the hits or matches are grouped into categories ("documents" and "PDF documents") shown by categories 1511 and 1513 within the search result region 1503. FIG. 15B shows another example of a search. In this case, a large number of hits was obtained (392 hits), only a few of which are shown in the search result region 1503. Again, the hits are organized by categories 1511 and 1513. Each category may be restricted in terms of the number of items displayed within the search result region 1503 in order to permit the display of multiple categories at the same time within the search result region. For example, the number of hits in the documents category may greatly exceed the available display space within the search result region 1503, but the hits for this category are limited to a predetermined or dynamically determinable number of entries within the search result region 1503 for the category 1511. An additional category, "top hit" is selected based on a scoring or relevancy using techniques which are known in the art. The user may select the "show all" command 1509 causing the display of a window, such as window 1601 shown in FIG. 16A. FIG. 15C shows a display of a graphical user interface of one embodiment of the invention which includes the menu bar 1502 and the search menu command 1505 on the menu bar 1502. FIG. 15D shows another example of the search result region 1503 which appeared after a search of the term "safari" was entered into the text entry region 1507. It can be seen from the search result region 1503 of FIG. 15D that the search results are again grouped into categories. Another search result window 1520 is also shown in the user interface of FIG. 15D. It can be seen that application programs are retrieved as part of the search results, and a user may launch any one of these application programs by selecting it from the search result region, thereby causing the program to be launched.

Figure 16A:
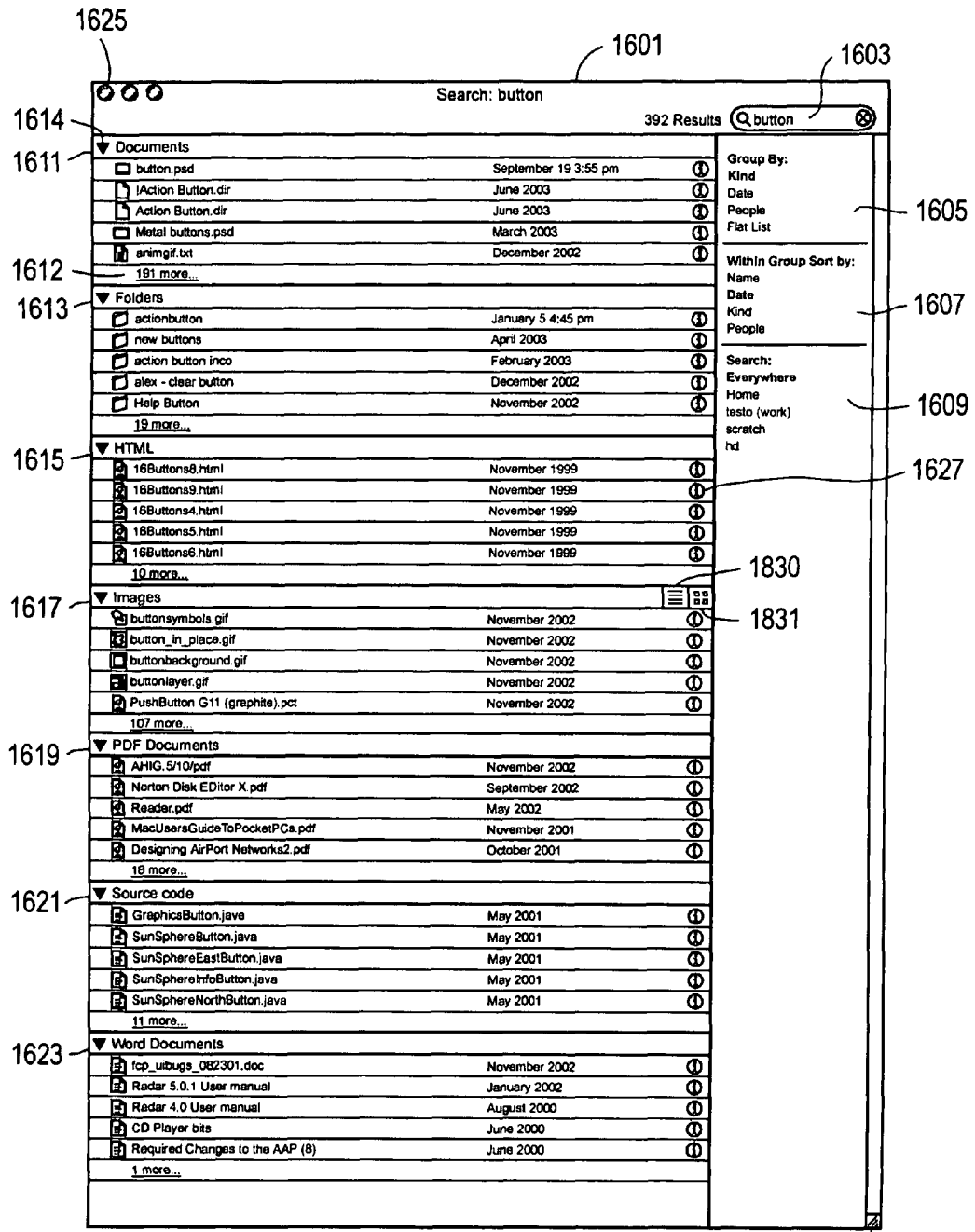
FIGS. 16A and 16B show certain aspects of embodiments of user interfaces according to the present invention.
Figure 16B:
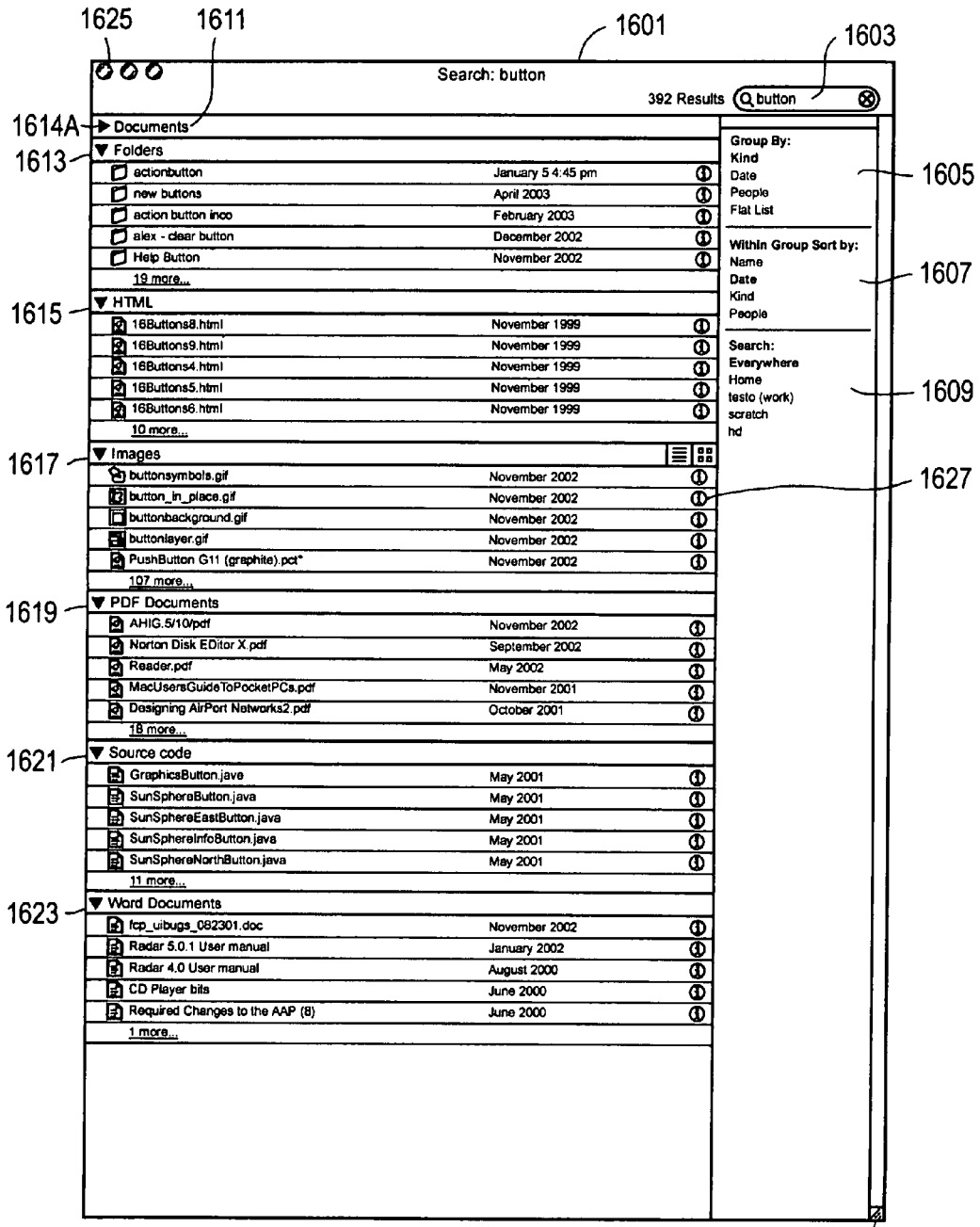
Figure 17:
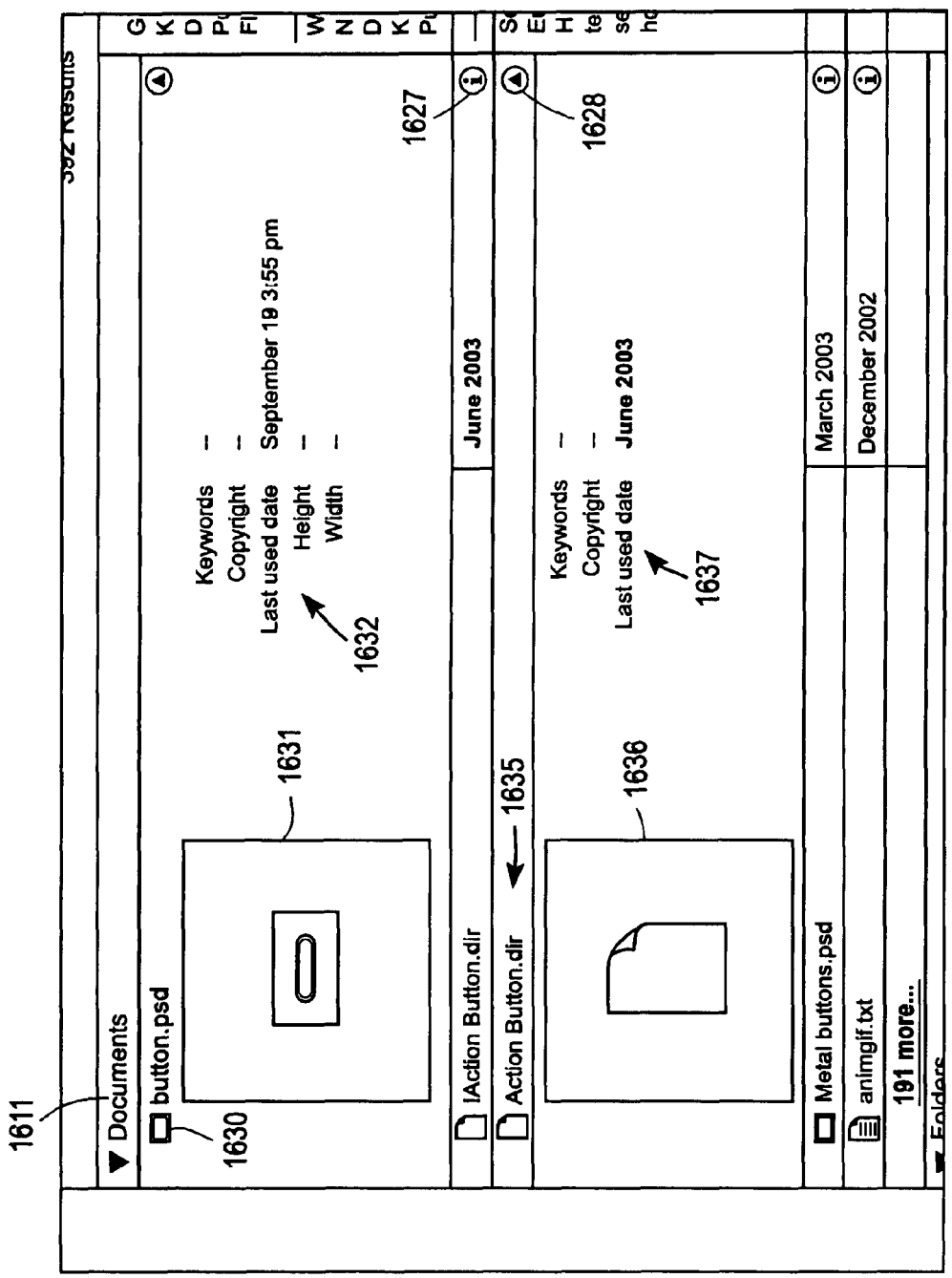
FIG. 17 shows an aspect of certain embodiments of user interfaces according to the present invention.

FIGS. 16A and 16B show examples of search result windows which may be caused to appear by selecting the "show all" command 1509 in FIG. 15A or 15B. Alternatively, these windows may appear as a result of the user having selected a "find" command or a some other command indicating that a search is desired. Moreover, the window 1601 shown in FIGS. 16A and 16B may appear in response to either of the selection of a show all command or the selection of a find command. The window 1601 includes a text entry region 1603, a group by menu selection region 1605, a sort by menu selection region 1607, and a where menu selection region 1609. The group by selection region 1605 allows a user to specify the manner in which the items in the search results are grouped according to. In the example shown in FIG. 16A, the user has selected the "kind" option from the group by menu selection region 1605, causing the search results to be grouped or sorted according to the kind or type of document or file. It can be seen that the type of file includes "html" files, image files, PDF files, source code files, and other types of files as shown in FIG. 16A. Each type or kind of document is separated from the other documents by being grouped within a section and separated by headers from the other sections. Thus, headers 1611, 1613, 1615, 1617, 1619, 1621, and 1623 designate each of the groups and separate one group from the other groups. This allows a user to focus on evaluating the search results according to certain types of documents. Within each group, such as the document groups or the folder groups, the user has specified that the items are to be sorted by date, because the user has selected the date option within the sort by menu region 1607. The user has also specified that all storage locations are to be searched by selecting "everywhere" from the where menu selection region 1609. Each item in the search result list includes an information button 1627 which may be selected to produce the display of additional information which may be available from the system. An example of such additional information is shown in FIG. 17 in which a user has selected the information button 1627 for item 1635, resulting in the display of an image 1636 corresponding to the item as well as additional information 1637. Similarly, the user has selected the information button for another item 1630 to produce the display of an image of the item 1631 as well as additional information 1632. The user may remove this additional information from the display by selecting the close button 1628 which causes the display of the information for item 1635 to revert to the appearance for that item shown in FIG. 16A. The user may collapse an entire group to hide the entries or search results from that group by selecting the collapse button 1614 shown in FIG. 16A, thereby causing the disappearance of the entries in this group as shown in FIG. 16B. The user may cause these items to reappear by selecting the expand button 1614A as shown in FIG. 16B to thereby revert to the display of the items as shown in FIG. 16A.

The search results user interface shown in FIGS. 16A and 16B presents only a limited number of matches or hits within each category. In the particular example of these figures, only the five top (most relevant or most highly sorted) hits are displayed. This can be seen by noticing the entry at the bottom of each list within a group which specifies how many more hits are within that group; these hits can be examined by selecting this indicator, such as indicator 1612, which causes the display of all of the items in the documents category or kind for the search for "button" which was entered into the text entry region 1603. Further examples of this behavior are described below and are shown in conjunction with FIGS. 18A and 18B. It will be appreciated that window 1601 is a closeable and resizable and moveable window and includes a close button and a resizing control 1625A.

Figure 18A:
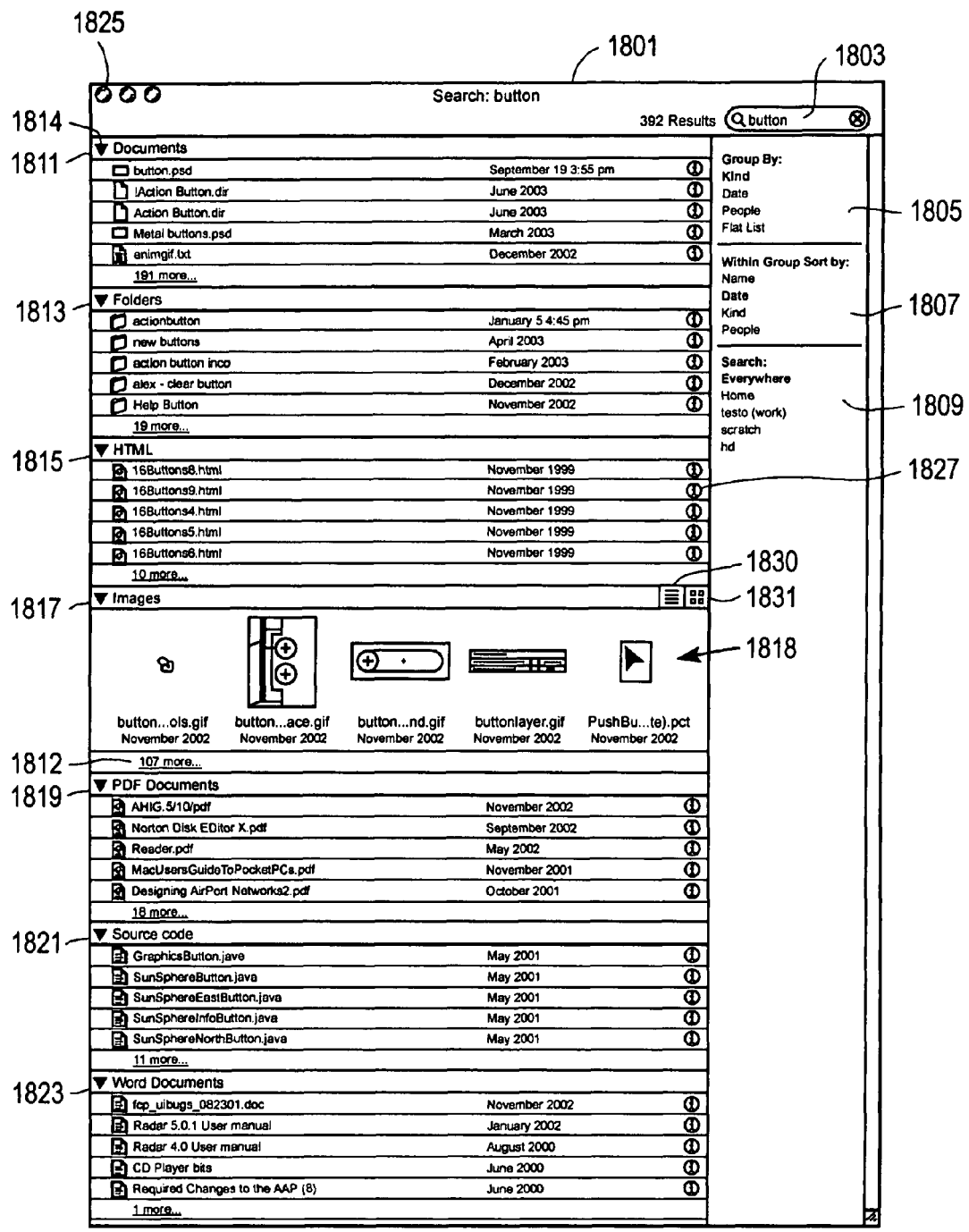
FIGS. 18A and 18B show further aspects of certain embodiments of user interfaces according to the present invention.
Figure 18B:
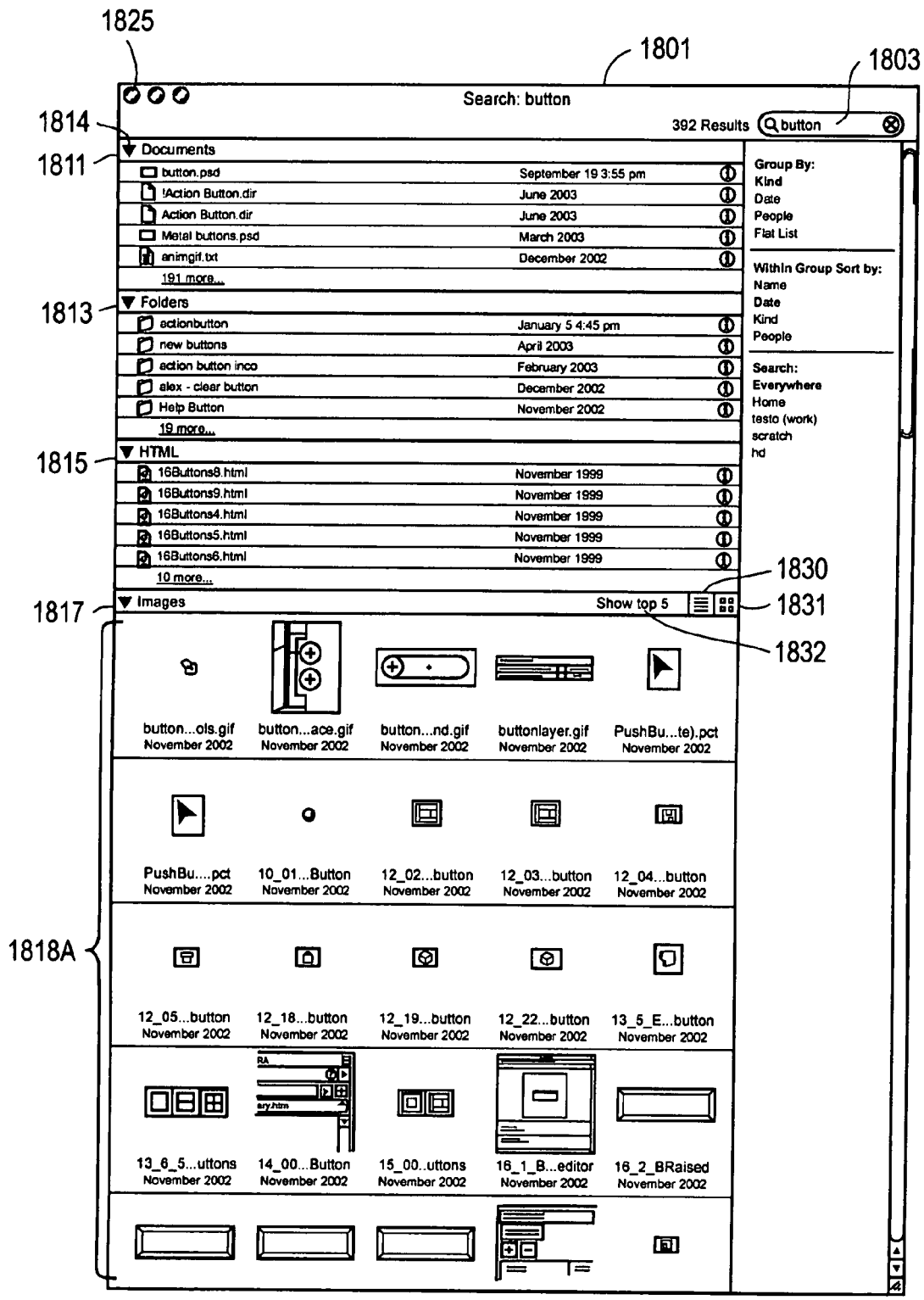

FIGS. 18A and 18B illustrate another window 1801 which is very similar to the window 1601. The window 1801 includes a text entry region 1803, a group by menu selection region 1805, a sort by menu selection region 1807, and a where menu selection region 1809, each of which function in a manner which is similar to the regions 1605, 1607, and 1609 respectively of FIG. 16A. Each item in a list view within the window 1801 includes an information button 1827, allowing a user to obtain additional information beyond that listed for each item shown in the window 1801. The window 1801 further includes headers 1811, 1813, 1815, 1817, 1819, 1821, and 1823 which separate each group of items, grouped by the type or kind of document, and sorted within each group by date, from the other groups. A collapse button 1814 is available for each of the headers. The embodiment shown in FIGS. 18A and 18B shows the ability to switch between several modes of viewing the information. For example, the user may display all of the hits within a particular group by selecting the indicator 1812 shown in FIG. 18A which results in the display of all of the images files within the window 1801 within the region 1818A. The window is scrollable, thereby allowing the user to scroll through all the images. The user can revert back to the listing of only five of the most relevant images by selecting the "show top 5" button 1832 shown in FIG. 18B. Further, the user can select between a list view or an icon view for the images portion shown in FIGS. 18A and 18B. The user may select the list view by selecting the list view button 1830 or may select the icon view by selecting the icon view button 1831. The list view for the images group is shown in FIG. 16A and the icon view for the images group is shown in FIGS. 18A and 18B. It can be seen that within a single, moveable, resizable, closeable search result window, that there are two different views (e.g. a list view and an icon view) which are concurrently shown within the window. For example, the PDF documents under the header 1819 are displayed in a list view while the images under the header 1817 are displayed in an icon view in FIGS. 18A and 18B. It can also be seen from FIGS. 18A and 18B that each image is shown with a preview which may be capable of live resizing as described in a patent application entitled "Live Content Resizing" by inventors Steve Jobs, Steve Lemay, Jessica Kahn, Sarah Wilkin, David Hyatt, Jens Alfke, Wayne Loofbourrow, and Bertrand Serlet, filed on Jun. 25, 2004, and being assigned to the assignee of the present inventions described herein, and which is hereby incorporated herein by reference.

Figure 19A:
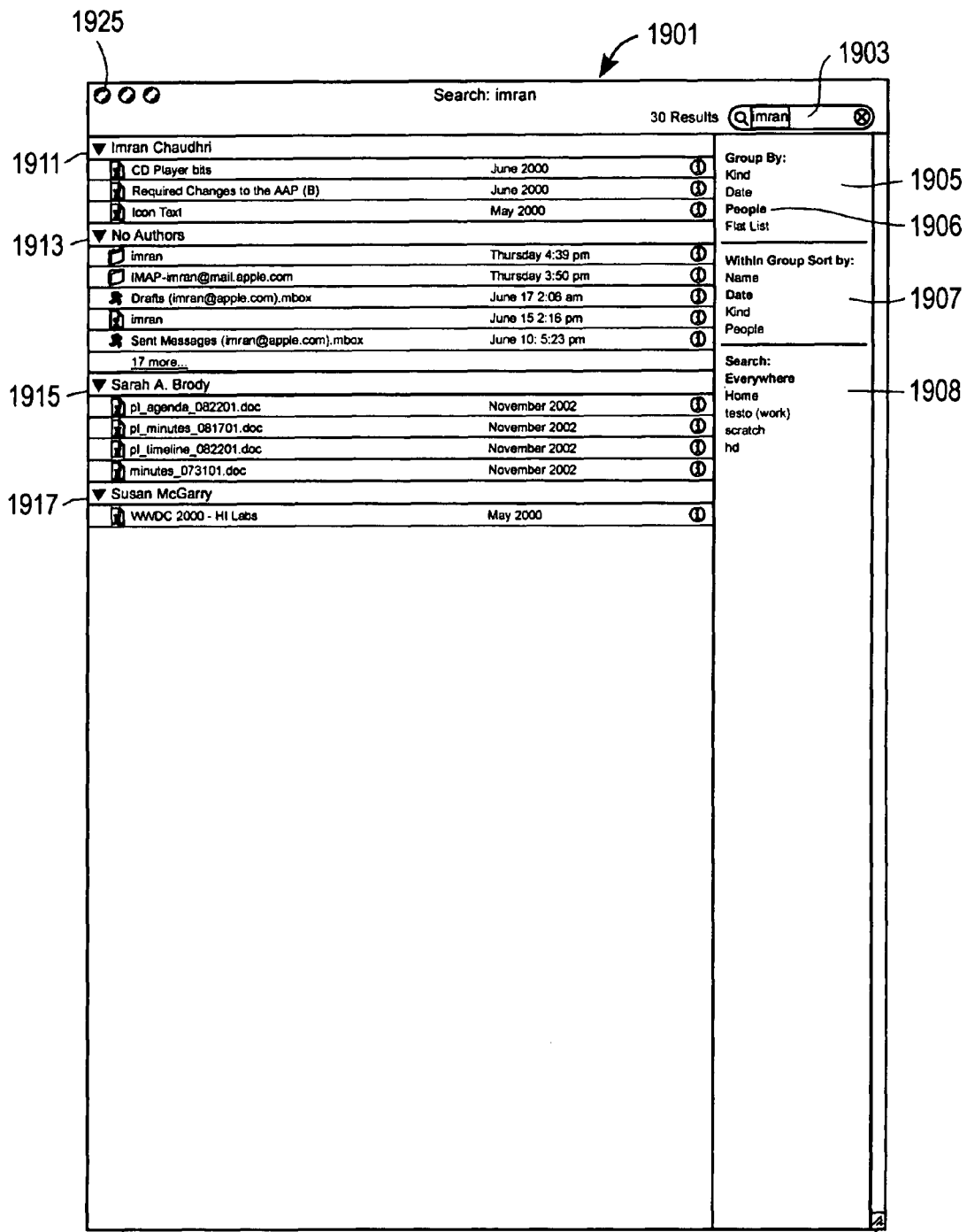
Figure 19B:
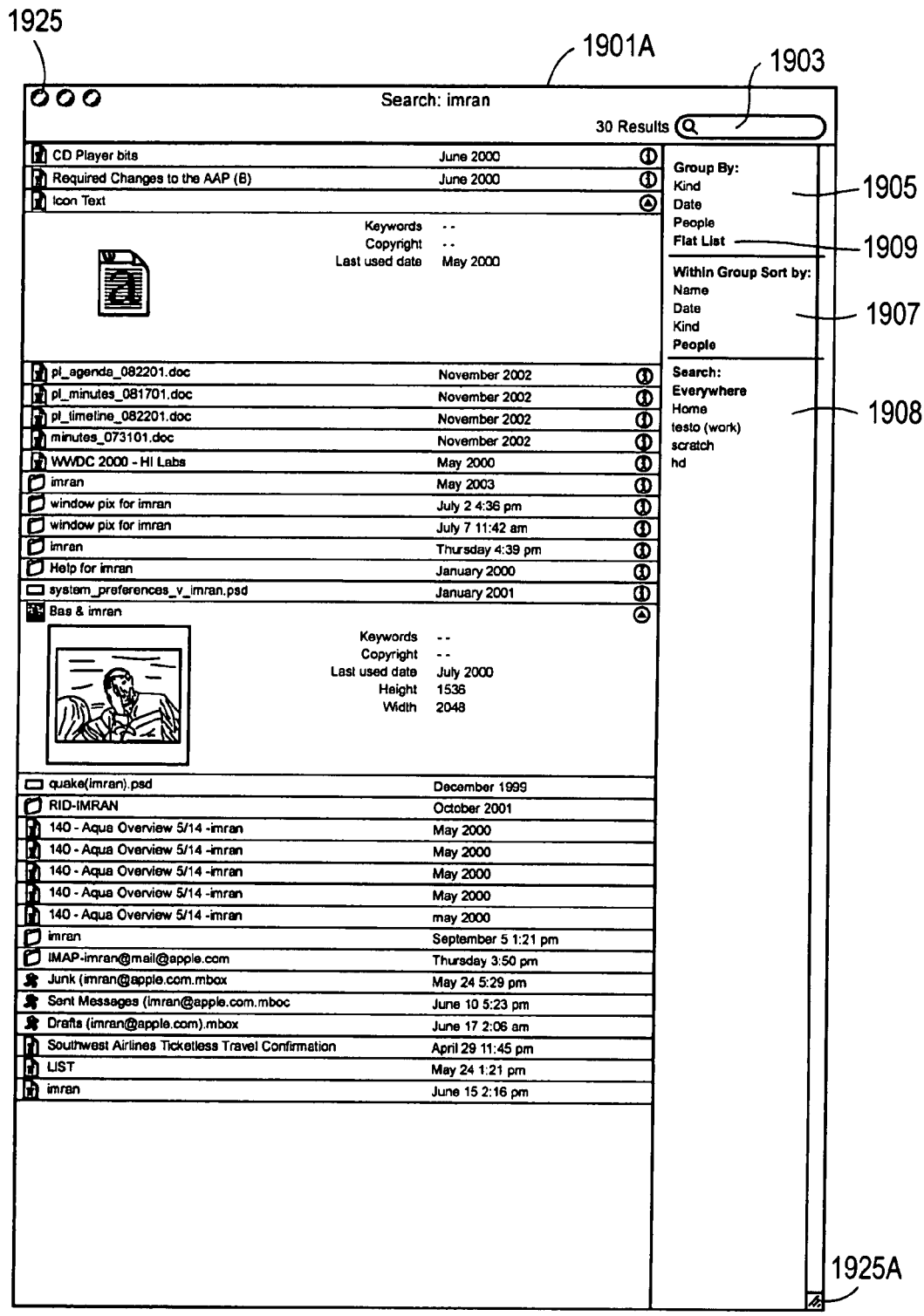

FIG. 19A shows another example of a search result window which is similar to the window 1601. The window 1901 shown in FIG. 19A includes a text entry region 1903 and a group by menu selection region 1905 and a sort by menu selection region 1907 and a where menu selection region 1908. Further, the window includes a close button 1925 and a resizing control 1925A. Text has been entered into the text entry region 1903 to produce the search results shown in the window 1901. The search results again are grouped by a category selected by a user which in this case is the people options 1906. This causes the headers 1911, 1913, 1915, and 1917 to show the separation of the groups according to names of people. Within each group, the user has selected to sort by the date of the particular file or document. The user interface shown in FIG. 19A allows a user to specify an individual's name and to group by people to look for communications between two people, for example. FIG. 19B shows another way in which a user can group a text search ("imran") in a manner which is different from that shown in FIG. 19A. In the case of FIG. 19B, the user has selected a flat list from the group by menu selection region 1905 and has selected "people" from the sort by menu region 1907. The resulting display in window 1901A is without headers and thus it appears as a flat list.

Figure 19C:
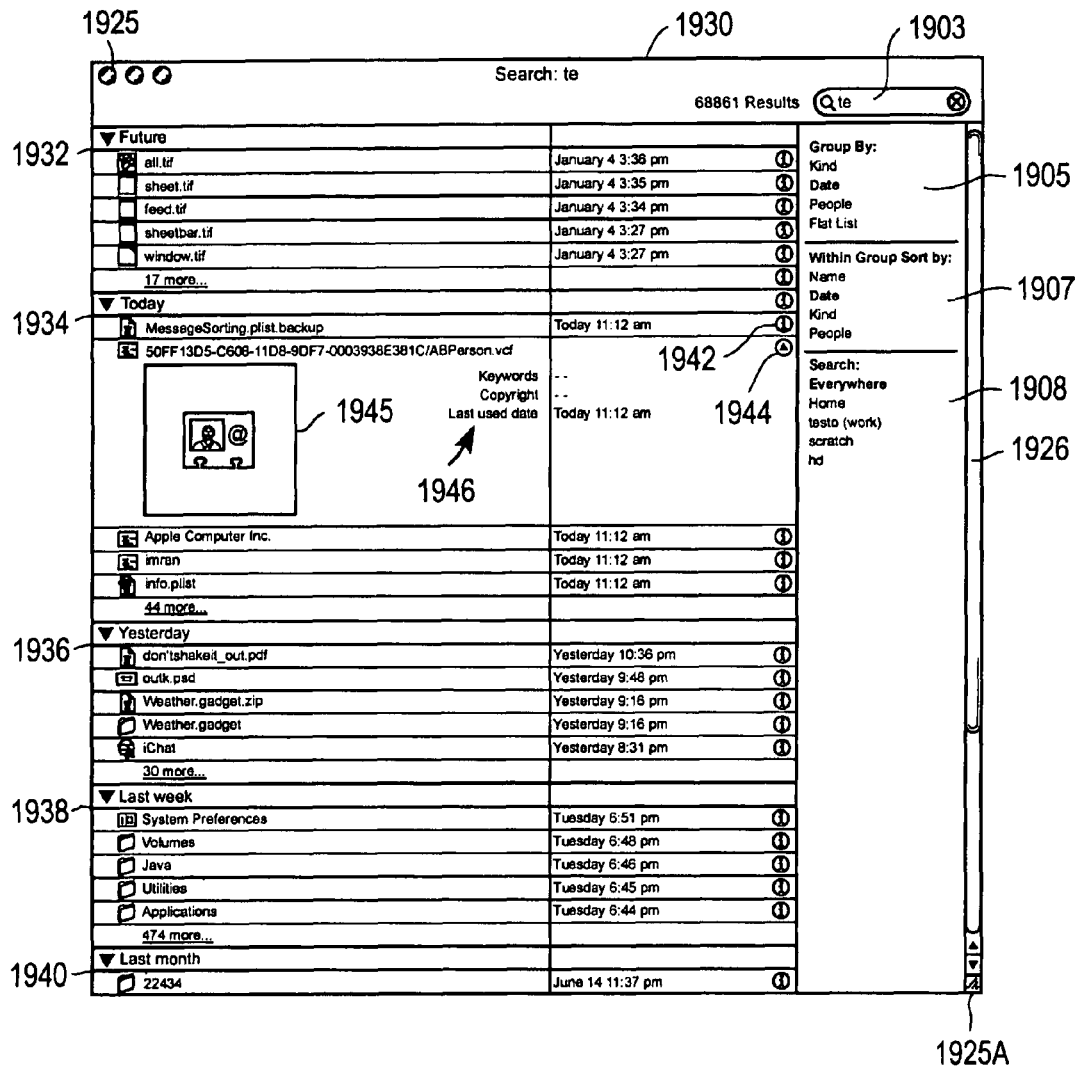

FIG. 19C shows the user interface of another search result window 1930 which includes a text entry region 1903 and the selection regions 1905, 1907, and 1908 along with a scrolling control 1926. The results shown in the window 1930 have been grouped by date and sorted within each group by date. Thus, the headers 1932, 1934, 1936, 1938, and 1940 specify time periods such as when the document was last modified (e.g. last modified today, or yesterday, or last week). Also shown within the search results window 1930 is the information button 1942 which may be selected to reveal further information, such as an icon 1945 and additional information 1946 as shown for one entry under the today group. This additional information may be removed by selecting the contraction button 1944.

Figure 19D:
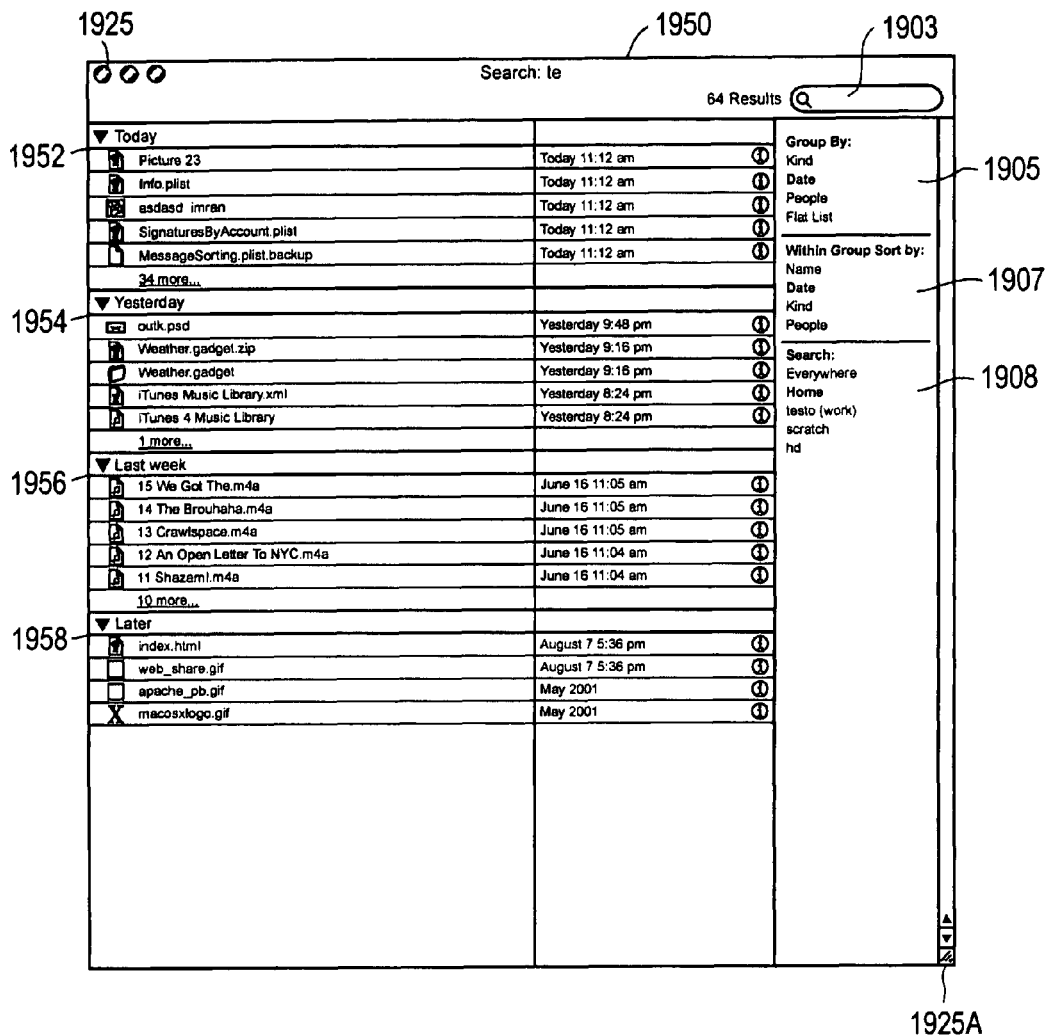

FIG. 19D shows a search result window 1950 in which a search for the text string "te" is grouped by date but the search was limited to a "home" folder as specified in the where menu selection region 1908. Time specific headers 1952, 1954, 1956, and 1958 separate items within one group from the other groups as shown in FIG. 19D.

FIG. 19E shows an alternative embodiment of a search result window. In this embodiment, the window 1970 includes elements which are similar to window 1901 such as the selection regions 1905, 1907, and a scrolling control 1926 as well as a close button 1925 and a resizing control 1925A. The search result window 1970 further includes a "when" menu selection region 1972 which allows the user to specify a search parameter based on time in addition to the text entered into the text entry region 1903. It can be seen from the example shown in FIG. 19E that the user has decided to group the search results by the category and to sort within each group by date. This results in the headers 1973, 1975, 1977, and 1979 as shown in FIG. 19E.

Figure 20:
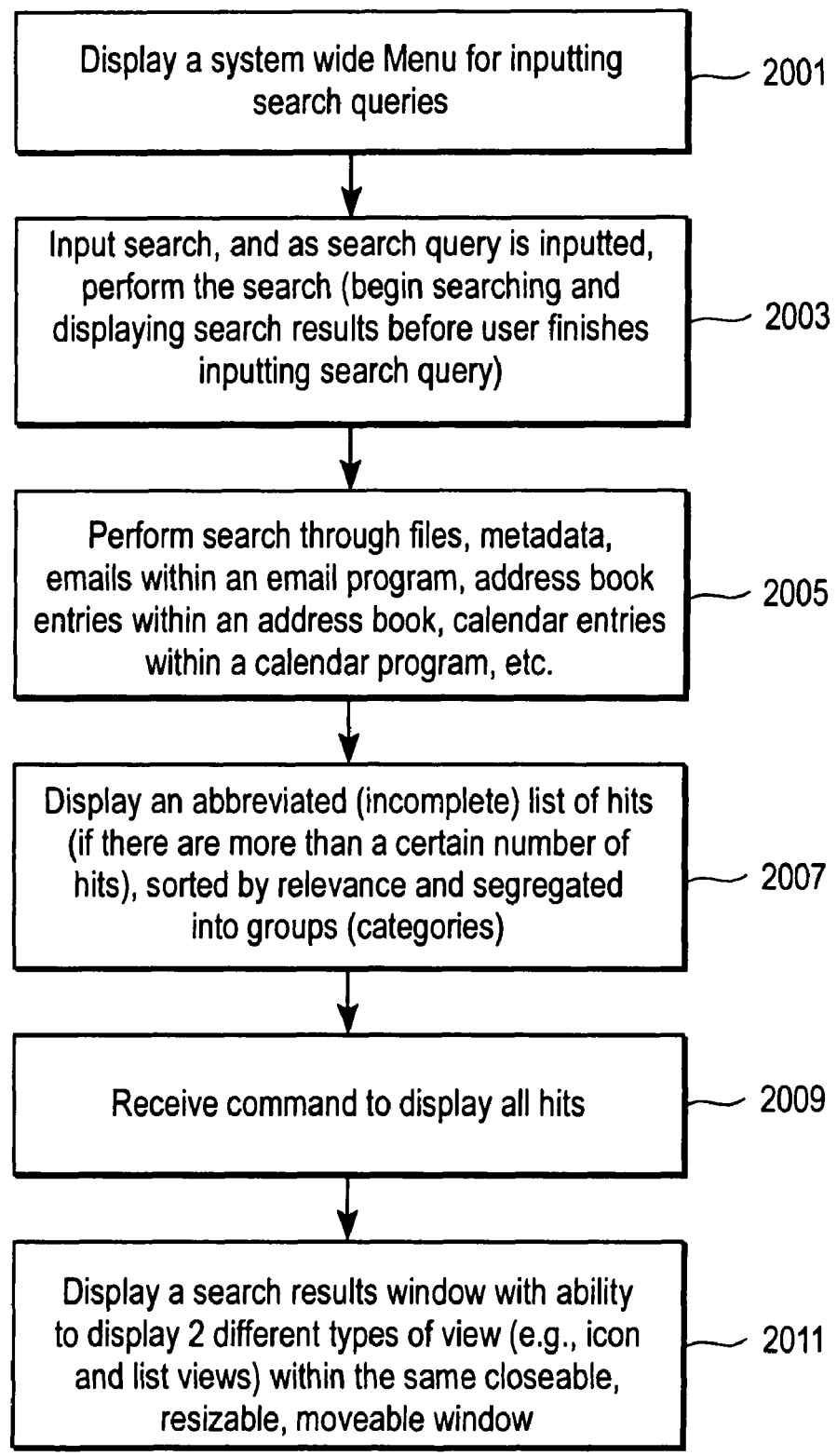
FIG. 20 is a flow chart which illustrates another exemplary method of the present invention.

FIG. 20 shows an exemplary method of operating a system wide menu for inputting search queries, such as the system wide menu available by selecting the search menu command 1505 shown in FIG. 15A or 15B, or 15C. In operation 2001, the system displays a system wide menu for inputting search queries. This may be the search menu command 1505. The user, in operation 2003, inputs a search, and as the search query is being inputted, the system begins performing and begins displaying the search results before the user finishes inputting the search query. This gives immediate feedback and input to the user as the user enters this information. The system is, in operation 2005, performing a search through files, metadata for the files, emails within an email program, address book entries within an address book program, calendar entries within a calendar program, etc. The system then, in operation 2007, displays an abbreviated (e.g. incomplete) list of hits if there are more than a certain number of hits. An example of this abbreviated listing is shown in FIG. 15B. The listing may be sorted by relevance and segregated into groups such as categories or types of documents. Then in operation 2009, the system receives a command from the user to display all the hits and in operation 2011 the system displays the search results window, such as the window 1601 shown in FIG. 16A. This window may have the ability to display two different types of views, such as an icon view and a list view within the same closeable, resizable, and moveable window. It will be appreciated that the searching, which is performed as the user is typing and the displaying of results as the user is typing may include the searching through the metadata files created from metadata extracted from files created by many different types of software programs.

FIGS. 21, and 22A, 22B, 22C, and 22D will now be referred to while describing another aspect of the inventions. This aspect relates to a method of selecting a group of files, such as a group of individual data files. In an exemplary method of this aspect, a data processing system receives a selection of a plurality of items, such as data files, folders (e.g. graphical user interface representations of subdirectories), application programs or a combination of one or more of these items. This selection may be performed by one of the many conventional ways to select a plurality of items such as (a) positioning a cursor at each item individually (e.g. through the movement of a mouse) and indicating a selection individually by, for example, pressing and releasing a button, such as a mouse's button; (b) pointing a cursor at a first item in a list and indicating a selection of the first item and pointing the cursor at a last item in a list of items and indicating a selection of all items from the first item to the last item in the list; (c) drawing a selection rectangle by a dragging operation of the cursor, etc. Thus operation 2101 shown in FIG. 21 receives one or more inputs indicating a selection of a plurality of items. The system in operation 2103 receives a command requesting both the creation of a new storage facility (e.g. a folder) and an association of the plurality of items with the new storage facility. While the operation 2103 is shown following operation 2101, in certain embodiments operation 2103 may precede operation 2101. The association of operation 2103 may be a copy or a move operation. For example, the user may select multiple items and then command the system to move those items from their existing locations to a new folder which is created in one operation as a result of the move and create new folder command. In response to the command received in operation 2103, the system creates a new storage facility, such as a new folder, with a predetermined directory path name or a user specified path name and the system further associates the selected plurality of items with the new storage facility. This association may be either a move or a copy operation. A copy operation would typically involve making a copy of each selected item and storing the item with a path name that reflects the storage of the item within the new folder having a predetermined directory path name or a user specified directory path name. A move operation, in which the items are moved into the new folder, may merely change the path names associated with each of the selected items (rather than making a copy of the items) which changed path names will reflect the new file system location (e.g. within the subdirectory of the new folder) of the selected items.

Figure 21:
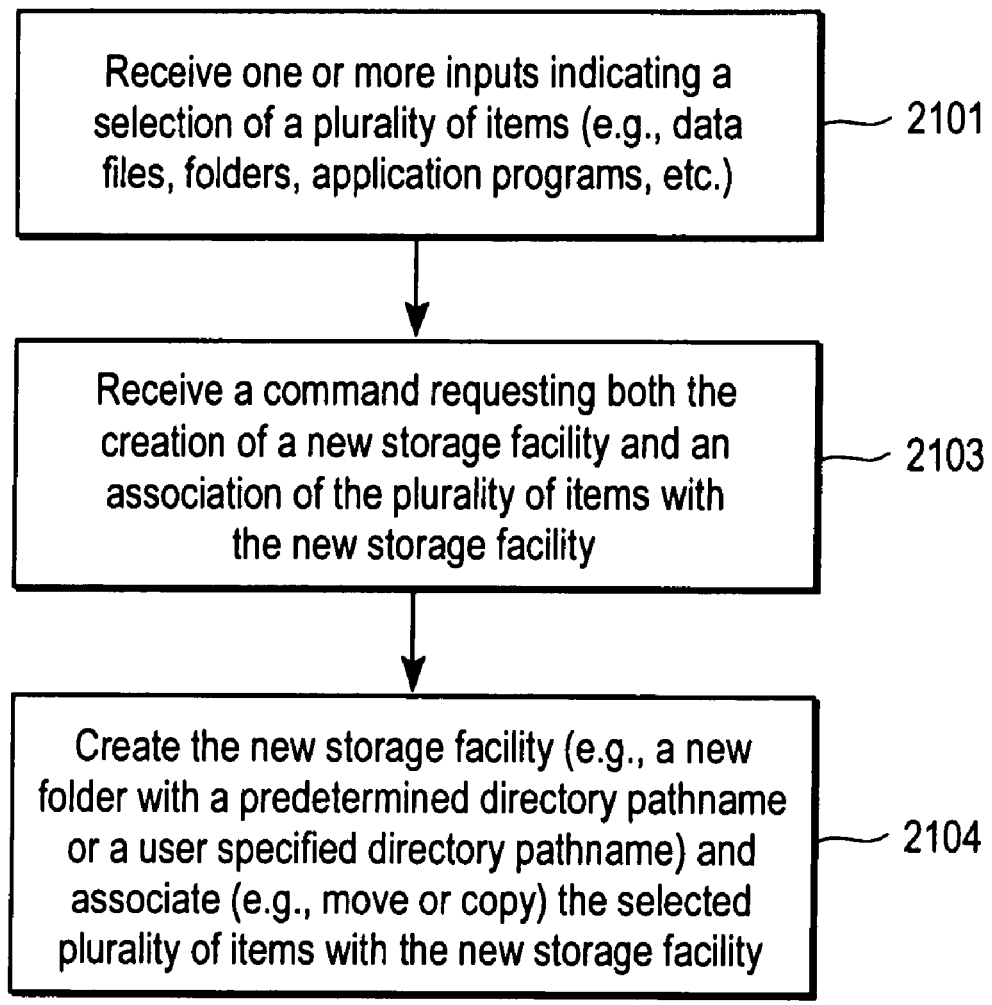
FIG. 21 is a flow chart showing another exemplary method of the present invention.
Figure 22A:
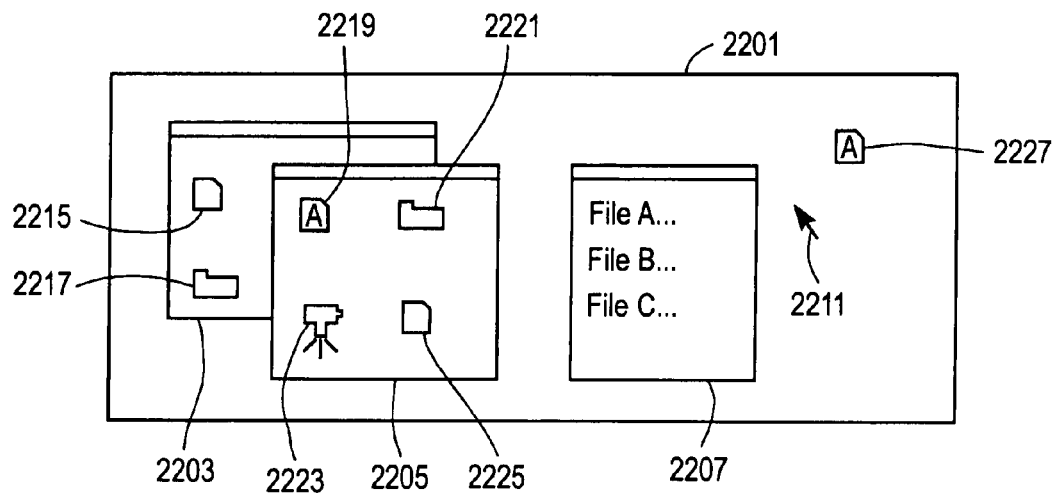
FIGS. 22A, 22B, 22C, and 22D illustrate the display of a display device on which an embodiment of the method of FIG. 21 is performed.
Figure 22B:
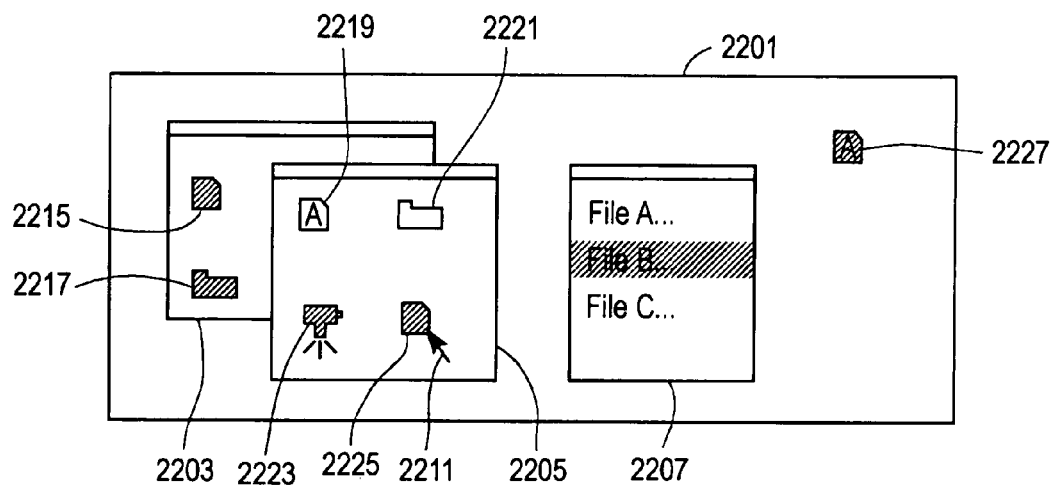
Figure 22C:
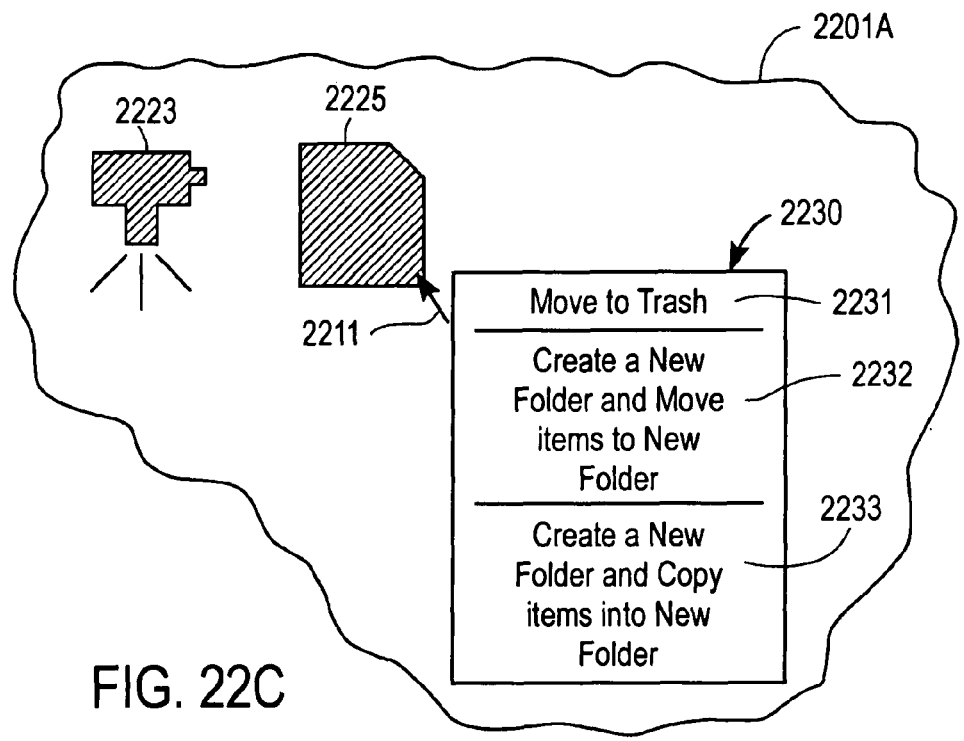
Figure 22D:
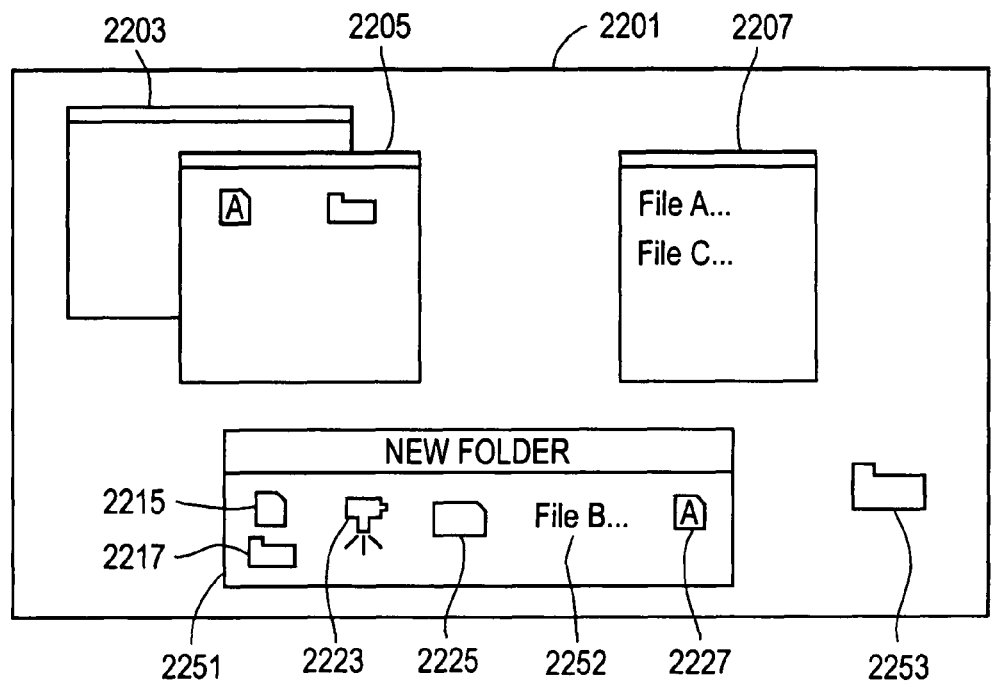

FIGS. 22A-22D show one example of the method of FIG. 21. A desktop 2201 on a display device is shown containing multiple windows and also an icon 2227 on the desktop. A cursor 2211 is also shown on the desktop. The windows 2203, 2205, and 2207 each contain a plurality of items shown as icons. In particular, window 2203 includes a data file represented by icon 2215 in a folder (e.g. a graphical representation of a subdirectory in a file storage system) represented by icon 2217. The window 2205 includes a program icon 2223 and a document icon 2219 and another document icon 2225 and a folder icon 2221. The window 2207 shows a list view of several files including "File B." The user may then, using the cursor 2211 or using other conventional user interface techniques, select multiple items. This may be done with one input or more inputs which indicate the selection of multiple items. FIG. 22B shows the result of the user having selected icons 2215, 2217, 2223, 2225, 2227, and "File B" in window 2207. It can be seen that the cursor 2211 is positioned adjacent to the icon 2225 at this point in the operation. Then the user, after having selected a plurality of items, may invoke the command referred to in operation 2103. An example of this is shown in FIG. 22C which represents a portion of the desktop 2101, which portion is designated 2201A as shown in FIG. 22C. The user has caused a pop up menu 2230 to appear, which pop up menu includes three options 2231, 2232, and 2233. Option 2231 would allow a user to move all the selected items into the trash (e.g. delete them) while options 2232 and 2233 relate to the command referred to in operation 2103 of FIG. 21. In particular, option 2232 is a command which is selectable by the user to create a new folder and, in the same operation, move the items which have been selected into the new folder. Option 2233 is a command which allows the user to, in one operation, create a new folder and copy the selected items into the new folder. In the example shown in FIGS. 22A-22D, the user will select option 2232, thereby causing the system to create a new storage facility, such as a new folder with a predetermined directory name (e.g. "new folder") or alternatively, a user specified path name. This result is shown in FIG. 22D in which the desktop 2201 now includes a new window labeled "new folder" which represents and shows the contents of this new folder, which is also shown as the folder 2253 which is a graphical user interface representation of this new folder.

It will be appreciated that this method may employ various alternatives. For example, a window may appear after the command option 2232 or 2233 has been selected, and this window asks for a name for the new folder. This window may display a default name (e.g. "new folder") in case the user does not enter a new name. Alternatively, the system may merely give the new folder or new storage facility a default path name. Also, the system may merely create the new folder and move or copy the items into the new folder without showing the new window as shown in FIG. 22D.

Modern computer operating systems allow different users of the same computer system. These operating systems also allow for the different users to establish ways to protect the privacy of their files such that a first user cannot view contents or modify contents of a second user's files and vice versa if the first and second user take the appropriate steps to limit access. For example, if the first user limits access to the first user's files such that other users cannot read or write to those files or execute the files, then access will be limited to the first user for the first user's files. So, if the second user limits access to the second user's files by setting permissions or other access control features for those files (or one or more files), then read or read and write access or other permutations of access privileges or permissions to the second user's files may be limited. According to certain aspects of the inventions described herein, methods and systems for protecting metadata for user's files are provided to preserve the privacy of the metadata of the files in addition to the files themselves. A permission information for each file may also be stored within the metadata for each file (or the indexed content of the file) such that when a search is done and search results are displayed, metadata and files may be protected by access permissions set by each user or by the system. For example, if the search produces a match for a file and its corresponding metadata but the user who owns that file has controlled the access to the file such that only that user can view the file, then a search by another user which matches both the file and the metadata will not reveal the file or the metadata when the search is done by the other user. It will be appreciated that, at least in certain embodiments, the permissions for the metadata of a file may be inherited or otherwise obtained from the permissions for the file itself.

Figure 23:
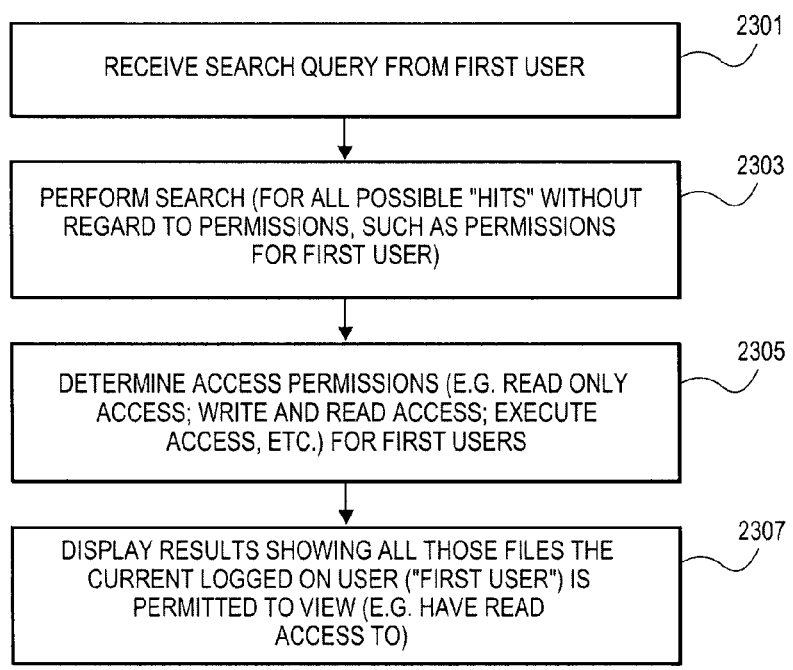
FIG. 23 is a flow chart which illustrates an exemplary method according to certain aspects of the inventions.

FIG. 23 shows one exemplary method in which the privacy of files and the metadata for those files may be protected according to certain aspects of the inventions described herein. In operation 2301, the system receives a search query from the first user and performs, in operation 2303, a search for all possible matches or hits without regard to permissions, such as permissions for the first user. Then in operation 2305, the data processing system determines access permissions for each file for that first user. Access permissions may include a read only access permission or a read and write access permission or an execute access permission in the case of an executable file. Other types of permissions and access statuses and various combinations and permutations of these statuses may be employed. Typically, the access permissions are defined on a file by file basis and also apply to the metadata for each corresponding file. Also, the permissions can be defined for a group of files, such as files within a directory. A file for which a permission may be defined may include a user data file, such as a portable document file (PDF) or a word processing file or a spreadsheet file or a drawings file or files which are not executable files, and it may include a directory or a link to a remote file or web site or web page which is stored at a remotely located data processing system. The access permissions which are determined in operation 2305 are used to filter the matches or hits produced in operation 2303. The filtering of the hits or matches results in showing only those files for which the user making the query (in this case the first user) is permitted to view. This user is normally the currently logged in user. This method preserves the privacy of files owned by other users and also the privacy of the metadata about those files by not displaying the content of those other files and by not displaying the metadata for those other files for which the user does not have access to view or read. It will be appreciated that, in certain embodiments, operations 2303 and 2305 may be performed concurrently by structuring a search query which takes into account the access permissions and (through a BOOLEAN AND operator) the search query itself provided by the first user. It will also be appreciated that the filtering may use a permissions cache to filter the files based on access permissions.

Figure 24:
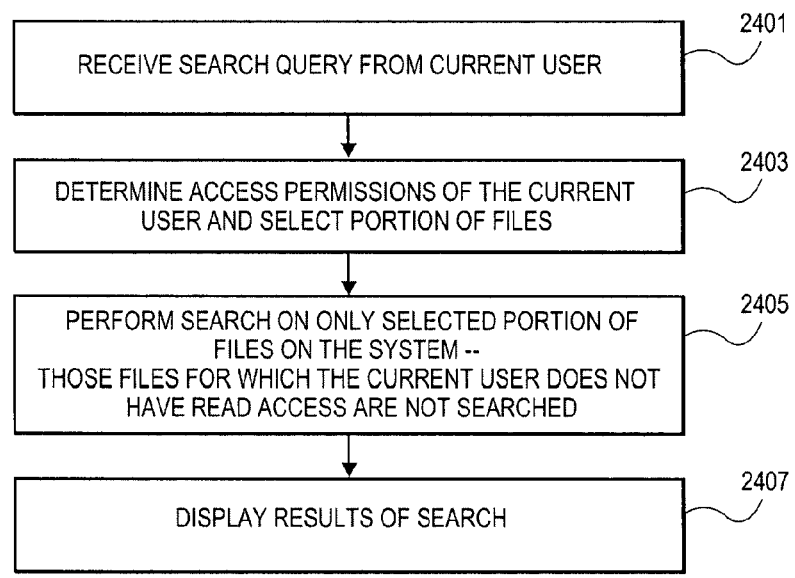
FIG. 24 is a flow chart which illustrates another exemplary method according to certain aspects of the inventions described herein.

FIG. 24 shows an alternative method in which the access permissions are determined first in order to select a group of files which are then searched using the search query. In operation 2401, the data processing system receives a search query from the current user, and then determines in operation 2403 the access permissions of the current user for each file which in turn determines a selected group or portion of the files on the data processing system. This selected group or portion of files represents those files for which the current user has at least read access permission. All other files on the system cannot be viewed by the current user. Then operation 2405 is performed in which the search is performed on only those selected files. Those files for which the current user does not have read access are not searched since they were selected out of the group in operation 2403. The results for this search will then displayed in operation 2407. The method of FIG. 24 may be advantageous in certain situations, among other reasons, in which users are required to store their files in only certain directories in a directory structure. Files which are stored outside of those directories are not accessible to users which own those directories. For example, if a first user is required to store files only in the first user's directories, and if files stored in other directories are not accessible to the first user, then the method of FIG. 24 can efficiently determine the group of files to which the first user has access and then perform a search on only those files by searching within only the directories which the first user has access to. The method of FIG. 24 may, as with the method of FIG. 23, protect the privacy of the metadata of a file in addition to the file itself. For example, if a first user enters a search query which matches a file and metadata for the file of a second user who has restricted access to that file such that the file can only be used by and viewed by the second user, the method of FIG. 24 will prevent the first user from seeing those files of the second user and also the metadata about those files.

Figure 25:
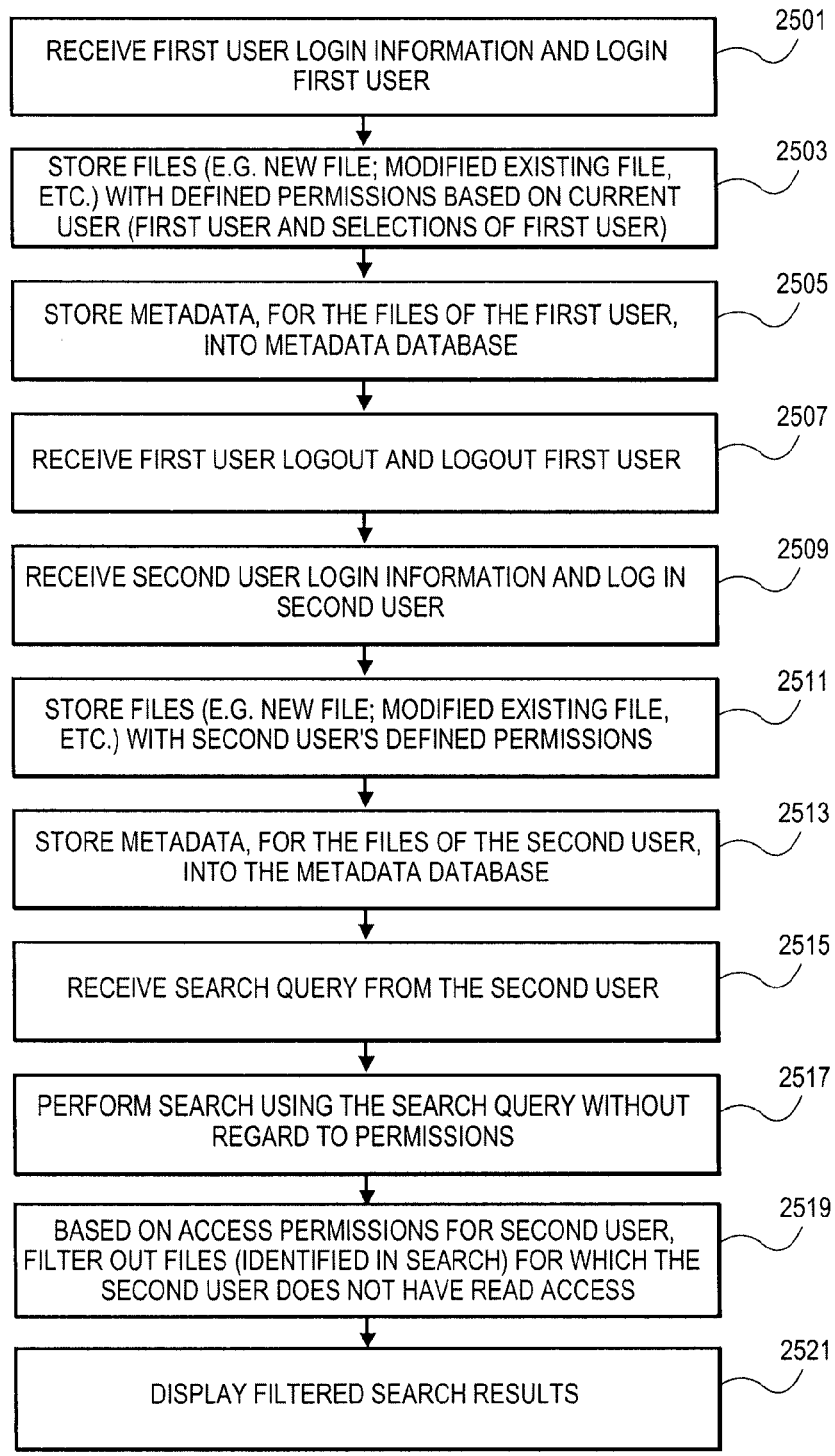
FIG. 25 is a flow chart which illustrates a further more specific exemplary method according to certain aspects of the inventions.

FIG. 25 shows another exemplary method which shows how the files and the metadata of the files of the first user may be protected and kept private relative to a second user, even when the search queries of the second user match information in the metadata from files of the first user. In operation 2501, the data processing system optionally receives a first user's log in information and logs in the first user. A log in process may occur automatically (e.g. a default process was established to assume a certain user always uses the data processing system) or it may occur as a result of an application or operating system program requesting a user to specify at least a user name and optionally a password. Operation 2503 represents a typical use by the first user who may be storing files, such as a new file or modifying an existing file which is stored. In each case a file is stored with define permissions based on the current user and selections of the user. For example, the first user may specify that a certain file is to remain private such that read access or write access is only given to the first user and to no other user. Metadata for the files stored in operation 2503 is also stored in operation 2505. This metadata may be stored by importing or exporting metadata from the files stored in operation 2503 into a metadata database. When the first user is done, the first user typically logs out in operation 2507, thereby allowing the second user to log-in in operation 2509. It will be appreciated that in certain operating systems, it is possible for the two users to be concurrently logged in, although that is not the circumstance of FIG. 25. After the second user has logged in, the second user stores files with the second user's defined permissions. These new files or modified files are stored with permissions that indicate whether other users may have access to these files. In operation 2513, metadata for the files of the second user are also stored in the metadata database. Optionally, each metadata file or entry for a corresponding user file may include the defined permissions for that particular file. In operation 2515, a search query from a second user is received and a data processing system performs in operation 2517, a search using the search query without regard to permissions. In other words, the search is performed without limiting the search based upon access permissions, such as only those files which may be viewed by the second user. In operation 2519, files for which the second user does not have read access are filtered out based on the access permissions for the second user. In other words, files that were found in the search in operation 2517 are filtered out based on the access permissions resulting in only those files which match the search criteria and which the second user does have read access to. Results of this search are displayed in operation 2521. A method of FIG. 25 protects the privacy of both the files and the metadata for the files based on the access permissions of the current user who entered the search query.

The method of FIG. 25 may be performed with a metadata base wherein the metadata is obtained from files of different types. In this situation, the type of information in metadata for a first type of file will differ from a type of information in metadata for a second type of file. Optionally, the permission and information for each file may be stored within the corresponding metadata file for that file.

Figure 26:
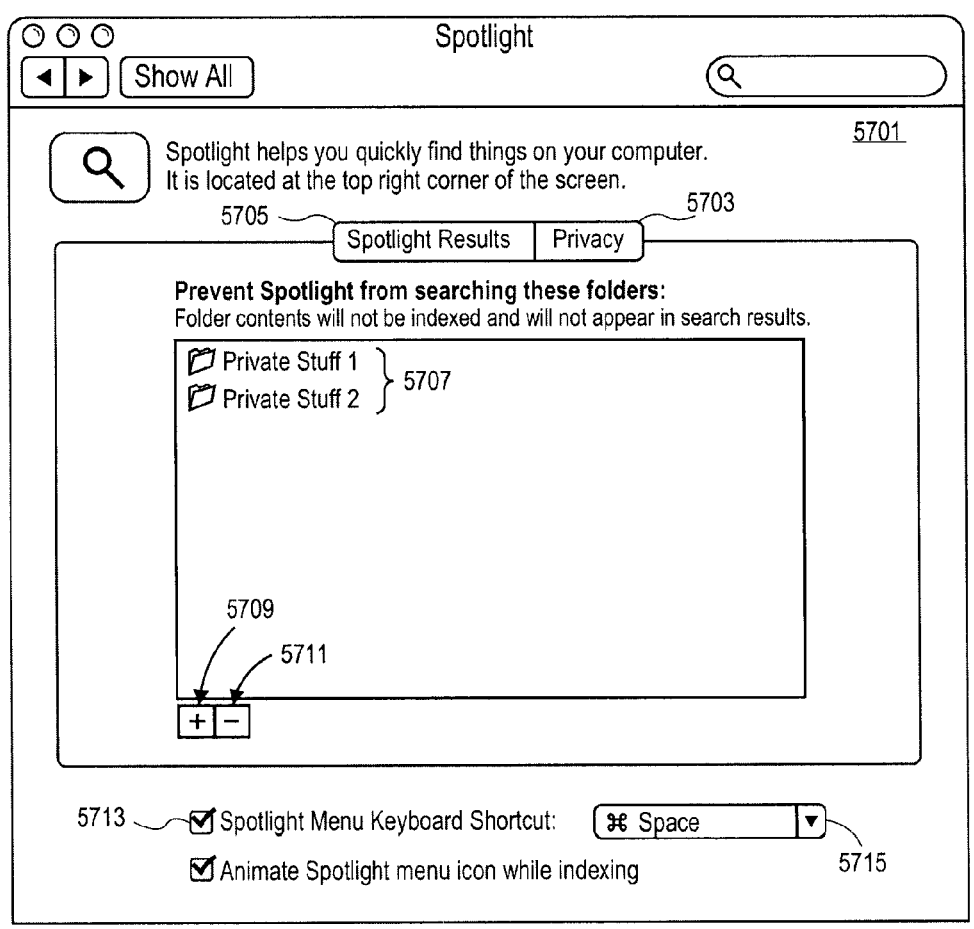
FIGS. 26 and 27 provide an example of user interfaces which allow a user to set preferences with respect to how information is kept private and how information is displayed in response to searches.
Figure 27:
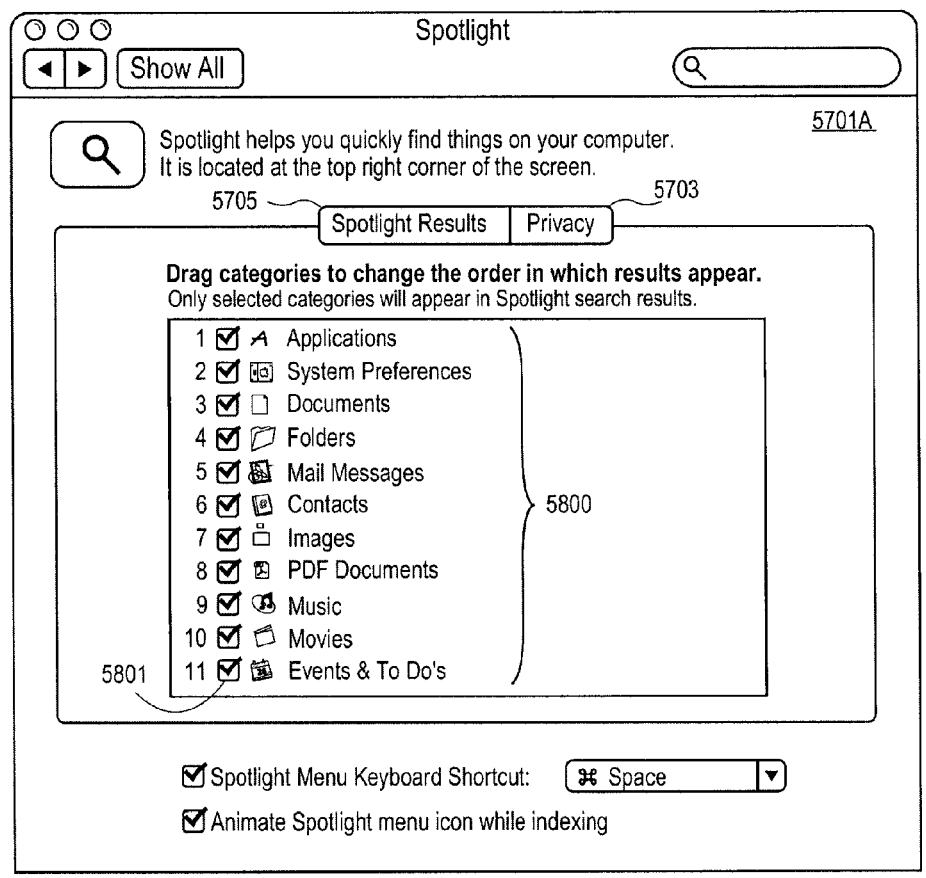

In certain embodiments it may desirable to provide the user with the ability to set preferences for these searching functions provided by the various embodiments described herein. FIGS. 26 and 27 provided an example of user interfaces which allow a user to set such preferences. Window 5701 shown in FIG. 26 includes a privacy button 5703 and a results button 5705. These two buttons switch between windows 5701 (which is selected when the privacy button 5703 is activated) and window 5701a (which is selected and displayed when the results button 5705 has been activated). The window 5701 also includes a list 5705 which displays folders and files which can be added to the list by using the add button 5709 or which can be removed from the list by using the remove button 5711. Adding a folder to the list 5707, in certain embodiments, will prevent files contained within those folders from being indexed and thus they will not appear in the search results. In certain embodiments, the metadata from these files will also not be included in any metadata databases so that searches through metadata will not retrieve these files. A folder may be removed from the list 5707 by selecting the folder and then selecting the remove button 5711. A folder may be added to the list 5707 by activating the add button 5709 which then causes a file open window to be displayed, from which the user can select a folder or file to be added to the list 5707. The window 5701 also includes a check box 5713 which allows the user to activate and specify a particular keyboard shortcut. The particular shortcut which is selected may be selected from the pull down menu 5715. In an alternative embodiment, adding a folder to the list 5707 does not prevent the contents of the folder from being indexed or searched, but the contents are not displayed in the search results. In other words, the contents of folders in the list 5707 are still indexed and still searched, but they are not displayed in the search results (and thus they are hidden); in a further alternative embodiment, they can be caused to be displayed by the entry of a password or code by the user.

The window 5701a in FIG. 27 is displayed in response to activating the results button 5705. This window includes a list 5800, which is a list of the various categories which appear in the search result windows. The check boxes, such as check box 5801, may be checked by a user to indicate that the particular category may appear in search results. If a check box is not selected (e.g. there is no check in the box), then the category will not appear in the search results window (however, for reasons relating to efficiency of indexing, the items within such category will still be indexed, and searched through, even though they do not appear in the search results). The order of the categories may be changed by dragging the categories within the list 5800.

A permissions cache may be used, in certain embodiments, to determine permissions information for files as part of the process of generating a response to a user's search query. For example, a permissions cache may be used to filter files, based on the permissions of the files, after having retrieved a set of files which match a search query. The use of a permissions cache will often allow a system to process a search query and validate permissions faster than another system which does not use a permissions cache. When a permissions cache is not used, the search software which manages and searches a metadata database and/or a content index database must request another, separate software component, such as the file system software which manages a file system database (which includes the information about file directory structures and permissions information for files in the file system), for the permissions information for files which match the search query. These requests between software components can increase the time required to process search queries. The permissions cache will also often contain the needed permissions information because a user will often search for the same types of documents. Furthermore, once a permissions cache has been created over a period of time, it will contain the permissions information for many of the files that a user is interested in and this information will remain valid because many users do not intentionally change the permissions of their files.

A permissions cache may contain, for each file having had its permissions cached, at least in certain embodiments, a file identifier and conventional permissions information for the associated file. The file identifier may be a persistent, unique file identification number, and the conventional permissions information may include read, write and execute permissions for an owner (or other user) of the file as well as read, write and execute permissions for a group ("group permissions") and also possibly permissions for other users. Normally, the permissions information is stored on a nonvolatile storage, such as a hard drive or other permanent, mass storage device. The permissions cache may be managed by the search and database software component which maintains and searches the metadata database (e.g. metadata database 415) and/or the index database (e.g. index database 421). The permissions cache may be used to filter or otherwise process search queries or search results. As described further herein, the permissions cache may be deleted in its entirety even if it is only partially invalid or may be deleted, and corrected, only in its portions which are invalid. Notifications from the file system software or operating system kernel may be used to indicate whether portions of the permissions cache are invalid because a permission of a file or directory has changed. These notifications are normally made from the file system software or operating system kernel to the software components which manage and search the metadata database and the index database. These notifications normally identify the file (e.g. by specifying the file's persistent, unique identifier) and indicate that the permissions have changed. These notifications may further include the new permissions information in certain embodiments. These notifications may also be the same notifications which, as described herein, indicate that a file has been modified and hence metadata for that file may need to be re-imported into the metadata database (and/or the content of the file needs to be re-indexed and incorporated into the index database); examples of these notifications are described in connection with FIG. 5.

Figure 28A:
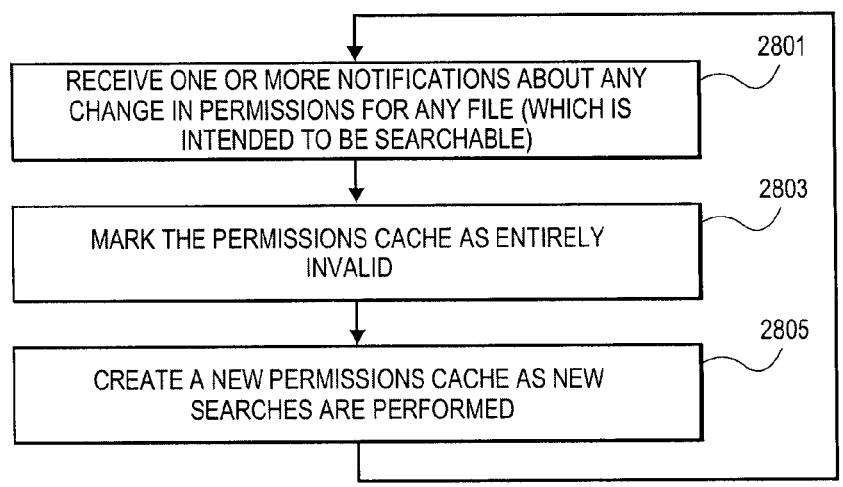
FIG. 28A is a flowchart which illustrates another exemplary method according to certain embodiments of the inventions in which a permissions cache is used.

FIG. 28A shows an embodiment in which notifications are used to invalidate an entire permissions cache (even if a permission was changed for only one file). This approach is a conservative approach, but for the many users who rarely, if ever, change a permission of a file, then the permissions cache will rarely, if ever, need to be entirely invalidated. In operation 2801 of FIG. 28A, one or more notifications about any change in permissions for any file (which is intended to be searchable) is received by a component, such as a software component which manages the permissions cache. This software component may be the software component(s) which manage and search the metadata database and the index database. In operation 2803, the entire permissions cache is marked as invalid in response to receiving the one or more notifications, and a new permissions cache is created over time as new searches are performed. Operation 2805 represents this creation of the new permissions cache. The method returns to operation 2801 when any new notifications are received which would require that the entire new permissions cache be invalidated, and the process would repeat.

Figure 28B:
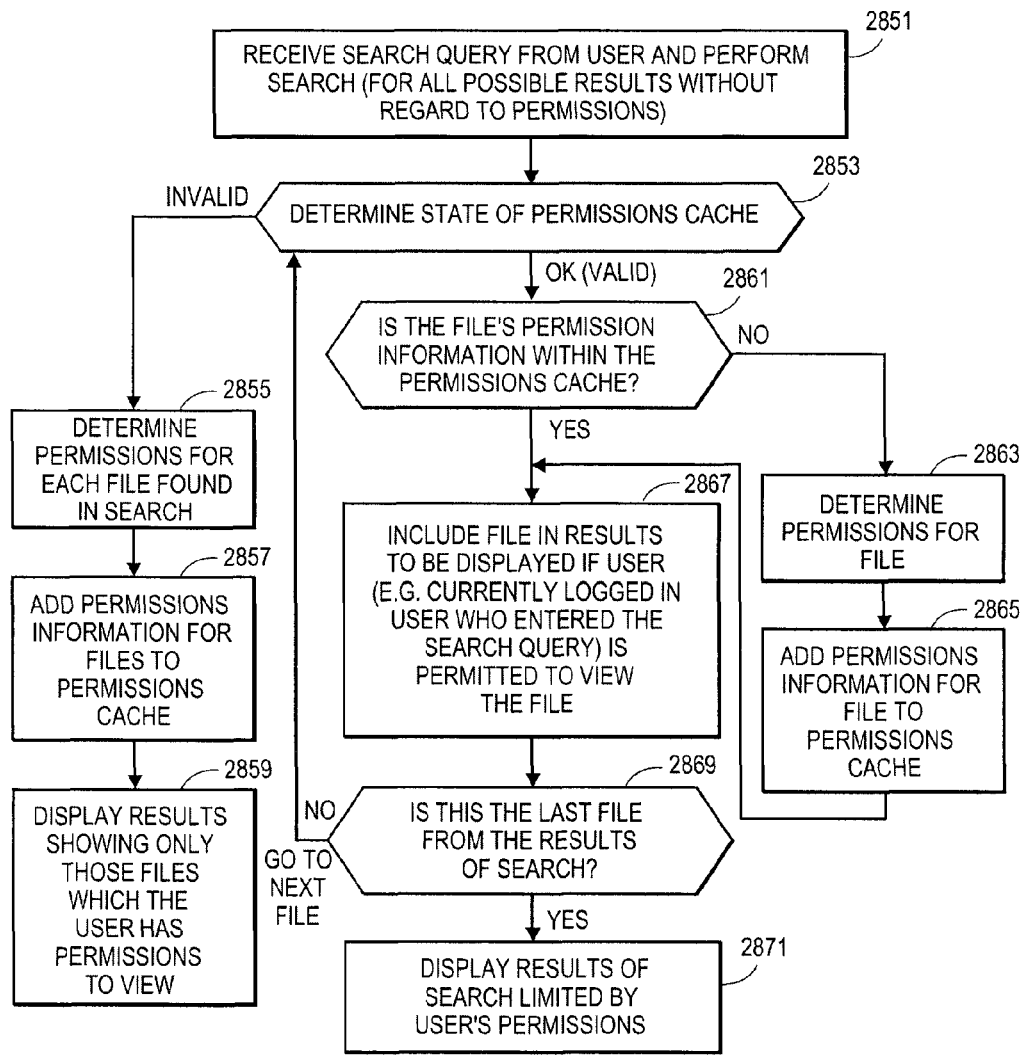
FIG. 28B is a flowchart which illustrates another exemplary method which includes the use of a permissions cache.

FIG. 28B shows an example of an embodiment which uses a permissions cache to validate permissions as part of a search process. In this example, it is assumed that the entire permissions cache is invalidated (e.g. as in the method of FIG. 28A), and it is also assumed that the search criteria is used to perform the search through, for example, a metadata database and/or an index database, without regard to permissions and then the permissions for files found in the search are validated in the rest of the process. It will be understood that the validation of permissions of files and the searching for files matching the search query could be performed concurrently; in other words, as files which match the search query are found, their permissions can be validated while the search, using the search query, continues to look for other files that match the search query. In operation 2851 of FIG. 28B, the search query is received and a search is performed. This search is normally done for all possible results (e.g. files which match the search query) without regard to permissions for the files. Then in operation 2853, the state of the permissions cache is determined. The state depends upon the notifications which indicate whether any permissions have changed; these notifications are shown, for example, in FIG. 28A. The component, such as a software component, which manages the permissions cache receives the notifications and marks the entire permissions cache as invalid upon receiving the notification. If the permissions cache has been marked as invalid, then it is entirely deleted and a new permissions cache is created (and marked as valid) as new searches are performed, such as in operations 2855, 2857, and 2859. In these operations, the permissions for each file found in the current search being processed are determined and added to the new permissions cache and the results of the search are displayed or otherwise presented, showing only those files which the user has permission to view.

In operation 2853, the system determines that the permissions cache is valid if no notifications (as in FIG. 28A) have been received since the existing permissions cache was first created. If the existing permissions cache is valid, then processing proceeds to operation 2861 in which it is determined whether the file's permissions information is within the permissions cache. If the permissions information for the current file being processed is within the permissions cache, then processing proceeds to operation 2867. If the permissions information is not within the permissions cache, then operations 2863 and 2865 follow operation 2861, and in operations 2863 and 2865 the permissions for the file are determined (e.g. the software component managing the permissions cache sends a request to the file system software which searches its file system database to obtain the permissions information and then passes this information back to the software component) and are added to the permissions cache for this file. In operation 2867, the permissions information for the file are examined, using the permissions cache, and it is determined, in operation 2867, whether the user will be given access to the file (which may be metadata for a file or the file itself or both) based on the permissions information and who the user is. In operation 2869, it is determined whether there are further files, retrieved by the search query, which require validation of permissions; if there are such files, then processing returns to operation 2853 and continues as described above. If there are no further files, then the results of the search, after filtering for permissions, are displayed. It will be appreciated that the results may be displayed as each file has its permissions validated (e.g. after operation 2867) rather than after determining that all searched and found files have had their permissions validated.

Figure 29A:
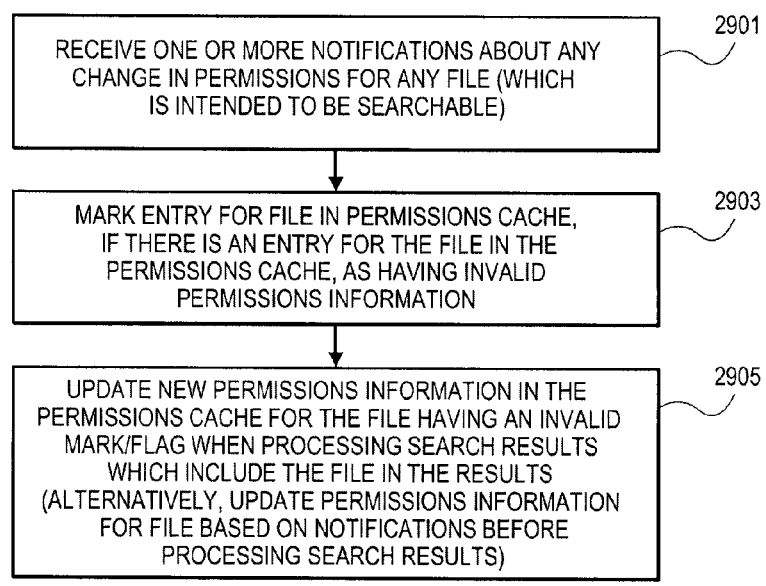
FIGS. 29A and 29B are flowcharts which illustrate other exemplary methods which include the use of a permissions cache.

FIG. 29A shows an embodiment in which notifications are used to invalidate only an invalid portion of the permissions cache rather than the entire permissions cache. This approach may be appropriate where it is anticipated that a user will often change permissions of one or more files. In operation 2901, one or more notifications about any change in permissions for any file (which is intended to be searchable) is received by a component, such as a software component, which manages the permissions cache. This software component may be the software component(s) which manage and search the metadata database and the index database. In operation 2903, those portions of the permissions cache which are identified in the notifications from operation 2901 are marked as invalid. Typically, if there is an entry in the permissions cache for the file identified in the notification, then the entry is marked as invalid. In operation 2905, the permissions information, for a file marked as invalid in the permissions cache, is updated when processing search results which include the file in the results; this is described further below. In certain alternative embodiments, the permissions information for the file marked as invalid may be updated at the time of the notification rather than when, at a later time, a future search result includes the file. For example, the permissions information in the permissions cache for the file may be updated upon receiving the notification if the notification includes the necessary changes or the entire permissions information for the file.

Figure 29B:
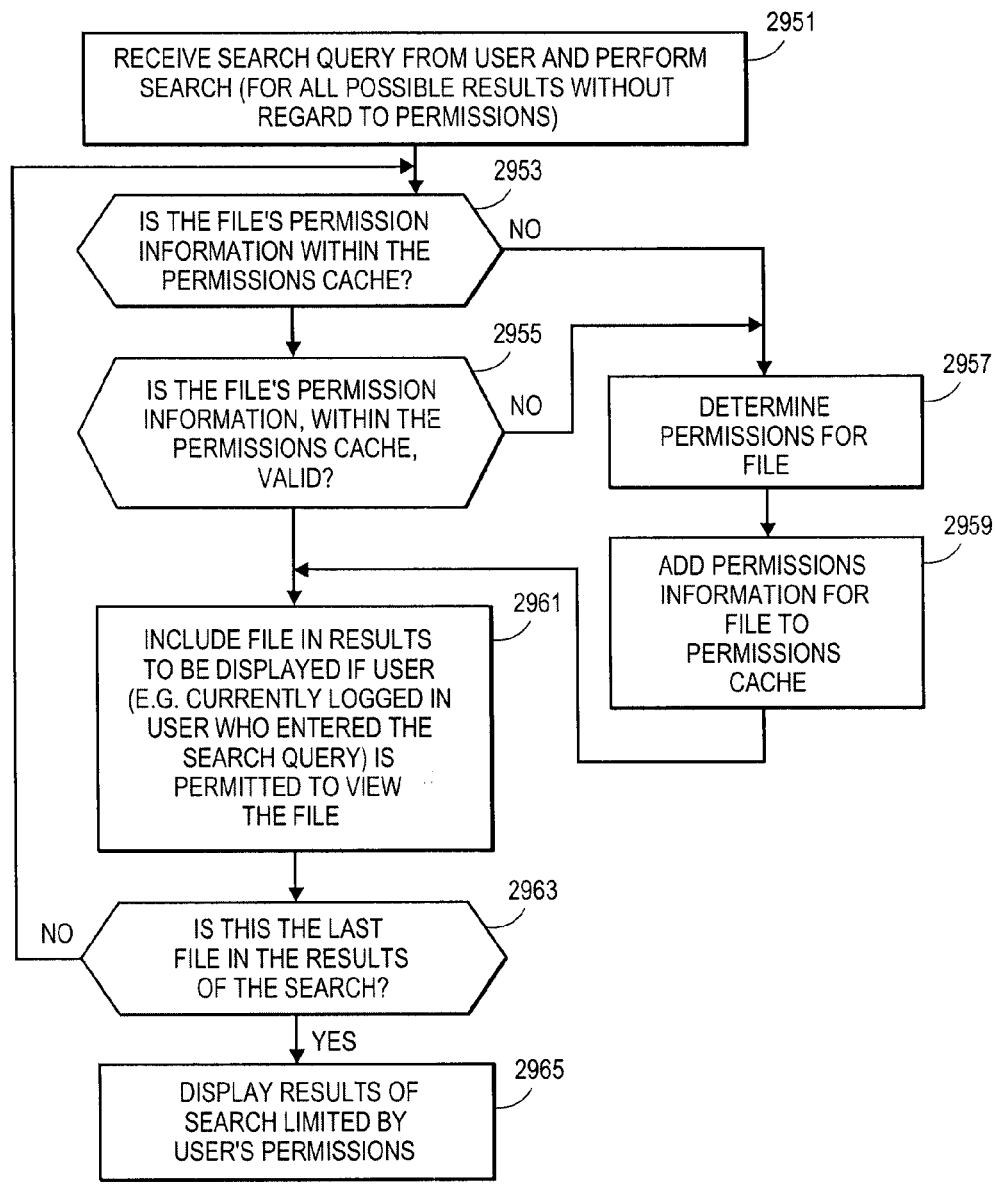

FIG. 29B shows an example of another embodiment which uses a permissions cache to validate permissions as part of a search process. In this example, it is assumed that only an invalid portion of a permissions cache is invalidated upon receiving a notification, such as in the example shown in FIG. 29A. It will be understood that the validation of permissions of files and the searching for files matching the search query could be performed concurrently; in other words, as files, which match the search query, are found, their permissions can be validated while the search, using the search query, continues to look for other files that match the search query. In operation 2951, the search query is received and a search is performed. This search is normally done for all possible results (e.g. files which match the search query) without regard to permissions for the files. In operation 2953, it is determined whether, for the current file being processed, its permissions information is stored within the permissions cache. If it is so stored, then processing proceeds to operation 2955, in which it is determined whether the permissions information, in the permissions cache, for the file is valid. If it is valid, then processing proceeds to operation 2961. If in operation 2953, it is determined that there is no permissions information for the file then processing proceeds to operation 2957. If operation 2955 determines that the permissions information, in the permissions cache, is invalid, then processing proceeds to operation 2957. In operation 2957, the permissions information for the file are determined (e.g. the software component managing the permissions cache sends a request to the file system software which searches its file system database to obtain the permissions information and then passes this information back to the software component) and are added to the entry for the file in the permissions cache in operation 2959. Operation 2961 follows either operations 2959 or 2955, and it examines the permissions information, using the permissions cache, and determines, for the current user, whether the user will be given access to the file (which may be metadata for a file or the file itself or both) based on the permissions information and who the user is. In operation 2963, it is determined whether there are further files, retrieved by the search query, which require validation of permissions; if there are such files, then processing returns to operation 2953 and continues as described above. If there are no further files, then the results of the search, after filtering for permissions, are displayed. It will be appreciated that the results may be displayed as each file has its permissions validated (e.g. after operation 2961) rather than after determining that all searched and found files have had their permissions validated.

In certain alternative embodiments, the software managing permissions filtering for the search engine(s) may create multiple permissions caches, such as one permissions cache for each user account. These caches are processed in a similar manner described herein and are used for their corresponding user.

In certain embodiments it is beneficial to partition an index containing data or metadata according to certain criteria. One exemplary implementation of such a partitioning is to partition the indexed data according to the location of files or other parameters related to exclusivity of access to files.

Figure 30:
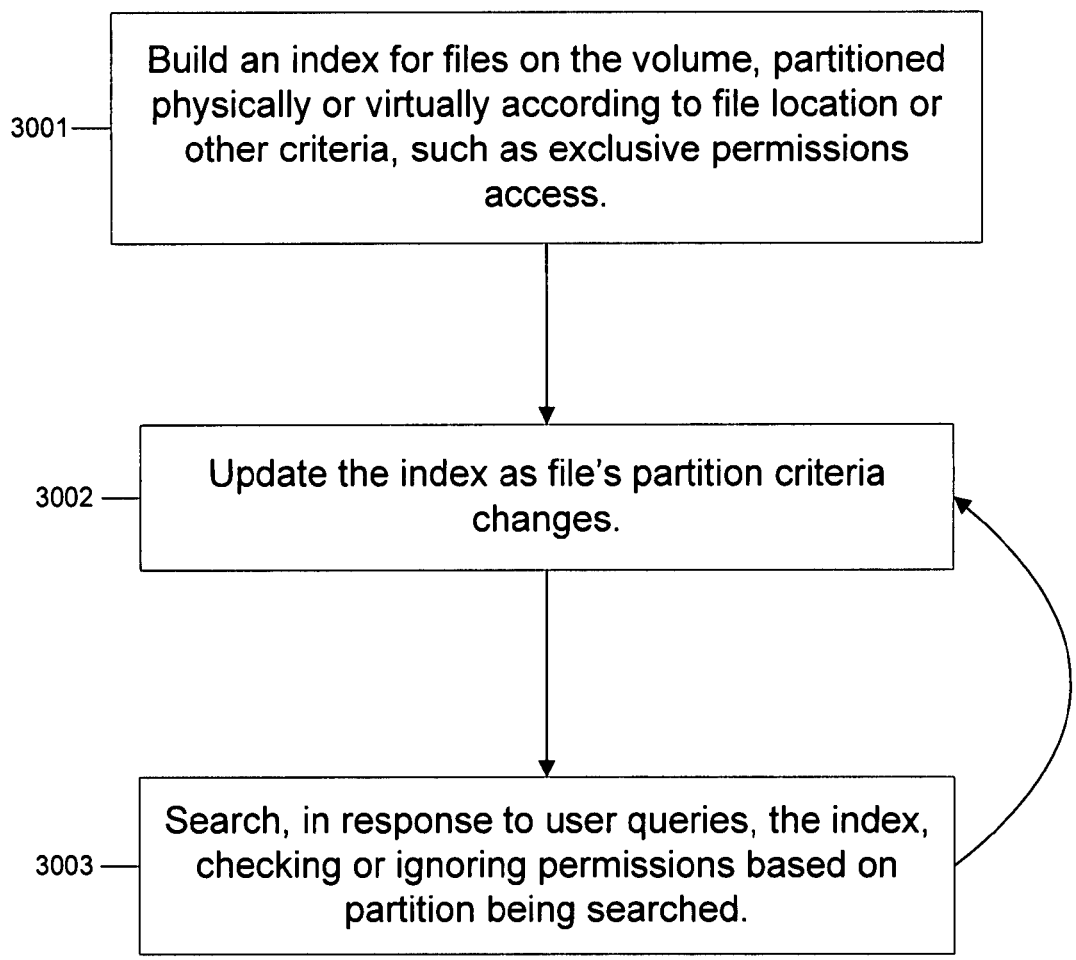
FIG. 30 shows a general example of one exemplary method of one aspect of the invention.

FIG. 30 shows an example of an embodiment in which an index is created and maintained in order to improve searching performance by reducing the frequency with which permission checks need be performed. In certain embodiments, operation 3001 places data associated with files located in a certain user's home folder into one partition, while data associated with files located in a public or shared folder might be placed into a different partition. In certain embodiments, assumptions about a certain user's permissions to access certain files might be aligned with the partition. For example, assumptions that improve the performance of searching a certain user's home folder, as seen in operation 3003, allow for ignoring of permissions when retrieving results from one index or partition of an index while checking permissions when retrieving results from another index or partition. Certain exemplary embodiments would receive notification from an operating system when files changed with respect to their indexed criteria. In certain embodiments, as in operation 3002, the index would be updated to reflect the file's new standing in relation to the index, so that the privacy of the file is protected without sacrificing a performance improvement from the indexing.

Figure 31:
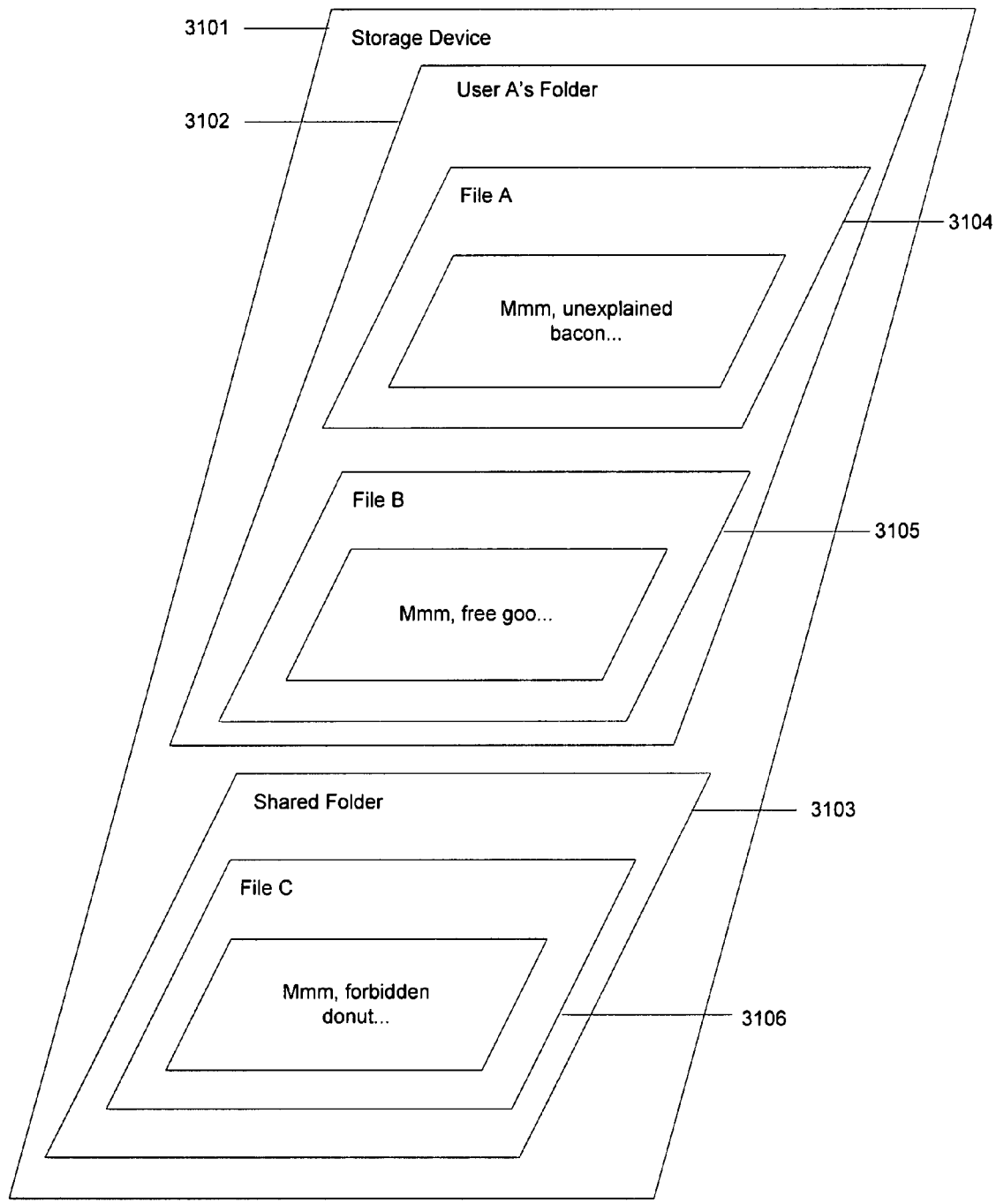
FIG. 31 shows a general example of file structure on a storage device corresponding to an embodiment of the invention.

In certain exemplary implementations, the underlying organization of files on a storage device may provide structure for a searchable index, as is seen in FIG. 31. Storage device 3101 contains folders 3102 and 3103, where folder 3102 contains files 3104 and 3106 belonging to user A and shared folder 3103 contains file 3106. In certain exemplary embodiments, this structure is used to form an assumption that files 3104 and 3105, being located in user A's home folder, need not be permission checked if it is A searching them, while file 3106, being outside user A's home folder, should be permission checked before allowing user A to view data associated with the file.

Figure 32:
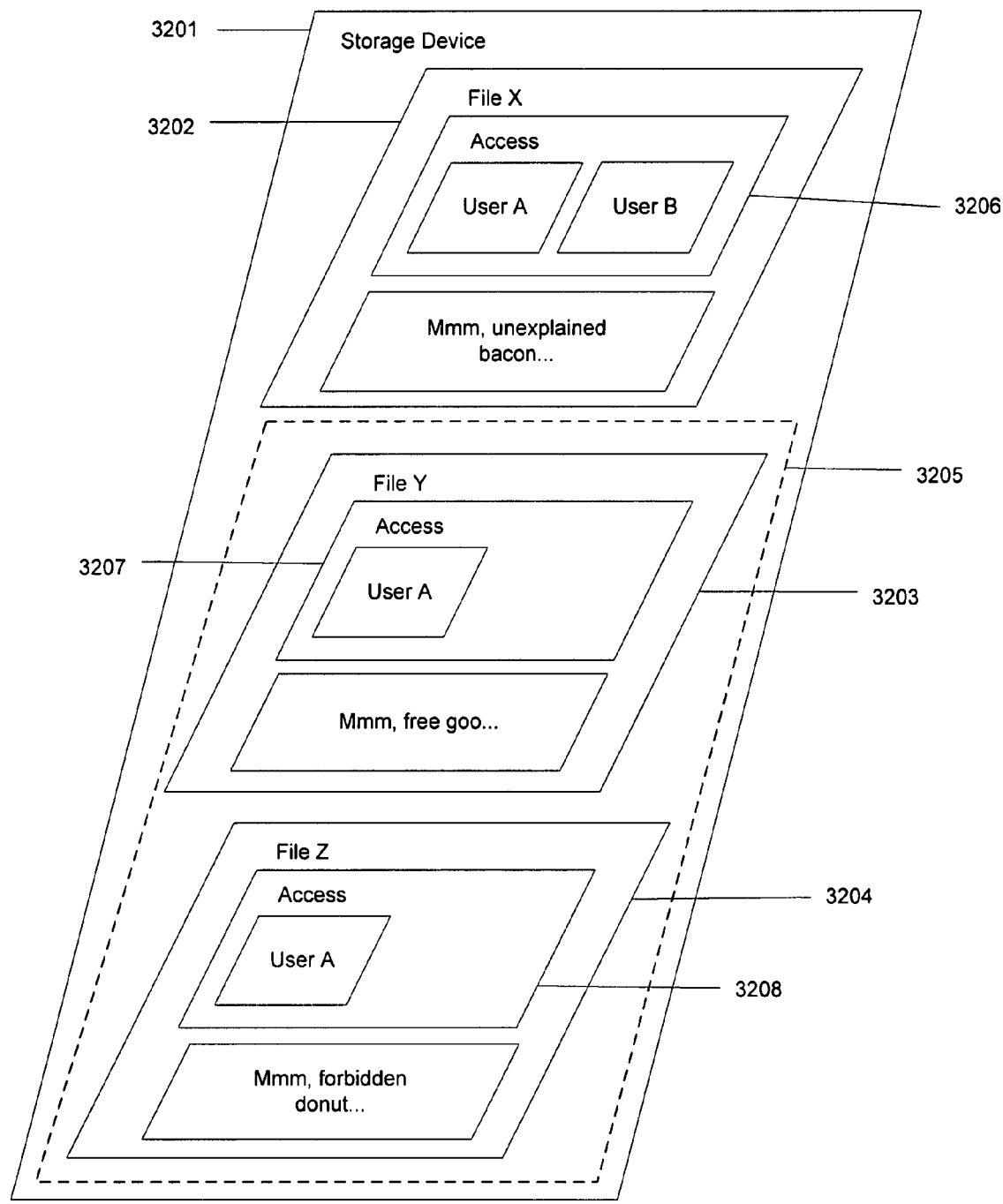
FIG. 32 shows another general example of file structure on a storage device corresponding to an embodiment of the invention.

In certain other exemplary implementations, the underlying organization of files on a storage device may provide the basis for a different assumption, such as assuming that if user A is the only user with access to a particular file, it is unnecessary to perform a permission check when user A searches that file. FIG. 32 demonstrates the organization of such a storage device 3201. File 3202, to which users A and B have access 3206, would require a permission check before user A could search it, because it lies outside assumption 3205 supported by the structure. Files 3203 and 3204 on the other hand lie within the bounds of assumption 3205 because only user A has access 3207 and 3208 to them.

Figure 33:
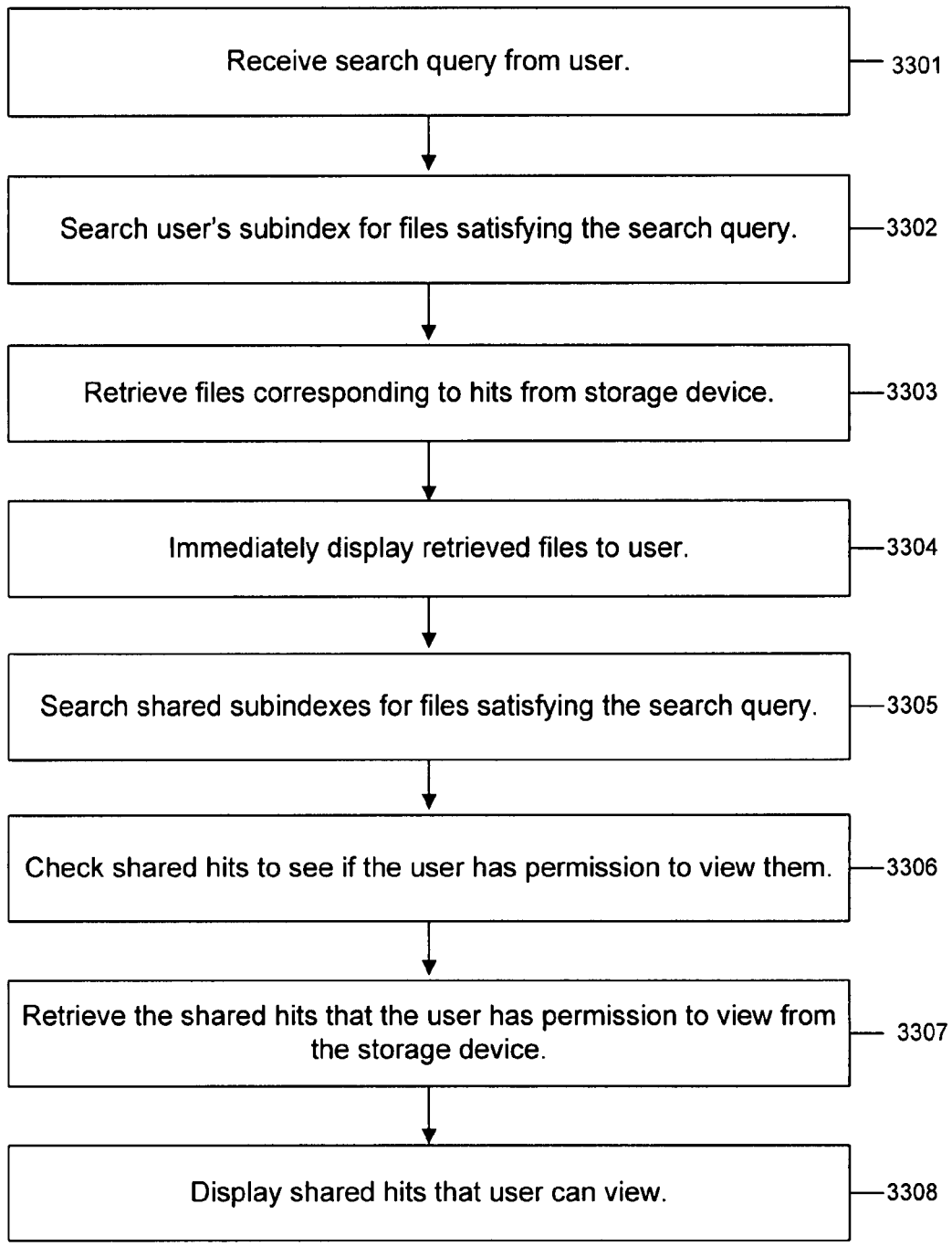
FIG. 33 shows a general example of searching an embodiment configured to use multiple subindexes.

In certain exemplary implementations, searching an index may occur as in FIG. 33. Beginning with operation 3301, a search query is received from a user. Next in operation 3302, the user's subindex is searched for files satisfying the search query. The subindex may be within a master index and partitioned virtually to be a distinct part of the master index or it may be physically distinct (as in the case of a separate distinct data structure stored in physically distinct storage addresses than other subindexes). Operation 3303 retrieves any files corresponding to hits from the storage device. In operation 3304, retrieved files are displayed immediately, as they were found within the subindex corresponding to the searching user. Next in operation 3305, the shared subindexes are searched using the same query, but permission checks are performed in operation 3306 as these files are not in the user's subindex. Hits found during operation 3305 that satisfy permission check 3306 are retrieved from the storage device in operation 3307 and displayed to the user in operation 3308.

Figure 34:
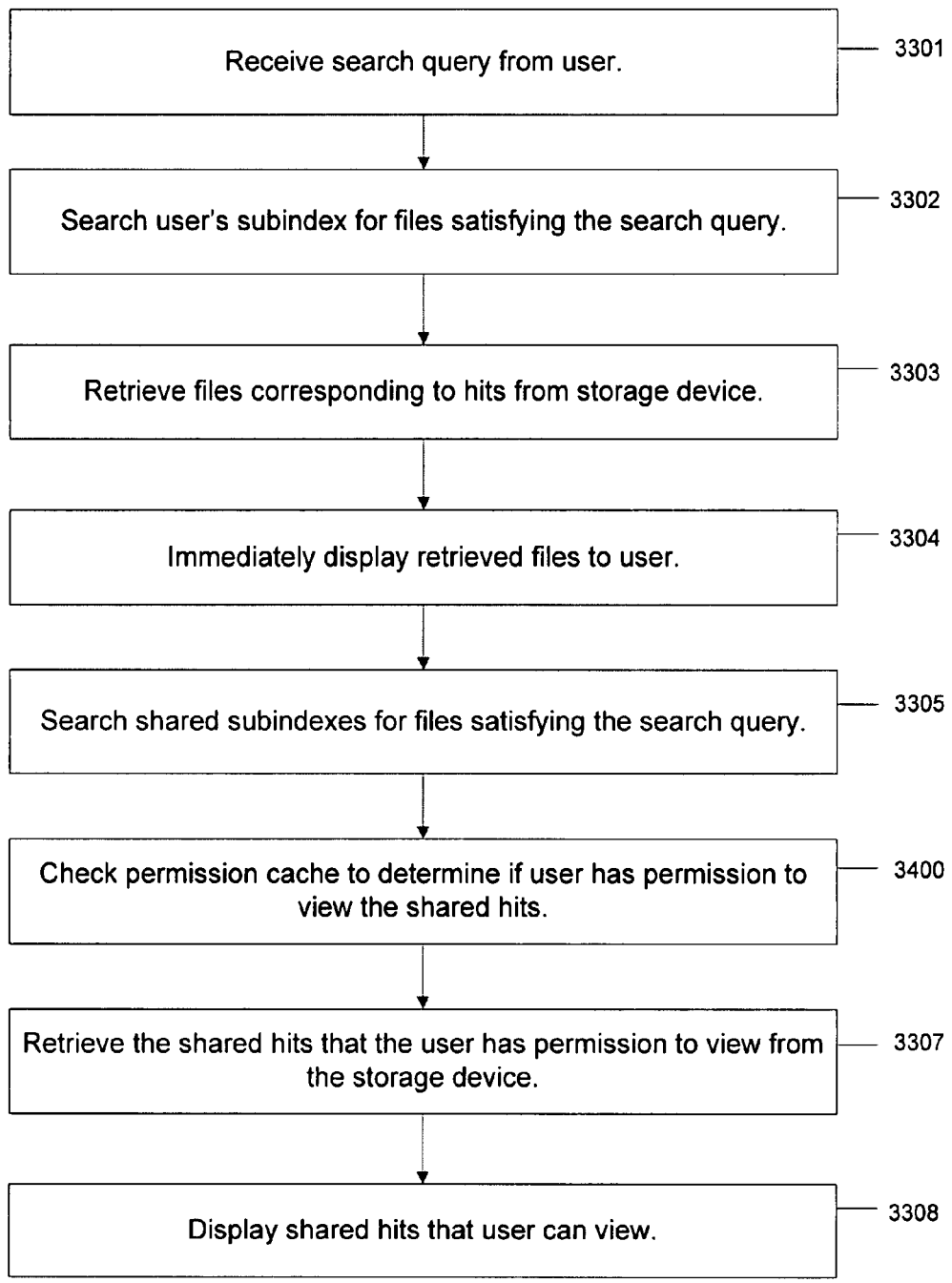
FIG. 34 shows a general example of searching an embodiment configured to use multiple subindexes and a permissions cache.

In another exemplary embodiment, such as in FIG. 34, permission check 3306 is replaced by operation 3400, in which a permissions cache is consulted in order to determine whether the user has permission to view the shared hit. The use of a permissions cache is described above. One exemplary implementation of checking a permissions cache is contained in FIG. 56, described subsequently.

Figure 35:
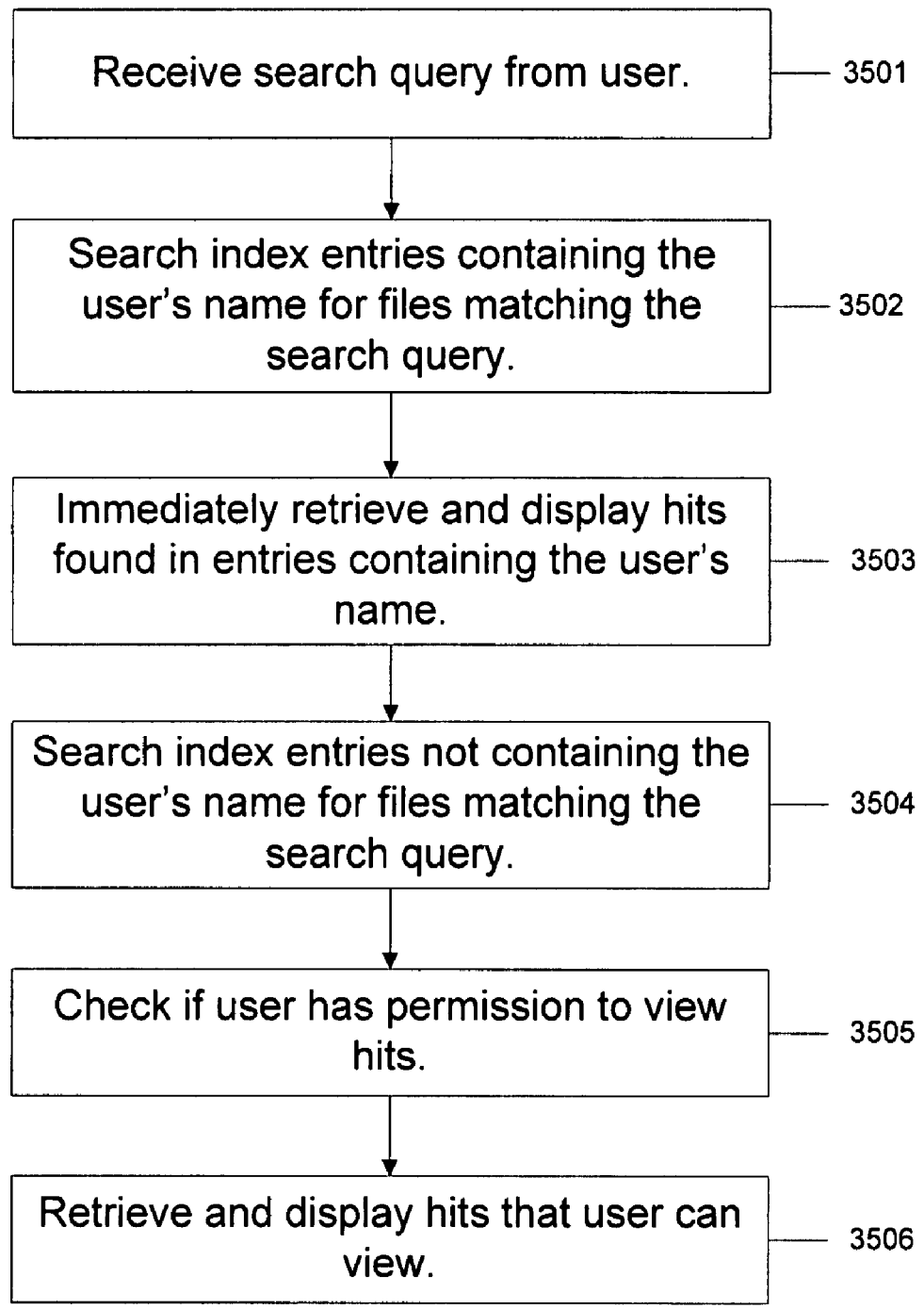
FIG. 35 shows a general example of searching an embodiment configured to use virtual subindexes within a single index.
Figure 36:
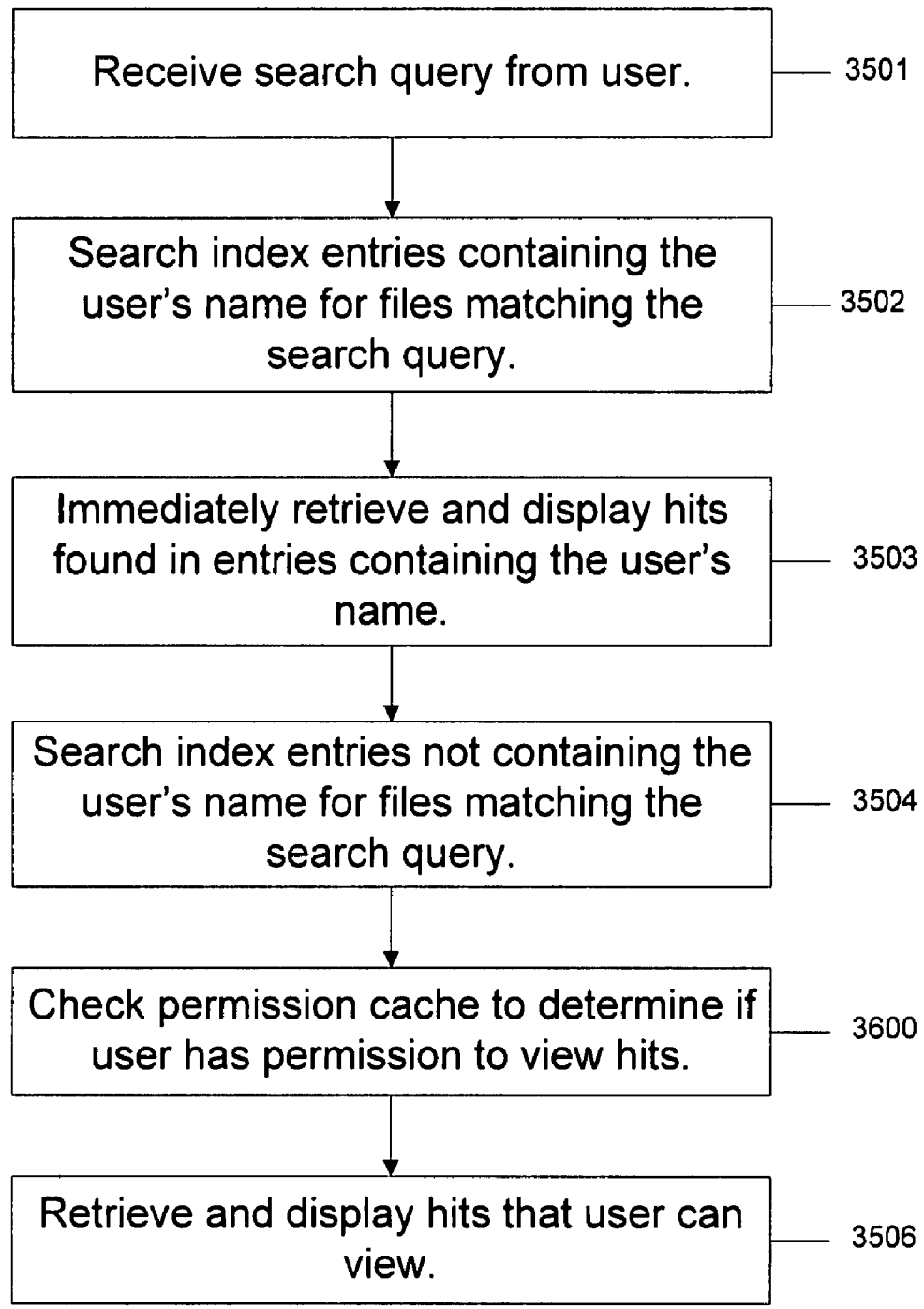
FIG. 36 shows a general example of searching an embodiment configured to use virtual subindexes within a single index and a permissions cache.

In another exemplary embodiment, a single index is searched in FIG. 35. In operation 3501, a search query is received from a user. Next, in operation 3502, index entries containing the user's name (as the owner of a file) are searched for files matching the search query. Files found in operation 3502 are immediately retrieved and displayed to the user in operation 3503. In operation 3504, index entries not containing the user's name (as the owner of the file) are searched for files matching the search query. In operation 3505, a permission check is performed to determine if the user has permission to view the files found in operation 3504. In operation 3506, those hits that the user can view are displayed to the user. In one exemplary implementation, as seen in FIG. 36, operation 3505 is replaced with operation 3600, which utilizes a permissions cache to determine if the user has permission to view the files found in operation 3504. One exemplary implementation of checking a permissions cache is contained in FIG. 56, described subsequently.

Figure 37:
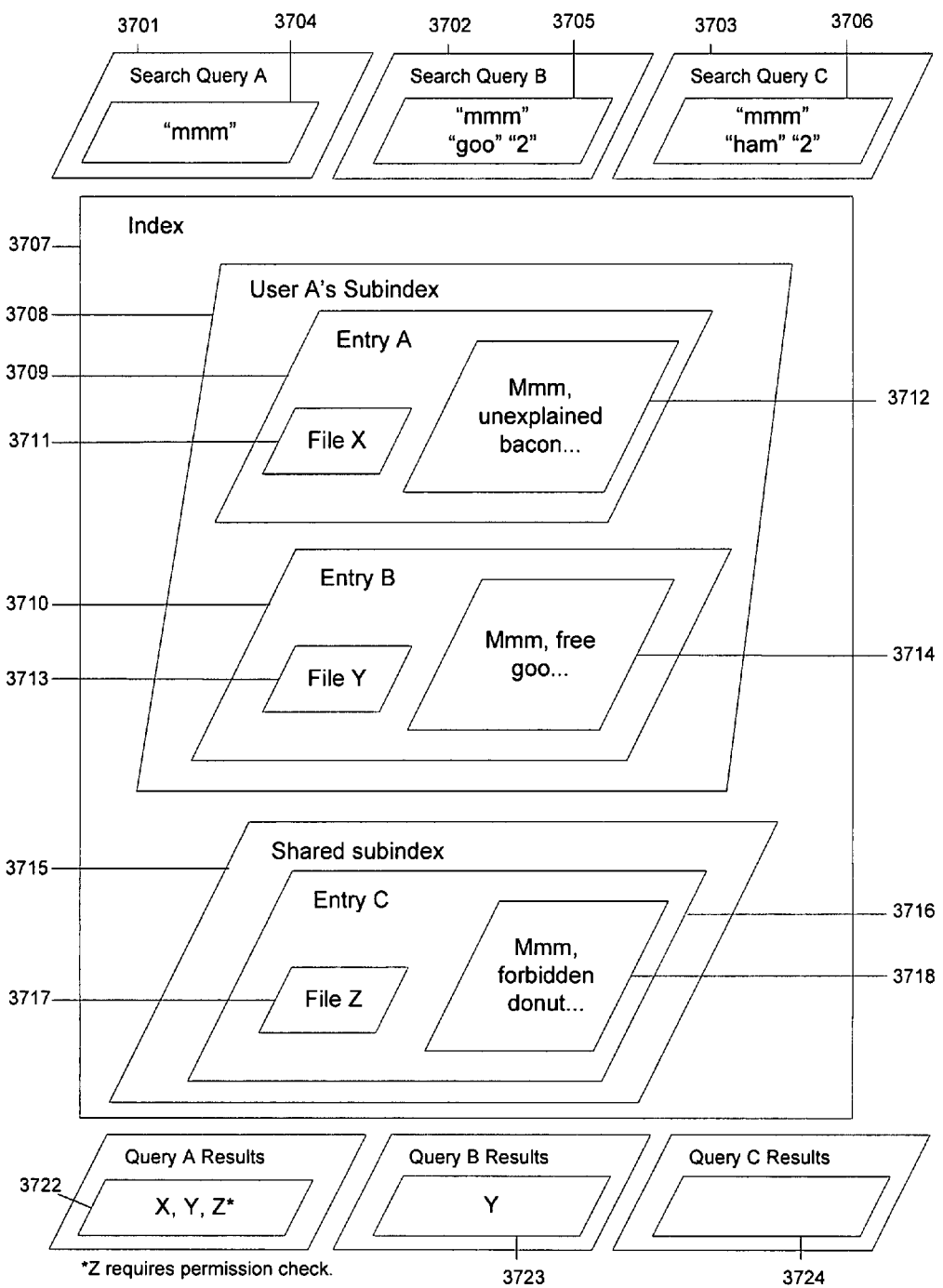
FIG. 37 shows a general example of searching an embodiment using full text subindexes.

In one exemplary implementation of the invention, described in FIG. 37, an index 3707 composed of subindexes 3708 and 3715 are searched using search queries 3701, 3702, and 3703. In one embodiment, query criteria 3704 is first tested against files contained within user's subindex 3708. The query is satisfied by file data 3712 and 3714 contained within entries 3709 and 3710, thus files 3711 and 3713 associated with entries 3709 and 3710 are considered hits for query 3701. In one embodiment, files 3711 and 3713 are immediately retrieved from a storage device and displayed to the user, since the files are located within user's subindex 3708 and need not be permission checked prior to access. In yet another embodiment, query 3701 is subsequently used to search shared subindex 3715, matching file data 3718 in entry 3716, thus file 3717 is a hit for this search query. Since entry 3716 is inside shared subindex 3715, a permission check is necessary before file 3717 can be viewed by the user. Query results 3722 indicate that while files 3711 and 3713 required no permission check as being in user subindex 3709, file 3717 requires a permission check before displaying the results showing file 3717. In certain exemplary embodiments, a permission check involves referencing a permissions cache, described, for example, in FIG. 56, discussed below. If the user who made the search query does not have proper permissions to view the file, then file 3717 (and any representation or portion thereof), will not be presented (e.g. not be displayed) to that user.

In another exemplary embodiment of the invention, index 3707 is searched using search query 3702, wherein query criteria 3705 contains a plurality of words and a number. In certain embodiments, the criteria 3705 would be interpreted to search for occurrences of the word "mmm" occurring within two or less words of the word "goo." For example, this search is through the full text content, represented by the subindexes, of the files. In another embodiment, criteria 3705 is first compared against entries contained within user subindex 3709, matching in this case entry 3710, making file 3713 a hit for query 3702. As this is a hit within user subindex 3708, the file 3713 or other representations of that file, in certain embodiments, is immediately retrieved from a storage device and displayed to the user. This result is reflected in results 3723, indicating that entry 3709 was the only match to query 3702 and that it resides in user subindex 3708. In yet another embodiment, search query 3703 produces results 3724, which in this is the empty set, as no files match the search criteria 3706.

Figure 38:
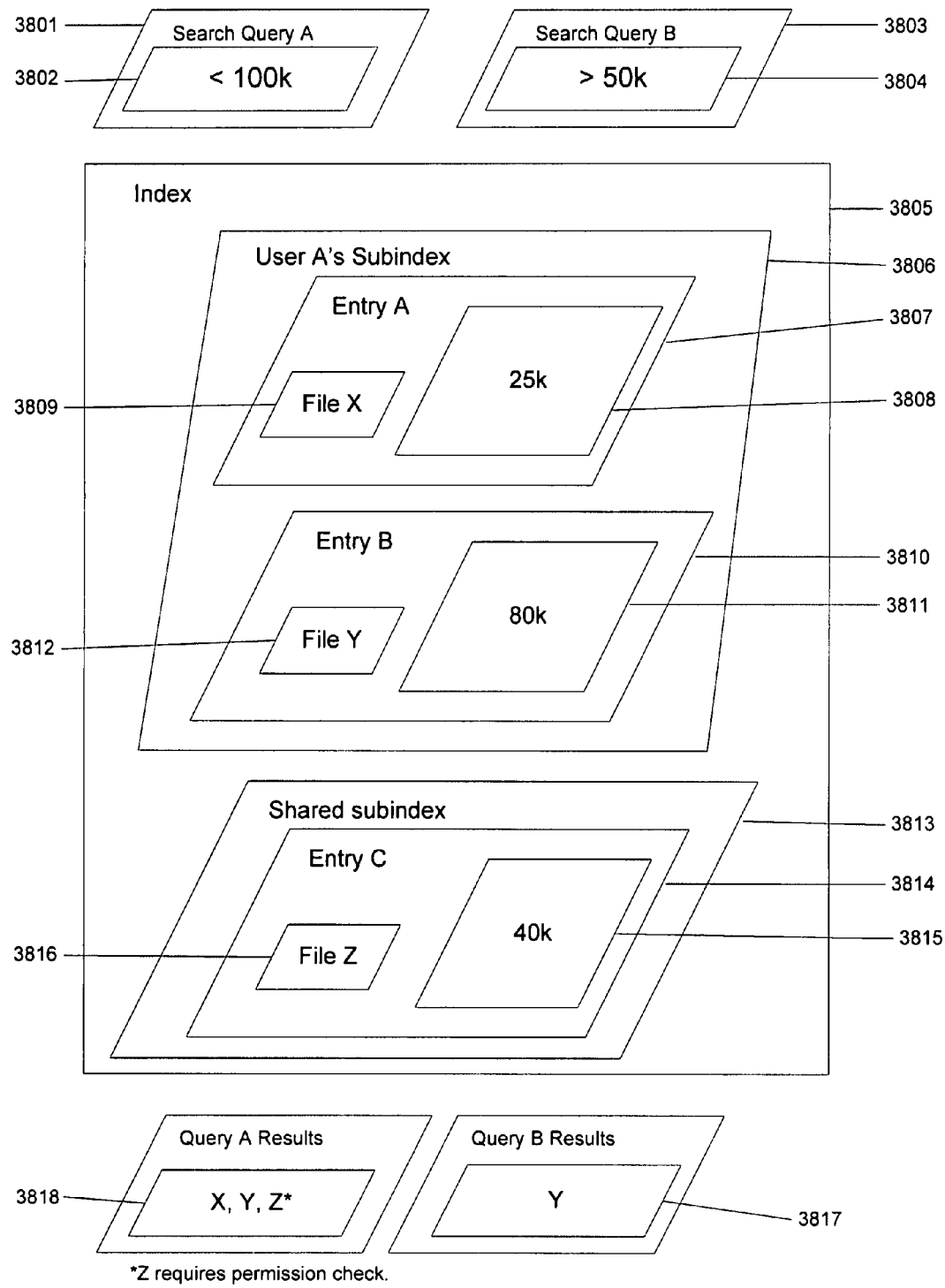
FIG. 38 shows a general example of searching an embodiment using metadata subindexes.

In certain embodiments, such as described in FIG. 38, index 3805 is composed of subindexes 3806 and 3813, wherein the subindexes are composed of entries such as 3807, containing metadata describing files corresponding to the entry. In one exemplary embodiment, the metadata is the size of the corresponding file. Search query 3801's search criteria 3802 will therefore match files whose size is less than 100 kilobytes. The size of file 3809 as indicated by metadata 3808 is within the parameters of search criteria 3802, as is the size of file 3812, denoted by metadata 3811. Entries 3807 and 3810 within user subindex 3806 are therefore matched by query 3801, thus files 3809 and 3812 are hits for query 3801. In certain embodiments, files 3809 and 3812 being contained within user subindex 3806, are immediately retrieved from a storage device and delivered to the user without checking permissions for those files. In certain embodiments, the search will turn to shared subindex 3813, where file 3816, whose size is indicated in metadata 3815, also matches search criteria 3802, making file 3816 a hit. Since file 3816's corresponding entry 3814 is located in shared subindex 3813, a permission check must be performed before the file can be retrieved for display. These results are indicated in results 3818. In certain exemplary embodiments, a permission check involves referencing a permissions cache, described, for example, in FIG. 56, discussed below. In certain other embodiments, query 3803 with criteria 3804 is used as the basis for a search of index 3805, but matches only entry 3810 in user subindex 3806. The only hit therefore is file 3812, which will be retrieved and displayed immediately without checking permissions for those files, as indicated by results 3817.

Figure 39:
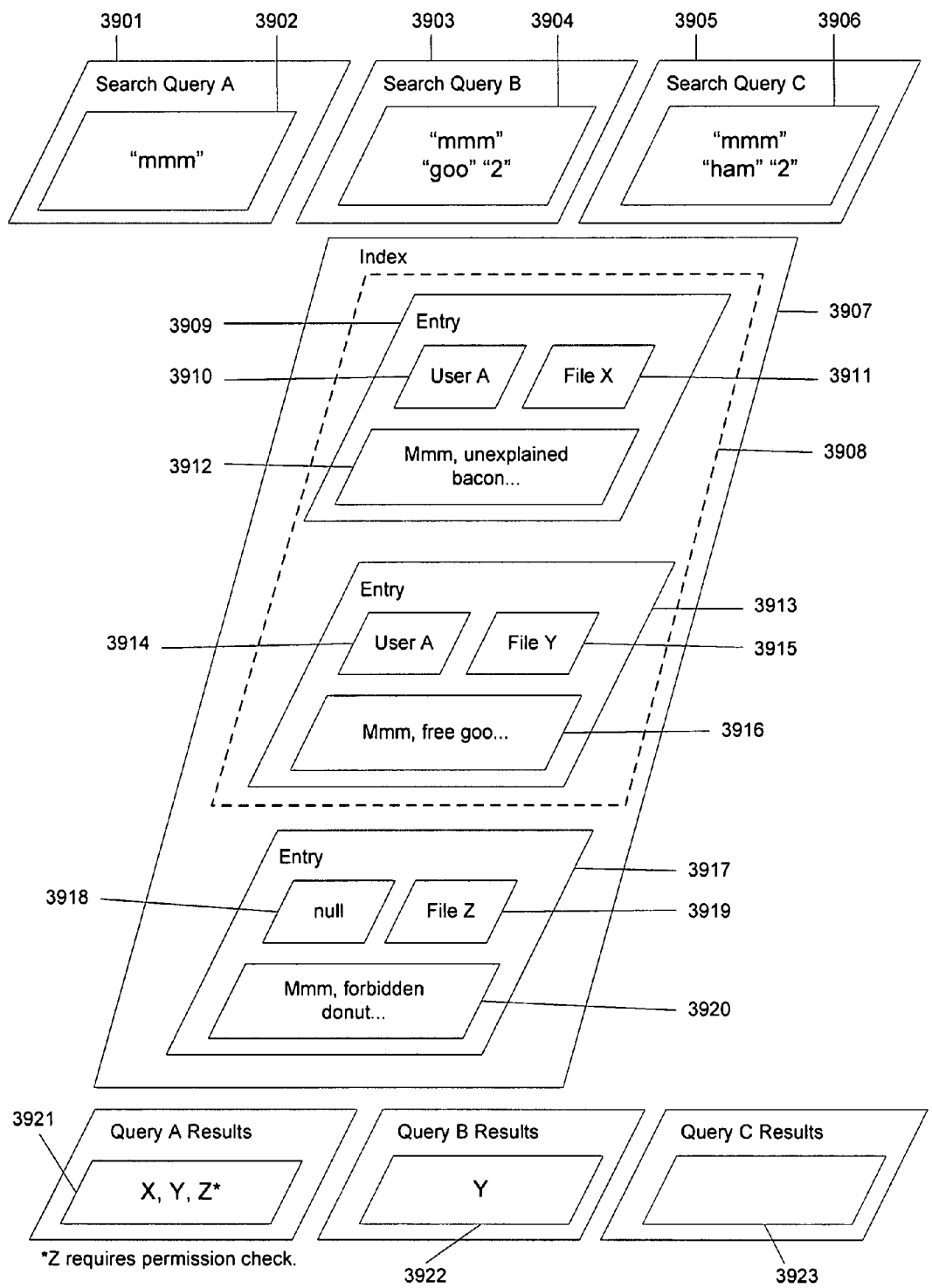
FIG. 39 shows a general example of searching an embodiment using full text subindexes.

In another exemplary embodiment, such as described in FIG. 39, index 3907 is composed of entries 3909, 3913, and 3917, wherein entries 3909 and 3913 contain user name 3910 and 3914. In certain embodiments, entries 3909 and 3913 in a single index 3907 sharing the same user name 3910 and 3914 result in a virtual subindex 3908 which is a subindex for user A. Files 3911 and 3915 are located in virtual subindex 3908 and may be retrieved immediately from a storage device without a permission check. Search query 3901 with search criteria 3902 is tested against the contents 3912, 3916, and 3920 of index 3907, matching entries 3909, 3913, and 3917. Files 3911 and 3915, corresponding to entries 3909 and 3913, which are located within virtual subindex 3908, are immediately retrieved from a storage device without permission checks. File 3919, also a hit, is located within entry 3917, which lies outside virtual subindex 3908 since its user name 3918 is null, and thus requires a permission check before display to the user. Query 3901 therefore produces results 3921. In certain exemplary embodiments, a permission check involves referencing a permissions cache, described, for example, in FIG. 56, discussed below.

In other embodiments, query 3903 contains criteria 3904, which is composed of a plurality of words and a number, such that the criteria is matched when the word "mmm" is found within two or fewer words as "goo." This search criteria matches entry 3913, containing file 3915. Entry 3913 is located within virtual subindex 3908 and therefore is retrieved immediately without a permission check, as noted in results 3922. In other embodiments, query 3905 containing criteria 3906 matches no entries in the index and requires no files to be retrieved, indicated by results 3923.

Figure 40:
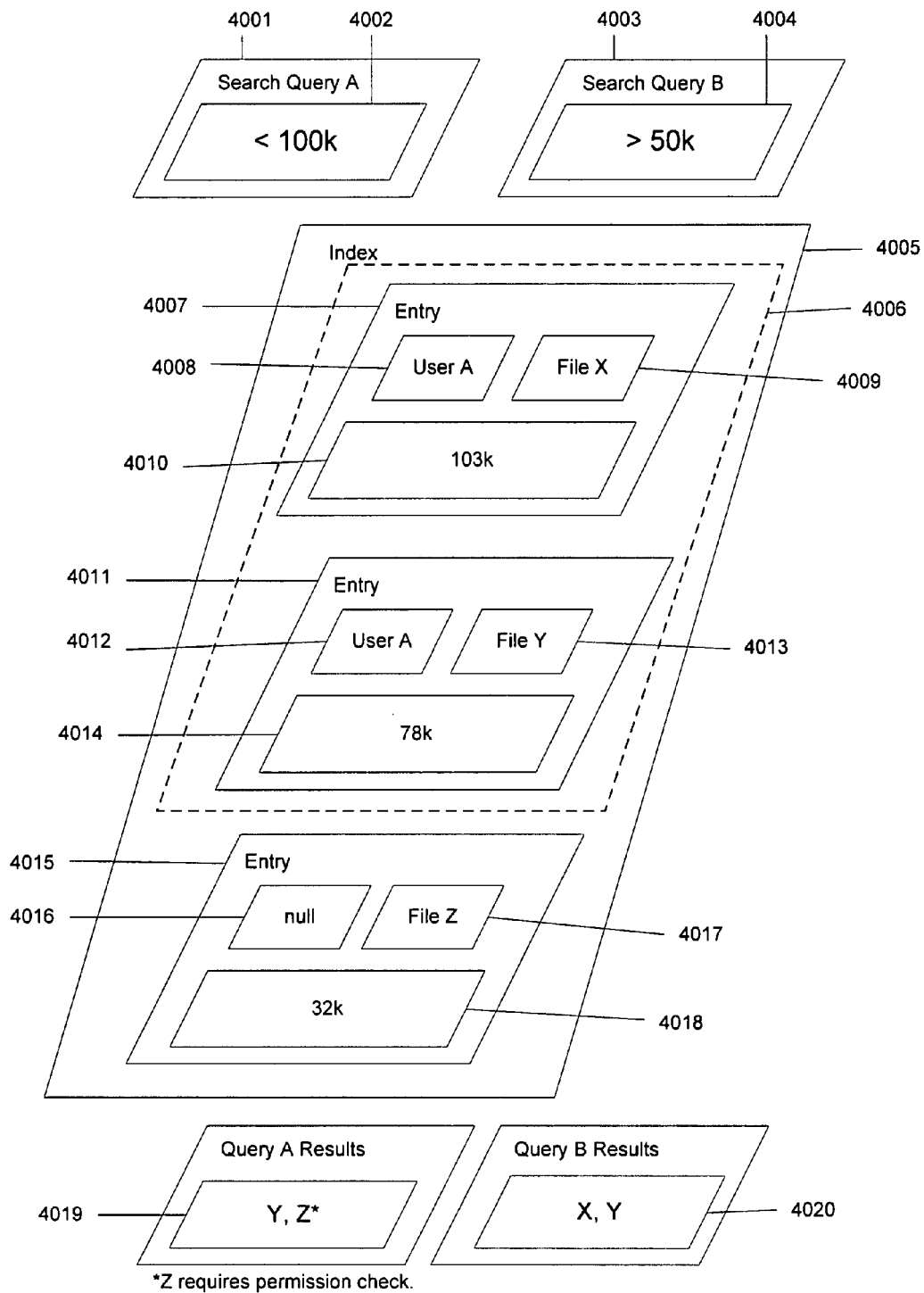
FIG. 40 shows a general example of searching an embodiment using metadata subindexes.

In another exemplary embodiment, described in FIG. 40, an index 4005 is composed of entries 4007, 4011, and 4015. Entries 4007 and 4011 contain user names 4008 and 4012, which in this particular embodiment are identical, resulting in virtual subindex 4006. Entry 4015 occurs outside virtual subindex 4006 as its user name 4016 does not match the "user A" name. In certain embodiments, entries such as 4007 contain metadata describing the file with which the entry is associated. Entry 4007 is here associated with file 4009, which has a size 4010. Search query 4001, containing search criteria 4002 will therefore match entries associated with files whose size is less than 4002. In this particular embodiment, criteria 4002 matches two entries contained within the index, since metadata 4014 and 4018 satisfy query 4001. Entry 4011, being within virtual subindex 4006, will have its associated file 4013 (or a representation of the file, such as basic information about the file such as file name, pathname, size, creation or modification dates, and file type) immediately retrieved (without a permissions check) from a storage device for display to the user, while entry 4015, occurring outside virtual subindex 4006, will require a permission check before file 4017 can be retrieved and displayed, as indicated in search results 4019. In certain exemplary embodiments, a permission check involves referencing a permissions cache, described, for example, in FIG. 56, discussed below. In yet another embodiment, query 4003 containing criteria 4004 would match entries 4007 and 4011 inside virtual subindex 4006, resulting in the immediate retrieval of files 4009 and 4013 for display to the user, as indicated in results 4020 without checking permissions for those files having their index data within virtual subindex 4006 for the user who made the search query.

Figure 41:
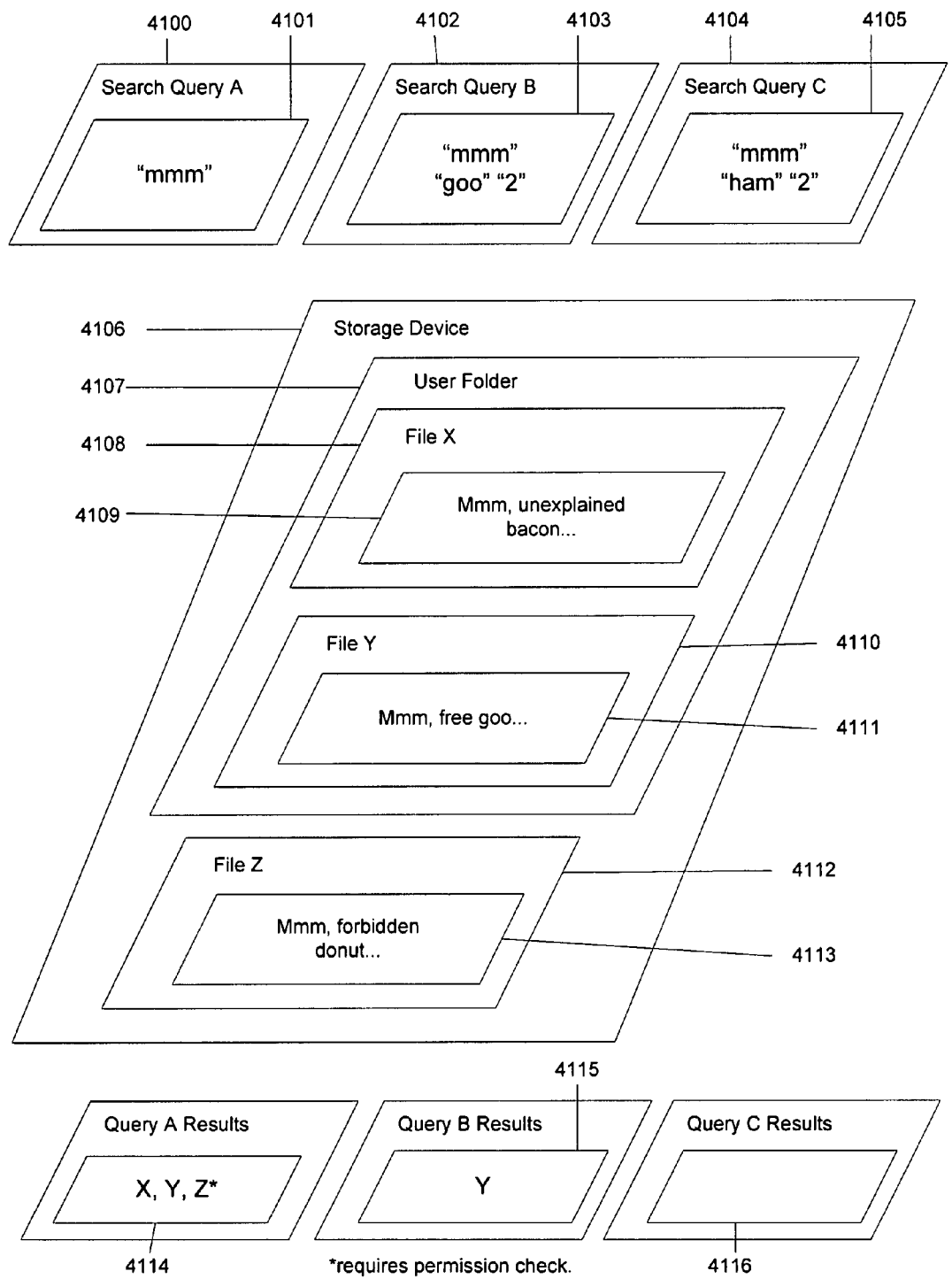
FIG. 41 shows a general example of searching a storage device without an index.

In certain embodiments, like FIG. 41, searches are performed directly upon storage device 4106, composed of files 4108 and 4110 located within user folder 4107 and file 4112 located outside user folder 4107. In the embodiment of FIG. 41, there are no indexes of full text content (or metadata) of the files, and thus the searching is performed on the files themselves. Query 4100 containing criteria 4101 is compared against files in user folder 4106, matching file content 4109 and 4111, and thus files 4108 and 4110 are hits. As the hits are located in user folder 4106, no permission check is required before they can be displayed to user. However, criteria 4101 also matches file content 4113, making file 4112 a hit, but a hit located outside user folder 4106, and thus a permissions check is required before file 4112 can be displayed to the user, as reflected in results 4114. In certain exemplary embodiments, a permission check involves referencing a permissions cache, described, for example, in FIG. 56, discussed below. In certain other embodiments query 4102 containing criteria 4103 contains a plurality of words and a number, such that the criteria is matched when the word "mmm" is found within two or fewer words as "goo." This query matches file 4110, which is located in user folder 4106, thus the file 4110 or a representation of the file can be immediately displayed to the user without a permission check, as indicated in results 4115. In certain other embodiments a query 4104 with criteria 4105 may be used, which matches no files and thus requires no permission checks, as indicated in results 4116.

Figure 42A:
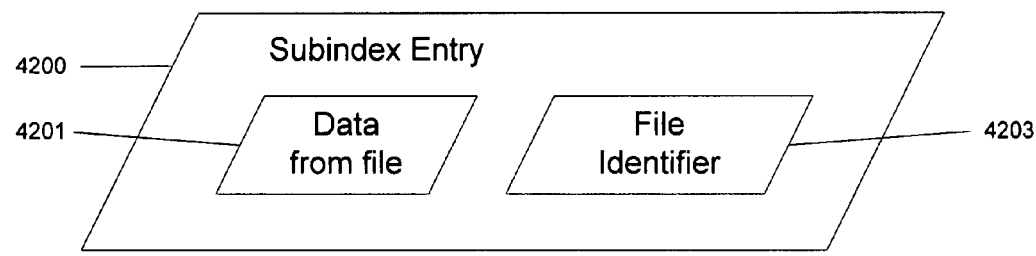
FIGS. 42A, 42B, and 42C show exemplary embodiments of subindex entries, subindexes, and an index composed of subindexes, respectively.
Figure 42B:
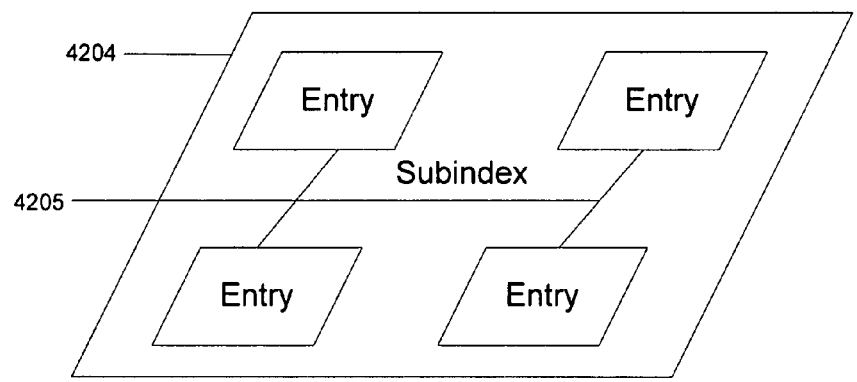
Figure 42C:
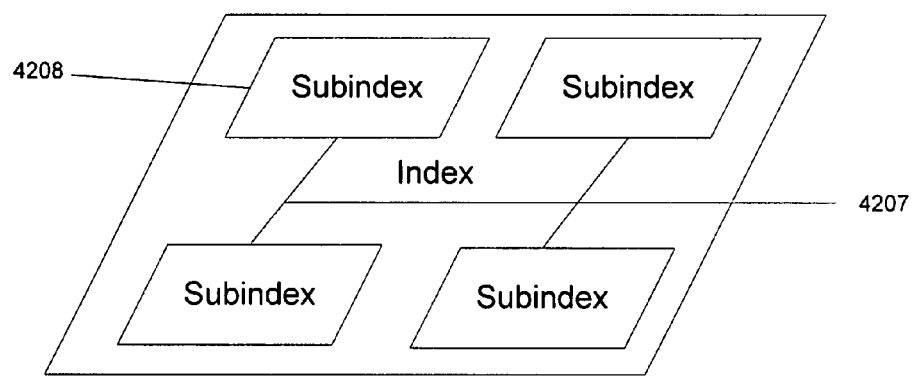

In one exemplary embodiment, the foundation of the index built in operation 3001 is subindex entry 4200, described in FIG. 42A, which contains file data 4201 and file identifier 4203. In certain embodiments, file data 4201 is a portion (e.g. a word) of the full text (or other content) of a file, and in other embodiments, file data 4201 may be metadata about a file or it may be a combination of the full content and metadata. File identifier 4203, in certain embodiments, represents a path to the file on a storage device or a unique, persistent file identifier (such as a file identification number which is unique and persistent even if the file is changed). FIG. 42B describes a subindex 4204, which is composed of entries 4205. In certain embodiments, as described in FIG. 42C, a plurality of subindexes 4207 are created as a result of operation 3001 to produce index 4208, wherein each of the subindexes 4207 are associated with separate groups of files sharing a common attribute. In certain exemplary embodiments, the attribute may be file location or exclusivity of access.

Figure 43:
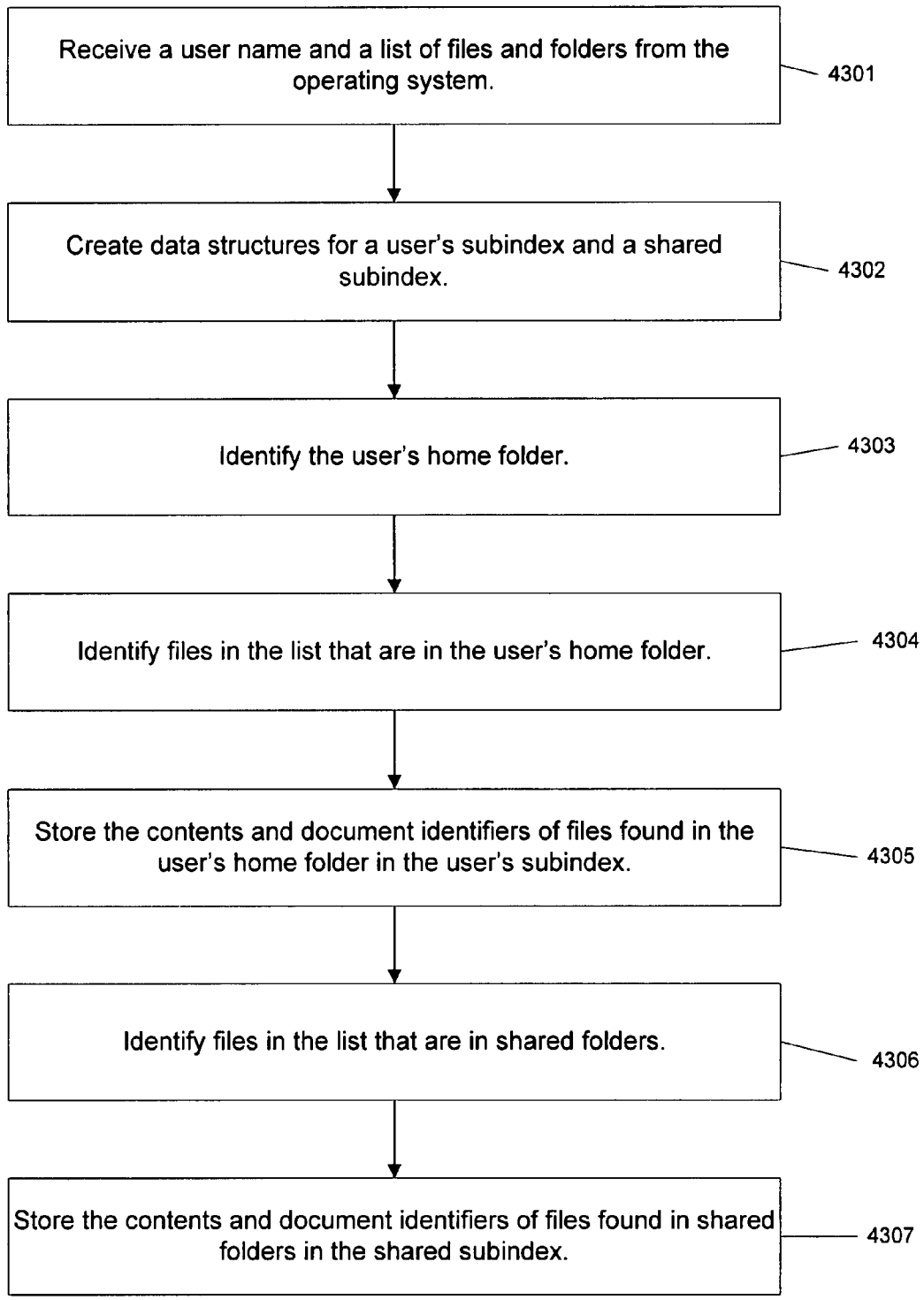
FIG. 43 is a flow chart showing an exemplary method of the present invention.

In another exemplary embodiment, FIG. 43 describes a method for implementing operation 3001. In certain embodiments, the implementation receives a user name and a list of files and folders from the operating system during operation 4301. In certain embodiments, after receipt of this data, data structures for a user's subindex and a shared subindex are created during operation 4302. In certain other embodiments, these data structures are created prior or concurrently with operation 4301. Having both data structures and data, in operation 4303 the home folder associated with the user name is identified, followed by operation 4304 during which the files residing with the user's folder are identified. In certain embodiments, operation 4305 stores at least a portion of the content and document identifiers of files located in the user's home folder in a subindex associated with that user's home folder. In certain other embodiments, metadata describing the file might be stored in the subindex. In certain embodiments, operation 4306 then identifies the files located in shared folders outside the user's home folder, and in operation 4307 stores the contents and document identifiers of those files in a shared subindex associated with the location of the files identified in 4306. In certain other embodiments, metadata describing the files identified in operation 4306 might be stored. In certain other embodiments, operations 4306 and 4307 might run before or concurrently with operations 4304 and 4305.

Figure 44:
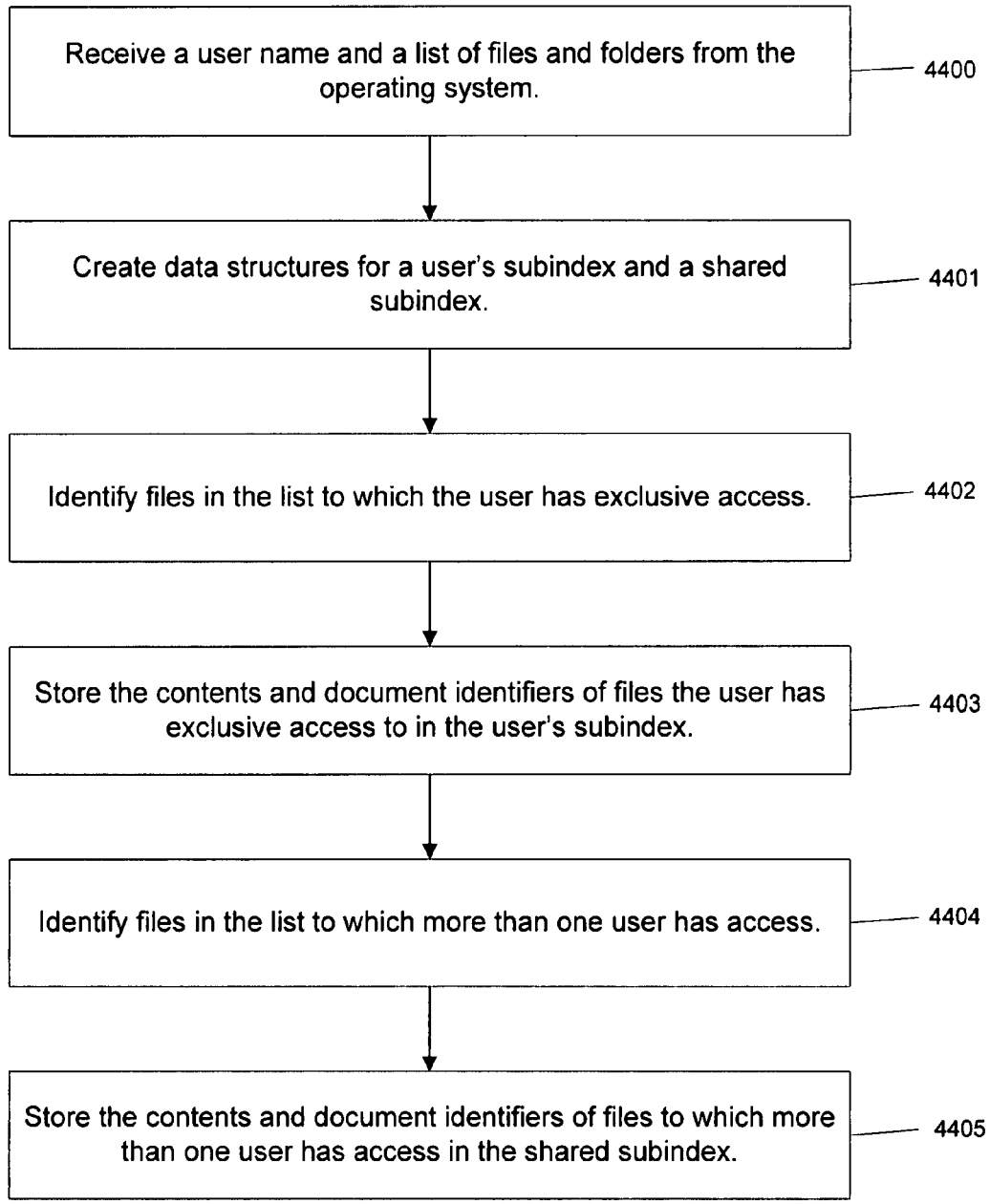
FIG. 44 is a flow chart showing another exemplary method of the present invention.

In certain exemplary embodiments, operation 3001 partitions files based on exclusivity of access. In one exemplary implementation of operation 3001, described in FIG. 44, operation 4400 receives a user name and a list of files and folders from the operating system. Operation 4401 then creates data structures for a user's subindex and a shared subindex. In other implementations, operation 4401 occurs before or concurrently with operation 4400. Operation 4402 identifies those files to which the user identified by the user name received in 4400 has exclusive access. In certain embodiments, operation 4403 stores at least a portion of the content and document identifiers of files found in operation 4402 in a user subindex associated with the user identified by the user name received in 4400. In certain other embodiments, the data stored may be metadata. In operation 4404, files to which the user does not have exclusive access are identified and then in operation 4405 stores at least a portion of the content and document identifiers of those files in a shared subindex associated with the location of the files identified in 4404. In certain other embodiments, operation 4405 may store metadata about the files identified. In certain other embodiments, operations 4404 and 4405 run before or concurrently with operations 4402 and 4403.

Figure 45A:
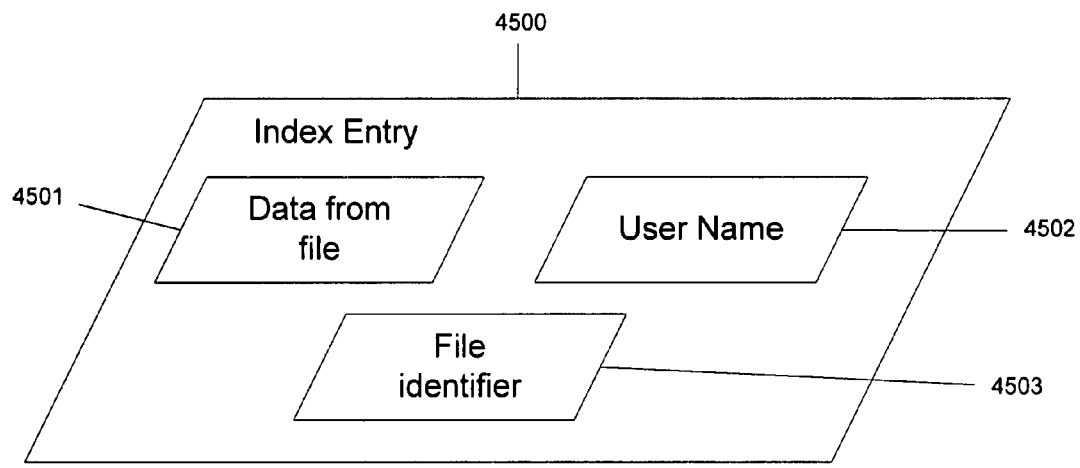
FIGS. 45A and 45B show exemplary embodiments of index entries and an index composed of entries, respectively.
Figure 45B:
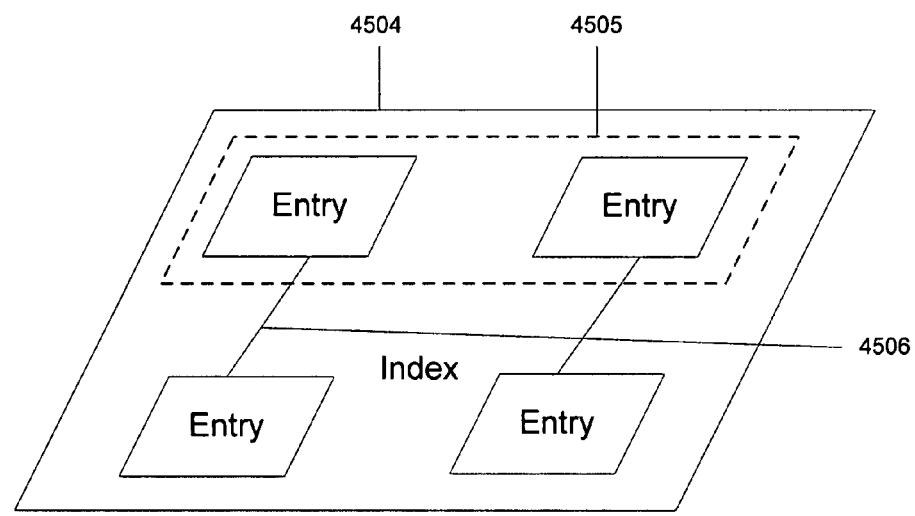

In another exemplary embodiment, index 4504 described in FIG. 45B produced by operation 3001 is composed of entries 4506 of the type described in FIG. 45A as entry 4500. Entry 4500 contains data from file 4501, user name 4502, and file identifier 4503. In certain embodiments, data from file 4501 is at least a portion of the full text content of a document. In certain other embodiments, data from file 4501 may be metadata describing a file. In certain embodiments, file identifier 4503 may be a path to a file on a storage device or it may be a unique, persistent file identification value, such as a number. In certain embodiments, user name 4502 identifies a user in whose home folder the file identified by file identifier 4503 is located. In certain other embodiments, user name 4502 identifies a user who has exclusive access to the file identified by file identifier 4503. In certain embodiments, virtual subindex 4505 is created by entries of type 4500 containing identical values for user name 4502, which indicates that the files share the partitioning criteria. In certain embodiments, the criteria is file location. In certain other embodiments, the criteria may be exclusivity of access to the file.

Figure 46:
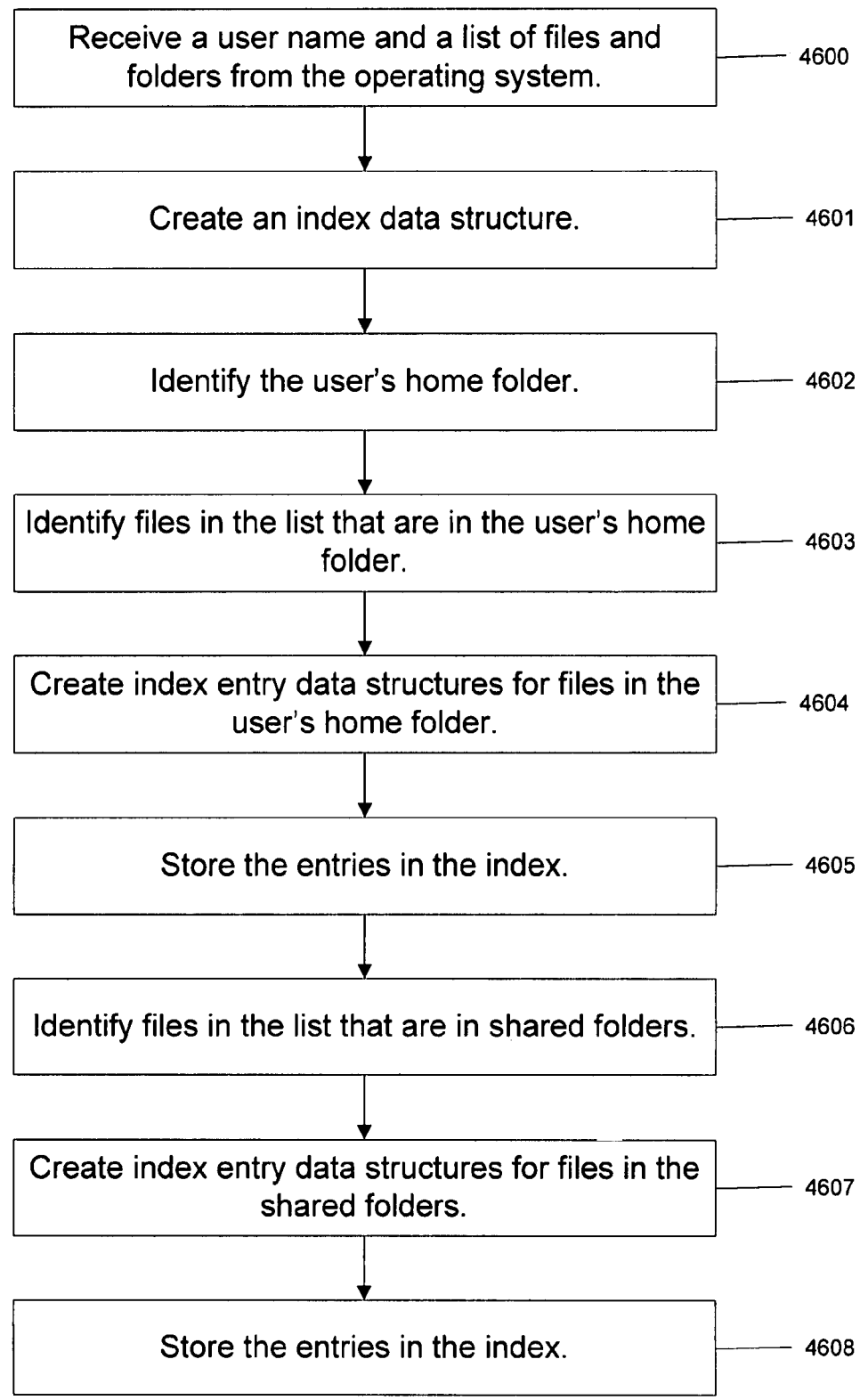
FIG. 46 is a flow chart showing an exemplary method of the present invention.

In another exemplary embodiment, operation 3001 may be implemented using the method described in FIG. 46 to produce an index 4504 with a partition criteria of file location. In operation 4600, a user name and list of files and folders is received from the operating system, followed in operation 4601 by the creation of an index data structure. In certain embodiments, operation 4601 may be performed before or concurrently with operation 4600. In operation 4602, the user's home folder is identified within the list of folders. In operation 4603, files contained in the user's home folder are identified. In certain embodiments, operations 4602 and 4603 are executed concurrently. In operation 4604, index entry data structures are created for files in the user's home folder. In certain embodiments, operation 4604 may be executed concurrently with operations 4602 and 4603. Operation 4604 additionally stores file identifiers, file contents, and the user name in the entries. Certain embodiments may store metadata in the entry. In operation 4605 the entries are stored in the index data structure, which in certain embodiments may occur concurrently with operation 4604. In operation 4606, files outside the user's home folder are identified. In operation 4607, entries are created with file identifiers, file content, and the user name corresponding to files located outside the user's home folder. These files are subsequently stored in the index data structure in operation 4608. In certain embodiments, the file content may be metadata. In certain other embodiments, operations 4606-08 may be executed concurrently. In certain other embodiments, operations 4606-08 may be executed concurrently with operations 4603-05.

Figure 47:
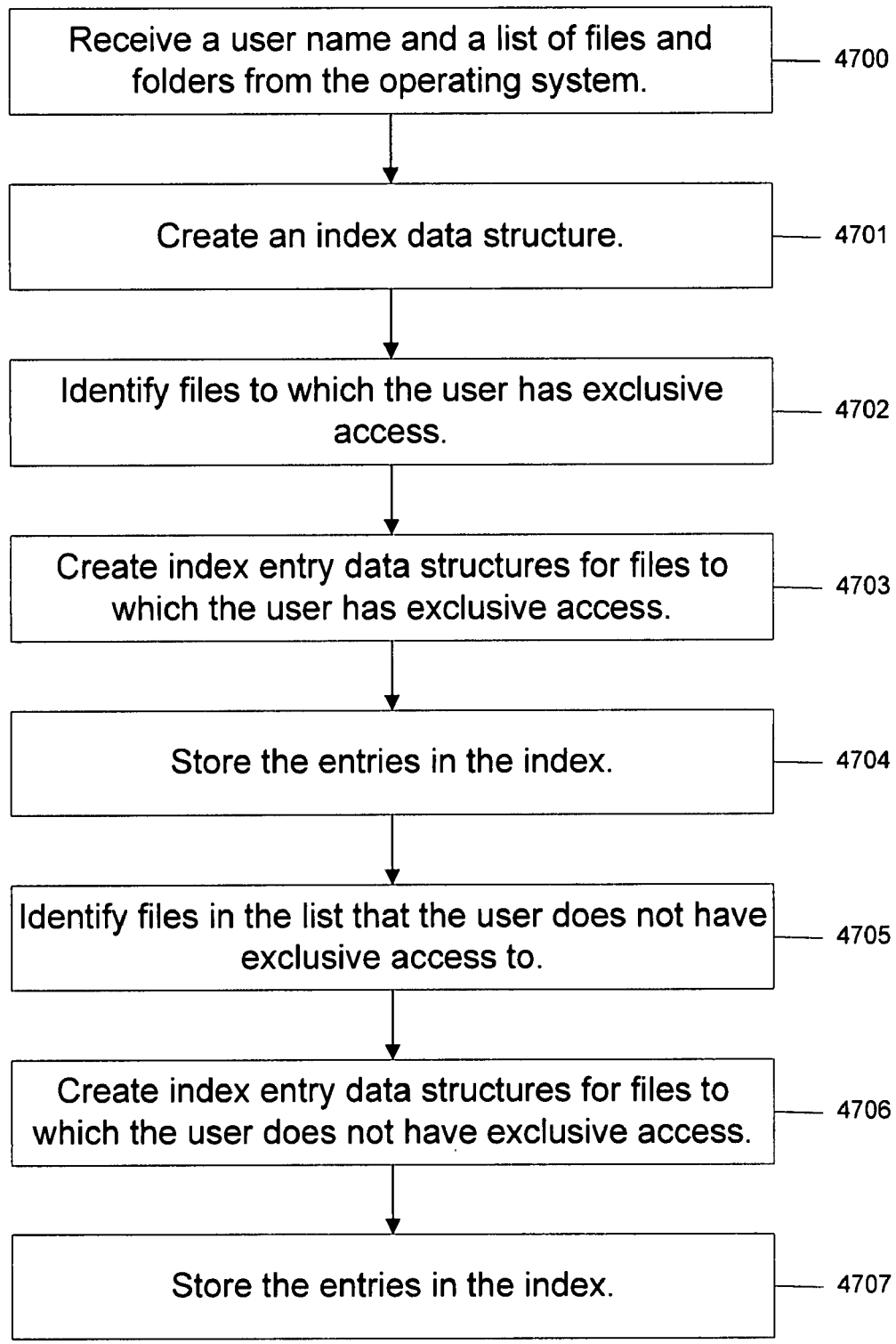
FIG. 47 is a flow chart showing another exemplary method of the present invention.

In another exemplary implementation, operation 3001 may be implemented using the method described in FIG. 47 to produce an index 4504 with exclusivity of access as the partition criteria. In certain embodiments, operation 4700 receives a user name and a list of files and folders from the operating system. Operation 4701 then creates an index data structure. Operation 4702 identifies files to which the user has exclusive access. Operation 4703 then creates data structures with the now available information: the user's name, the file identifier, and the contents of the file. In certain embodiments, the data stored in the entry may be metadata. In operation 4704, the entries are stored in the index data structure. Operation 4705 identifies files in the list that the user identified by the user name received in operation 4700 does not have exclusive access to. Operation 4706 creates index entries corresponding to these files, and operation 4707 stores those entries in the index. In certain embodiments, one or more of the steps may be executed concurrently.

Figures 48A, 48B:
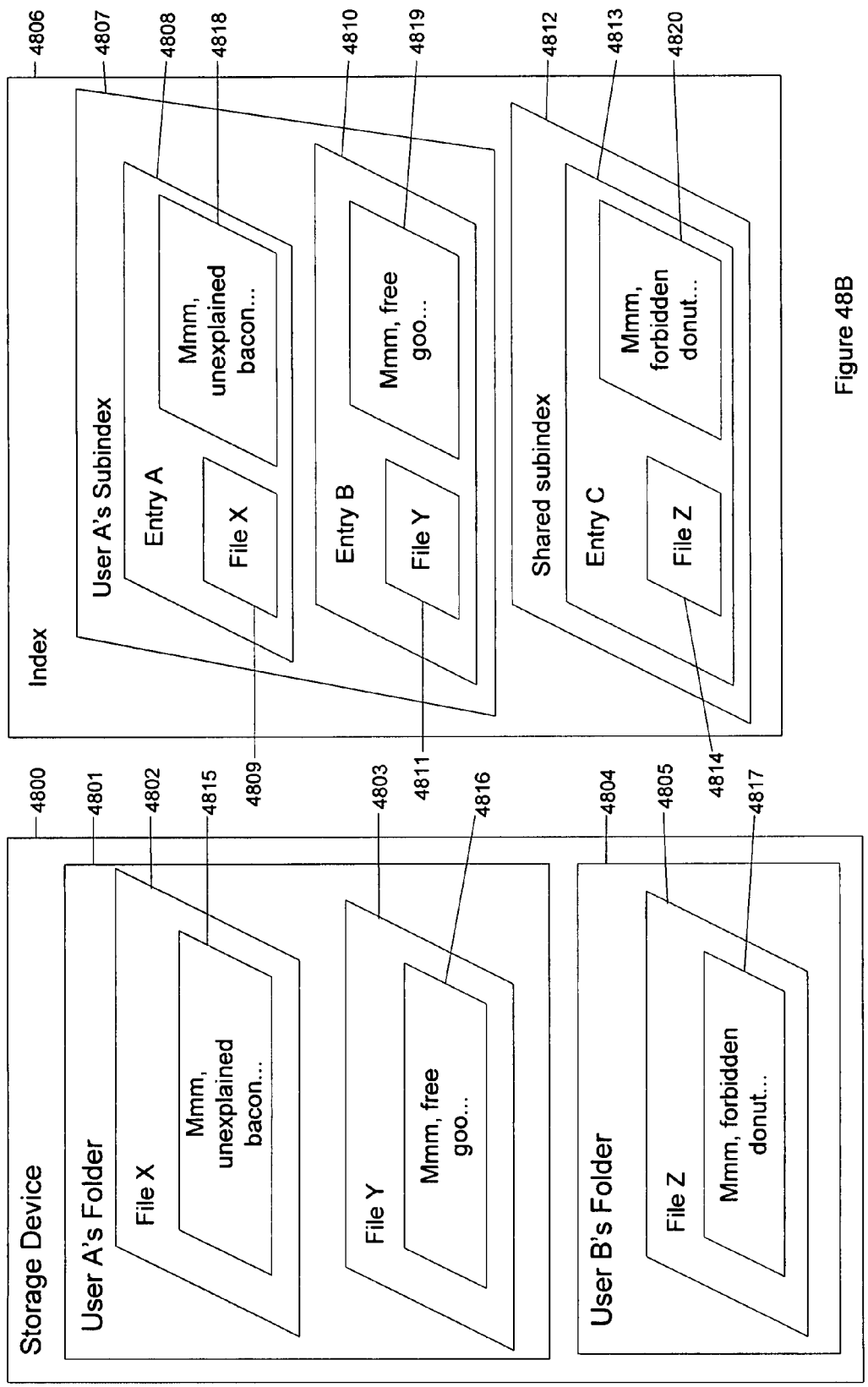
FIGS. 48A and 48B show an example of a storage device to be indexed and an example of a corresponding index, respectively.
Figure 48C:
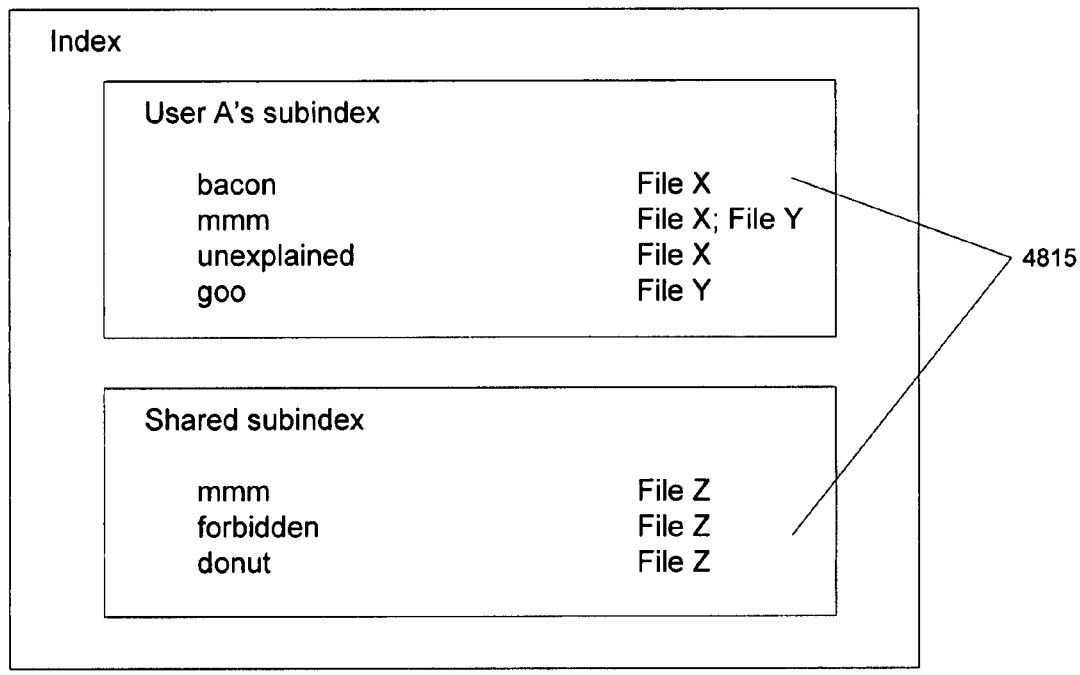
FIG. 48C shows a full text index database.

In an exemplary embodiment, operation 3001 will take storage device 4800 described in FIG. 48A and produce index 4806 described in FIG. 48B or the full text index shown in FIG. 48C. Storage device 4800 contains user folder 4801 and shared folder 4804. In certain embodiments, operations 3001 will partition index 4806 according to file location. Files in user folder 4801, for example may be partitioned into user subindex 4807. File 4802, contained in user folder 4801, may be associated with entry 4808, wherein entry 4808 contains identifier 4809 referring to file 4802. File 4802 has content 4815, which may be represented in entry 4808 as content 4818. In the full text index of FIG. 48C, the content 4815 is dispersed in multiple entries, each having a file identifier. In certain embodiments, content 4818 may contain metadata, rather than full text content, describing the file identified by file identifier 4809. File 4803, also located in user folder 4801, may be associated with entry 4810 in user subindex 4807, with content 4819 reflecting file content 4816 and file identifier 4811 referring to file 4803. File 4805 is located in shared folder 4804, and may therefore be associated with an entry 4813 in shared subindex 4812. Content 4820 may contain file content 4817, or, in certain embodiments, metadata describing file 4805.

Figure 49:
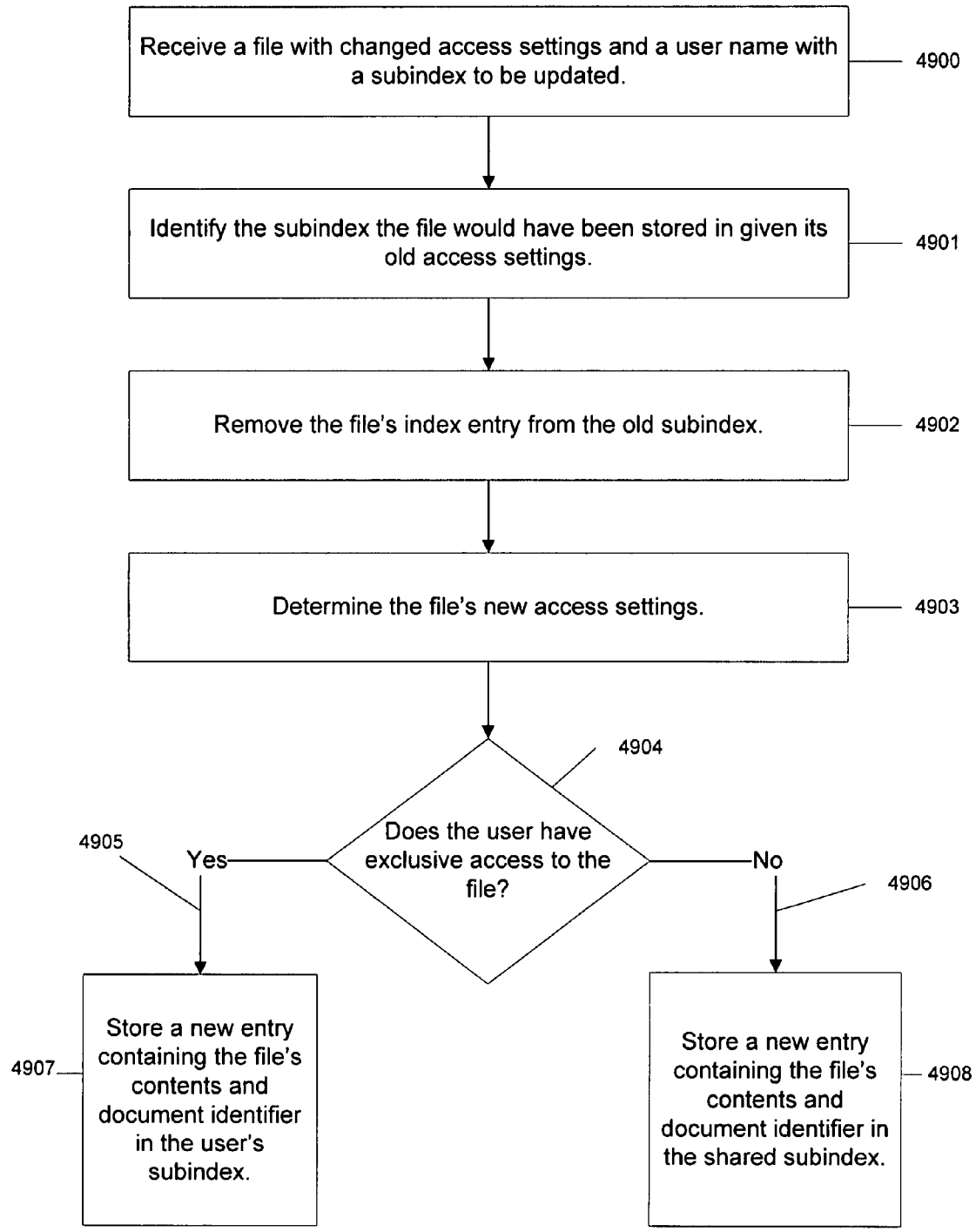
FIG. 49 is a flow chart showing an exemplary method of the present invention.

In certain exemplary embodiments, operation 3002 updates the index over time as files change and may be implemented with a method like that described in FIG. 49. In certain embodiments, the index resulting from operation 3001 may represent a partitioning based on exclusivity of access. Operation 4900 may therefore receive a file with changed access settings and a user name with a subindex to be updated. Operation 4901 identifies the subindex the file would have been stored in given its old access settings. In one embodiment, the old subindex in which the file was stored may have been a shared subindex. In another embodiment, the old subindex in which the file was stored may have been a user subindex. In still another embodiment, the file was not previously indexed because of its location or recent creation. In operation 4902, the index entry corresponding to the file received in 4900 is removed from its subindex. In operation 4903 the new access settings for the file received in 4900 are ascertained. In decision 4904, certain embodiments of this method inquire as to whether the user identified by the user name received in 4900 currently has exclusive access to the file. If the user now has exclusive access as in transition 4905, operation 4907 creates and stores a new entry associated with the file in the user's subindex. If the user does not now have exclusive access as in transition 4906, operation 4908 creates and stores a new entry associated with the file in a shared subindex.

Figure 50:
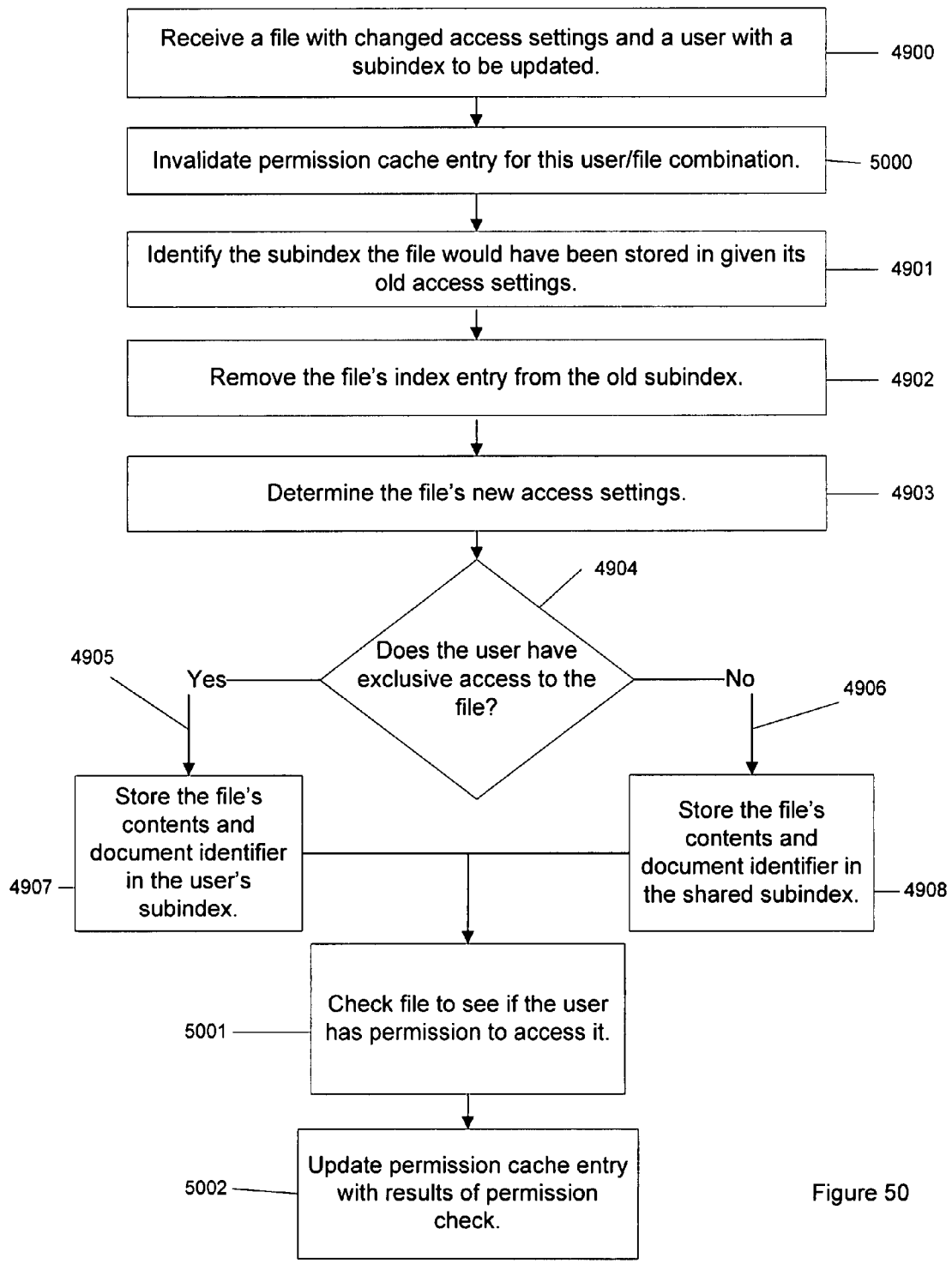
FIG. 50 is a flow chart showing another exemplary method of the present invention.

In certain exemplary embodiments, operation 3002 may be implemented with a method like that described in FIG. 50, integrating the maintenance of a permissions cache into a method for maintaining an index. Three new operations are added to the method described in FIG. 49 to accomplish this. First, between operations 4900 and 4901, an operation invalidates a permissions cache entry for the received user/file combination. In certain embodiments, operation 5000 may be executed concurrently with other operations in the method described in FIG. 50. In certain embodiments, a permissions cache entry will not yet exist for the user/file combination received in operation 4900, and operation 5000 will execute without invalidating a permissions cache entry associated with this user/file combination. After either operation 4907 or 4908 occurs, operation 5001 is executed, which in certain embodiments will perform a permission check to determine if the user has permission to access the file. Operation 5002 then stores a new entry in the permissions cache associated with this user/file combination and further containing the results of the permission check. In certain embodiments, a permissions cache is implemented as described in FIG. 56, described below.

In certain exemplary embodiments, operation 3001 may partition based on the location of files. In such embodiments, operation 3002 may be implemented with a method like that described in FIG. 51. In operation 5101, a file that's been moved to a different folder is received, along with a user name identifying the user whose subindex is to be updated. In operation 5102, the folder the file was previously located in is identified. Operation 5103 then determines what subindex is associated with the folder in which the file was previously located. Operation 5104 removes the entry associated with the file from the previous subindex. Operation 5105 determines which folder the file is currently located in. Decision 5106 inquires as to whether the file is currently located in the home folder belonging to the user identified in operation 5101. If the file is currently located in the user's home folder, transition 5107 is followed, leading to operation 5109, which creates and stores a new entry containing the file's identifier and contents in the user's subindex. In certain embodiments, the data stored in the entry is metadata describing the file. If the file is not currently located in the user's home folder, transition 5108 is followed, leading to operation 5110, which creates and stores a new entry containing the file's identifier and contents in a shared subindex associated with the folder in which the file is currently located. In certain embodiments, the data stored in the entry is metadata describing the file.

Figure 51:
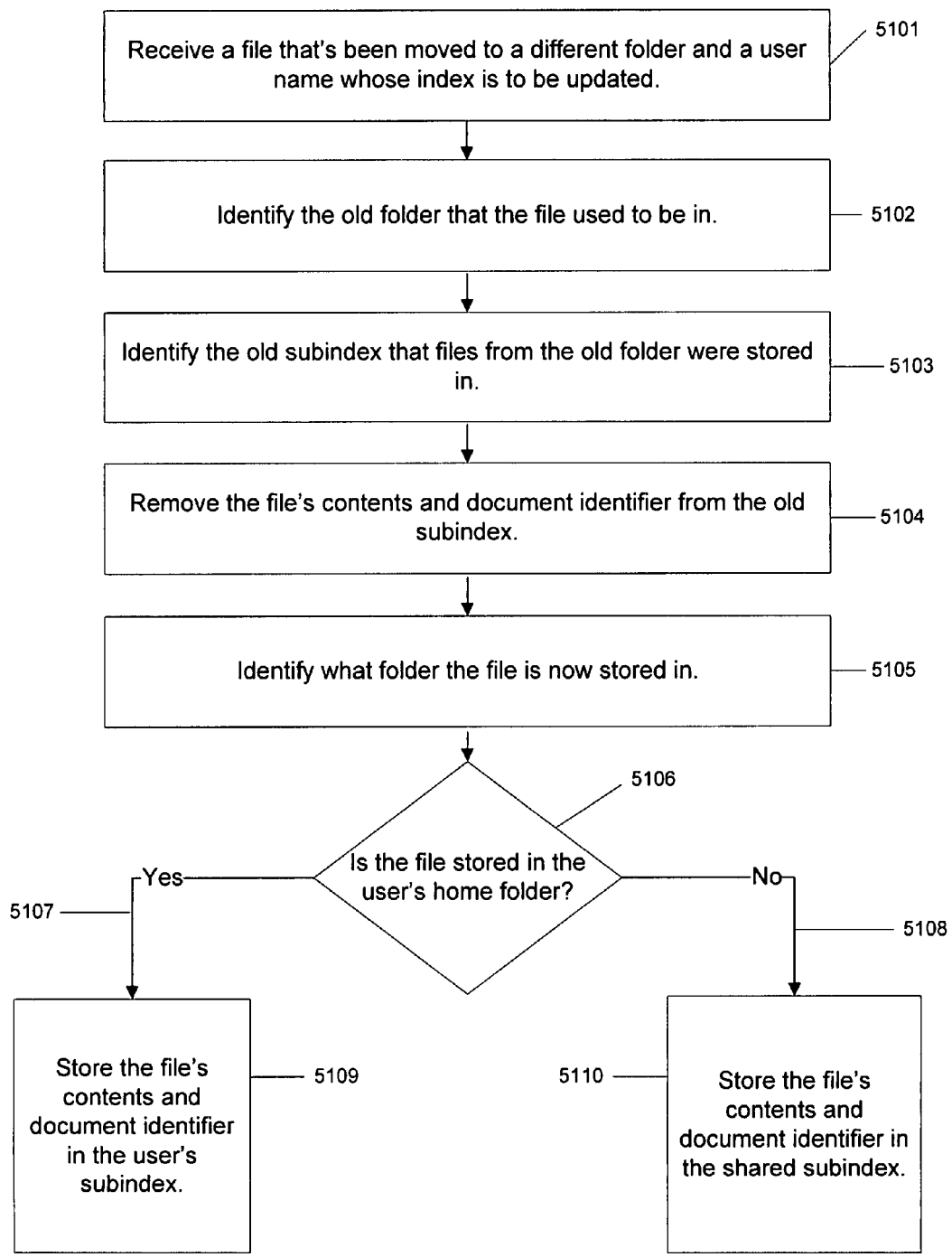
FIG. 51 is a flow chart showing another exemplary method of the present invention.
Figure 52:
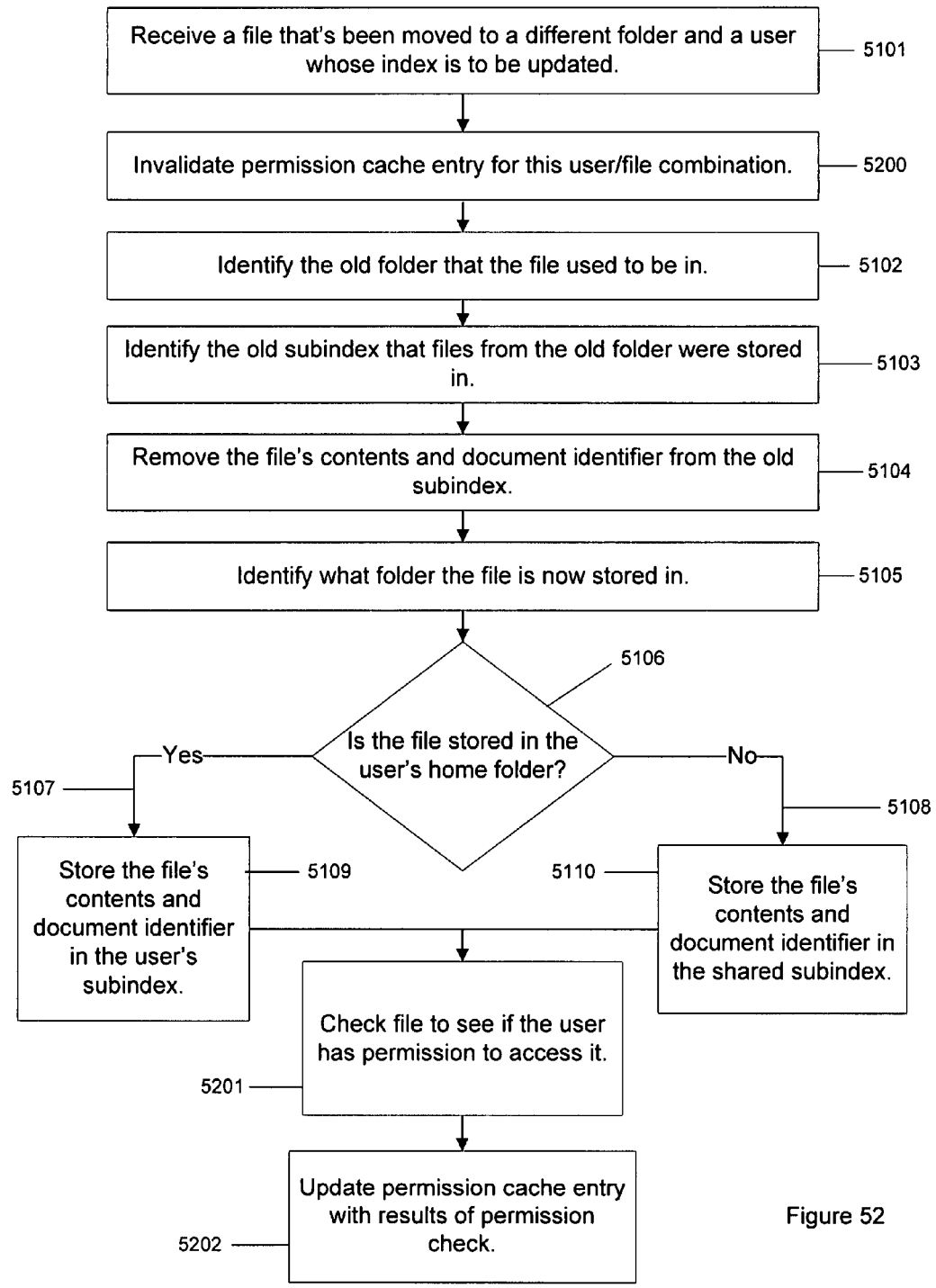
FIG. 52 is a flow chart showing another exemplary method of the present invention.
Figure 56:
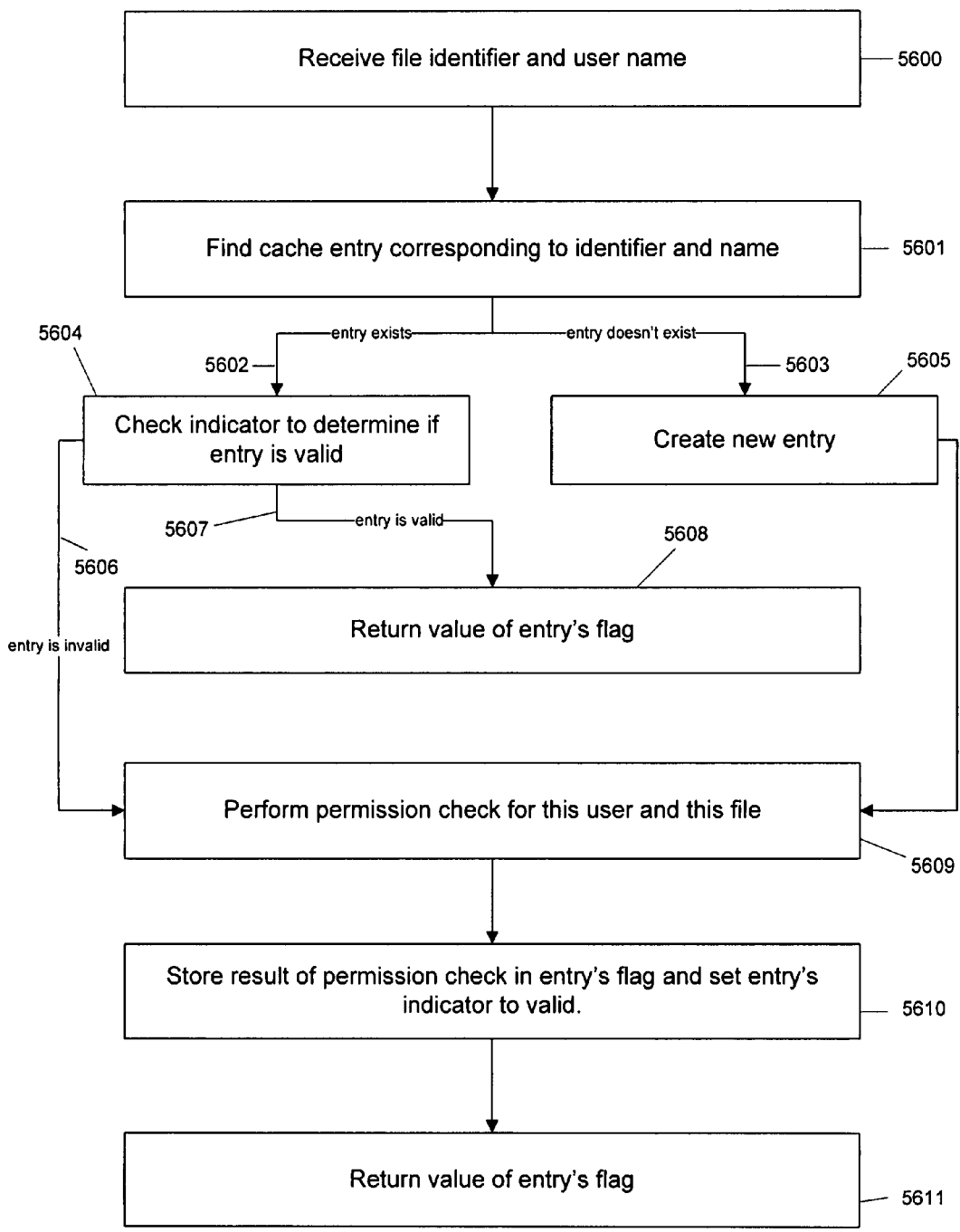
FIG. 56 is a flow chart showing an exemplary method of the present invention.

In certain embodiments, it is desirable to integrate into operation 3002 the maintenance of a permissions cache, such as that described in FIG. 56 and described below. In certain embodiments, operation 3001 creates an index by partitioning files according to their location. The method described in FIG. 51 is one implementation of a method to maintain such an index. FIG. 52 describes the method of FIG. 51 with permissions cache maintenance integrated into it. The first added operation is 5200, which invalidates a permissions cache entry associated with the user/file combination received in operation 5101. In certain embodiments, a corresponding permissions cache entry may not yet exist, in which case operation 5200 will not change anything during the current execution. Following either operation 5109 or operation 5110, operation 5201 performs a permission check upon the file in light of the user as they were received in operation 5101. Operation 5202 then updates a permissions cache entry with the result of the check, wherein said entry corresponds to the user/file combination received in operation 5101. In certain embodiments, a permissions cache entry corresponding to the user/file combination received in 5101 may not yet exist, in which case operation 5202 may create and store a new permissions cache entry.

Figure 53:
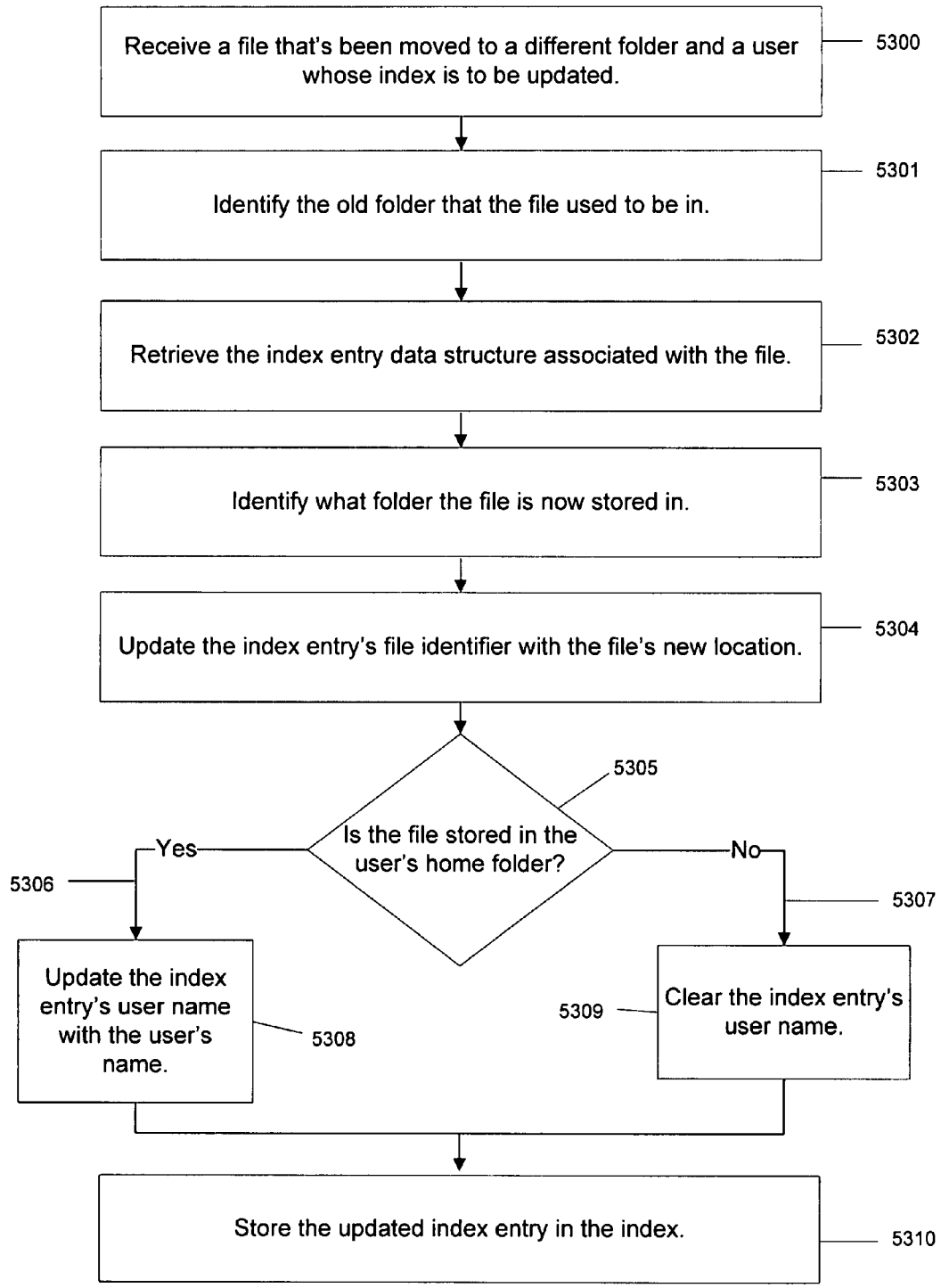
FIG. 53 is a flow chart showing another exemplary method of the present invention.

In certain embodiments, it is desirable to partition files in operation 3001 according to their location and produce an index made up of entries, wherein subindexes exist virtually. In certain embodiments, operation 3002 may be implemented with the method described in FIG. 53 to maintain such an index. In operation 5300, a file that has moved to a different folder and a user whose index is to be updated are received. Operation 5301 then identifies the previous folder in which the file was stored, and operation 5302 retrieves the index entry associated with the file. In certain embodiments, the data structure underlying the index entry may be discarded, while in other embodiments, the data may be changed. In operation 5303, the folder in which the file is currently located is identified. Operation 5304 then updates the index entry associated with the file to reflect the file's new location. Decision 5305 determines whether the file is currently stored in the user's home folder. If the file is currently stored in the user's home folder, transition 5306 is followed and operation 5308 updates the index entry's user name with the user's name. If the file is not currently stored in the user's home folder, transition 5307 is followed and operation 5309 clears the index entry's user name. In certain embodiments, clearing the index entry's user name may represent assigning a null value to the corresponding data element. In other embodiments, clearing the entry's user name may represent assigning a constant value to the corresponding data element. In operation 5310, the updated index entry is stored back in the index, with the virtual subindex defined by various values of entries' user names correspondingly updated.

Figure 54:
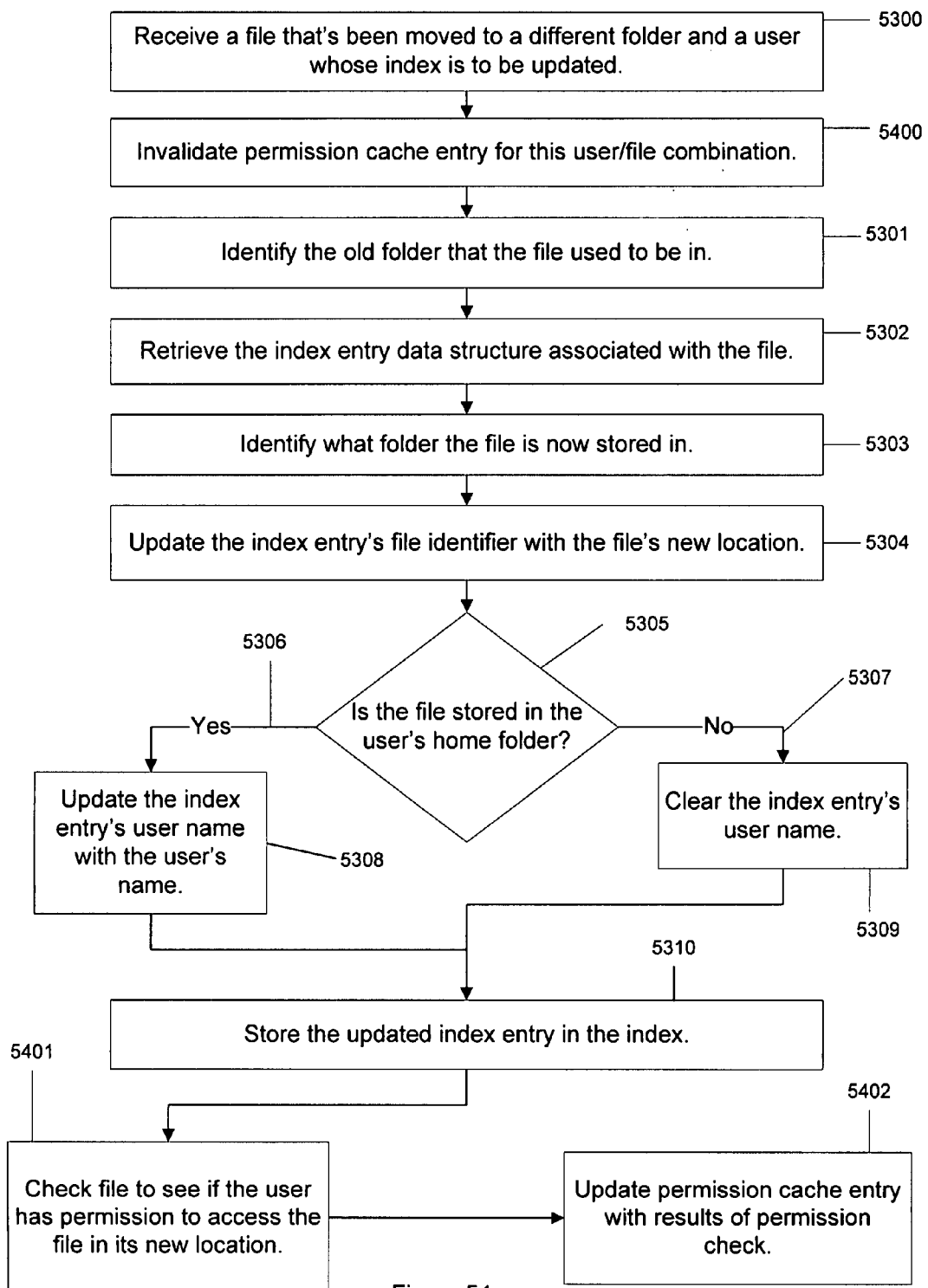
FIG. 54 is a flow chart showing another exemplary method of the present invention.

In certain embodiments, it is desirable to integrate maintenance of a permissions cache to operation 3002. One exemplary embodiment of such a permissions cache is described in FIG. 56, discussed below. In some embodiments, wherein operation 3001 produces a single index partitioned by file location, operation 3002 may be implemented with the method described in FIG. 54, which integrates permissions cache maintenance functionality into the method described in FIG. 53. The first additional operation is 5400, wherein a permissions cache entry associated with the user/file combination received in operation 5300 is invalidated. In certain embodiments, a permissions cache entry may not yet exist for the user/file combination received in operation 5300. In such embodiments, the current operation 5400 will not invalidate a permissions cache entry. Operation 5401 follows the execution of operation 5310, performing a permissions check to determine if the user has permission to access the file in its new location. Operation 5402 then updates a permissions cache entry with the results of the permission check and the user/file combination received in operation 5300. In certain embodiments where no permissions cache entry yet exists for the user/file combination received in operation 5300, one may be created and stored by the method described in FIG. 54.

Figure 55A:
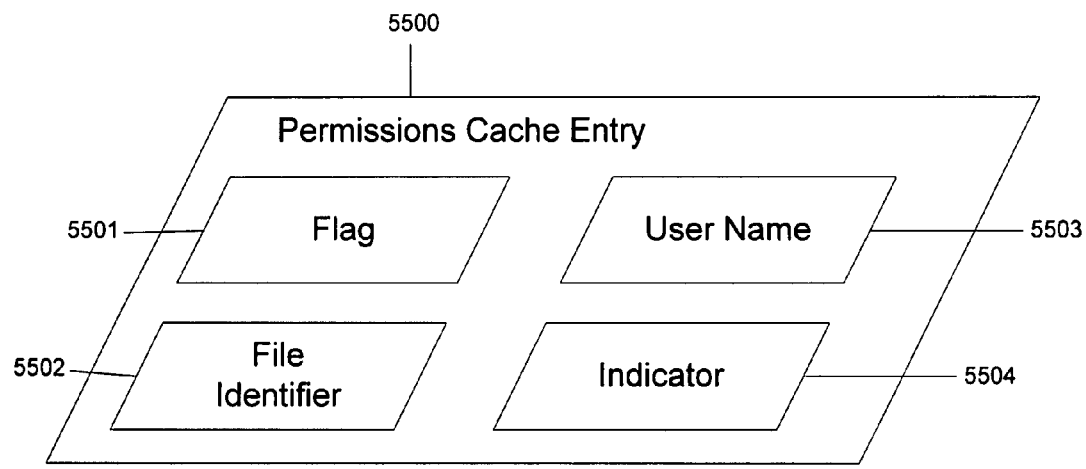
FIGS. 55A and 55B show an example of a permissions cache entry and a permissions cache composed of entries, respectively.
Figure 55B:
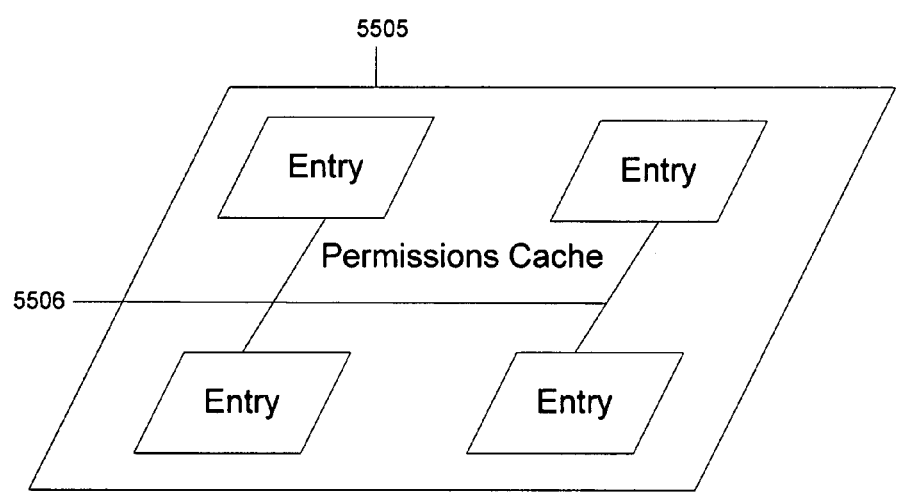

In certain embodiments, it is desirable to integrate a permissions cache into the method described in FIG. 30 and referenced elsewhere in this description. In one embodiment, the foundation of a permissions cache is a permissions cache entry 5500, described in FIG. 55. Permissions cache 5505 is composed entries 5506, each of which is of the type entry 5500. An entry 5500 contains a flag 5501, which in certain embodiments takes on the value of true or false depending on whether the user identified by user name 5503 has permission or does not have permission to access the file identified by file identifier 5502, respectively. Entry 5500 also contains indicator 5504 which indicates whether or not the entry is still valid.

In certain embodiments, it is desirable for the invention to utilize a permissions cache. In other embodiments, a permissions cache is integrated into those circumstances in which a permissions check is needed before a file may be displayed to a user. In certain embodiments, the method described in FIG. 56 may be used to implement the permissions cache. In certain embodiments, the method described in FIG. 56 is invoked because the knowledge of whether a given user has access to a given file is necessary; the expected result of the invocation is whether such access exists. Operation 5600 receives a file identifier and a user name. Operation 5601 then searches the permissions cache for an entry corresponding to the file identified by the file identifier and the user identified by the user name as received in operation 5600. If a corresponding entry exists in the cache, transition 5602 is followed to operation 5604 which tests the entry to determine if its contents are valid. If the entry does not exist in the permissions cache, transition 5603 is followed to operation 5605 which creates a new permissions cache entry data structure. If operation 5604 determines that the existing entry is a valid entry, transition 5607 is followed to operation 5608 which returns the value of the permissions cache entry's flag indicating whether this user has access to that file. However, if the entry indicates that it is invalid, transition 5606 is followed to operation 5609. Also, if the entry did not exist and operation 5605 created a new entry, the method also transitions to operation 5609, in which a permissions check is performed for this user/file combination. The results of the permission check are stored in the entry's flag in operation 5610 and the entry's validity indicator is set to valid. In certain embodiments, this may be the same data structure in memory with new values written to it, and in other embodiments it may be a new data structure in memory. In operation 5611, the value of the entry's flag is returned to the user.

FIGS. 57A-61 will now be referred to in order to describe certain embodiments which use a data structure which contains representations of identifiers of directories which are parents of files in a permissions cache. In other words, the data structure stores representations of identifiers of directories that have children in the permissions cache. This data structure can be used to prevent a problem in which a still-valid permissions cache is entirely invalidated when a directory's permissions change. This problem is often created when a temporary folder, such as a temporary subdirectory in a hierarchical filing system, is created by a program (e.g. by a program during a download process) which causes a change for permissions for a directory. A directory's permissions may also change when moving a folder from one folder to another folder or when explicitly changing the permissions of a folder or when someone is added to a work group for a folder, etc. In the past, this change may cause an entire permissions cache to be invalidated even though no files in the permission cache are children of the directory which has had its permissions changed, such as a temporary folder. According to one embodiment of the present inventions, these changes in permissions for a directory can be monitored by an operating system, such as a kernel or file system, to provide notification that permissions for a directory have changed. According to one embodiment, a method may use the notification of a change of permissions of a directory and may use the data structure of cached directories to determine if the files in the permissions cache are within the directory which changed. If the directory which has changed contains no files in the permissions cache, then the permissions cache does not need to be updated or invalidated. The embodiments relating to FIGS. 57A-61 may be used with at least some of the foregoing methods. For example, those methods which use a permissions cache when searching or screening search results may benefit from using a data structure of cached directories in order to avoid unnecessarily invalidating an entire permissions cache. Further, in at least certain embodiments, a portion of the permissions cache may be flushed or invalidated by using the data structure of cached directories to determine which portion of the permissions cache needs to be invalidated or flushed rather than flushing or invalidating the entire permissions cache if a file within the permissions cache is contained within the directory having a changed permission.

Figure 57A:
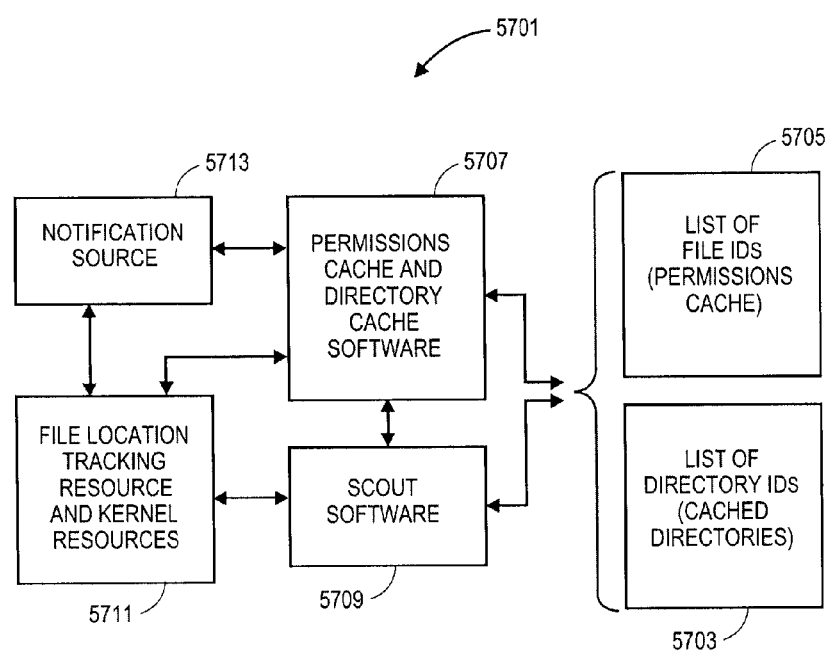
FIG. 57A shows an example of a software architecture and data structures for implementing an embodiment of a permission cache with a list or other data structure of cached directories.

FIG. 57A shows an example of a software architecture which uses a data structure of cached directories. This software architecture 5701 may include a list of directory identifiers 5703, which is a form of a data structure of cached directories. This software architecture further includes a permissions cache, such as the permissions caches described previously herein; this permissions cache 5705 may be a list of file identifiers or other identifiers which identify files for which permissions have been checked. This permissions cache may be on a user-by-user basis such that each user has its own permissions cache. The list of directory identifiers 5703 is a list of directories that contain the files listed in the permissions cache 5705. In other words, the directory identifiers in the list of directory identifiers 5703 identify directories that have children in the permission cache. This will be explained further below in conjunction with FIG. 57B. The software architecture 5701 also includes software 5707 for managing and creating and updating both the permissions cache 5705 and the cached directories in the list of directory identifiers 5703. The software 5707 and the scout software 5709 perform the operations shown in FIG. 59 as well as performing the operations in FIG. 58 which relate to the management of the two caches, the permissions cache 5705 and the list of directory identifiers 5703. For example, the software 5707 builds and updates both the permissions cache 5705 and the list of directory identifiers 5703. The scout software 5709 is, in one embodiment, called by the software 5707 in operation 5907 to find all files which are children of the directory which has had its permissions changed and which was the subject of the notification in operation 5901 of FIG. 59. Both the software 5707 and the scout software 5709 are operatively coupled to the memory storing the data structures which constitute the permissions cache 5705 and the list of directory identifiers 5703. The software 5707 is coupled to a notification source 5713 which may be a software resource in a kernel and which provides a notification of either a file or directory change with respect to the permissions of the file or the directory. The notification source 5713 may be coupled to another resource 5711 which includes file tracking resources, which track the location (e.g. path name) of the file and changes to those locations as well as changes to the location (path) of a directory. In addition, the resource 5711 includes kernel resources, which receive calls from the scout software 5709 and from the software 5707 to provide information about the files or directories, such as the path name or other location identifiers for the files or directories. It will also be understood that the software 5707, and optionally the scout software 5709, may be coupled to user-level programs such as a file management software, such as the Finder or Windows Explorer, or a search software, such as Spotlight, in order for Spotlight or the Finder to make use of the permissions cache. The scout software 5709 may, in addition to finding all files which are children of the directory which has had its permissions changed and was the subject of the notification in operation 5901, also invalidate or remove those children from the permission cache in order to update the permissions cache.

In alternative embodiments, the scout software 5709 may be omitted; in this case, the cached directories are kept in the list of directory identifiers 5703 in order to determine whether or not the permissions cache should be entirely invalidated or not. If permissions change for a directory which does not contain children in the permissions cache, then the permissions cache does not need to be invalidated. On the other hand, if the directory which has had its permissions changed contains a child or children within the permissions cache, then the permissions cache is entirely invalidated. This embodiment may be useful in those cases where users rarely or the system rarely changes permissions for directories.

The list of directory identifiers 5703 may be a simple list of every parent for every file in the permissions cache, wherein the list is lossless and complete. In alternative embodiments, the list of directory identifiers may be a lossy data structure, such as a Bloom filter, which is a space-efficient, probabilistic data structure that is used to test whether an element is a member of a set; false positives are possible with a Bloom filter, but false negatives are not. Elements can be added to the set, but typically not removed, although this can be addressed with a counting filter. An implementation of a Bloom filter for the list of directory identifiers 5703 is described further below in conjunction with FIG. 60.

Figure 57B:
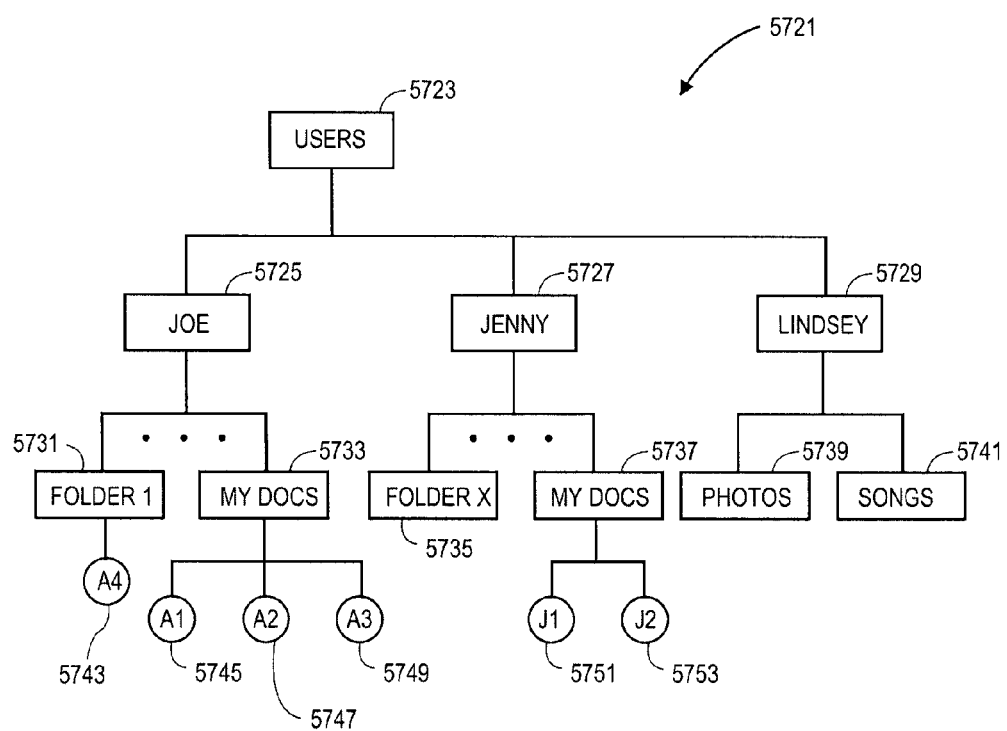
FIG. 57B shows an example of a directory structure in a hierarchical file system according to one embodiment of the invention.
Figure 58:
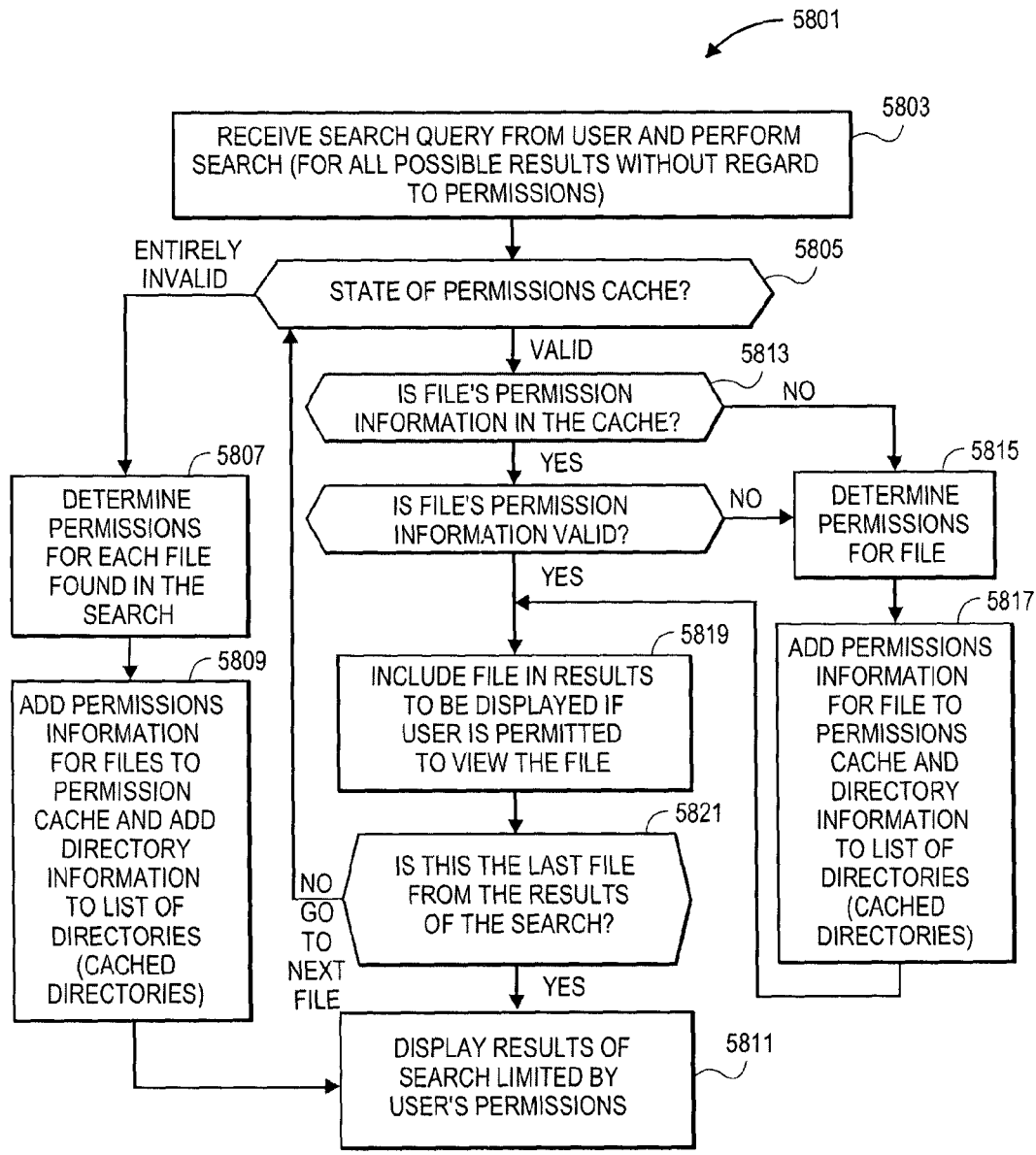
FIG. 58 is a flow chart which illustrates a method of using a permission cache with a list or other data structure of cached directories.

FIG. 57B will now be referred to in order to explain how one embodiment of the software architecture 5701 may operate by using both the permissions cache and a list of directory identifiers, such as the permission cache 5705 and the list of directory identifiers 5703. FIG. 57B shows a diagram of certain folders or directories and files within those folders or directories which may be maintained in a hierarchical filing system 5721. A root directory or a subdirectory Users 5723 may be the main user directory or the only directory into which users are allowed to store files. The rectangles show other subdirectories, including subdirectories 5725, 5727, 2729, 5731, 5733, 5735, 5737, 5739, and 5741. Each of these may be considered folders displayed in a file management software program, such as the Finder from Apple Inc. of Cupertino, Calif. Certain documents, shown in circles, are also stored in the hierarchical file system within their respective folders or subdirectories. Hence, document A4, also shown as document 5743, is stored within the folder 5731. Documents 5745, 5747, and 5749 are stored within the folder or subdirectory 5733. Documents 5751 and 5753 are stored within the folder or subdirectory 5737, and documents 5755 and 5757 are stored within the folder or subdirectory 5741. Assume that documents 5743, 5749, and 5753 have been retrieved from prior search queries, and as a result have had their permissions determined and stored within the permissions cache 5705. An example of an embodiment for implementing that process is shown in FIG. 58. Further, also assume that the parent directories for those three documents 5743, 5747, and 5753 have had their identifiers stored in the list of directory identifiers 5703; this may also be performed, in certain embodiments, by the method shown in FIG. 58. Hence, the directories identified in the list of directory identifiers 5703 are directories 5731, 5725, 5723, 5733, 5727, and 5737. Should permissions for a directory not listed in the list of directory identifiers 5703 be changed, then, by following the method of, for example, FIG. 59, it can be determined that the permissions cache does not need to be invalidated or modified at all. For example, if permissions for the directory 5729 change, it can be determined by comparing that directory to the list of directory identifiers 5703 that no change needs to be made to the permissions cache 5705. Similarly, if permissions were changed for the directory 5741, it can be determined that no changes are required for the permissions cache 5705 by implementing, for example, the method shown in FIG. 59. On the other hand, if permissions for the directory 5731 change, then permissions for the file 5743 need to be updated (e.g. those permissions need to be marked as invalid).

FIG. 58 shows an example of a method which may be used to create and update a permissions cache and a list of directory identifiers having cache directories. The method shown in FIG. 58 is an embodiment which uses a permissions cache to validate permissions as part of a search process, although it will also be understood that this embodiment may also be alternatively used to decide whether to give access to files for other processes, such as file management software processes (e.g. file access processes provided by the Finder) or other user-level application software. In this example, it is assumed that the entire permissions cache may be invalidated in certain circumstances (e.g. as a result of a timeout of the scout software that is described in conjunction with FIG. 59), but the cache may also be partially invalidated, leaving a portion unchanged and another portion updated (e.g. invalidated or removed or flushed) either through the method shown in FIG. 58 or the method shown in FIG. 59. It is also assumed that the search criteria is used to perform the search through, for example, one or more metadata databases and/or index databases (e.g. full context indexed database or databases) without regard to permissions, and then the permissions for files found in the search are validated in the rest of the process. It will be understood that the validation of permissions of files and the searching for the files matching the search query could be performed concurrently; in other words, as files which match the search query are found, their permissions can be validated while the search, using the search query, continues to look for other files that match the search query. In operation 5803 of method 5801, the search query is received and a search is performed. The search is normally done for all possible results (e.g. files which match the search query) without regard to permissions for the files. Then in operation 5805, the state of the entire permissions cache is determined. The entire permissions cache may become invalid as a result of, in at least certain embodiments, the scout software running out of time to perform its operations as explained herein in conjunction with FIG. 59. If the entire permissions cache is invalid, then operation 5807 follows in which permissions are determined for each file found in the search. Further, in operation 5809, permission information for those files is added to the permission cache and directory information for those files is added to the list of directories containing the cached directories, such as the list of directory identifiers 5703. These operations may be performed by the software 5707. As new searches are performed, the permissions cache is built up over time and the cached directories are also built up over time and used for subsequent searching. After the permissions checking and permissions cache building operations, the results of the search may be displayed or otherwise presented in operation 5811. The results are limited by the user's permission as described above.

If operation 5805 determines that the state of the permissions cache is valid (at least in part), then operation 5813 is performed to determine whether the file's permission information is in the permissions cache. If it is not, processing proceeds to operation 5815 in which the permissions for the file are determined, and these permissions are added to the permissions cache in operation 5817 which also adds the directory information for the file to the list of directories (cached directories), such as the list of directory identifiers

5703. At this point, processing may continue from operation 5817 to operation 5819 as shown in FIG. 58. In operation 5813, if it is determined that the file's permission information is in the cache, then processing proceeds to operation 5814 in which it is determined whether the file's permissions information is valid. If it is not, processing proceeds to operation 5815 and operation 5817; otherwise, processing proceeds to operation 5819 in which the file is included in the results to be displayed if the user is permitted to view or otherwise access the file. Then in operation 5821, it is determined whether there are any further files, retrieved by the search query, which require validation of permissions; if there are such files, then processing returns to operation 5805 and continues as described above. If there are no further files, then the results of the search, after filtering for permissions, are displayed or are otherwise presented. It will be appreciated that the results may be displayed as each file has its permissions validated rather than after determining that all searched and found files have had their permissions validated. It will also be appreciated that, in other embodiments, the order of operations may be changed or different than shown in FIG. 58 and that additional operations or fewer operations may also be performed. The method of FIG. 58 may also be modified in an embodiment in which the permissions cache is either entirely valid or invalidated should a change arise, rather than being partially valid and updating the state of the invalid portion of the permissions cache.

Figure 59:
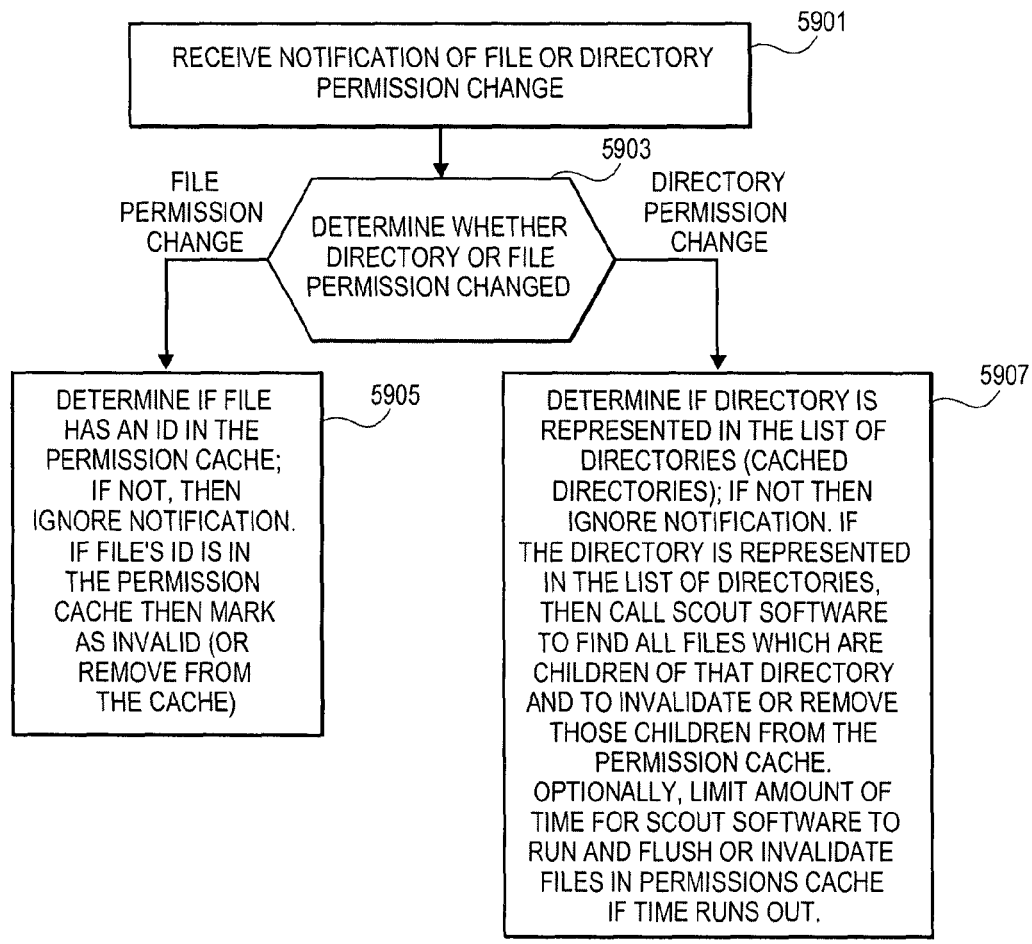
FIG. 59 is a flow chart which shows a method for updating permissions in an embodiment which uses a permission cache with a list or other data structure of cached directories.

While the method shown in FIG. 58 relates to an embodiment in which the permissions cache is built and updated and the list of directory identifiers is built and updated, the method shown in FIG. 59 relates to an aspect of determining whether the permissions cache should be updated or invalidated based upon a change to the permissions of a directory, such as the folder 5731 or the folder 5729 shown in FIG. 57B. In operation 5901, a notification is received that a file or directory has had its permissions changed. This notification may be provided by an operating system kernel or a file system application running on the operating system kernel or by a notification source which is coupled to receive calls or notices from a kernel or file system application. The notification may be received by permissions software, such as the software 5707 shown in FIG. 57A. In response to receiving the notification, operation 5903 determines whether the change in permissions is for a directory or a file. If the change in permissions is a change for a file, then operation 5905 follows operation 5903. In operation 5905, it is determined whether the file has an identifier already in the permissions cache. If it does not, then the notification is ignored. This is a case where a file has previously not been processed to have its identifier added to the permissions cache, and hence it is appropriate to ignore the notification. On the other hand, if the file's identifier has been previously placed in the permissions cache, then the identifier is marked as invalid or removed from the permissions cache in order to update the permissions cache. This operation allows for the permissions cache to be partially invalid (and marked as such) and remain intact for the portion of the permissions cache which is still valid. If operation 5903 determines that permissions for a directory have changed, then processing proceeds to operations 5907 which involve, potentially, a series of operations. If the directory is determined to be represented in the list of directories (cached directories) then, in one embodiment, scout software is called to attempt to correct the permission cache or to update the permissions cache for all children of that directory. On the other hand, if the directory is not represented in the list of directories (cached directories), then the notification is ignored. The scout software attempts to find all files which are children of the directory which was the subject of the notification. Further, the scout software may, after finding those files, attempt to invalidate or remove those children from the permissions cache. In other words, the scout software will remove file identifiers (or mark as having invalid permissions data) for those files which are children of the directory which was the subject of the notification in operation 5901. In certain embodiments, it may be desirable to limit the amount of time for the scout software to operate. This may be particularly desirable where the scout software is using a data structure, such as a Bloom filter, which may contain false positives. In other words, the scout software may be looking for files which are not in the permissions cache given that a false positive can occur with a Bloom filter. In this embodiment, the scout software may be given a limited amount of time to operate and attempt to find the files which are children of the directory that is the subject of the notification and to flush or invalidate the file identifiers in the permissions cache for files which are children of that directory. In certain embodiments, it may be desirable to limit the amount of time under which the scout software may operate, even if a Bloom filter is not used for the list of directory identifiers. For example, if the list of directory identifiers is complete and lossless (e.g. a normal list of directories), it may still be desirable to limit the amount of time the scout software has to run because the operation of this software may place too high a burden on the data processing system, causing it to appear slow, etc. If the amount of time for the scout software runs out, and the scout software has not completed its tasks, such as finding all files which are children of the directory or updating the permissions cache for those files, then it is necessary to invalidate the entire permissions cache because it is no longer clear which portions are valid. In an alternative embodiment, the status of the scout software may be saved which indicates the amount of work which remains for the scout software, and at idle times for the data processing system, the scout software may be called again with a saved state to start up, from that saved state, the scout software to attempt to complete its processing. In certain embodiments, the scout software does not attempt to update the list of directory identifiers; for example, in the case where a Bloom filter is used for the list of directory identifiers, the scout software does not attempt to modify the list of directory identifiers. In alternative embodiments, the scout software may also modify the list of directory identifiers so that it is also updated in addition to the permissions cache.

Figure 60:
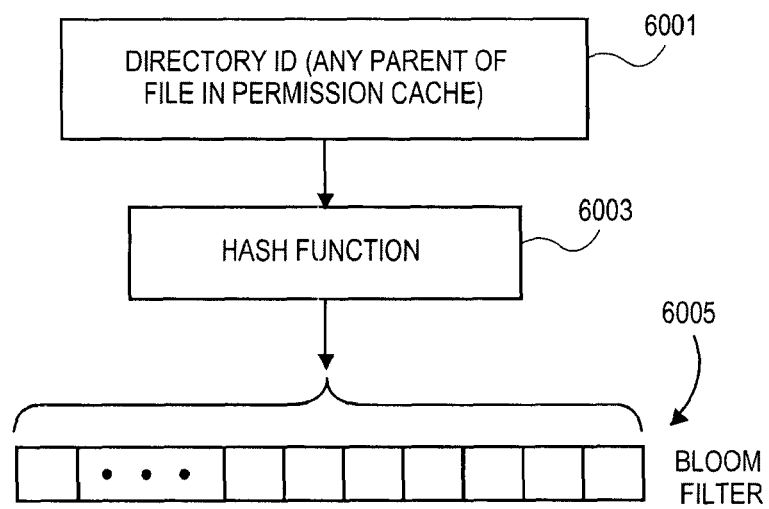
FIG. 60 shows an example of an implementation of a data structure for the cached directories.

FIG. 60 shows an example of a data structure for storing a list of directory identifiers (cached directories). This particular embodiment assumes that a fixed-size Bloom filter is used as this data structure. It will be appreciated that there are numerous other data structures which may be used rather than a Bloom filter. The directory identifier 6001, which represents any parent of a file in a permission cache, is hashed in a hash function 6003. This hash function may be a modulo operation or other operations which produce a value which then can be stored in an array, which may be a fixed size, such as a Bloom filter 6005. The array can then be checked later by taking a directory identifier received in a notification (such as the notification in operation 5901) and performing the same hash function on that directory identifier and determining whether a value after that hash function has been stored in the location corresponding to that value. If the value has been stored in that particular location, then the location remains as it was before; on the other hand, if the value has not been stored there, then a value, such as a 1, is written to the location to indicate that the directory should be added to the list of directory identifiers.

Figure 61:
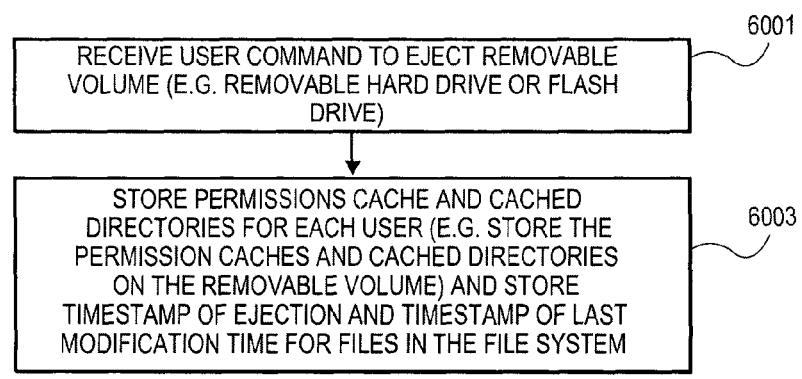
FIG. 61 shows an example of a method, according to one embodiment, for using a permission cache and a list or other data structure of cached directories with a removable storage volume, such as a removable hard drive or flash memory volume.

FIG. 61 shows an optional method which may be used for a removable volume, such as a removable hard drive or flash drive. This method allows the use of a permissions cache and the list of directory identifiers with such a removable volume. In operation 6001, a user command is received to eject the removable volume. In response, the data processing system stores, in operation 6003, the permissions cache and the cache directories for each user. These may be stored on the removable volume itself or on a volume of the data processing system to which the removable volume is coupled. Operation 6003 also includes storing a time stamp of the ejection of the removable volume and a time stamp of the last modification time for files in the file system for the removable volume. These time stamps can be used when the removable volume is mounted again on a data processing system to determine whether or not the permissions cache and the list of directory identifiers is still valid. If the time stamps are close enough in time (e.g. as measured by the difference in time being compared to a predetermined value) then it is concluded that the permissions cache and the cache directories are still valid. If, on the other hand, the difference in time is too large, then the data processing system determines that both the permissions cache and the list of directory identifiers is invalid and must be rebuilt, using a method such as the method shown in FIG. 58.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory machine readable storage medium containing executable computer program instructions which cause a data processing system to perform a method comprising:
generating search results by searching a metadata database or an index database without regard to permissions;
determining that permission information for a file in the search results is not included in a permissions cache;
determining valid permission information for the file in a hierarchical file system;
adding the valid permission information for the file to the permissions cache;
adding directory information for the file to a directory cache, wherein the directory cache identifies directories having files included in a permissions cache;
receiving a notification of a change of permissions of a directory in the hierarchical file system;
determining, in response to the notification, whether the directory is listed in the directory cache;
invalidating or deleting at least a portion of the permissions cache when the directory is listed in the directory cache; and
maintaining validity of the permissions cache when the directory is not listed in the directory cache.

2. The medium as in claim 1, wherein the determining that a file's permission information is not included in the permissions cache further comprises comparing the directory to the directory cache and wherein the directory is a subdirectory.

3. The medium as in claim 1, wherein the invalidating or deleting a portion of the permissions cache is terminated automatically after a period of time, and the entire permissions cache is invalidated or flushed when the invalidating or deleting the portion of the permissions cache is incomplete when terminated.

4. The medium as in claim 1, wherein invalidating or deleting at least a portion of the permissions cache is performed for a first portion of the permissions cache while a second portion of the permissions cache is not invalidated or deleted.

5. The medium as in claim 1, wherein the directory cache is configured as a fixed size Bloom filter in which directory identifiers are hashed and stored in the directory cache.

6. The medium as in claim 1, wherein separate permission caches and directory caches are maintained for each user and each permission cache and each directory cache is stored as one or two files in the hierarchical file system.

7. The medium as in claim 1, wherein the method further comprises:
receiving a notification of a change of permissions of a file in the hierarchical file system;
determining whether to partially update the permissions cache for permissions of the file in response to the receiving of the notification of the change of permissions of the file.

8. The medium as in claim 1, wherein the permissions cache is used in screening search results based on permissions.

9. The medium as in claim 1, wherein the directory cache stores hashed directory identifiers in a lossy manner.

10. The medium as in claim 1, further comprising finding any files that are children of the directory.

11. A machine implemented method comprising:
generating search results by searching a metadata database or an index database without regard to permissions;
determining that permission information for a file in the search results is not included in a permissions cache;
determining valid permission information for the file in a hierarchical file system;
adding the valid permission information for the file to the permissions cache;
adding directory information for the file to a directory cache, wherein the directory cache identifies directories having files included in a permissions cache;
receiving a notification of a change of permissions of a directory in the hierarchical file system;
determining, in response to the notification, whether the directory is listed in the directory cache;
invalidating or deleting at least a portion of the permissions cache when the directory is listed in the directory cache; and
maintaining validity of the permissions cache when the directory is not listed in the directory cache.

12. The method as in claim 11, wherein the determining that a file's permission information is not included in the permissions cache further comprises comparing the directory to the directory cache, and wherein the directory is a subdirectory.

13. The method as in claim 11, wherein the invalidating or deleting a portion of the permissions cache is terminated automatically after a period of time, and the entire permissions cache is invalidated or flushed when the invalidating or deleting the portion of the permissions cache is incomplete when terminated.

14. The method as in claim 11, wherein invalidating or deleting at least a portion of the permissions cache is performed for a first portion of the permissions cache while a second portion of the permissions cache is not invalidated or deleted.

15. The method as in claim 11, wherein the directory cache is configured as a fixed size Bloom filter in which directory identifiers are hashed and stored in the directory cache.

16. The method as in claim 11, wherein separate permission caches and directory caches are maintained for each user and each permission cache and each directory cache is stored as one or two files in the hierarchical file system.

17. The method as in claim 11, wherein the method further comprises:
receiving a notification of a change of permissions of a file in the hierarchical file system;
determining whether to partially update the permissions cache for permissions of the file in response to the receiving of the notification of the change of permissions of the file.

18. The method as in claim 11, wherein the permissions cache is used in screening search results based on permissions.

19. The method as in claim 11, wherein the directory cache stores hashed directory identifiers in a lossy manner.

20. The medium as in claim 10, wherein the invalidated or deleted portion of the permissions cache corresponds to the files found to be children of the directory.

21. The method as in claim 11, further comprising finding any files that are children of the directory.

22. The method as in claim 21, wherein the invalidated or deleted portion of the permissions cache corresponds to the files found to be children of the directory.

* * * * *